US005196946A

United States Patent [19]

Balkanski et al.

[11] Patent Number: 5,196,946

[45] Date of Patent: Mar. 23, 1993

[54] SYSTEM FOR COMPRESSION AND DECOMPRESSION OF VIDEO DATA USING DISCRETE COSINE TRANSFORM AND CODING TECHNIQUES

[75] Inventors: Alexandre Balkanski, San Francisco; Steve Purcell, Mountain View; James Kirkpatrick, San Jose, all of Calif.

[73] Assignee: C-Cube Microsystems, San Jose, Calif.

[21] Appl. No.: 494,242

[22] Filed: Mar. 14, 1990

[51] Int. Cl.[5] .............................................. H04N 1/415

[52] U.S. Cl. .................................... 358/433; 358/427; 382/56

[58] Field of Search ............... 358/133, 135, 426, 427, 358/432, 433, 443, 310; 382/56; 364/725, 726, 727, 728.01, 826

[56] References Cited

U.S. PATENT DOCUMENTS

| | | | |
|---|---|---|---|
| 4,704,628 | 11/1987 | Chen et al. | 358/135 |
| 4,847,677 | 7/1989 | Music et al. | 358/135 |
| 4,858,026 | 8/1989 | Richards | 358/135 |
| 4,910,609 | 3/1990 | Nicholas et al. | 358/433 |

*Primary Examiner*—Leo H. Boudreau

*Assistant Examiner*—Barry Stellrecht

*Attorney, Agent, or Firm*—Skjerven, Morrill, MacPherson, Franklin & Friel

[57] ABSTRACT

A digital video compression system and an apparatus implementing this system are disclosed. Specifically, matrices of pixels in the RGB signal format are converted into YUV representation, including a step of selectively sampling the chrominance components. The signals are then subjected to a discrete cosine transform (DCT). A circuitry implementing the DCT in a pipelined architecture is provided. A quantization step eliminates DCT coefficients having amplitude below a set of preset thresholds. The video signal is further compressed by coding the elements of the quantized matrices in a zig-zag manner. This representation is further compressed by Huffman codes. Decompression of the signal is substantially the reverse of compression steps. The inverse discrete cosine transform (IDCT) may be implemented by the DCT circuit. Circuits for implementing RGB to YUV conversion, DCT, quantization, coding and their decompression counterparts are disclosed. The circuits may be implemeneted in the form an integrated circuit chip.

6 Claims, 94 Drawing Sheets

DATA DEFINITIONS AND SEQUENCE

KEY TO FIGURE 5A

| | |
|---|---|
| FIG. 5A-1 | FIG. 5A-2 |
| FIG. 5A-3 | FIG. 5A-4 |

| CLOCK | COMPRESS | CNT(3) | CNT(2) | CNT(1) | CNT(Ø) | 518a | FROM BLK STO TOPDATA | FROM BLK STO BOTDATA 518b | FROM DCT STO BOTDATA 518c | FROM DCT STO TOPDATA 518d | LOAD 4 REG 501c T, 505b B | LOAD 4 | LOAD 5 REG 502c T, 506b B | LOAD 5 | LOAD 6 REG 503c T, 507c B | LOAD 6 |
|---|---|---|---|---|---|---|---|---|---|---|---|---|---|---|---|---|
| Ø | 1 | 1 | Ø | 1 | 1 | | | | Y(Ø) | Y(1) | | Ø | | Ø | | Ø |
| 1 | 1 | 1 | 1 | Ø | Ø | | | | Y(2) | Y(3) | | Ø | | Ø | | Ø |
| 2 | 1 | 1 | 1 | Ø | 1 | | | | Y(4) | Y(5) | | Ø | | Ø | | Ø |
| 3 | 1 | 1 | 1 | 1 | Ø | | | | Y(6) | Y(7) | | Ø | | Ø | | Ø |
| | | | | | | | | | | | | | | | | |
| 4 | 1 | 1 | 1 | 1 | 1 | | X(Ø) | X(1) | | | | 1 | | Ø | | Ø |
| 5 | 1 | Ø | Ø | Ø | Ø | | X(2) | X(3) | | | X(Ø) X(1) | Ø | | 1 | | Ø |
| 6 | 1 | Ø | Ø | Ø | 1 | | X(4) | X(5) | | | | Ø | X(2) X(3) | Ø | | 1 |
| 7 | 1 | Ø | Ø | 1 | Ø | | X(6) | X(7) | | | | Ø | | Ø | X(4) X(5) | Ø |
| | | | | | | | | | | | | | | | | |
| 8 | 1 | Ø | Ø | 1 | 1 | | | | | | | Ø | | Ø | | Ø |
| 9 | 1 | Ø | 1 | Ø | Ø | | | | | | | Ø | | Ø | | Ø |
| 1Ø | 1 | Ø | 1 | Ø | 1 | | | | | | | Ø | | Ø | | Ø |
| 11 | 1 | Ø | 1 | 1 | Ø | | | | | | | Ø | | Ø | | Ø |
| | | | | | | | | | | | | | | | | |
| 12 | 1 | Ø | 1 | 1 | 1 | | | | | | | 1 | | Ø | | Ø |
| 13 | 1 | 1 | Ø | Ø | Ø | | | | | | | Ø | | 1 | | Ø |
| 14 | 1 | 1 | Ø | Ø | 1 | | | | | | | Ø | | Ø | | 1 |
| 15 | 1 | 1 | Ø | 1 | Ø | | | | | | | Ø | | Ø | | Ø |

FIG. 5B -1

KEY TO FIGURE 5B

| | | |
|---|---|---|
| FIG.5B-1 | FIG.5B-2 | FIG.5B-3 |

| LOAD 7 REG (504c T, 508c B) | LOAD 7 | SELECTION OF BLOCK STORAGE: A_TOP (514c) | SEL Ø | A_BOT (515c) | SEL Ø | B_TOP (512c) | SEL Ø | B_BOT (513c) | SEL Ø | LOAD Ø REG (501d T, 505d B) | LOAD Ø | LOAD 1 REG (502d T, 506d B) | LOAD 1 | LOAD 2 REG (503d T, 507d B) | LOAD 2 |
|---|---|---|---|---|---|---|---|---|---|---|---|---|---|---|---|
| | Ø | | Ø | | Ø | | Ø | | Ø | | 1 | | Ø | | Ø |
| | Ø | | Ø | | Ø | | Ø | | Ø | Y(Ø) Y(1) | Ø | | 1 | | Ø |
| | Ø | | 1 | | 1 | | 1 | | 1 | | Ø | Y(2)Y(3) | Ø | | 1 |
| | Ø | | 1 | | 1 | | 1 | | 1 | | Ø | | Ø | Y(4)Y(5) | Ø |
| | | | | | | | | | | | | | | | |
| | Ø | | — | | — | | — | | — | | Ø | | Ø | | Ø |
| | Ø | | — | | — | | — | | — | | Ø | | Ø | | Ø |
| | Ø | | — | | — | | — | | — | | Ø | | Ø | | Ø |
| | 1 | | — | | — | | — | | — | | Ø | | Ø | | Ø |
| | | | | | | | | | | | | | | | |
| X(6) X(7) | Ø | X(2) | Ø | X(5) | Ø | X(1) | Ø | X(6) | Ø | | 1 | | Ø | | Ø |
| | Ø | X(2) | Ø | X(5) | Ø | X(1) | Ø | X(6) | Ø | | Ø | | 1 | | Ø |
| | Ø | X(3) | 1 | X(4) | 1 | X(Ø) | 1 | X(7) | 1 | | Ø | | Ø | | 1 |
| | Ø | X(3) | 1 | X(4) | 1 | X(Ø) | 1 | X(7) | 1 | | Ø | | Ø | | Ø |
| | | | | | | | | | | | | | | | |
| | Ø | | — | | — | | — | | — | | Ø | | Ø | | Ø |
| | Ø | | — | | — | | — | | — | | Ø | | Ø | | Ø |
| | Ø | | — | | — | | — | | — | | Ø | | Ø | | Ø |
| | 1 | | — | | — | | — | | — | | Ø | | Ø | | Ø |

FIG. 5B -2

| LOAD 3 REG 508d B / 504d T | LOAD 3 | SELECTION OF DCT STORAGE: A_TOP (514d) | SEL 1 | SEL Ø | A_BOT (515d) | SEL 1 | SEL Ø | B_TOP (512d) | SEL 1 | SEL Ø | B_BOT (513d) | SEL 1 | SEL Ø | BLK_OR_DCT |
|---|---|---|---|---|---|---|---|---|---|---|---|---|---|---|
| | Ø | | — | — | | — | — | | — | — | | — | — | Ø |
| | Ø | | — | — | | — | — | | — | — | | — | — | Ø |
| | Ø | | — | — | | — | — | | — | — | | — | — | Ø |
| | 1 | | — | — | | — | — | | — | — | | — | — | Ø |
| Y(6)Y(7) | | | | | | | | | | | | | | |
| | Ø | Y(2) | Ø | Ø | Y(5) | Ø | 1 | Y(1) | 1 | Ø | Y(6) | 1 | 1 | 1 |
| | Ø | Y(2) | Ø | Ø | Y(5) | Ø | 1 | Y(1) | 1 | Ø | Y(6) | 1 | 1 | 1 |
| | Ø | Y(3) | Ø | 1 | Y(4) | Ø | Ø | Y(Ø) | 1 | 1 | Y(7) | 1 | Ø | 1 |
| | Ø | Y(3) | Ø | 1 | Y(4) | Ø | Ø | Y(Ø) | 1 | 1 | Y(7) | 1 | Ø | 1 |
| | | | | | | | | | | | | | | |
| | Ø | | — | — | | — | — | | — | — | | — | — | Ø |
| | Ø | | — | — | | — | — | | — | — | | — | — | Ø |
| | Ø | | — | — | | — | — | | — | — | | — | — | Ø |
| | 1 | | — | — | | — | — | | — | — | | — | — | Ø |
| | | | | | | | | | | | | | | |
| | Ø | | Ø | Ø | | Ø | 1 | | 1 | Ø | | 1 | 1 | 1 |
| | Ø | | Ø | Ø | | Ø | 1 | | 1 | Ø | | 1 | 1 | 1 |
| | Ø | | Ø | 1 | | Ø | Ø | | 1 | 1 | | 1 | Ø | 1 |
| | Ø | | Ø | 1 | | Ø | Ø | | 1 | 1 | | 1 | Ø | 1 |

FIG. 5B -3

| Signal | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LOAD 4 | Ø | Ø | Ø | Ø | 1 | Ø | Ø | Ø | Ø | Ø | Ø | Ø | Ø | Ø | Ø | Ø |
| 503a LOAD 4 REG | | | | | | X(4) | | | | | | | | | | |
| LOAD 3 | Ø | Ø | Ø | 1 | Ø | Ø | Ø | Ø | Ø | Ø | Ø | Ø | Ø | Ø | Ø | Ø |
| 506a LOAD 3 REG | | | | | X(3) | | | | | | | | | | | |
| LOAD 2 | Ø | Ø | 1 | Ø | Ø | Ø | Ø | Ø | Ø | Ø | Ø | Ø | Ø | Ø | Ø | Ø |
| 502a LOAD 2 REG | | | | X(2) | | | | | | | | | | | | |
| LOAD 1 | Ø | 1 | Ø | Ø | Ø | Ø | Ø | Ø | Ø | Ø | Ø | Ø | Ø | Ø | Ø | Ø |
| 505a LOAD 1 REG | | | X(1) | | | | | | | | | | | | | |
| LOAD Ø | 1 | Ø | Ø | Ø | Ø | Ø | Ø | Ø | Ø | Ø | Ø | Ø | Ø | Ø | Ø | Ø |
| 501a LOAD Ø REG | | X(Ø) | | | | | | | | | | | | | | |
| FROM DCT SLO BOTDATA (518d) | Y(1) | Y(3) | Y(5) | Y(7) | | | | | W(1) | W(3) | W(5) | W(7) | | | | |
| FROM DCT SLO TOPDATA (518c) | Y(Ø) | Y(2) | Y(4) | Y(6) | | | | | W(Ø) | W(2) | W(4) | W(6) | | | | |
| FROM QUANTIZER BOTDATA | | | | | | | | | | | | | | | | |
| FROM QUANTIZER TOPDATA | X(Ø) | X(1) | X(2) | X(3) | X(4) | X(5) | X(6) | X(7) | Z(Ø) | Z(1) | Z(2) | Z(3) | Z(4) | Z(5) | Z(6) | Z(7) |
| 519 CNL (Ø) | 1 | Ø | 1 | Ø | 1 | Ø | 1 | Ø | 1 | Ø | 1 | Ø | 1 | Ø | 1 | Ø |
| CNL (1) | 1 | Ø | Ø | 1 | 1 | Ø | Ø | 1 | 1 | Ø | Ø | 1 | 1 | Ø | Ø | 1 |
| CNL (2) | Ø | 1 | 1 | 1 | 1 | Ø | Ø | Ø | Ø | 1 | 1 | 1 | 1 | Ø | Ø | Ø |
| CNL (3) | 1 | 1 | 1 | 1 | 1 | Ø | Ø | Ø | Ø | Ø | Ø | Ø | Ø | 1 | 1 | 1 |
| COMPRESS | Ø | Ø | Ø | Ø | Ø | Ø | Ø | Ø | Ø | Ø | Ø | Ø | Ø | Ø | Ø | Ø |
| CLOCK | Ø | 1 | 2 | 3 | 4 | 5 | 6 | 7 | 8 | 9 | 10 | 11 | 12 | 13 | 14 | 15 |

KEY TO FIGURE 5C

| FIG. 5C-1 | FIG. 5C-2 | FIG. 5C-3 | FIG. 5C-4 |
|---|---|---|---|

FIG. 5C-1

DECOMPRESS CONTROL FOR DCT INPUT

| SELECTION OF DCT STORAGE (514d) | | | | | | | | | | | | |
|---|---|---|---|---|---|---|---|---|---|---|---|---|
| A_TOP | SCL 1 | SCL Ø | A_BOT (515d) | SCL 1 | SCL Ø | B_TOP (512d) | SCL 1 | SCL Ø | B_BOT (513d) | SCL 1 | SCL Ø | BLK_OR DCT |
| | | | | | | | | | | | | |
| | | | | | | | | | | | | Ø |
| | | | | | | | | | | | | Ø |
| | | | | | | | | | | | | Ø |
| | | | | | | | | | | | | Ø |
| | | | | | | | | | | | | |
| Y(1) | 1 | Ø | Y(7) | 1 | Ø | Y(1) | 1 | Ø | Y(7) | 1 | Ø | 1 |
| Y(3) | Ø | 1 | Y(5) | Ø | 1 | Y(3) | Ø | 1 | Y(5) | Ø | 1 | 1 |
| Y(2) | Ø | Ø | Y(6) | 1 | 1 | Y(2) | Ø | Ø | Y(6) | 1 | 1 | 1 |
| Y(Ø) | 1 | 1 | Y(4) | Ø | Ø | Y(Ø) | 1 | 1 | Y(4) | Ø | Ø | 1 |
| | | | | | | | | | | | | |
| | | | | | | | | | | | | Ø |
| | | | | | | | | | | | | Ø |
| | | | | | | | | | | | | Ø |
| | | | | | | | | | | | | Ø |
| | | | | | | | | | | | | |
| W(1) | 1 | Ø | W(7) | 1 | Ø | W(1) | 1 | Ø | W(7) | 1 | Ø | 1 |
| W(3) | Ø | 1 | W(5) | Ø | 1 | W(3) | Ø | 1 | W(5) | Ø | 1 | 1 |
| W(2) | Ø | Ø | W(6) | 1 | 1 | W(2) | Ø | Ø | W(6) | 1 | 1 | 1 |
| W(Ø) | 1 | 1 | W(4) | Ø | Ø | W(Ø) | 1 | 1 | W(4) | Ø | Ø | 1 |

FIG. 5C-4

DCT MEMORY

KEY TO FIGURE 6A

| FIG. 6A -1 | FIG. 6A -2 |
|---|---|

| | | | |
|---|---|---|---|
| 0 X0(0) X0(1) e o | 1 X0(2) X0(3) e o | 2 X0(4) X0(5) e o | 3 X0(6) X0(7) e o |
| 4 X1(0) X1(1) o e | 5 X1(2) X1(3) o e | 6 X1(4) X1(5) o e | 7 X1(6) X1(7) o e |
| 8 X2(0) X2(1) e o | 9 X2(2) X2(3) e o | 10 X2(4) X2(5) e o | 11 X2(6) X2(7) e o |
| 12 X3(0) X3(1) o e | 13 X3(2) X3(3) o e | 14 X3(4) X3(5) o e | 15 X3(6) X3(7) o e |
| 16 X4(0) X4(1) e o | 17 X4(2) X4(3) e o | 18 X4(4) X4(5) e o | 19 X4(6) X4(7) e o |
| 20 X5(0) X5(1) o e | 21 X5(2) X5(3) o e | 22 X5(4) X5(5) o e | 23 X5(6) X5(7) o e |
| 24 X6(0) X6(1) e o | 25 X6(2) X6(3) e o | 26 X6(4) X6(5) e o | 27 X6(6) X6(7) e o |
| 28 X7(0) X7(1) o e | 29 X7(2) X7(3) o e | 30 X7(4) X7(5) o e | 31 X7(6) X7(7) o e |

DCT MEMORY HORIZONTAL WRITE PATTERN

FIG. 6B

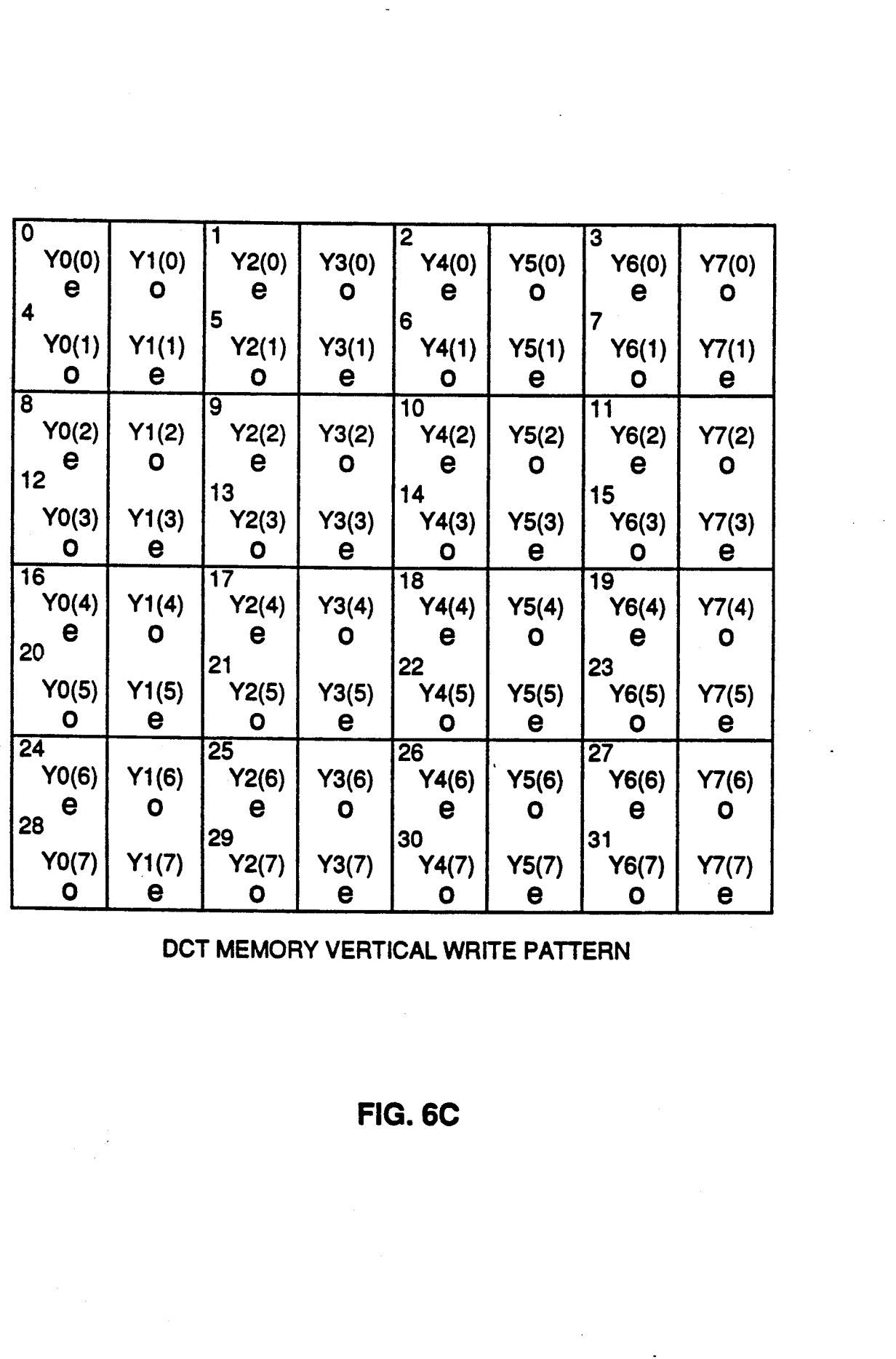

| | | | | | | | |
|---|---|---|---|---|---|---|---|
| 0 Y0(0) e | Y1(0) o | 1 Y2(0) e | Y3(0) o | 2 Y4(0) e | Y5(0) o | 3 Y6(0) e | Y7(0) o |
| 4 Y0(1) o | Y1(1) e | 5 Y2(1) o | Y3(1) e | 6 Y4(1) o | Y5(1) e | 7 Y6(1) o | Y7(1) e |
| 8 Y0(2) e | Y1(2) o | 9 Y2(2) e | Y3(2) o | 10 Y4(2) e | Y5(2) o | 11 Y6(2) e | Y7(2) o |
| 12 Y0(3) o | Y1(3) e | 13 Y2(3) o | Y3(3) e | 14 Y4(3) o | Y5(3) e | 15 Y6(3) o | Y7(3) e |
| 16 Y0(4) e | Y1(4) o | 17 Y2(4) e | Y3(4) o | 18 Y4(4) e | Y5(4) o | 19 Y6(4) e | Y7(4) o |
| 20 Y0(5) o | Y1(5) e | 21 Y2(5) o | Y3(5) e | 22 Y4(5) o | Y5(5) e | 23 Y6(5) o | Y7(5) e |
| 24 Y0(6) e | Y1(6) o | 25 Y2(6) e | Y3(6) o | 26 Y4(6) e | Y5(6) o | 27 Y6(6) e | Y7(6) o |
| 28 Y0(7) o | Y1(7) e | 29 Y2(7) o | Y3(7) e | 30 Y4(7) o | Y5(7) e | 31 Y6(7) o | Y7(7) e |

DCT MEMORY VERTICAL WRITE PATTERN

FIG. 6C

KEY TO FIGURE 7C

| | |
|---|---|
| FIG. 7C-1 | FIG. 7C-2 |
| FIG. 7C-3 | FIG. 7C-4 |

FIG. 7C-1

DCT

| | 701t A T | 701b B | 703t C T | 703b D | 707t L T | 707b Z | 708t E T | 708b F | 712t G T | 712b H | 714t J T | 714b K | | 715t-720t J 1 2 | J 3 4 | J 5 6 |
|---|---|---|---|---|---|---|---|---|---|---|---|---|---|---|---|---|
| 0 | T 2,5 | T 1,6 | | | | | | | | | | | | | | |
| 1 | 2,5 | 1,6 | Y3 | Y7 | | | | | | | | | | | | |
| 2 | 3,4 | 0,7 | Y6 | Y2 | Y3 | Y7 | | | | | | | | | | |
| 3 | 3,4 | 0,7 | Y4 | Y8 | Y6 | Y2 | W3 | W7 | | | | | | | | |
| 4 | | | Y5 | Y1 | Y4 | Y8 | W6 | W2 | Z3 | Z7 | | | | | | |
| 5 | | | | | Y5 | Y1 | W4 | W8 | Z6 | Z2 | Z3 | Z7 | | | | |
| 6 | | | | | | | W5 | W1 | Z4 | Z8 | Z6 | Z2 | | Z3 | | |

| | | | | | | | | | | | | | | | | |
|---|---|---|---|---|---|---|---|---|---|---|---|---|---|---|---|---|
| 7 | | | | | | | | | Z5 | Z1 | Z4 | Z8 | | Z6Z3 | | |
| 8 | | | | | | | | | | | Z5 | Z1 | | Z4Z6 | Z3 | |
| 9 | | | | | | | | | | | | | | Z5Z4 | Z6Z3 | |
| 10 | | | | | | | | | | | | | | Z5 | Z4Z6 | Z3 |
| 11 | | | | | | | | | | | | | | | Z5Z4 | Z6Z3 |
| 12 | | | | | | | | | | | | | | | Z5 | Z4Z6 |
| 13 | | | | | | | | | | | | | | | | Z5Z4 |
| 14 | | | | | | | | | | | | | | | | Z5 |
| 15 | | | | | | | | | | | | | | | | |
| 16 | | | | | | | | | | | | | | | | |
| 17 | | | | | | | | | | | | | | | | |

FIG. 7C-3

COMPRESS CONTROL FOR DCT/IDCT 702t 702b 704 709 710 711b 711t 713t 713b 721t

| | | | | TOP1 ADDER | | | BOTT1 ADDER | | | COEF1 | | | BOTT2 ADDER | | | | | | | A SEL | | |
|---|---|---|---|---|---|---|---|---|---|---|---|---|---|---|---|---|---|---|---|---|---|---|
| CLOCK | COMPRESS | RESET | | ADDTOP | ADDBOT | SCALEØ SCALE1 | ADDTOP | ADDBOT | SCALEØ SCALE1 | CO1SEL1 | CO1SELØ | GATE1 MUX | ADDTOP | ADDBOT | SCALEØ SCALE1 | GATE2 MUX | GATE9MUX | GATE3MUX | GATE4MUX | SEL2 | SEL1 | SELØ |
| | | 1 | | | | | | | | | | | | | | | | | | | | |
| Ø | 1 | Ø | | 1 | 1 | Ø1 | 1 | Ø | Ø1 | Ø | 1 | | | | | | | | | | | |
| 1 | 1 | Ø | | 1 | Ø | Ø1 | 1 | 1 | Ø1 | Ø | Ø | | | | | | | | | | | |
| 2 | 1 | Ø | | 1 | 1 | Ø1 | 1 | Ø | Ø1 | Ø | 1 | | | | | | | | | | | |
| 3 | 1 | Ø | | 1 | Ø | Ø1 | 1 | 1 | Ø1 | Ø | Ø | 1 | Ø | 1 | Ø1 | 1 | 1 | | | | | |
| 4 | 1 | Ø | | | | | | | | | | - | - | - | -- | Ø | 1 | 1 | 1 | | | |
| 5 | 1 | Ø | | | | | | | | | | 1 | Ø | 1 | Ø1 | 1 | 1 | 1 | 1 | | | |
| 6 | 1 | Ø | | | | | | | | | | - | - | - | -- | Ø | 1 | 1 | 1 | | | |
| 7 | 1 | Ø | | | | | | | | | | | | | | | | 1 | 1 | | | |
| 8 | 1 | Ø | | | | | | | | | | | | | | | | | | Ø | Ø | Ø |
| 9 | 1 | Ø | | | | | | | | | | | | | | | | | | Ø | Ø | 1 |
| 10 | 1 | Ø | | | | | | | | | | | | | | | | | | Ø | 1 | Ø |
| 11 | 1 | Ø | | | | | | | | | | | | | | | | | | Ø | Ø | 1 |
| 12 | 1 | Ø | | | | | | | | | | | | | | | | | | | | |
| 13 | 1 | Ø | | | | | | | | | | | | | | | | | | | | |
| 14 | 1 | Ø | | | | | | | | | | | | | | | | | | | | |
| | | | | | | | | | | | | | | | | | | | | | | |

KEY TO FIGURE 7D

| FIG. 7D-1 | FIG. 7D-2 | FIG. 7D-3 |
|---|---|---|

FIG. 7D-1

| 722t B SEL | | | 722b C SEL | | | 721b D SEL | | | 723t TOP2 ADDER | | | 723b BOTT3 ADDER | | | 725 COEF2 | | 731t GATE5MUX | 732 BOTT4 ADDER | | | 733b GATE6MUX |
|---|---|---|---|---|---|---|---|---|---|---|---|---|---|---|---|---|---|---|---|---|---|
| SEL2 | SEL1 | SELØ | SEL2 | SEL1 | SELØ | SEL2 | SEL1 | SELØ | ADDTOP | ADDBOT | SCALEØ SCALE1 | ADDTOP | ADDBOT | SCALEØ SCALE1 | CO2SEL1 | CO2SELØ | | ADDTOP | ADDBOT | SCALEØ SCALE1 | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| Ø | Ø | Ø | Ø | Ø | Ø | Ø | Ø | Ø | 1 | 1 | Ø1 | 1 | 1 | Ø1 | 1 | 1 | | | | | |
| Ø | Ø | Ø | Ø | Ø | Ø | Ø | Ø | Ø | Ø | 1 | Ø1 | Ø | 1 | Ø1 | Ø | Ø | | | | | |
| Ø | Ø | 1 | Ø | Ø | 1 | Ø | Ø | 1 | Ø | 1 | Ø1 | Ø | 1 | Ø1 | 1 | Ø | | | | | |
| Ø | 1 | Ø | Ø | Ø | Ø | Ø | 1 | Ø | 1 | 1 | Ø1 | 1 | 1 | Ø1 | Ø | 1 | 1 | Ø | 1 | Ø1 | 1 |
| | | | | | | | | | | | | | | | | | 1 | Ø | 1 | Ø1 | 1 |
| | | | | | | | | | | | | | | | | | 1 | Ø | 1 | Ø1 | 1 |
| | | | | | | | | | | | | | | | | | - | - | - | -- | Ø |
| | | | | | | | | | | | | | | | | | | | | | |

| GATE7MUX | GATE8MUX | TOP3 ADDER ADDTOP | TOP3 ADDER ADDBOT | TOP3 ADDER SCALEØ SCALE1 | BOTT5 ADDER ADDTOP | BOTT5 ADDER ADDBOT | BOTT5 ADDER SCALEØ SCALE1 | CLOCK |
|---|---|---|---|---|---|---|---|---|
| | | | | | | | | |
| | | | | | | | | Ø |
| | | | | | | | | 1 |
| | | | | | | | | 2 |
| | | | | | | | | 3 |
| | | | | | | | | 4 |
| | | | | | | | | 5 |
| | | | | | | | | 6 |
| | | | | | | | | 7 |
| | | | | | | | | 8 |
| | | | | | | | | 9 |
| | | | | | | | | 10 |
| 1 | 1 | | | | | | | 11 |
| 1 | 1 | 1 | 1 | Ø1 | Ø | 1 | Ø1 | 12 |
| 1 | 1 | 1 | 1 | Ø1 | Ø | 1 | Ø1 | 13 |
| 1 | 1 | 1 | 1 | Ø1 | Ø | 1 | Ø1 | 14 |
| | | 1 | 1 | Ø1 | 1 | Ø | Ø1 | |

ADDERS CONTROLS
1 TO ADD, Ø TO SUBTRACT

| SCALE: | SCALE1 | SCALEØ |
|---|---|---|
| PASS | Ø | Ø |
| /2 | Ø | 1 |
| *2 | 1 | Ø |

| CO1SEL1 | CO1SELØ | COEFF1: COMP OR DECOMP |
|---|---|---|
| Ø | Ø | 2COS(1/4) |
| Ø | 1 | 1 |
| 1 | Ø | 2COS(3/8) |
| 1 | 1 | 2COS(1/8) |

ABCD SEL

| SEL2 | SEL1 | SELØ | COMPRESS A | COMPRESS B | COMPRESS C | COMPRESS D | DECOMPRESS A | DECOMPRESS B | DECOMPRESS C | DECOMPRESS D |
|---|---|---|---|---|---|---|---|---|---|---|
| Ø | Ø | Ø | J | J2 | K3 | K1 | | | K3 | K1 |
| Ø | Ø | 1 | J4 | J4 | K5 | K3 | J4 | | K5 | |
| Ø | 1 | Ø | J2 | J6 | | K5 | | J6 | K2 | K5 |
| Ø | 1 | 1 | | | | | J3 | J3 | | K2 |
| 1 | Ø | Ø | | | | | J1 | J | | K4 |

| CO2SEL1 | CO2SELØ | COEFF2: COMP OR DECOMP |
|---|---|---|
| Ø | Ø | 2COS(1/4) |
| Ø | 1 | 1 |
| 1 | Ø | 2COS(3/8) |
| 1 | 1 | 2COS(1/8) |

FIG. 7D-3

KEY TO FIGURE 7F

| | |
|---|---|
| FIG. 7F-1 | FIG. 7F-2 |
| FIG. 7F-3 | FIG. 7F-4 |

FIG. 7F-1

IDCT

| | 701t | 701b | 703t | 703b | 707t | 707b | 708t | 708b | 712t | 712b | 714t | 714b | | 715t-720t | | |
|---|---|---|---|---|---|---|---|---|---|---|---|---|---|---|---|---|
| | A | B | C | D | L | Z | E | F | G | H | J | K | | J | | |
| | T | | T | | T | | T | | T | | T | | | 1 2 | 3 4 | 5 6 |
| 0 | T 1,7 | T 1,7 | | | | | | | | | | | | | | |
| 1 | 3,5 | 3,5 | Y8 | Y2 | | | | | | | | | | | | |
| 2 | 2,6 | 2,6 | Y6 | Y4 | Y8 | Y2 | | | | | | | | | | |
| 3 | 0,4 | 0,4 | Y7 | Y3 | Y6 | Y4 | W8 | W2 | | | | | | | | |
| 4 | | | Y5 | Y1 | Y7 | Y3 | W6 | W4 | Z2 | Z8 | | | | | | |
| 5 | | | | | Y5 | Y1 | W7 | W3 | Z4 | Z6 | Z2 | Z8 | | | | |
| 6 | | | | | | | W5 | W1 | Z3 | Z7 | Z6 | Z4 | | Z2 | | |

| | | | | | | | | | | | | | | | | |
|---|---|---|---|---|---|---|---|---|---|---|---|---|---|---|---|---|
| 7 | | | | | | | | | Z5 | Z1 | Z3 | Z7 | | Z6Z2 | | |
| 8 | | | | | | | | | | | Z5 | Z1 | | Z3Z6 | Z2 | |
| 9 | | | | | | | | | | | | | | Z5Z3 | Z6Z2 | |
| 10 | | | | | | | | | | | | | | Z5 | Z3Z6 | Z2 |
| 11 | | | | | | | | | | | | | | | Z5Z3 | Z6Z2 |
| 12 | | | | | | | | | | | | | | | Z5 | Z3Z6 |
| 13 | | | | | | | | | | | | | | | | Z5Z3 |
| 14 | | | | | | | | | | | | | | | | Z5 |
| 15 | | | | | | | | | | | | | | | | |
| 16 | | | | | | | | | | | | | | | | |
| 17 | | | | | | | | | | | | | | | | |

FIG. 7F-3

DECOMPRESS CONTROL FOR DCT/IDCT

| | | | | TOP1 ADDER (702t) | | | BOTT1 ADDER (702b) | | | COEF1 (704) | | (709) | BOTT2 ADDER (710) | | | (711b) | (711t) | (713t) | (713b) | A SEL (721t) | | |
|---|---|---|---|---|---|---|---|---|---|---|---|---|---|---|---|---|---|---|---|---|---|---|
| CLOCK | COMPRESS | RESET | | ADDTOP | ADDBOT | SCALEØ SCALE1 | ADDTOP | ADDBOT | SCALEØ SCALE1 | CO1SEL1 | CO1SELØ | GATE1 MUX | ADDTOP | ADDBOT | SCALEØ SCALE1 | GATE2 MUX | GATE9MUX | GATE3MUX | GATE4MUX | SEL2 | SEL1 | SELØ |
| | | 1 | | | | | | | | | | | | | | | | | | | | |
| Ø | Ø | Ø | | 1 | Ø | 1Ø | 1 | 1 | ØØ | 1 | 1 | | | | | | | | | | | |
| 1 | Ø | Ø | | 1 | Ø | 1Ø | 1 | 1 | ØØ | 1 | Ø | | | | | | | | | | | |
| 2 | Ø | Ø | | 1 | Ø | 1Ø | 1 | 1 | ØØ | Ø | Ø | | | | | | | | | | | |
| 3 | Ø | Ø | | 1 | Ø | ØØ | 1 | 1 | ØØ | Ø | 1 | Ø | 1 | Ø | ØØ | 1 | Ø | | | | | |
| 4 | Ø | Ø | | | | | | | | | | Ø | 1 | Ø | ØØ | 1 | Ø | 1 | 1 | | | |
| 5 | Ø | Ø | | | | | | | | | | Ø | 1 | Ø | ØØ | 1 | Ø | Ø | Ø | | | |
| 6 | Ø | Ø | | | | | | | | | | - | - | - | -- | Ø | 1 | 1 | 1 | | | |
| 7 | Ø | Ø | | | | | | | | | | | | | | | | 1 | 1 | | | |
| 8 | Ø | Ø | | | | | | | | | | | | | | | | | | Ø | 1 | 1 |
| 9 | Ø | Ø | | | | | | | | | | | | | | | | | | 1 | Ø | Ø |
| 10 | Ø | Ø | | | | | | | | | | | | | | | | | | Ø | Ø | 1 |
| 11 | Ø | Ø | | | | | | | | | | | | | | | | | | Ø | Ø | 1 |
| 12 | Ø | Ø | | | | | | | | | | | | | | | | | | | | |
| 13 | Ø | Ø | | | | | | | | | | | | | | | | | | | | |
| 14 | Ø | Ø | | | | | | | | | | | | | | | | | | | | |

FIG. 7G-1

KEY TO FIGURE 7G

| | | |
|---|---|---|
| FIG. 7G-1 | FIG. 7G-2 | FIG. 7G-3 |

| B SEL 722t | | | C SEL 722b | | | D SEL 721b | | | TOP2 ADDER 723t | | | BOTT3 ADDER 723b | | | COEF2 725 | | GATE5MUX 731t | BOTT4 ADDER 732 | | | GATE6MUX 733b |
|---|---|---|---|---|---|---|---|---|---|---|---|---|---|---|---|---|---|---|---|---|---|
| SEL2 | SEL1 | SELØ | SEL2 | SEL1 | SELØ | SEL2 | SEL1 | SELØ | ADDTOP | ADDBOT | SCALEØ SCALE1 | ADDTOP | ADDBOT | SCALEØ SCALE1 | CO2SEL1 | CO2SELØ | | ADDTOP | ADDBOT | SCALEØ SCALE1 | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| 1 | Ø | Ø | Ø | 1 | Ø | Ø | Ø | Ø | 1 | Ø | 1Ø | 1 | Ø | ØØ | Ø | Ø | | | | | |
| Ø | 1 | 1 | Ø | 1 | Ø | 1 | Ø | Ø | 1 | 1 | ØØ | 1 | 1 | ØØ | Ø | 1 | | | | | |
| Ø | 1 | 1 | Ø | Ø | 1 | Ø | 1 | 1 | Ø | 1 | 1Ø | Ø | 1 | ØØ | Ø | Ø | | | | | |
| Ø | 1 | Ø | Ø | Ø | Ø | Ø | 1 | Ø | 1 | 1 | ØØ | 1 | 1 | ØØ | Ø | 1 | Ø | 1 | Ø | ØØ | 1 |
| | | | | | | | | | | | | | | | | | - | - | - | -- | Ø |
| | | | | | | | | | | | | | | | | | Ø | 1 | Ø | ØØ | 1 |
| | | | | | | | | | | | | | | | | | - | - | - | -- | Ø |
| | | | | | | | | | | | | | | | | | | | | | |

FIG. 7G-2

| GATE7MUX | GATE8MUX | TOP3 ADDER ADDTOP | TOP3 ADDER ADDBOT | TOP3 ADDER SCALEØ SCALE1 | BOTT5 ADDER ADDTOP | BOTT5 ADDER ADDBOT | BOTT5 ADDER SCALEØ SCALE1 | CLOCK |
|---|---|---|---|---|---|---|---|---|
| | | | | | | | | |
| | | | | | | | | Ø |
| | | | | | | | | 1 |
| | | | | | | | | 2 |
| | | | | | | | | 3 |
| | | | | | | | | 4 |
| | | | | | | | | 5 |
| | | | | | | | | 6 |
| | | | | | | | | 7 |
| | | | | | | | | 8 |
| | | | | | | | | 9 |
| | | | | | | | | 10 |
| Ø | Ø | | | | | | | 11 |
| - | 1 | 1 | 1 | ØØ | 1 | Ø | ØØ | 12 |
| Ø | Ø | 1 | 1 | ØØ | 1 | Ø | ØØ | 13 |
| - | 1 | 1 | 1 | ØØ | 1 | Ø | ØØ | 14 |
| | | 1 | 1 | ØØ | 1 | Ø | ØØ | |

ADDERS CONTROLS
1 TO ADD, Ø TO SUBTRACT

| SCALE: | SCALE1 | SCALEØ |
|---|---|---|
| PASS | Ø | Ø |
| /2 | Ø | 1 |
| *2 | 1 | Ø |

| CO1SEL1 | CO1SELØ | COEFF1: COMP OR DECOMP |
|---|---|---|
| Ø | Ø | 2COS(1/4) |
| Ø | 1 | 1 |
| 1 | Ø | 2COS(3/8) |
| 1 | 1 | 2COS(1/8) |

ABCD SEL

| SEL2 | SEL1 | SELØ | COMPRESS A | COMPRESS B | COMPRESS C | COMPRESS D | DECOMPRESS A | DECOMPRESS B | DECOMPRESS C | DECOMPRESS D |
|---|---|---|---|---|---|---|---|---|---|---|
| Ø | Ø | Ø | J | J2 | K3 | K1 | | | K3 | K1 |
| Ø | Ø | 1 | J4 | J4 | K5 | K3 | J4 | | K5 | |
| Ø | 1 | Ø | J2 | J6 | | K5 | | J6 | K2 | K5 |
| Ø | 1 | 1 | | | | | J3 | J3 | | K2 |
| 1 | Ø | Ø | | | | | J1 | J | | K4 |

| CO2SEL1 | CO2SELØ | COEFF2: COMP OR DECOMP |
|---|---|---|
| Ø | Ø | 2COS(1/4) |
| Ø | 1 | 1 |
| 1 | Ø | 2COS(3/8) |
| 1 | 1 | 2COS(1/8) |

FIG. 7G-3

KEY TO FIG. 8B

| | | |
|---|---|---|
| FIG. 8B-1 | FIG. 8B-2 | FIG. 8B-3 |
| FIG. 8B-4 | FIG. 8B-5 | FIG. 8B-6 |

FIG. 8B-1

| CLOCK | COMPRESS | | | TOPDATA (738t) | BOTDATA (738b) | LOAD4 REG (801) T | LOAD4 REG (801) B | LOAD4BOT LOAD4TOP | LOAD5 REG (802) T | LOAD5 REG (802) B | LOAD5BOT LOAD5TOP | LOAD6 REG (803) T | LOAD6 REG (803) B | LOAD6BOT LOAD6TOP | LOAD7 REG (804) T | LOAD7 REG (804) B | LOAD7BOT LOAD7TOP | TO DCT_MEM (809) TOPMUX | TO DCT_MEM (809) BOTMUX | TOPMUX SEL1 | TOPMUX SELØ |
|---|---|---|---|---|---|---|---|---|---|---|---|---|---|---|---|---|---|---|---|---|---|
| Ø | 1 | | | X(1) | X(7) | | | Ø1 | | | Ø1 | | | ØØ | | | ØØ | | | | |
| 1 | 1 | | | X(2) | X(6) | | X(1) | 1Ø | | X(7) | 1Ø | | | ØØ | | | ØØ | | | | |
| 2 | 1 | | | X(3) | X(5) | X(2) | | ØØ | X(6) | | ØØ | | | Ø1 | | | Ø1 | | | | |
| 3 | 1 | | | X(Ø) | X(4) | | | ØØ | | | ØØ | | X(3) | 1Ø | | X(5) | 1Ø | | | | |
| 4 | 1 | | | Y(1) | Y(7) | | | ØØ | | | ØØ | X(Ø) | | ØØ | X(4) | | ØØ | X(0) | X(1) | Ø | Ø |
| 5 | 1 | | | Y(2) | Y(6) | | | ØØ | | | ØØ | | | ØØ | | | ØØ | X(2) | X(3) | Ø | 1 |
| 6 | 1 | | | Y(3) | Y(5) | | | ØØ | | | ØØ | | | ØØ | | | ØØ | X(4) | X(5) | 1 | Ø |
| 7 | 1 | | | Y(Ø) | Y(4) | | | ØØ | | | ØØ | | | ØØ | | | ØØ | X(6) | X(7) | 1 | 1 |
| 8 | 1 | | | Z(1) | Z(7) | | | Ø1 | | | Ø1 | | | ØØ | | | ØØ | | | | |
| 9 | 1 | | | Z(2) | Z(6) | | Z(1) | 1Ø | | Z(7) | 1Ø | | | ØØ | | | ØØ | | | | |
| 10 | 1 | | | Z(3) | Z(5) | Z(2) | | ØØ | Z(6) | | ØØ | | | Ø1 | | | Ø1 | | | | |
| 11 | 1 | | | Z(Ø) | Z(4) | | | ØØ | | | ØØ | | Z(3) | 1Ø | | Z(5) | 1Ø | | | | |
| 12 | 1 | | | W(1) | W(7) | | | ØØ | | | ØØ | Z(Ø) | | ØØ | Z(4) | | ØØ | Z(Ø) | Z(1) | Ø | Ø |
| 13 | 1 | | | W(2) | W(6) | | | ØØ | | | ØØ | | | ØØ | | | ØØ | Z(2) | Z(3) | Ø | 1 |
| 14 | 1 | | | W(3) | W(5) | | | ØØ | | | ØØ | | | ØØ | | | ØØ | Z(4) | Z(5) | 1 | Ø |
| 15 | 1 | | | W(Ø) | W(4) | | | ØØ | | | ØØ | | | ØØ | | | ØØ | Z(6) | Z(7) | 1 | 1 |

COMPRESS CONTROL FOR SEPARATOR FIG. 8B-2

| BOTMUX SEL1 | BOTMUX SEL0 | 805 LOADØ REG T | LOADØ REG B | LOADØ | 806 LOAD1 REG T | LOAD1 REG B | LOAD1 | 807 LOAD2 REG T | LOAD2 REG B | LOAD2 | 808 LOAD3 REG T | LOAD3 REG B | LOAD3 | 811 LOAD8 REG T | LOAD8 REG B | LOAD8 | 812 LOAD9 REG T | LOAD9 REG B | LOAD9 | 813 LOAD1Ø REG T | LOAD1Ø REG B | LOAD1Ø | 814 LOAD11 REG T | LOAD11 REG B | LOAD11 |
|---|---|---|---|---|---|---|---|---|---|---|---|---|---|---|---|---|---|---|---|---|---|---|---|---|---|
| | | | | Ø | | | Ø | | | Ø | | | Ø | | | Ø | | | Ø | | | Ø | | | Ø |
| | | | | Ø | | | Ø | | | Ø | | | Ø | | | Ø | | | Ø | | | Ø | | | Ø |
| | | | | Ø | | | Ø | | | Ø | | | Ø | | | Ø | | | Ø | | | Ø | | | Ø |
| | | | | Ø | | | Ø | | | Ø | | | Ø | | | Ø | | | Ø | | | Ø | | | Ø |
| Ø | Ø | | | 1 | | | Ø | | | Ø | | | Ø | | | Ø | | | Ø | | | Ø | | | Ø |
| Ø | 1 | Y(1) | Y(7) | Ø | | | 1 | | | Ø | | | Ø | | | Ø | | | Ø | | | Ø | | | Ø |
| 1 | Ø | | | Ø | Y(2) | Y(6) | Ø | | | 1 | | | Ø | | | Ø | | | Ø | | | Ø | | | Ø |
| 1 | 1 | | | Ø | | | Ø | Y(3) | Y(5) | Ø | | | 1 | | | Ø | | | Ø | | | Ø | | | Ø |
| | | | | Ø | | | Ø | | | Ø | Y(Ø) | Y(4) | Ø | | | Ø | | | Ø | | | Ø | | | Ø |
| | | | | Ø | | | Ø | | | Ø | | | Ø | | | Ø | | | Ø | | | Ø | | | Ø |
| | | | | Ø | | | Ø | | | Ø | | | Ø | | | Ø | | | Ø | | | Ø | | | Ø |
| | | | | Ø | | | Ø | | | Ø | | | Ø | | | Ø | | | Ø | | | Ø | | | Ø |
| Ø | Ø | | | Ø | | | Ø | | | Ø | | | Ø | | | 1 | | | Ø | | | Ø | | | Ø |
| Ø | 1 | | | Ø | | | Ø | | | Ø | | | Ø | W(1) | W(7) | Ø | | | 1 | | | Ø | | | Ø |
| 1 | Ø | | | Ø | | | Ø | | | Ø | | | Ø | | | Ø | W(2) | W(6) | Ø | | | 1 | | | Ø |
| 1 | 1 | | | Ø | | | Ø | | | Ø | | | Ø | | | Ø | | | Ø | W(3) | W(5) | Ø | | | 1 |

| EXIT DCT | | | | | |
|---|---|---|---|---|---|
| OUT | BKØ SELØ SEL1 | BK1 SELØ SEL1 | BKØ2 SELØ SEL1 | BK3 SELØ SEL1 | QMUX SELØ SEL1 |
| | | | | | |
| | | | | | |
| | | | | | |
| | | | | | |
| | | | | | |
| | | | | | |
| | | | | | |
| | | | | | |
| | | | | | |
| Y(Ø) | ØØ | | | | ØØ |
| Y(1) | Ø1 | | | | ØØ |
| Y(2) | 1Ø | | | | ØØ |
| Y(3) | 11 | | | | ØØ |
| Y(4) | | ØØ | | | Ø1 |
| Y(5) | | Ø1 | | | Ø1 |
| Y(6) | | 1Ø | | | Ø1 |
| Y(7) | | 11 | | | Ø1 |

| | | | | | | | | | | | | | | | | | |
|---|---|---|---|---|---|---|---|---|---|---|---|---|---|---|---|---|---|
| 16 | 1 | | | | | | | | | | | | | | | | |
| 17 | 1 | | | | | | | | | | | | | | | | |
| 18 | 1 | | | | | | | | | | | | | | | | |
| 19 | 1 | | | | | | | | | | | | | | | | |
| 20 | 1 | | | | | | | | | | | | | | | | |
| 21 | 1 | | | | | | | | | | | | | | | | |
| 22 | 1 | | | | | | | | | | | | | | | | |
| 23 | 1 | | | | | | | | | | | | | | | | |

FIG. 8B-4

| | | | | | |
|---|---|---|---|---|---|
| W(Ø) | | | ØØ | | 1Ø |
| W(1) | | | Ø1 | | 1Ø |
| W(2) | | | 1Ø | | 1Ø |
| W(3) | | | 11 | | 1Ø |
| W(4) | | | | ØØ | 11 |
| W(5) | | | | Ø1 | 11 |
| W(6) | | | | 1Ø | 11 |
| W(7) | | | | 11 | 11 |

FIG. 8B-6

KEY TO FIGURE 8C

| | | |
|---|---|---|
| FIG. 8C-1 | FIG. 8C-2 | FIG. 8C-3 |
| FIG. 8C-4 | FIG. 8C-5 | FIG. 8C-6 |

FIG. 8C-1

DECOMPRESS CONTROL FOR SEPARATOR

| | | | | 738t | 738b | 801 | | 802 | | 803 | | 804 | | 809 | | | |
|---|---|---|---|---|---|---|---|---|---|---|---|---|---|---|---|---|---|
| | | | | | | | | | | | | | | TO DCT_MEM | | TOPMUX | |
| CLOCK | COMPRESS | | | TOPDATA | BOTDATA | LOAD4 REG | LOAD4BOT LOAD4TOP | LOAD5 REG | LOAD5BOT LOAD5TOP | LOAD6 REG | LOAD6BOT LOAD6TOP | LOAD7 REG | LOAD7BOT LOAD7TOP | TOPMUX | BOTMUX | SEL1 | SELØ |
| Ø | Ø | | | X(2) | X(5) | | 1Ø | | Ø1 | | ØØ | | ØØ | | | | |
| 1 | Ø | | | X(1) | X(6) | X(2) | Ø1 | X(5) | 1Ø | | ØØ | | ØØ | | | | |
| 2 | Ø | | | X(3) | X(4) | X(1) | ØØ | X(6) | ØØ | | Ø1 | | 1Ø | | | | |
| 3 | Ø | | | X(Ø) | X(7) | | ØØ | | ØØ | X(3) | 1Ø | X(4) | Ø1 | | | | |
| 4 | Ø | | | Y(2) | Y(5) | | ØØ | | ØØ | X(Ø) | ØØ | X(7) | ØØ | X(0) | X(1) | Ø | Ø |
| 5 | Ø | | | Y(1) | Y(6) | | ØØ | | ØØ | | ØØ | | ØØ | X(2) | X(3) | Ø | 1 |
| 6 | Ø | | | Y(3) | Y(4) | | ØØ | | ØØ | | ØØ | | ØØ | X(4) | X(5) | 1 | Ø |
| 7 | Ø | | | Y(Ø) | Y(7) | | ØØ | | ØØ | | ØØ | | ØØ | X(6) | X(7) | 1 | 1 |
| 8 | Ø | | | Z(2) | Z(5) | | 1Ø | | Ø1 | | ØØ | | ØØ | | | | |
| 9 | Ø | | | Z(1) | Z(6) | Z(2) | Ø1 | Z(5) | 1Ø | | ØØ | | ØØ | | | | |
| 10 | Ø | | | Z(3) | Z(4) | Z(1) | ØØ | Z(6) | ØØ | | Ø1 | | 1Ø | | | | |
| 11 | Ø | | | Z(Ø) | Z(7) | | ØØ | | ØØ | Z(3) | 1Ø | Z(4) | Ø1 | | | | |
| 12 | Ø | | | W(2) | W(5) | | ØØ | | ØØ | Z(Ø) | ØØ | Z(7) | ØØ | Z(Ø) | Z(1) | Ø | Ø |
| 13 | Ø | | | W(1) | W(6) | | ØØ | | ØØ | | ØØ | | ØØ | Z(2) | Z(3) | Ø | 1 |
| 14 | Ø | | | W(3) | W(4) | | ØØ | | ØØ | | ØØ | | ØØ | Z(4) | Z(5) | 1 | Ø |
| 15 | Ø | | | W(Ø) | W(7) | | ØØ | | ØØ | | ØØ | | ØØ | Z(6) | Z(7) | 1 | 1 |

| BOTMUX | | | | | | | | | | | | | | | | | |
|---|---|---|---|---|---|---|---|---|---|---|---|---|---|---|---|---|---|
| SEL1 | SELØ | LOADØ REG | LOADØ | LOAD1 REG | LOAD1 | LOAD2 REG | LOAD2 | LOAD3 REG | LOAD3 | LOAD8 REG | LOAD8 | LOAD9 REG | LOAD9 | LOAD1Ø REG | LOAD1Ø | LOAD11 REG | LOAD11 |
| | | | Ø | | Ø | | Ø | | Ø | | | | | | | | |
| | | | Ø | | Ø | | Ø | | Ø | | | | | | | | |
| | | | Ø | | Ø | | Ø | | Ø | | | | | | | | |
| | | | Ø | | Ø | | Ø | | Ø | | | | | | | | |
| Ø | Ø | | 1 | | Ø | | Ø | | Ø | | | | | | | | |
| Ø | 1 | Y(2) Y(5) | Ø | | 1 | | Ø | | Ø | | | | | | | | |
| 1 | 1 | | Ø | Y(1) Y(6) | Ø | | 1 | | Ø | | | | | | | | |
| 1 | Ø | | Ø | | Ø | Y(3) Y(4) | Ø | | 1 | | | | | | | | |
| | | | Ø | | Ø | | Ø | Y(Ø) Y(7) | Ø | | | | | | | | |
| | | | Ø | | Ø | | Ø | | Ø | | | | | | | | |
| | | | Ø | | Ø | | Ø | | Ø | | | | | | | | |
| | | | Ø | | Ø | | Ø | | Ø | | | | | | | | |
| Ø | Ø | | 1 | | Ø | | Ø | | Ø | | | | | | | | |
| Ø | 1 | W(2)W(5) | Ø | | 1 | | Ø | | Ø | | | | | | | | |
| 1 | 1 | | Ø | W(1)W(6) | Ø | | 1 | | Ø | | | | | | | | |
| 1 | Ø | | Ø | | Ø | W(3)W(4) | Ø | | 1 | | | | | | | | |

| EXIT DCT TO QUANTIZER | | | | | | DECOMP TO BK STOR | | |
|---|---|---|---|---|---|---|---|---|
| OUT | BKØ SELØ SEL1 | BK1 SELØ SEL1 | BKØ2 SELØ SEL1 | BK3 SELØ SEL1 | QMUX SELØ SEL1 | OUT E O | BKE BKO SELØ SEL1 | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | Y(Ø)Y(1) | ØØ | |
| | | | | | | Y(2)Y(3) | Ø1 | |
| | | | | | | Y(4)Y(5) | 1Ø | |
| | | | | | | Y(6)Y(7) | 11 | |
| | | | | | | | | |
| | | | | | | | | |
| | | | | | | | | |
| | | | | | | | | |

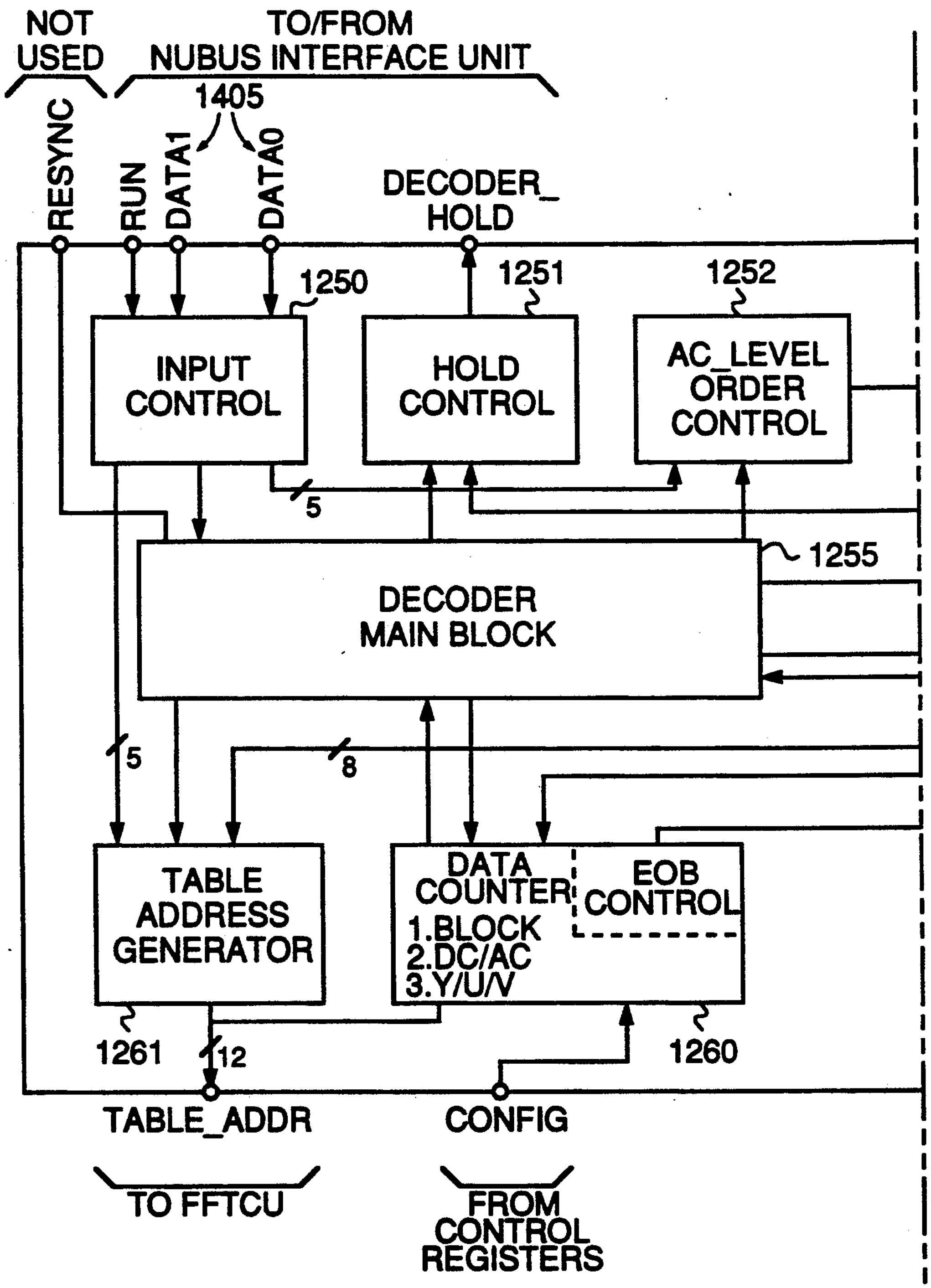
FIG. 12B-1
KEY TO FIG. 12B
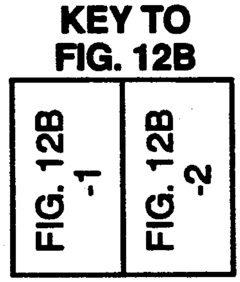

KEY TO FIGURE 13A

| FIG.13A -1 | FIG.13A -2 | FIG.13A -3 |
|---|---|---|

| FIG. 14-1 | FIG. 14-2 |
| --- | --- |
| | FIG. 14-3 |

KEY TO FIGURE 15B

| | |
|---|---|
| FIG. 15B-1 | FIG. 15B-2 |
| FIG. 15B-3 | FIG. 15B-4 |

SYSTEM FOR COMPRESSION AND DECOMPRESSION OF VIDEO DATA USING DISCRETE COSINE TRANSFORM AND CODING TECHNIQUES

BACKGROUND OF THE INVENTION

This invention relates to the compression and decompression of data and in particular to the reduction in the amount of data necessary to be stored for use in reproducing a high quality video picture.

DESCRIPTION OF THE PRIOR ART

In order to store images and video on a computer, the images and video must be captured and digitized. Image capture can be performed by a wide range of input devices including scanners and video digitizers.

A digitized image is a large two-dimensional array of picture elements, or pixels. The quality of the image is a function of its resolution, which is measured in the number of horizontal and vertical pixels. For example, a standard display of 640 by 480 has 640 pixels across (horizontally) and 480 from top to bottom (vertically). However, the resolution of an image is usually referred to in dots per inch (dpi). Dots per inch are quite literally the number of dots per inch of print capable of being used to make up an image measured both horizontally and vertically on, for example, either a monitor or a print medium. As more pixels are packed into smaller display area and more pixels are displayed on the screen, the detail of the image increases—as well as the amount of memory required to store the image.

A black and white image is an array of pixels that are either black or white, on or off. Each pixel requires only one bit of information. A black and white image is often referred to as a bi-level image. A gray scale image is one such that each pixel is usually represented using 8 bits of information. The number of shades of gray that can thus be represented is therefore equal to the number of permutations achievable on the 8 bits, given that each bit is either on or off, equal to $2^8$ or 256 shades of gray. In a color image, the number of possible colors that can be displayed is determined by the number of shades of each of the primary colors, Red, Green and Blue, and all their possible combinations. A color image is represented in full color with 24 bits per pixel. This means that each of the primary colors is assigned 8 bits, resulting in $2^8 \times 2^8 \times 2^8$ or 16.7 million colors possible in a single pixel.

In other words, a black and white image, also referred to as a bi-level image, is a two dimensional array of pixels, each of 1 bit. A continuous-tone image can be a gray scale or a color image. A gray scale image is an image where each pixel is allocated 8-bits of information thereby displaying 256 shades of gray. A color image can be 8-bits per pixel, corresponding to 256 colors or 24-bits per pixel corresponding to 16.7 million colors. A 24-bit color image, often called a true-color image, can be represented in one of several coordinate systems, the Red, Green and Blue (RGB) component system being the most common.

The foremost problem with processing images and video in computers is the formidable storage, communication, and retrieval requirements.

A typical True Color (full color) video frame consists of over 300,000 pixels (the number of pixels on a 640 by 480 display), where each pixel is defined by one of 16.7 million colors (24-bit), requiring approximately a million bytes of memory. To achieve motion in, for example, an NTSC video application, one needs 30 frames per second or two gigabytes of memory to store one minute of video. Similarly, a full color standard still frame image (8.5 by 11 inches) that is scanned into a computer at 300 dpi requires in excess of 25 Megabytes of memory. Clearly these requirements are outside the realm of existing storage capabilities.

Furthermore, the rate at which the data need to be retrieved in order to display motion vastly exceeds the effective transfer rate of existing storage devices. Retrieving full color video for motion sequences as described above (30M bytes/sec) from current hard disk drives, assuming an effective disk transfer rate of about 1 Mbyte per second, is 30 times too slow; from a CD-ROM, assuming an effective transfer rate of 150 kbytes per second, is about 200 times too slow.

Therefore, image compression techniques aimed at reducing the size of the data sets while retaining high levels of image quality have been developed.

Because images exhibit a high level of pixel to pixel correlation, mathematical techniques operating upon the spatial Fourier transform of an image allow a significant reduction of the amount of data that is required to represent an image; such reduction is achieved by eliminating information to which the eye is not very sensitive. For example, the human eye is significantly more sensitive to black and white detail than to color detail, so that much color information in a picture may be eliminated without degrading the picture quality.

There are two means of image compression: lossy and lossless. Lossless image compression allows the mathematically exact restoration of the image data. Lossless compression can reduce the image data set by about one-half. Lossy compression does not preserve all information but it can reduce the amount of data by a factor of about thirty (30) without affecting image quality detectable by the human eye.

In order to achieve high compression ratios and still maintain a high image quality, computationally intensive algorithms must be relied upon. And further, it is required to run these algorithms in real time for many applications.

In fact, a large spectrum of applications requires the following:

(i) the real-time threshold of 1/30th of a second, in order to process frames in a motion sequence; and (ii) the human interactive threshold of under one (1) second, that can elapse between tasks without disrupting the workflow.

Since the processor capable of compressing a 1 Mbyte file in 1/30th of a second is also the processor capable of compressing a 25 Mbyte file—a single color still frame image—in less than a second, such a processor will make a broad range of image compression applications feasible.

Such a processor will also find application in high resolution printing. Since having such a processor in the printing device will allow compressed data to be sent from a computer to a printer without requiring the bandwidth needed for sending non-compressed data, the compressed data so sent may reside in an economically reasonable amount of local memory inside the printer, and printing may be accomplished by decompressing the data in the processor within a reasonable amount of time.

Numerous techniques have been proposed to reduce the amount of data required to be stored in order to reproduce a high quality picture particularly for use with video displays. Because of the high cost of memory, the ability to store a given quality picture with minimal data is not only important but also greatly enhances the utility of computer systems utilizing video displays. Among the work done in this area is work by Dr. Wen Chen as disclosed in U.S. Pat. Nos. 4,302,775, 4,385,363, 4,394,774, 4,410,916, 4,698,672 and 4,704,628. One technique for the storage of data for use in reproducing a video image is to transform the data into the frequency domain and store only that information in the frequency domain which, when the inverse transform is taken, allows an acceptable quality reproduction of the space varying signals to reproduce the video picture. Dr. Herbert Lohscheller's work as described in European Patent Office Application No. 0283715 also describes an algorithm for providing data compression.

Dr. Chen's U.S. Pat. No. 4,704,628 alluded to in the above described data transmission/receiving system uses intraframe and interframe transform coding. In intraframe and interframe transform coding, rather than providing the actual transform coefficients as output, the output encoded data are block-to-block difference values (intraframe) and frame-to-frame difference values (interframe). While coding differences rather than actual coefficients reduce the bandwidth necessary for transmission, large amounts of memory for storage of prior blocks and prior frames are required during the compression and decompression processes. Such systems are expensive and difficult to implement, especially on an integrated circuit implementation where "real estate" is a premier concern.

U.S. Pat. No. 4,385,363 describes a discrete cosine transform processor for 16 pixel by 16 pixel blocks. The 5-stage pipeline implementation disclosed in the '363 patent is not readily usable for operation with 8 pixel by 8 pixel blocks. Furthermore, Chen's algorithm requires global shuffling at stages 1, 4 and 5.

Despite the prior art efforts, the information which must be stored to reproduce a video picture is still quite enormous. Therefore, substantial memory is required particularly if a computer system is to be used to generate a plurality of video images in sequence to replicate either changes in images or data. Furthermore, the prior art has also failed to provide a processor capable of processing video pictures in real time.

SUMMARY OF THE INVENTION

The present invention provides a data compression/decompression system capable of significant data compression of video or still images such that the compressed images may be stored in the mass storage media commonly found in conventional computers.

The present invention also provides (i) a data compression/decompression system which will operate at real time speed, i.e. able to compress at least thirty frames of true color video per second, and to compress a full-color standard still frame (8.5"×11" at 300 dpi) within one second;

(ii) a system adhering to an external standard so as to allow compatibility with other computation or video equipment;

(iii) a data compression/decompression system capable of being implemented in an integrated circuit chip so as to achieve the economic and portability advantages of such implementation.

In accordance with this invention, a data compression/decompression system using a discrete cosine transform is provided to generate a frequency domain representation of the spatial domain waveforms which represent the video image. The discrete cosine transform may be performed by finite impulse response (FIR) digital filters in a filter bank. In this case, the inverse transform is obtained by passing the stored frequency domain signals through FIR digital filters to reproduce in the spatial domain the waveforms comprising the video picture. Thus, the advantage of simplicity in hardware implementation of FIR digital filters is realized. The filter bank according to this invention possesses the advantages of linear complexity and local communication. This system also provides Huffman coding of the transform domain data to effectuate large data compression ratios. This system may be implemented as an integrated circuit and may communicate with a host computer using an industry standard bus provided in the data compression/decompression system according to the present invention. Accordingly, by combining in hardware a novel discrete cosine transform algorithm, quantization and coding steps, minimal data are required to be stored in real time for subsequent reproduction of a high quality replica of an original image.

This invention will be more fully understood in conjunction with the following detailed description taken together with the accompanying drawings.

BRIEF DESCRIPTION OF THE DRAWINGS

FIG. 2 shows a schematic diagram of the video bus controller unit 102 of the embodiment shown in FIG. 1.

FIGS. 3-1 and 3-2 form FIG. 3 which shows a block diagram of the block memory unit 103 of the embodiment shown in FIG. 1.

FIGS. 4a-1 and 4a-2 form FIG. 4a which shows a data flow diagram of the Discrete Cosine Transform (DCT) units, consisting of the units 103–107 of the embodiment shown in FIG. 1.

FIGS. 4b-1 and 4b-4 form FIG. 4b which shows the schedule of 4:1:1 data flow in the DCT units under compression condition.

FIGS. 4c-1 and 4c-2 form FIG. 4c which shows the schedule of 4:2:2 data flow in the DCT units under compression condition.

FIGS. 4d-1 to 4d-4 form FIG. 4d which shows the schedule of 4:1:1 data flow in the DCT units under decompression condition.

FIGS. 4e-1 and 4e-2 form FIG. 4e which shows the schedule of 4:2:2 data flow in the DCT units under decompression condition.

FIGS. 5a-1 and 5a-4 form FIG. 5a which shows a schematic diagram of the DCT input select unit 104 of the embodiment shown in FIG. 1.

FIGS. 5b-1 to 5b-3 form FIG. 5b which shows the schedule of control signals of the DCT input select unit 104 under compression condition, according to the clock phases.

FIGS. 5c-1 to 5c-4 form FIG. 5c which shows the schedule of control signals of the DCT input select unit 104 under decompression condition, according to the clock phases.

FIGS. 6a-1 and 6a-2 form FIG. 6a which shows a schematic diagram of the DCT row storage unit 105 of the embodiment shown in FIG. 1.

FIG. 6*b* shows a horizontal write pattern of the memory arrays 609 and 610 in the DCT row storage unit 105 of FIG. 6*a*.

FIG. 6*c* shows a vertical write pattern of the memory arrays 609 and 610 in the DCT row storage unit 105 of FIG. 6*a*.

FIGS. 7*a*-1 and 7*a*-2 form FIG. 7*a* which shows a schematic diagram of the DCT/IDCT processor unit 106 of the embodiment shown in FIG. 1.

FIGS. 7*c*-1 to 7*c*-4 form FIG. 7*c* which shows the data flow schedule of the DCT computational algorithm used under compression condition in the DCT/IDCT processor unit 105 of FIG. 7*a*.

FIGS. 7*d*-1 to 7*d*-3 form FIG. 7*d* which shows the schedule of control signals of the DCT/IDCT processor unit 105 shown in FIG. 7*a* under compression condition.

FIGS. 7*f*-1 to 7*f*-4 form FIG. 7*f* which shows the data flow schedule of the DCT/IDCT processor unit 105 of FIG. 7*a* under decompression condition.

FIGS. 7*g*-1 to 7*g*-3 form FIG. 7*g* which shows the schedule of control signals of the DCT/IDCT processor unit shown in FIG. 7*a* under decompression condition.

FIGS. 8*a*-1 to 8*a*-3 form FIG. 8*a* which shows a schematic diagram of the DCT row/column separator unit 107 in the embodiment shown in FIG. 1.

FIGS. 8*b*-1 to 8*b*-6 form FIG. 8*b* which shows the schedule of control signals of the DCT row/column separator unit 107 under decompression condition.

FIGS. 8*c*-1 to 8*c*-6 form FIG. 8*c* which shows the schedule of control signals of the DCT row/column separator unit 107 shown in FIG. 7*a* under decompression condition.

FIGS. 9-1 and 9-2 form FIG. 9 which shows a schematic diagram of the quantizer unit 108 in the embodiment shown in FIG. 1.

FIGS. 12*b*-1 and 12*b*-2 form FIG. 12*b* which shows a block diagram of the decoder unit 111*b* of the coder/decoder unit 111 in the embodiment shown in FIG. 1.

FIGS. 13*a*-1 to 13*a*-2 form FIG. 13*a* which shows a schematic diagram of the FIFO/Huffman code controller unit 112 shown in the embodiment shown in FIG. 1.

FIGS. 14-1 to 14-3 form FIG. 14 which shows a schematic diagram of the host bus interface unit 113 in the embodiment shown in FIG. 1.

FIGS. 15*b*-1 to 15*b*-4 form FIG. 15*b* which shows the system functions of the filter tree shown in FIG. 15*a*.

FIGS. 15*c*-1 to 15*c*-4 form FIG. 15*c* which shows the steps of derivation from the system functions of the filter tree in FIG. 15*a* to a flow diagram representation of the algebraic operations of the FIR digital filter bank.

FIGS. 15*d*-1 and 15*d*-2 form FIG. 15*d* which shows the flow diagram resulting from the derivation shown in FIG. 15*c*.

FIGS. 15*e*-1 and 15*e*-2 form FIG. 15*e* which shows the flow diagram of the inverse discrete cosine transform, as a result of reversing the algebraic operations of the flow diagram of FIG. 15*d*.

DETAILED DESCRIPTION

Figure 1:
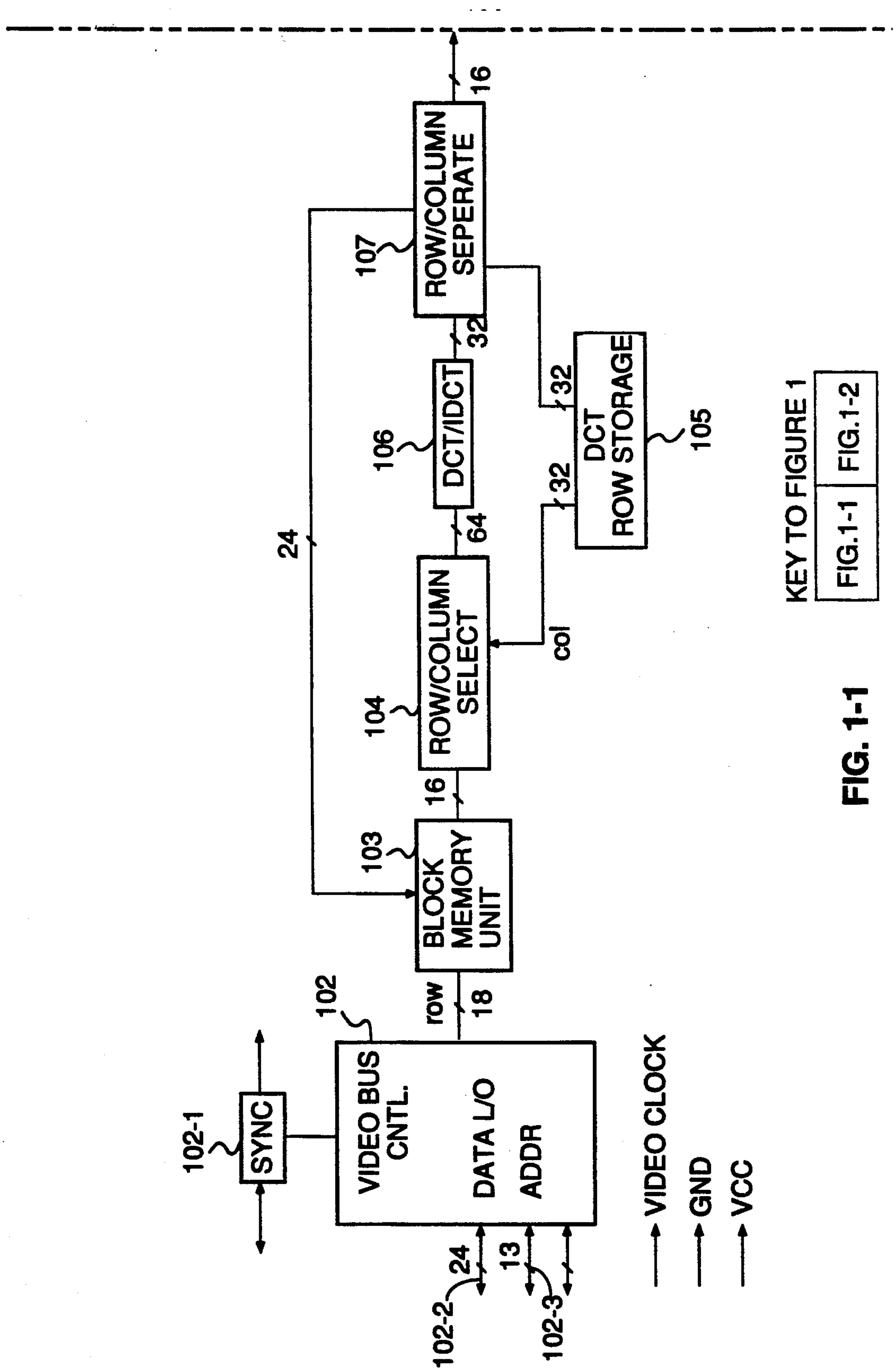
FIGS. 1-1 and 1-2 form FIG. 1 which shows a block diagram of an embodiment of the present invention.

Data compression for image processing may be achieved by (i) using a coding technique efficient in the number of bits required to represent a given image, (ii) by eliminating redundancy, and (iii) by eliminating portions of data deemed unnecessary to achieve a certain quality level of image reproduction. The first two approaches involve no loss of information, while the third approach is "lossy". The amount of information loss acceptable is dependent upon the intended application of the data. For reproduction of image data for viewing by humans, significant amounts of data may be eliminated before noticeable degradation of image quality results.

According to the present invention, data compression is achieved by use of Huffman coding (a coding technique) and by elimination of portions of data deemed unnecessary for acceptable image reproduction. Because sensitivities of human vision to spatial variations in color and image intensity have been studied extensively in cognitive science, these characteristics of human vision are available for data compression of images intended for human viewing. In order to reduce data based on spatial variations, it is more convenient to represent and operate on the image represented in the frequency domain.

This invention performs data compression of the input discrete spatial signals in the frequency domain. The present method transforms the discrete spatial signals into their frequency domain representations by a Discrete Cosine Transform (DCT). The discrete spatial signal can be restored by an inverse discrete cosine transform (IDCT).

Theory

A discrete spatial signal can be represented as a sequence of signal sample values written as:

$$x[n] \text{ where } n=0,1,\ldots,N-1$$

x[n] denotes a signal represented by N signal sample values at N points in space. The N-point DCT of this spatial signal is defined as $$X[k] = \gamma_k \sum_{n=0}^{N-1} x[n]\cos\left(\frac{\pi}{N} k(n+\tfrac{1}{2})\right) \text{where } k = 0, 1, \ldots, N-1$$

-continued $$\text{where } \gamma_k = \begin{cases} \frac{1}{\sqrt{2}} & \text{for } k = 0 \\ 1 & \text{for } k \neq 0 \end{cases}$$

Recognizing that $\cos a = \frac{1}{2}(e^{-ja} + e^{ja})$ (1)

and $$e^{j\frac{\pi}{N}k(2N-n+\frac{1}{2})} = e^{j2\pi k}e^{-j\frac{\pi}{N}k(n-\frac{1}{2})} = e^{-j\frac{\pi}{N}k(n-\frac{1}{2})}, \quad (2)$$

a method of computing the DCT of x[n] is derived and illustrated in the following:

F1. The discrete spatial signal x[n] is shifted by ½ sample in the increasing n direction and mirrored about n=N to form to form the resulting signal $\tilde{x}[n]$, written as:

$$\tilde{x}[n] = \begin{cases} x[n-\frac{1}{2}] & \text{for } n = \frac{1}{2}, 3/2, 5/2, \ldots, N-\frac{1}{2} \\ x[2N-n-\frac{1}{2}] & \text{for } n = N+\frac{1}{2}, N+3/2, \ldots, 2N-\frac{1}{2} \end{cases}$$

F2. A 2N-point discrete Fourier Transform (DFT) is applied to the signal $\tilde{x}[n]$. The transformed representation of $\tilde{x}[n]$ is written as:

$$\tilde{X}[k] = \sum_{n=\frac{1}{2}}^{2N-\frac{1}{2}} x[n]e^{-j\frac{\pi}{N}kn} \quad \text{for } k = 0, 1, \ldots, 2N-1$$

F3. Because of relations (1) and (2), the DCT of x[n], i.e., X[k], is readily obtained by setting X[k] to zero for k≧N (truncation), or $$X[k] = \begin{cases} 1/\sqrt{2}\,\tilde{X}[0] & k = 0 \\ \tilde{X}[k] & k = 1, 2, \ldots, N-1 \\ 0 & N \leqq k \leqq 2N-1 \end{cases}$$

Furthermore, the frequency domain representation of $\tilde{x}[n]$, i.e. $\tilde{X}[k]$, has the following properties $$\tilde{X}[k] = -\tilde{X}[2n-k], \text{ and } \tilde{X}[-k] = \tilde{X}[k] \quad (3), (4)$$
(real, odd symmetry)

and $$\tilde{X}[N] = 0 \quad (5)$$

Therefore, as will be shown below, despite truncation in step F3 the inverse transformation can be obtained using the information of (3), (4) and (5).

The inverse transformation, hence, follows the steps:

I1. The sequence $\tilde{X}[k]$ is reconstructed from X[k] by a mirroring X[k] about k=N, and scaling appropriately, i.e.

$$\tilde{X}[k] = \begin{cases} \sqrt{2}\,X[0] & \text{for } k = 0 \\ X[k] & k = 1, 2, \ldots, N-1 \\ 0 & k = N \\ -X[2N-k] & k = n+1, \ldots, 2N-1 \end{cases}$$

(using relations (3), (4) and (5)).

I2. The 2N-point inverse discrete Fourier transform (IDFT) is then applied to X[k].

$$\tilde{x}[n] = \frac{1}{2N}\sum_{k=0}^{2N-1}\tilde{X}[k]e^{\frac{j\pi kn}{N}} \quad \text{for } n = \frac{1}{2}, 3/2, \ldots, 2N-\frac{1}{2}$$

I3. Finally, x[n] may be obtained by setting $\tilde{x}[n]$ to zero for n≧N and shifting the signal by ½ sample in the decreasing n direction, i.e.

$$x[n] = \begin{cases} \tilde{x}[m+\frac{1}{2}] & \text{for } m = 0, \ldots, N-1 \\ 0 & \text{for } N \geqq M \geqq 2N-1. \end{cases}$$

Filter Implementation

The Discrete Cosine Transform (DCT) and its inverse outlined in steps F1–F3 and I1–I3 steps discussed in the theory section above can be realized by a set of finite impulse response (FIR) digital filters. As discussed in the theory section above, DCT, and similarly IDCT, may be obtained through the use of a DFT or an inverse DFT at steps F2 and I2 respectively.

Because DFT, and similarly its inverse, can be seen as a system of linear equations of the form:

$$X[k] = \gamma \sum_{2N} x[n]w^{kn} \qquad \gamma = 1\ (DFT) \quad = \frac{1}{2N}\ (\text{inverse})$$

the transform can be seen as being accomplished by a bank of filters, one filter for each value of k (forward DFT) or n (inverse DFT). The system function (z-transform of a filter's unit sample response) of each filter may be generally written as, (a) $H_k(Z)$ in the forward DFT, for the kth filter, $$H_k(Z) = \sum_{n=\frac{1}{2}}^{2N-\frac{1}{2}} z^n e^{\frac{-j\pi kn}{N}} \quad (P1)$$

$$= z^{-\frac{1}{2}}e^{\frac{-j\pi k}{2N}}\left(\frac{1 - Z^{2N} - 1}{1 - Ze^{-j\frac{\pi}{N}k-1}}\right)$$

or equivalently, $$= z^{-\frac{1}{2}}e^{\frac{j\pi k}{2N}}\prod_{\substack{l=0 \\ l\neq k}}^{2N-1}\left(1 - ze^{\frac{j\pi lk}{N}}\right)$$

The last formulation (P1) specifically points out that the 2N−1 zeroes of the kth filter lie on the unit circle of the Z-plane, separated π/N radially, except for l=k which is not a zero of the filter.

(b) Similarly, the system function $G_n(Z)$ for the inverse DFT in the nth filter, $$G_n(Z) = \frac{1}{2N}\sum_{k=0}^{2N-1} z^k e^{\frac{\pi}{jNkn}} \quad (P2)$$

-continued $$= \frac{1}{2N} \prod_{\substack{l=\frac{1}{2} \\ l \neq n}}^{2N-\frac{1}{2}} \left(1 - Ze^{\frac{j\pi ln}{N}}\right)$$

Again, it can be seen that the zeros of the nth filter in the inverse DFT transform lie on the unit circle separated by $\pi/N$ radially, except for $l \neq n$. The structure of equations P1 and P2 suggests that both forward and inverse DFTs may be implemented by the same filter banks with proper scaling (noting that P1 and P2 has identical zeroes for any k=n).

The representation of P1 suggests a "recursive" implementation of the FIR filter, i.e. the FIR filter may be formed by cascading 2N−1 single-point filters, each having a zero at a different integral multiple of $$e^{\frac{j\pi k}{N}} \text{ or } e^{\frac{j\pi n}{N}}$$

For example, we may rewrite the kth (forward) or nth (inverse) filter as $$P_k(z) = z^{-\frac{1}{2}} e^{\frac{j\pi k}{2N}} \prod_{l \neq k} (z - R^l) \text{ for the forward } DFT$$

or $$P_n(z) = \frac{1}{2N} \prod_{l \neq n} (z^l - R) \text{ for the inverse } DFT$$

where $R^l$ is the $l^{th}$ zero, $$R = e^{\frac{j\pi lk}{N}} \text{ (for forward } DFT\text{)}$$

$$= e^{\frac{-j\pi ln}{N}} \text{ (for inverse } DFT\text{)}$$

Furthermore, we may write $$P_k(z) = P_{mk}(z)(z - R^m)$$

where $P_{mk}(z)$ denotes a FIR filter having 2N−2 zeroes spaced $\pi/N$ apart, except for l=k,m. Here, $P_k(z)$ is represented as a cascade of a 2N−2 point filter $P_{mk}(z)$ and a single point filter having a zero at $R^m$.

In the same way, $P_k(z)$ may also be decomposed into a cascade of a 2N−3 point FIR filter $P_{mnk}(z)$ and a 2-point filter having zeros at $R^m$ and $R^n$. $P_{mnk}(z)$ may itself be implemented by cascading lower order FIR filters.

Figure 15A:
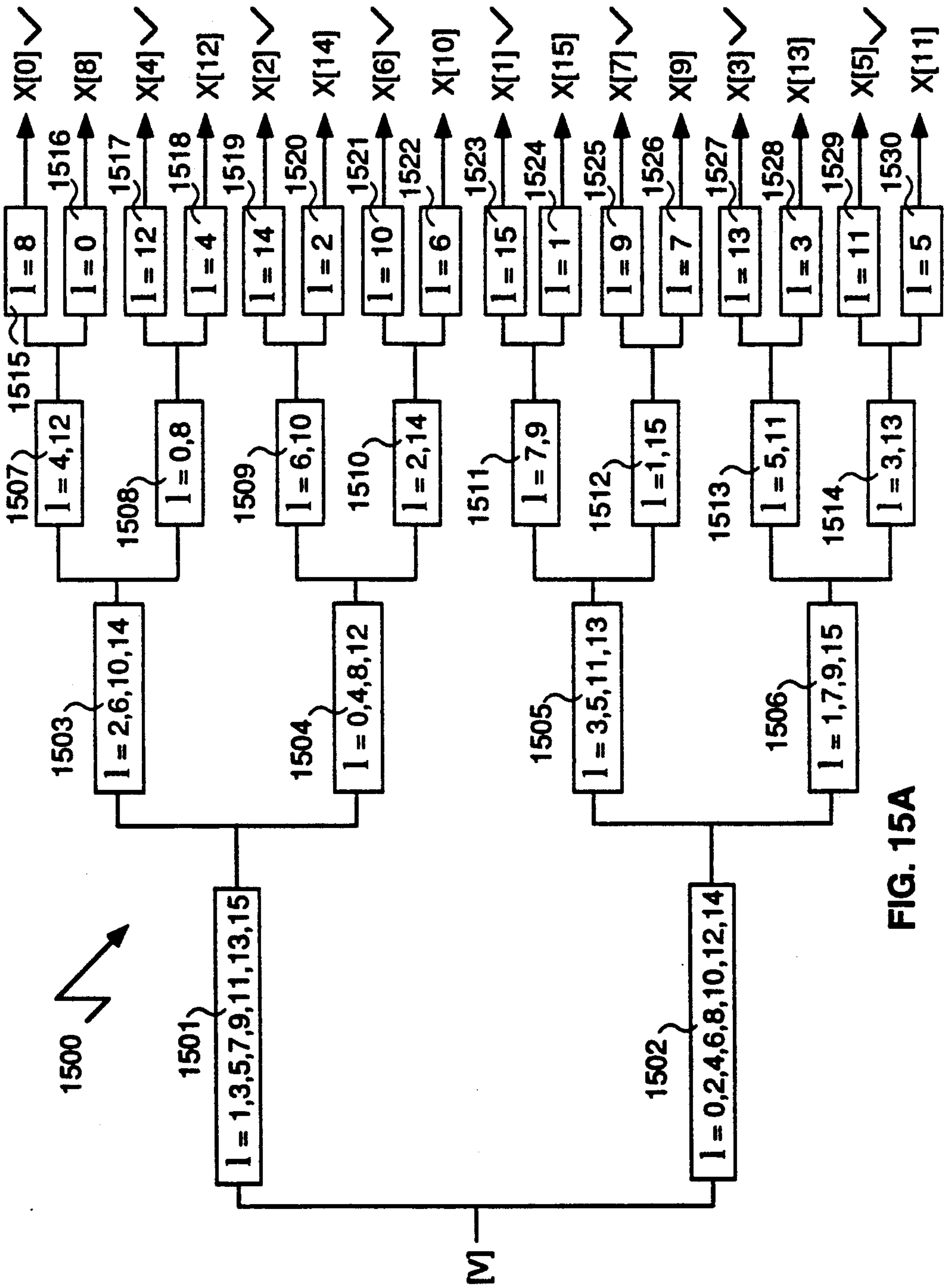
FIG. 15*a* shows a filter tree used to perform a 16-point discrete Fourier transform (DFT).

A 16-point DFT may be implemented by the FIR filter tree 1500 shown in FIG. 15*a* by selectively grouping FIR filters.

Figures 1, 15B:
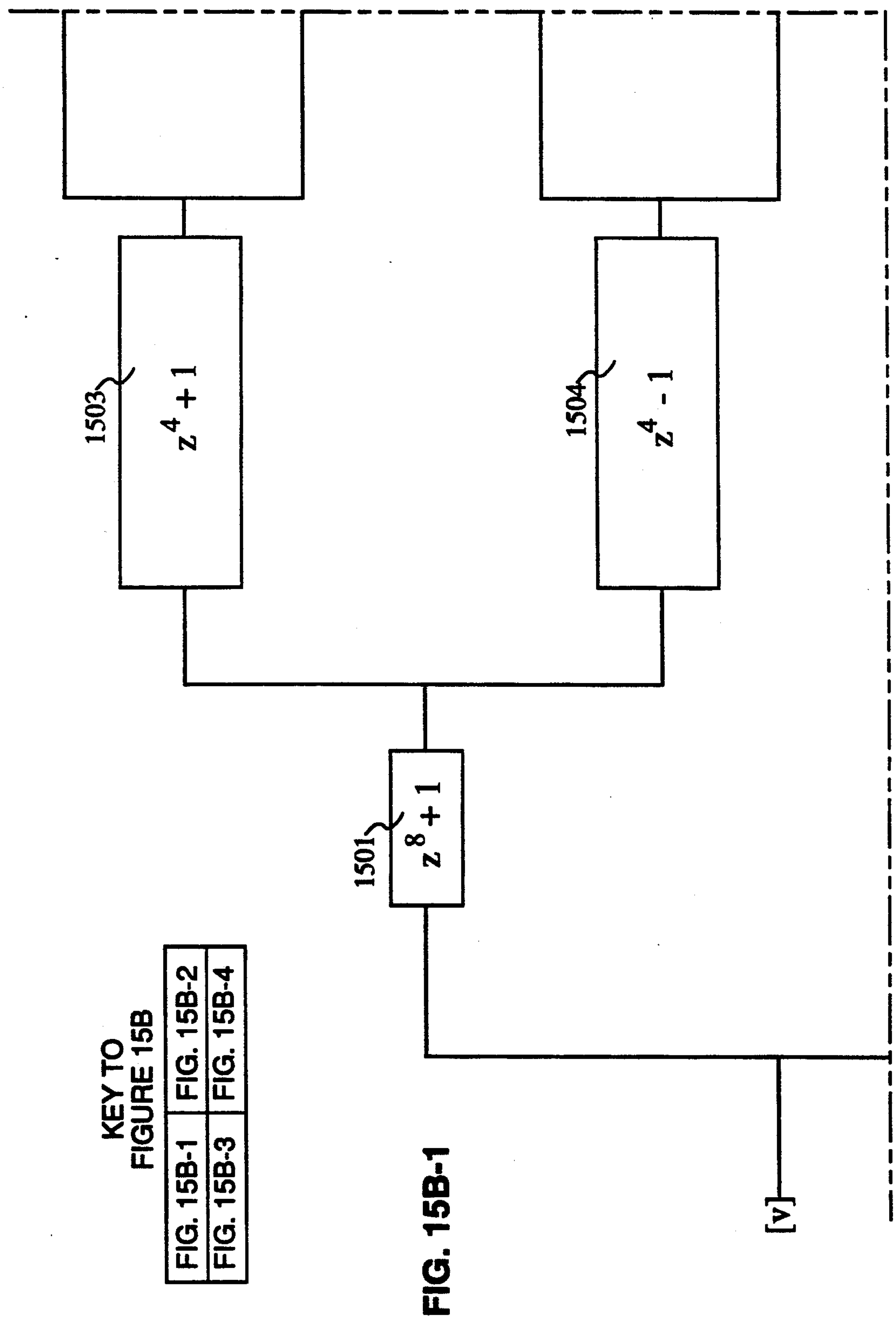
Figures 2, 15B:
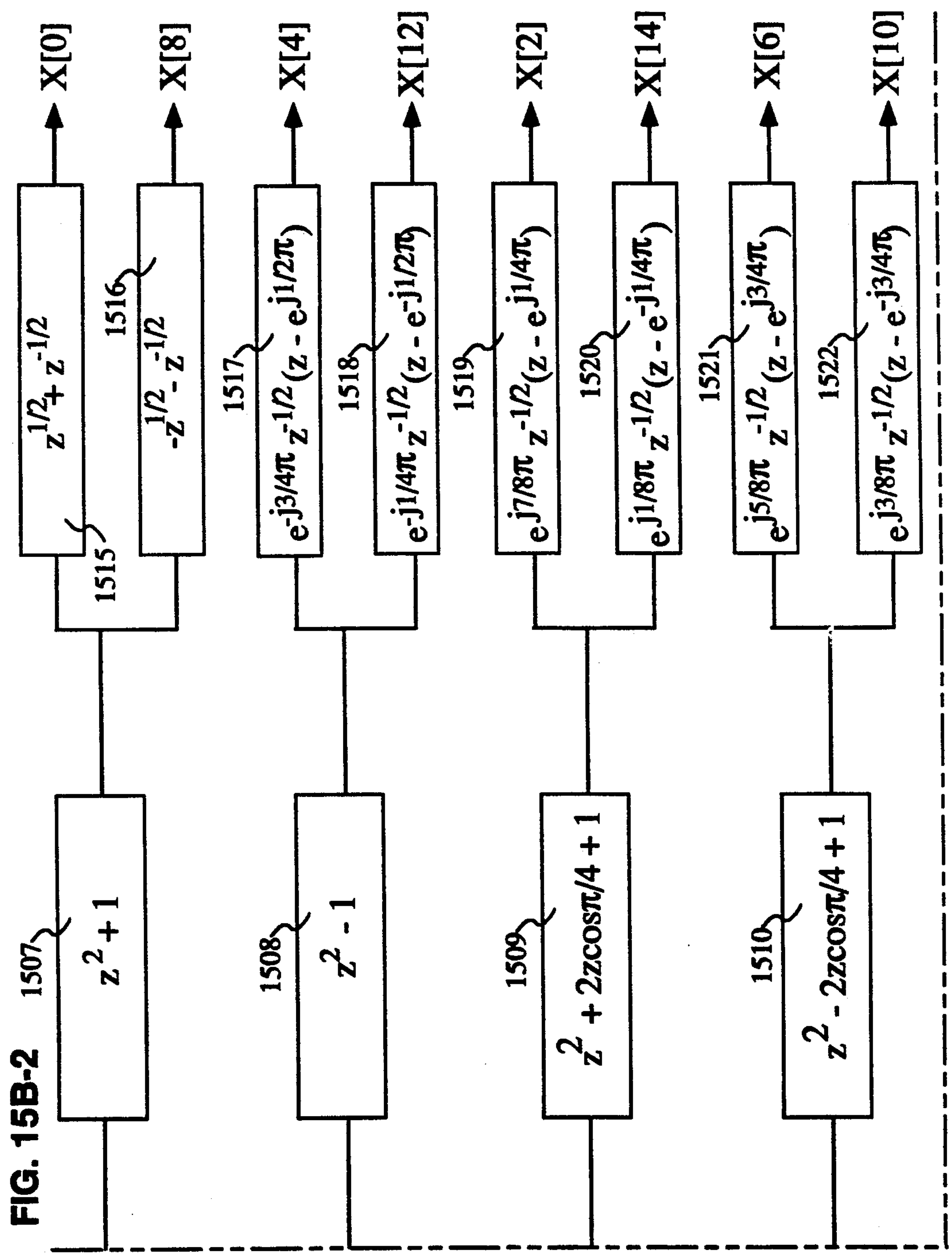
Figures 3, 15B:
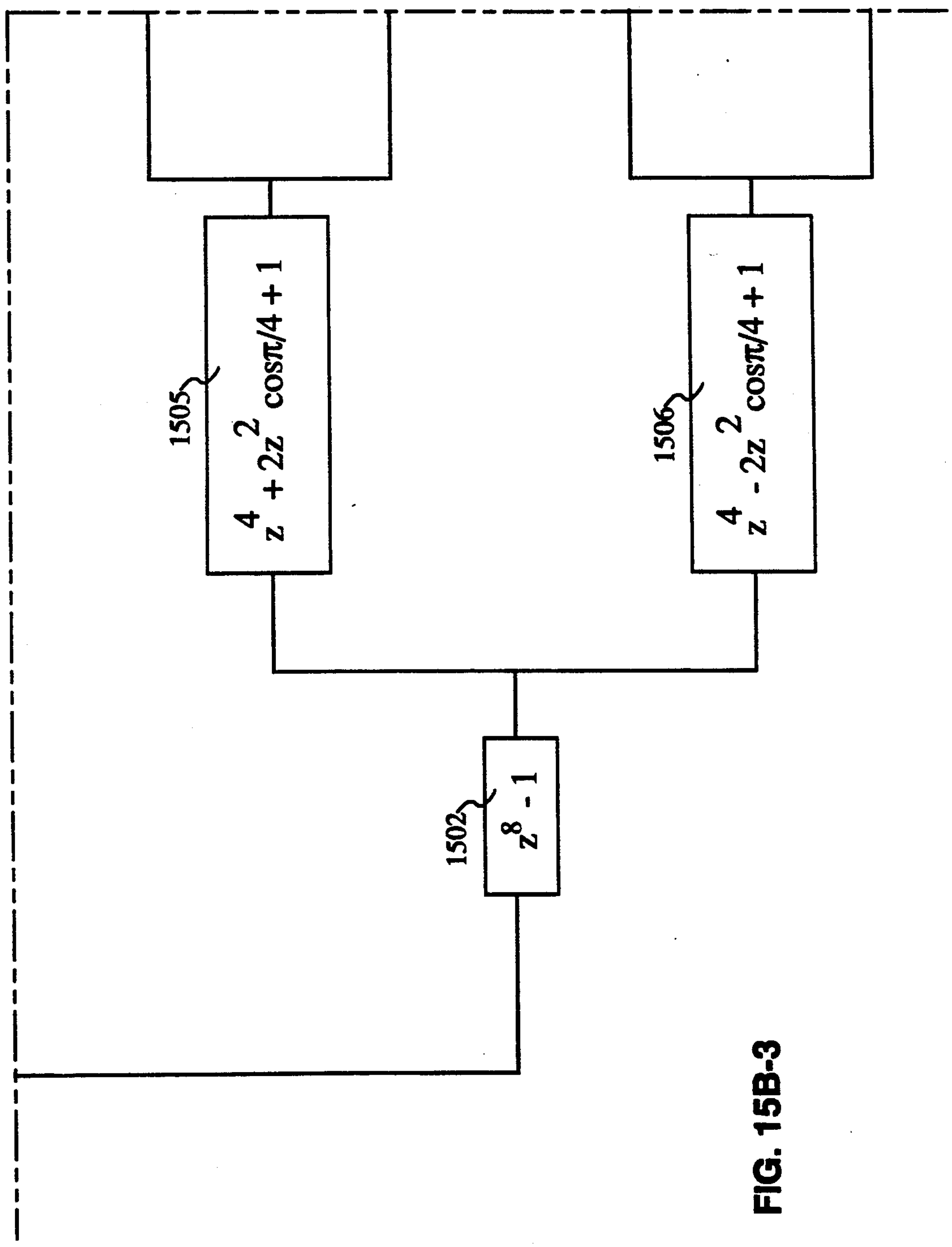
Figures 4, 15B:
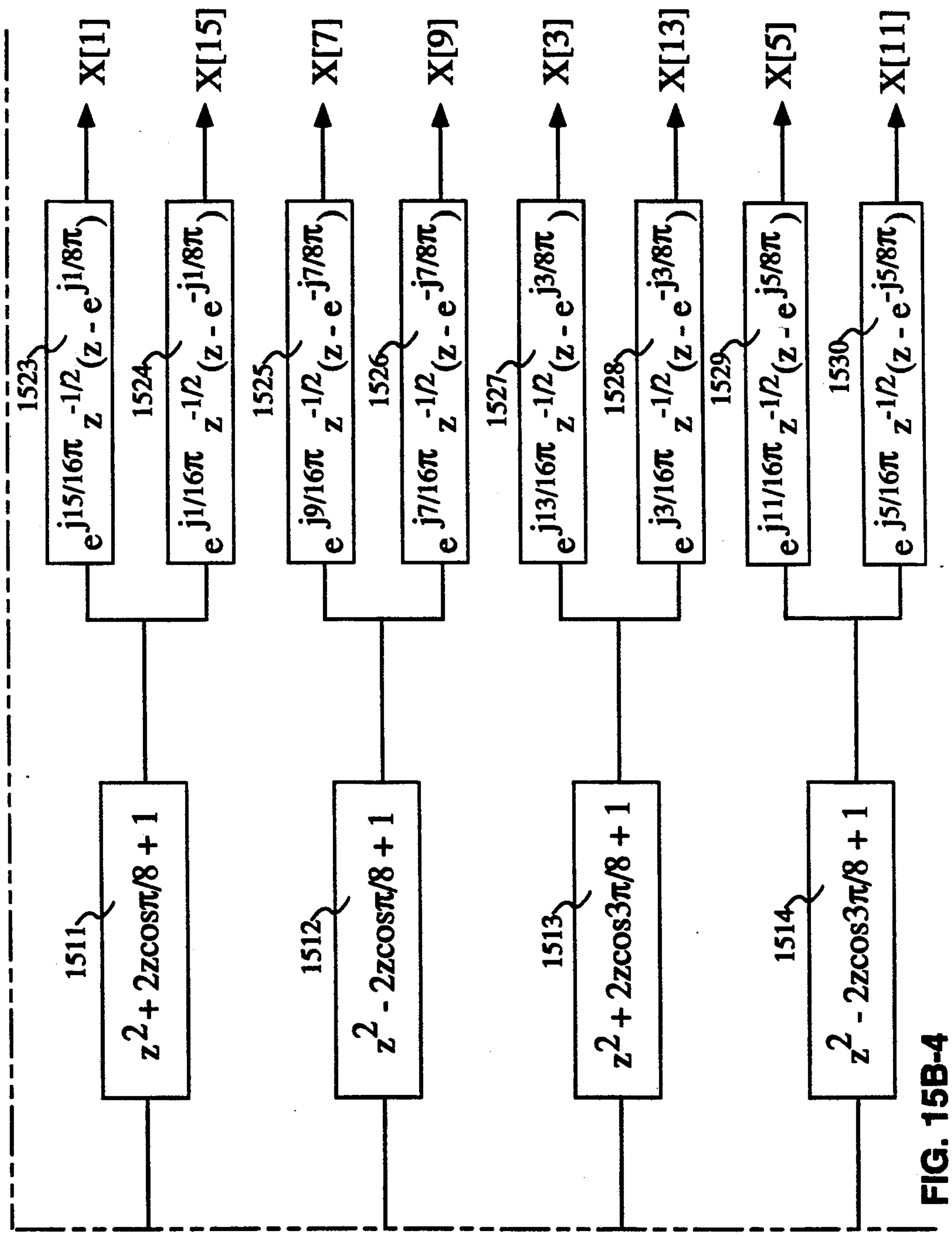

The grouping of filters shown in FIG. 15*a* is designed to minimize the number of intermediate results necessary to complete the DFT. A filter is characterized by its system function, and referred to as an N-th order filter if the leading term of the polynomial representing the system function is of power N. As shown in FIG. 15*b*, the two filters 1501 and 1502 in the first filter level are 8th order filters, i.e. the leading term of the power series representing the system function is a multiple of $z^8$. The four filters 1503–1506 in the second level of filters are 4th order filters, and the eight filters 1507–1514 in the third level of filters are 2nd order filters. In general, a N-point DFT may be implemented by this method using $(1+\log_2 N)$ levels of filters with the kth level of filters having $2^k$ filters, each being of order $N/2^{k-1}$, and such that the impulse response of each filter possesses either odd or even symmetry. Under this grouping scheme, the number of arithmetic operations are minimized because many filter coefficients are zero, and many multiplications are trivial (involving 1, −1, or a limited number of constants cos $\pi l/N$, where l is an integer). These properties lend to simplicity of circuit implementation. Furthermore, as will be shown in the following, computation at each level of filters involves only output data of the previous level, and, treating each filter as a node in a tree structure, specifically each child node depends only on output data of the immediate parent node. Therefore, no communication is required between data output of filters not in a "parent-child" relationship. This property results in "local connectivity" essential for area efficiency in an integrated circuit implementation. This filter tree 1500 has the following properties:

(i) all branches have the same number of zeros; and (ii) all stages have the same number of zeros. These properties provide the advantages of locally connected filters ("local connectivity") and a maximum number of filters from which data must be supplied ("fan out") of two. The property of local connectivity, defined below, minimizes communication overhead. Minimum fan out of two allows a compact implementation in integrated circuits requiring high space efficiency.

In FIG. 15*a*, each rectangular box represents a filter having the zeroes $W^l$, for the values of l shown inside the box. W is $e^{j\pi k/N}$ or $e^{-j\pi n/N}$ dependent upon whether DCT or IDCT is computed. Recalling that, in order to obtain DCT from DFT, at steps F3 and I3, the DFT results for $k \geqq N$ (forward) or $n \geqq N$ are set to zero. Hence, only the portions of this filter tree that yield DFT results for $k<N$ (forward) and $n<N$ (inverse) need be implemented. The required DFT results are each marked in FIG. 15*a* with a "check".

Figures 1, 15C:
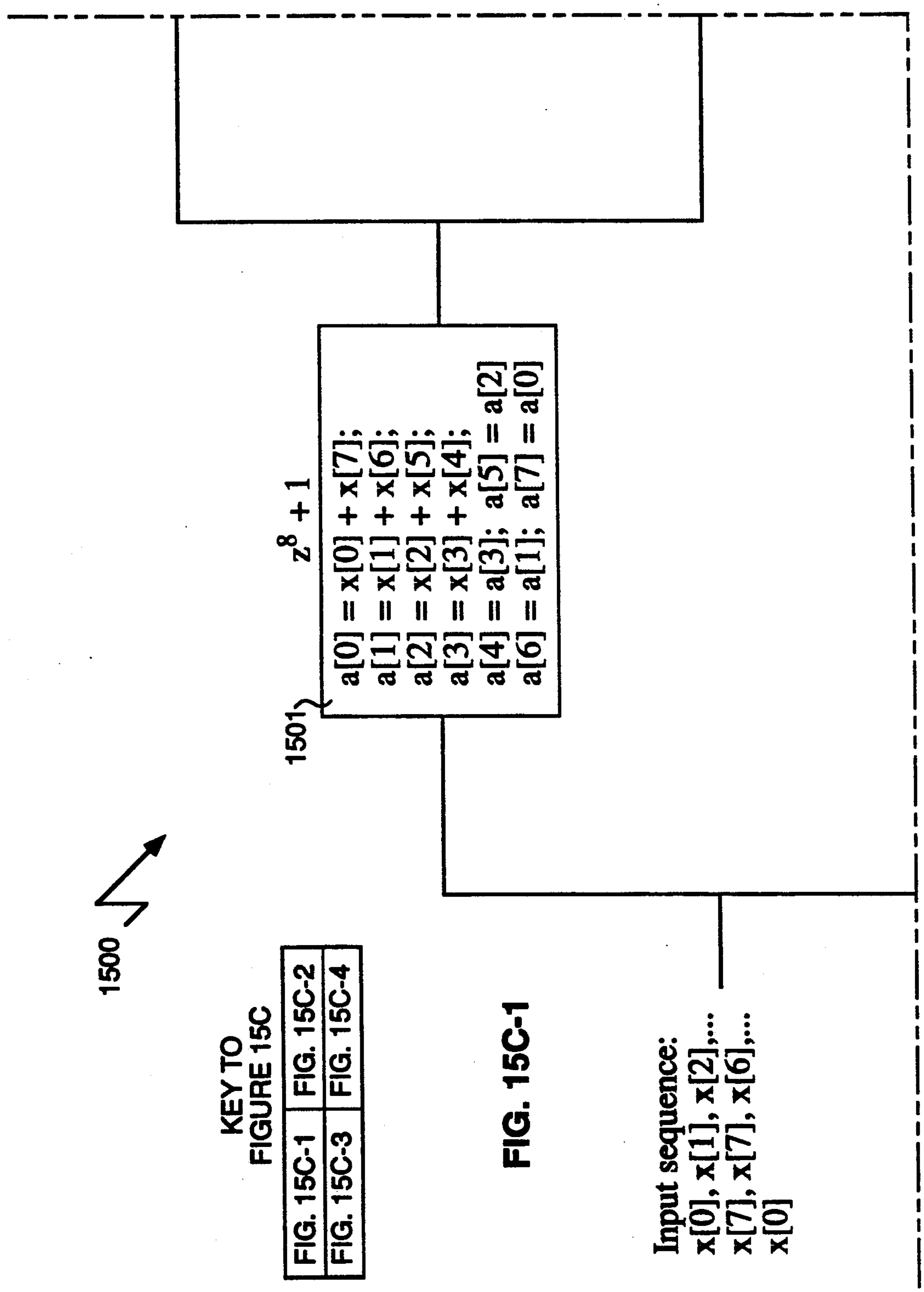
Figures 2, 15C:
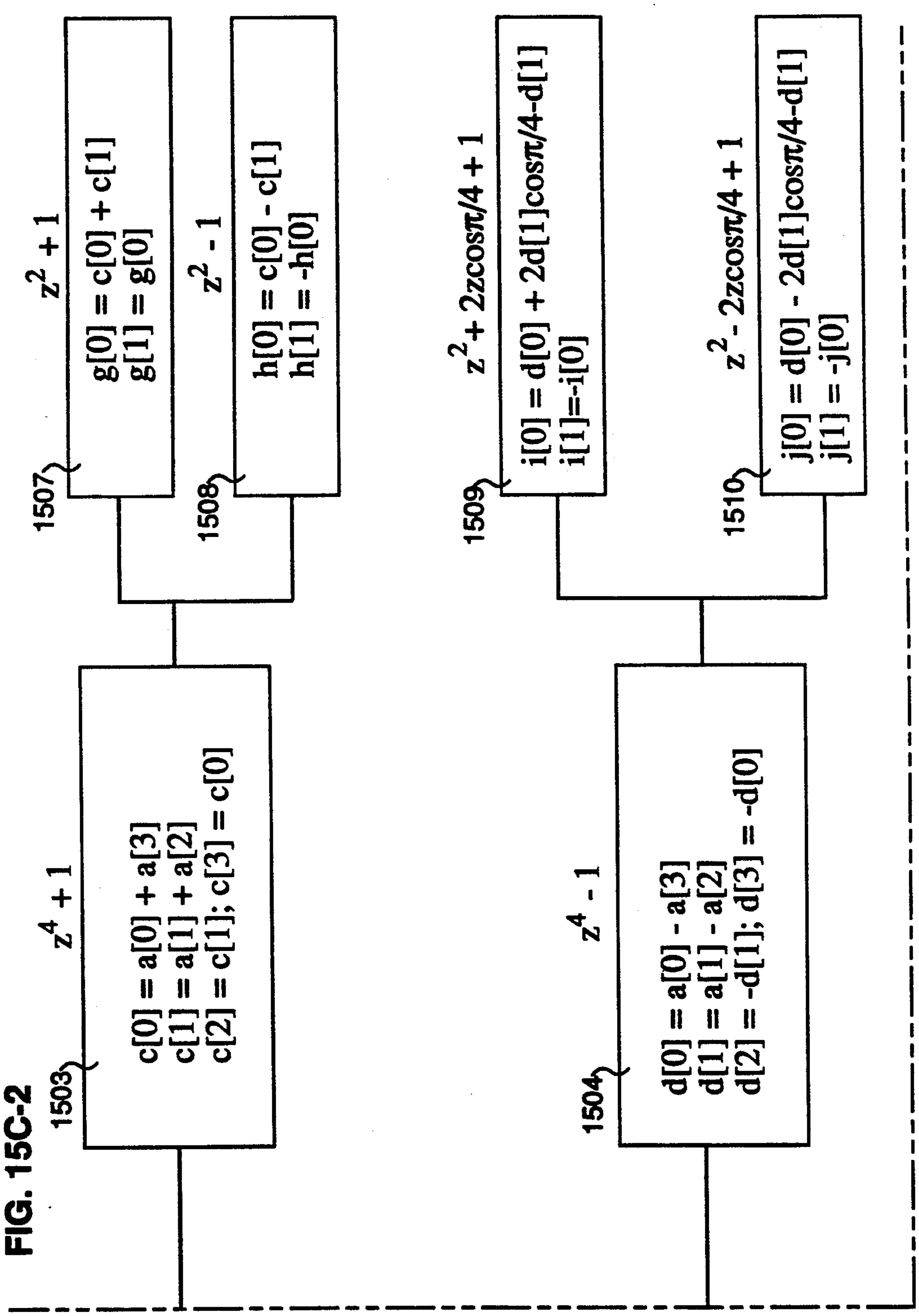
Figures 3, 15C:
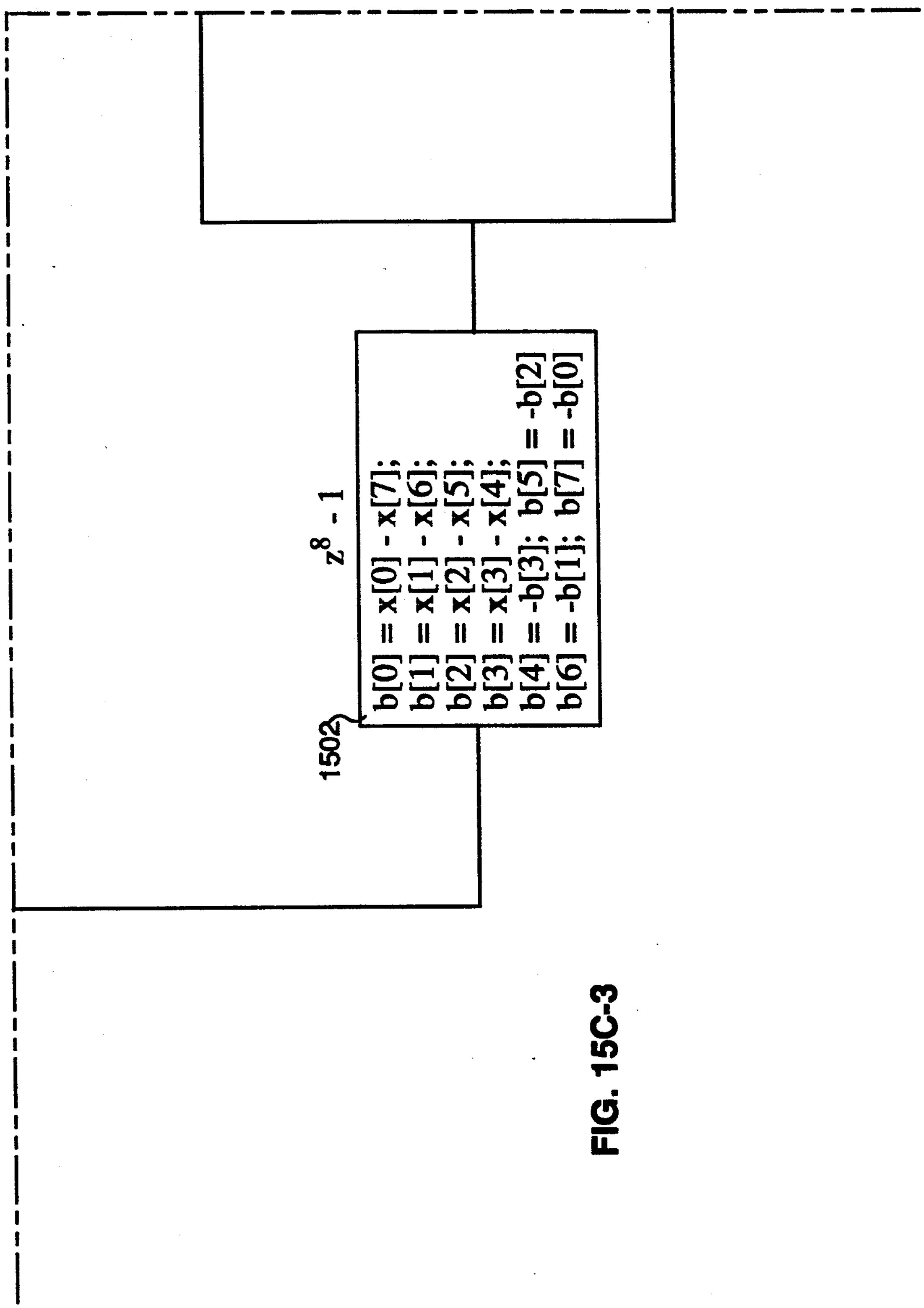
Figures 4, 15C:
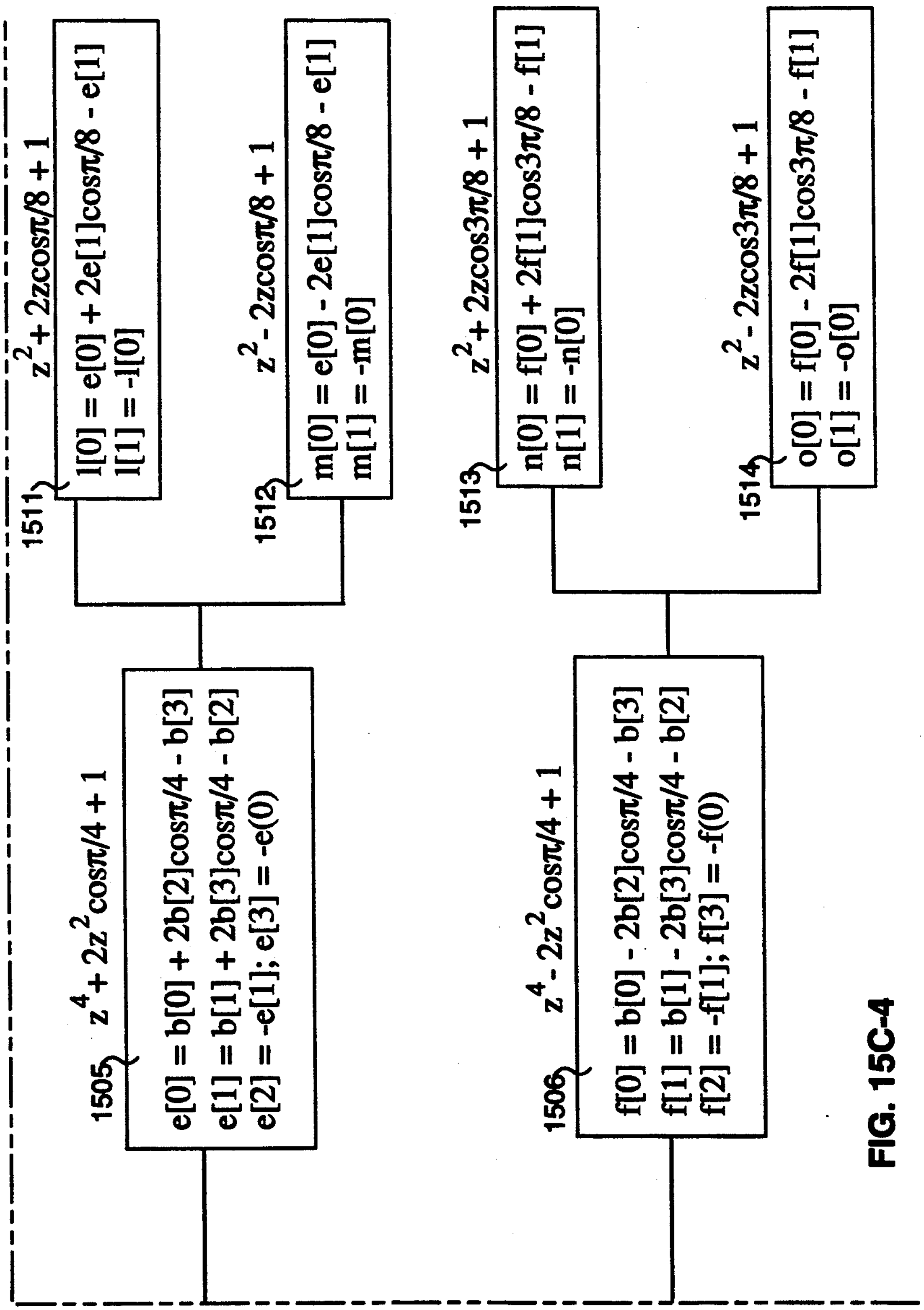

The system functions for the forward transform filters are shown in FIG. 15*b*. Because of the symmetry in the input sequence and in the system function of the FIR filters, tracking carefully the intermediate values and eliminating duplicate computation of the same value, the flow graph of FIG. 15*c* is obtained. FIG. 15*c* illustrates these tracking steps by following the computation of the first three stages in the filter tree 1500 shown in FIG. 15*a*. Recall that at step F1, the input sequence X[n] is mirrored about n=N to obtain the input sequence x[n] to the 16-point DFT. Therefore x[n] is x[0], x[1], x[2] . . . x[7], x[7], x[6], . . . , x[0]. This sequence is used to compute the 8-point DCT. As shown in FIG. 15*c*, the filter 1501 has system function $H(Z)=Z^8+1$; hence, the first eight output data a[0] . . . a[7] are each the sum of two samples of the input sequence, each sample being 8 unit "delays" apart, e.g. $a[0]=x[0]+x[7]$; $a[1]=x[1]+x[6]$ etc. (These delays are not delays in time, but a distance in space since x[n] is a spatial sequence.) Because of the symmetry of the input sequence x[n], a[0] . . . a[7] are symmetrical about $n=3\frac{1}{2}$. Therefore, when implementing this filter 1501, only the first four values a[0] . . . a[3] need actually be computed, a[4] . . . a[7] having values corresponding respectively to a[3] . . . a[1]. Computation of a[0] . . . a[3] is provided in the first four values of stage 2 shown in FIG. 15*d*. The operations to implement filter 1501 are shown in FIG. 15*c*.

The same procedure is followed for filter 1502. Filter 1502, however, possesses odd symmetry, i.e. b[0]=−b[7]; b[1]=−b[9] etc. For most implementations, including the embodiment described below, the algebraic sign of an intermediate value may be provided at a later stage when the value is used for a subsequent operation. Thus, in filter 1502, as in filter 1501, only the first four values b[0] . . . b [3] need actually be computed, since b[4] . . . b[7] may be obtained by a sign inversion of the values b[3] . . . b[0] respectively at a subsequent operation. The operations to implement 1502 are shown in FIG. 15*c*. Hence, the bottom four values at stage 2 shown in FIG. 15*d* are provided for computation of values b[0] . . . b[3].

Figures 1, 15D:
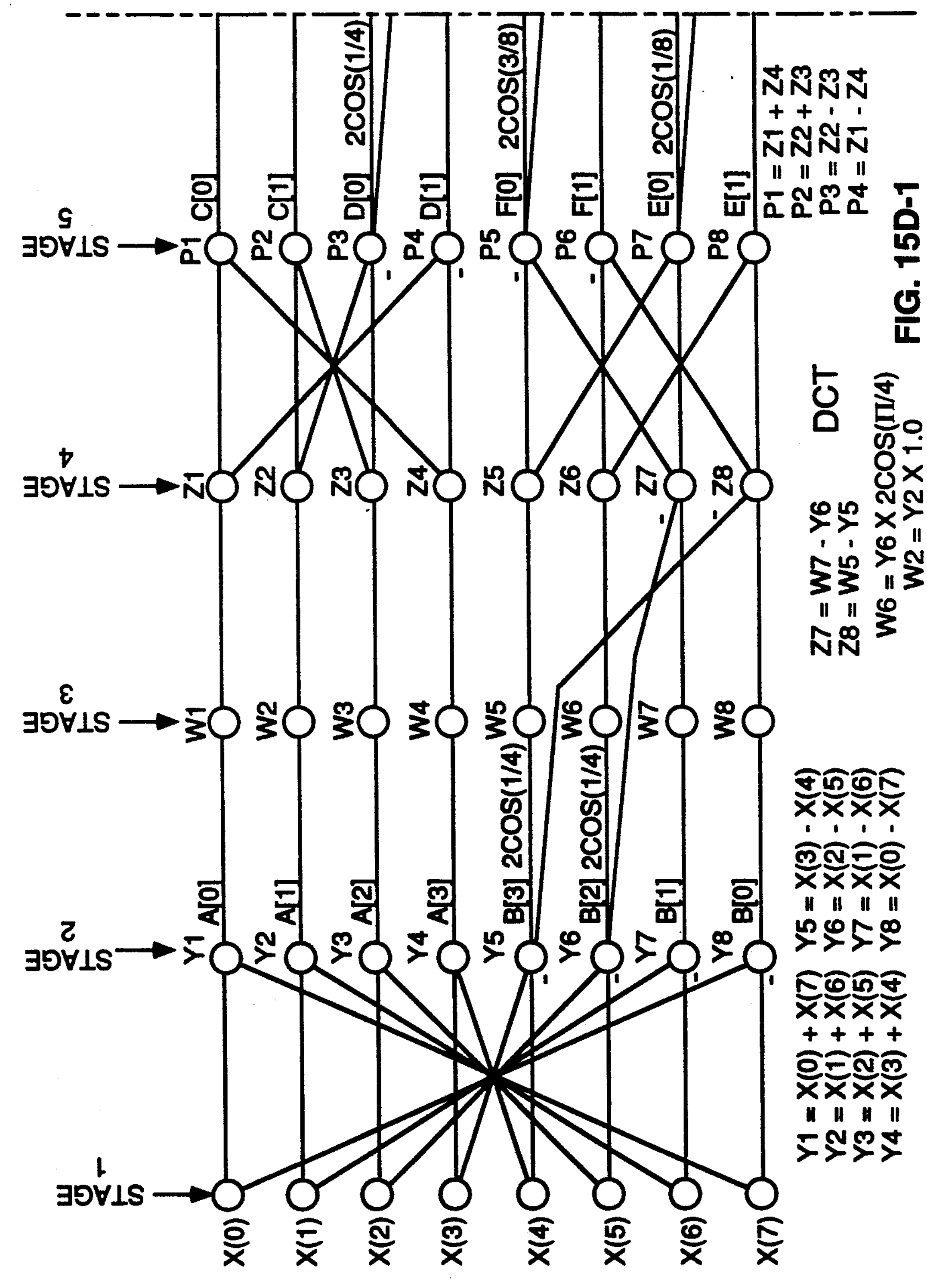
Figures 2, 15D:
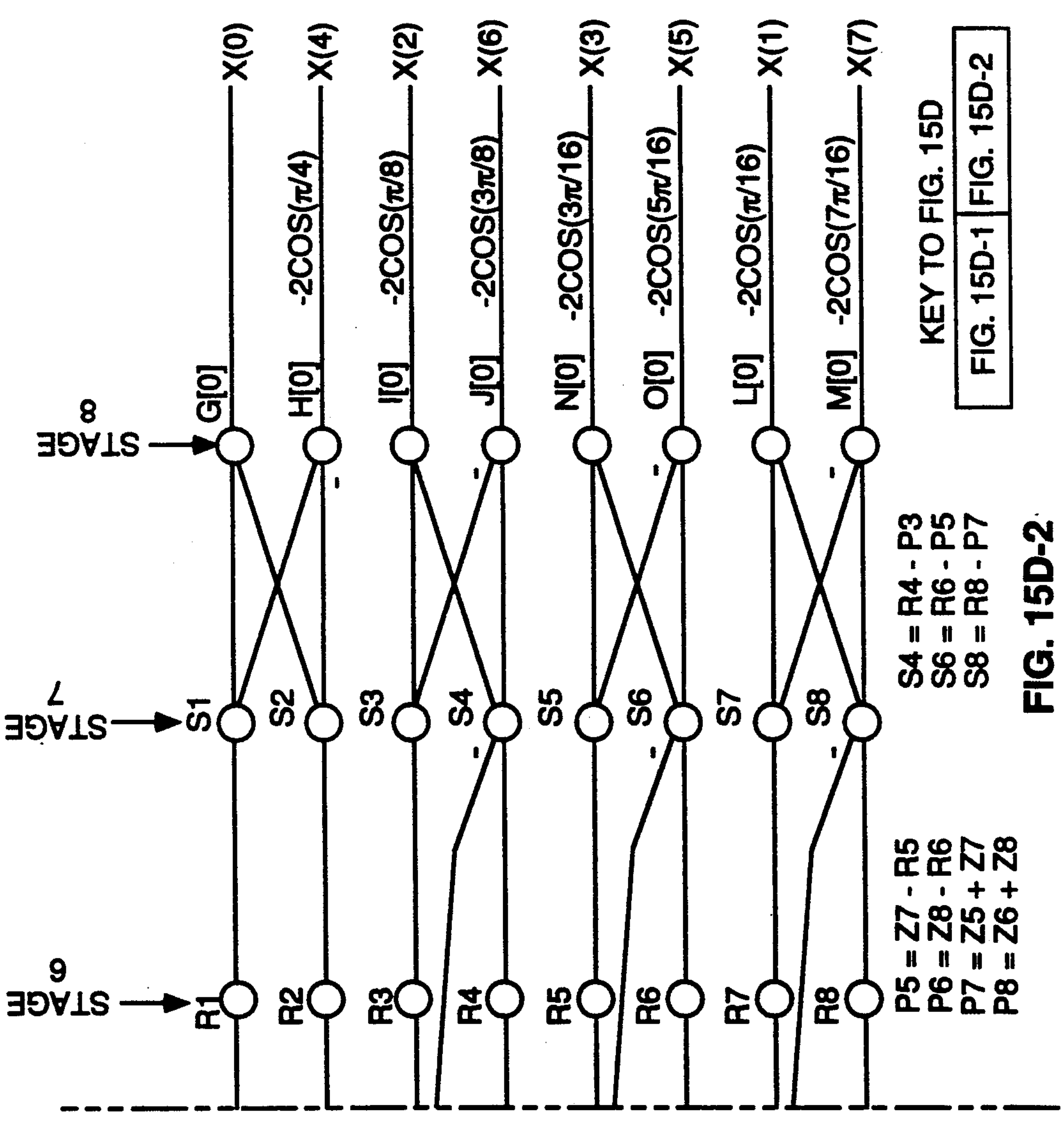

Accordingly, by mechanically tracking the values computed at the previous stages, and noting the symmetry of each filter, the operations required to implement filters 1503–1514 are determined in the same manner as described above for filter 1501 and 1502, the result of the derivation is the flow diagram shown in FIG. 15*d*.

Finally, because of the symmetry of the output in filters 1507–1514, and the symmetry in filters 1515–1530, the required output data X[0] . . . X[7] are obtained by multiplying g[0], h[0], i[0] . . . o[0] by $$s1 = X(0) + X(4); s2 = X(0) - X(4);$$
$$s3 = X(2) - X(6); s4 = X(2) + X(6);$$
$$s5 = X(3) - X(5); s6 = X(3) + X(5);$$
$$s7 = X(1) - X(7); s8 = X(1) + X(7).$$

respectively.

Figures 1, 15E:
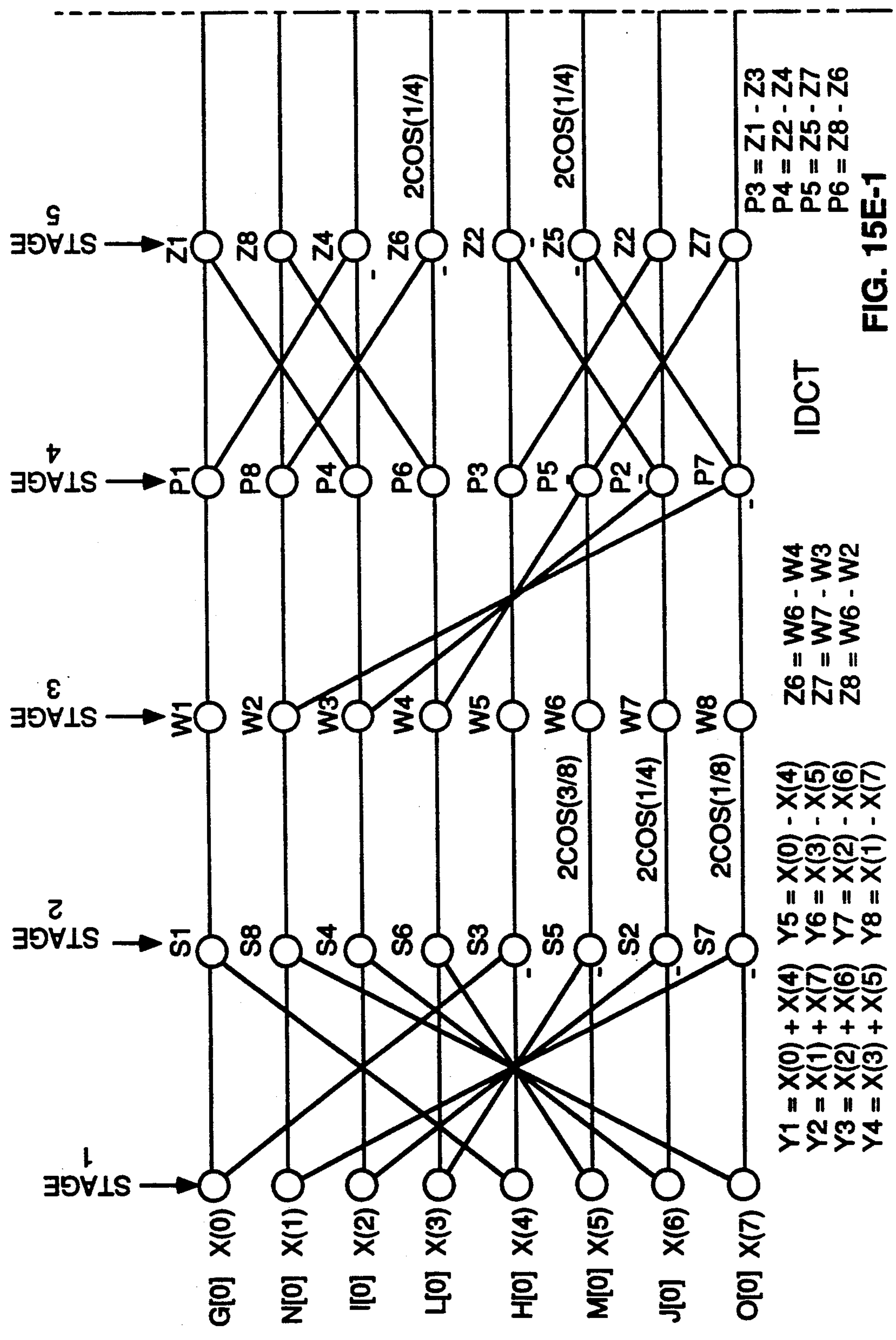
Figures 2, 15E:
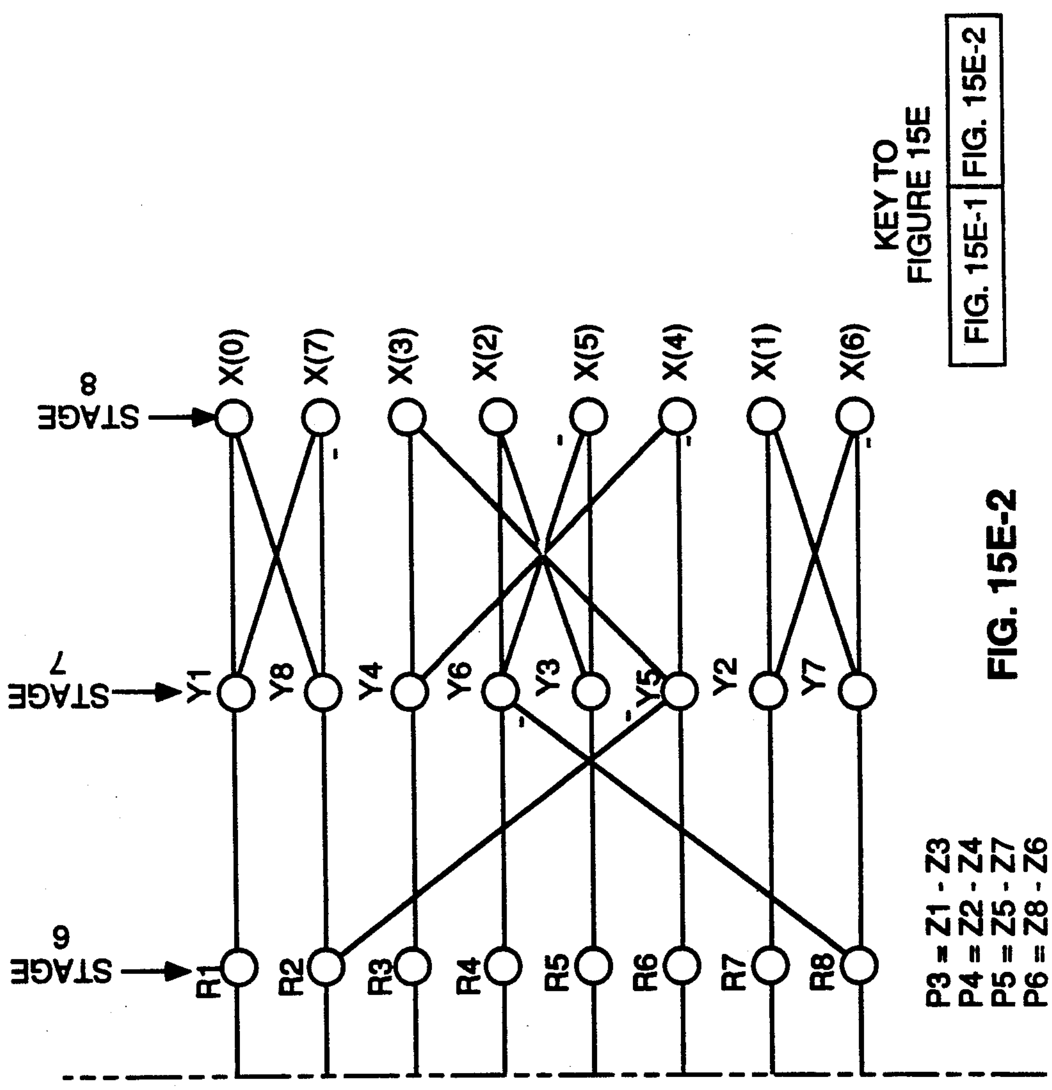
Figure 5:
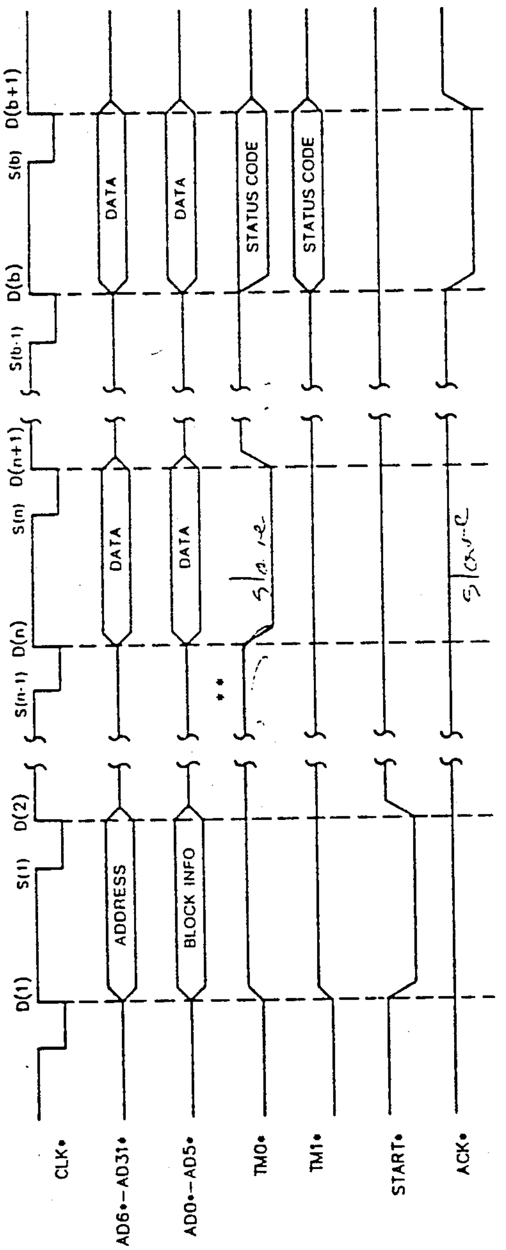
Figure 6:
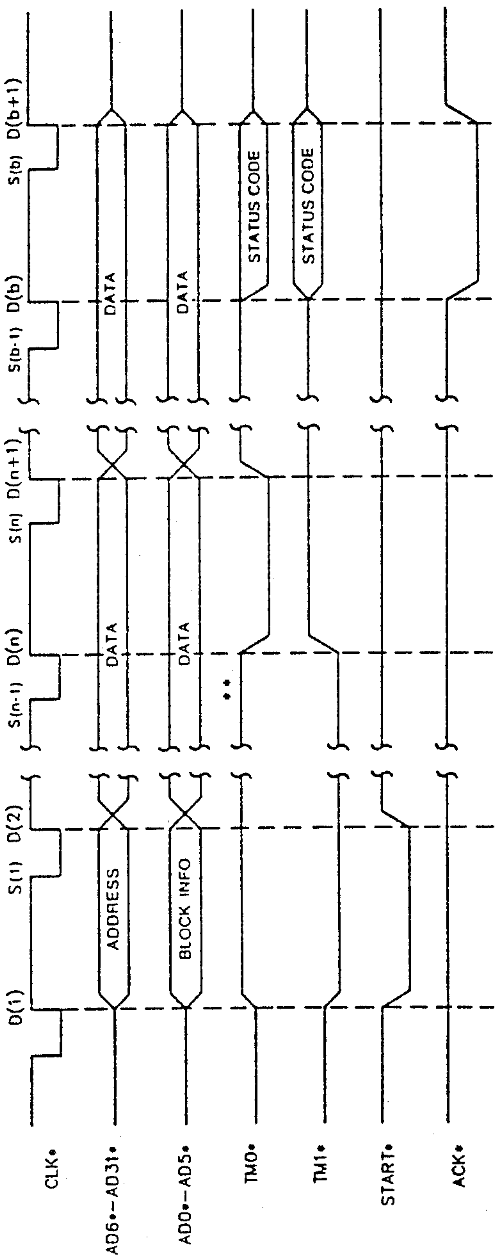
Figure 9:
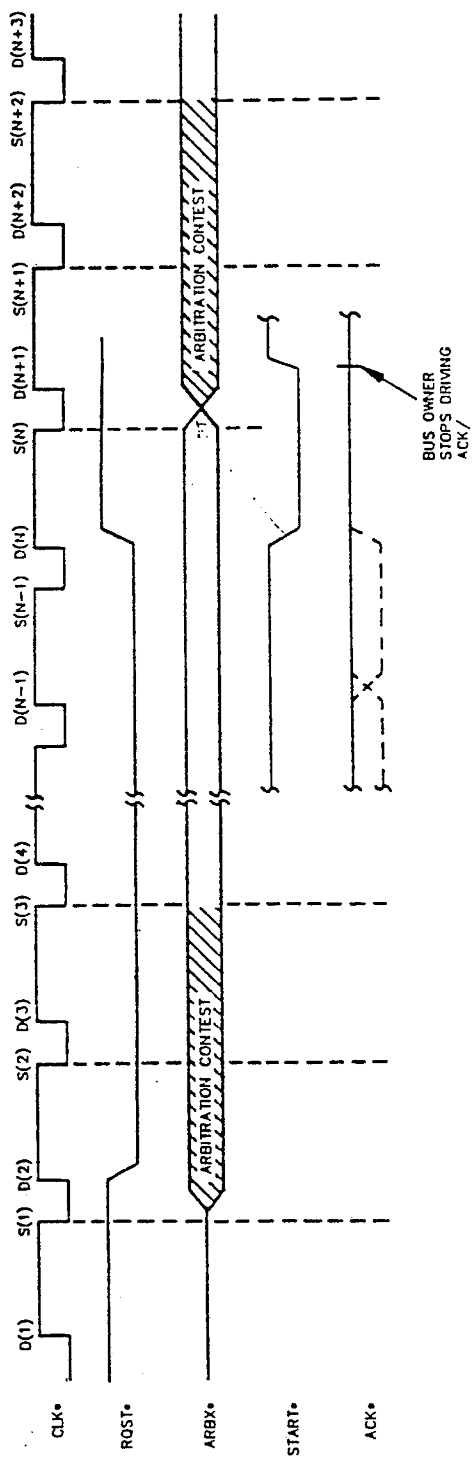

The inverse transform flow diagram FIG. 15*e* is obtained by reversing the algebraic operations of the forward transform flow diagram in FIG. 15*d*.

Thus, intermediate results s1–s7 at stage 2 in FIG. 15*e* are given by reversing the algebraic operations for obtaining x(0)–x(7) at stage 8 of FIG. 15*d*. That is, ignoring for the moment a factor ½.

$$s1 = X(0) + X(4); s2 = X(0) - X(4);$$
$$s3 = X(2) - X(6); s4 = X(2) + X(6);$$
$$s5 = X(3) - X(5); s6 = X(3) + X(5);$$
$$s7 = X(1) - X(7); s8 = X(1) + X(7).$$

(In general, the scale factors, such as the ½ above, may be ignored because they are recaptured by output scaling). The same process is repeated by reversing the intermediate results s1–s7 at stage 6 of FIG. 15*d* to derive intermediate results p1–p7 at stage 4 of FIG. 15*e*. The intermediate results z1–z7, y1–y7 are similarly derived and additional intermediate results are then derived until the final values x(0)–x(7) are derived. The process is summarized below:

$$p1 = s1; p2 = s2; p3 = 2\,s3 \cos\frac{\pi}{4}, - s4;$$

$$p4 = s4; p5 = 2\,s5 \cos\frac{3\pi}{8} - s6; p6 = s6;$$

$$p7 = 2\,s7 \cos\frac{\pi}{8} - s8; p8 = s8;$$

$$z1 = p1 + p4; z2 = p2 + p3; z3 = p2 - p3;$$
$$z4 = p1 - p4; z5 = p7 - p5; z6 = p8 - p6;$$
$$z7 = p5 + p7; z8 = p6 + p8;$$
$$y1 = z1; y2 = z2; y3 = z3; y4 = z4;$$

$$y5 = 2\,z5 \cos\frac{\pi}{4} - z8; y6 = 2\,z6 \cos\frac{\pi}{4} - z7;$$

$$y7 = z7; y8 = z8;$$

-continued $$x(0) = y1 + y8; x(1) = y2 + y7; x(2) = y3 + y6;$$
$$x(3) = y4 + y5; x(4) = y4 - y5; x(5) = y3 - y6;$$
$$x(6) = y2 - y7; x(7) = y1 - y8.$$

The quality of possible hardware implementations of a computation algorithm may be measured in two dimensions: (i) computational complexity and (ii) communication requirements. According to the present invention, the computational complexity of the DCT, measured by the number of multiplication steps needed to accomplish the DCT, taking into consideration of the throughput rate, is of order N (i.e. linear), where N is the number of points in the DCT. As discussed above, the tree structure of the filter bank results in a maximum fan out of two, which allows all communication to be "local" (i.e. data flows from the root filters—in other words, highest order filters—and no communication is required between filters not having parent-child relationship in the tree structure as described above in conjunction with FIG. 15*a*).

Overview of An Embodiment of the Present Invention

An embodiment of the present invention implements the "baseline" algorithm of the JPEG standard. A concise description of the JPEG standard is attached as Appendix A. FIG. 1 shows the functional block diagram of this embodiment of the present invention. This embodiment is implemented in integrated circuit form; however, the use of other technologies to implement this architecture, such as by discrete components, or by software in a computer is also feasible.

The operation of this embodiment during data compression (i.e. to reduce the amount of data required to represent a given image) is first functionally described in conjunction with FIG. 1.

FIG. 1 shows, in schematic block diagram form, a data compression/decompression system in accordance with this invention.

The embodiment in FIG. 1 interfaces with external equipment generating the video input data via the Video Bus Interface unit 102. Because the present invention provides compression and decompression (playback) of video signals in real-time, synchronization circuits 102-1 and 113-2 are provided for receiving and providing respectively synchronization signals from and to the external video equipment (not shown).

Video Bus Interface unit (VBIU) 102 accepts 24 bits of input video signal every two clock periods via the data I/O lines 102-2. The VBIU 102 also provides a 13-bit address on address lines 102-3 for use with an external memory buffer, at the user's option which provides temporary storage of input (compression) or output (decompression) data in "natural" horizontal line-by-line video data format used by many in video equipment. During compression, the horizontal line-by-line video data is read in as 8×8 pixel blocks for input to VBIU via I/O bus 102-2 according to addresses generated by VBIU 102 on bus 102-3. During decompression, the horizontal line-by-line video data is made available to external video equipment by writing the 8×8 pixel blocks output from VBIU 102 on bus 102-2 into proper address locations for horizontal line-by-line output. Again, the address generator inside VBIU 102 provides the proper addresses.

VBIU 102 accepts four external video data formats: color format (RGB) and three luminance-chrominance (YUV) formats. The YUV formats are designated YUV 4:4:4, YUV 4:2:2, and YUV 4:1:1. The ratios indicate the ratios of the relative sampling frequencies in the luminance and the two chrominance components. In the RGB format, each pixel is represented by three intensities corresponding to the pixel's intensity in each of the primary colors red, green, and blue. In the YUV representations, three numbers Y, U and V represent respectively the luminance index (Y component) and two chrominance indices (U and V components) of the pixel. In the JPEG standard, groups of 64 pixels, each expressed as an 8×8 matrix, are compressed or decompressed at a time. The 64 pixels in the RGB and YUV 4:4:4 formats occupy on the physical display an 8×8 area in the horizontal and vertical directions. Because human vision is less sensitive towards colors than intensity, it is adequate in some applications to provide in the U and V components of the YUV 4:2:2 and YUV 4:1:1 formats, U and V type data expressed as horizontally averaged values over areas of 16 pixels by 8 pixels and 32 pixels by 8 pixels respectively. An 8×8 matrix in the spatial domain is called a "pixel" matrix, and the counterpart 8×8 matrix in the transform domain is called a "frequency" matrix.

Although RGB and YUV 4:4:4 formats are accepted as input, they are immediately reduced to representations in YUV 4:2:2 format. RGB data is first transformed to YUV 4:4:4 format by a series of arithmetic operations on the RGB data. YUV 4:4:4 data are converted into YUV 4:2:2 data in the VBIU 102 by averaging neighboring pixels in the U, V components. This operation immediately reduces the amount of data to be processed by one-third. As a result, the circuit in this embodiment of the present invention needs only to process YUV 4:2:2 and YUV 4:1:1 formats. As mentioned hereinabove, the JPEG standard implements a "lossy" compression algorithm; the video information lost due to translation of the RGB and YUV 4:4:4 formats to the YUV 4:2:2 format is not considered significant for purposes under the JPEG standard. In the decompression mode, the YUV 4:4:4 format is restored by providing the average value in place of the sample value discarded in the compression operation. RGB format is restored from the YUV 4:4:4 format by a series of arithmetic operation on the YUV 4:4:4 data to be described below.

As a result of the processing in the VBIU unit 102, video data are supplied to the block memory unit 103, at 16 bits (two values) per clock period. The block memory unit 103 is a buffer for the incoming stream of 16-bit video data to be sorted into 8×8 blocks (matrices) of the same pixel type (Y, U or V). This buffering step is also essential because the discrete cosine transform (DCT) algorithm implemented herein is a 2-dimensional transform, requiring the video signal data to pass through the DCT/IDCT processor unit 106 twice, one for each spatial direction (horizontal and vertical). Intermediate data are obtained after the video input data pass through DCT/IDCT processor unit 106 once. Consequently, DCT/IDCT processor unit 106 must multiplex between video input data and the intermediate results after the first-pass DCT operation. To minimize the number of registers needed inside the DCT unit 106, and also to simplify the control signals within the DCT unit 106, the sequence in which the elements of the pixel matrix is processed is significant.

The sequencing of the input data, and of the intermediate data after first-pass of the 2-dimensional DCT, for DCT/IDCT processor unit 106 is performed by the DCT input select unit 104. DCT input select unit 104 alternatively selects, in predetermined order, either two 8-bit words from the block memory unit 103 or two 16-bit words from the DCT row storage unit 105. The DCT row storage unit 105 contains the intermediate results after the first pass of the data through the the 2-dimensional DCT. The data selected by DCT input select unit 104 is processed by the DCT/IDCT processor unit 106. The results are either, in the case of data which completed the 2-dimensional DCT, forwarded to the quantizer unit 108, or, in the case of first-pass DCT data, recycled via DCT row storage unit 105 for the second pass of the 2-dimensional DCT. This separation of data to supply either DCT row storage unit 105 or quantizer unit 108 is achieved in the DCT row/column separator unit 107. The result of the DCT operation yields two 16-bit data every clock period. A double-buffering scheme in the DCT row/column separator 107 provides a continuous stream i.e. 16 bits each clock cycle of 16-bit output data from DCT row/column separator unit 107 into the quantizer unit 108.

The output data from the 2-dimensional DCT is organized as an 8 by 8 matrix, called a "frequency" matrix, corresponding to the spatial frequency coefficients of the original 8 by 8 pixel matrix. Each pixel matrix has a corresponding frequency matrix in the transform (frequency) domain as a result of the 2-dimensional DCT operation. According to its position in the frequency matrix, each element is multiplied in the quantizer 108 by a corresponding quantization constant taken from the YUV quantization table 108-1. Quantization constants are obtained from an international standard body, i.e. JPEG; or, alternatively, obtained from a customized image processing function supplied by a host computer to be applied on the present set of data. The quantizer unit 108 contains a 16-bit by 16-bit multiplier for multiplying the 16-bit input from the row/column separator unit 107 to the 16-bit quantization constant from the YUV quantization table 108-1. The result is a 32-bit value with bit 31 as the most significant bit and bit 0 as the least significant bit. In this embodiment, to meet the dual goals of allowing a reasonable dynamic range, and of minimizing the number of significant bits for simpler hardware implementation, only 8 bits in the mid-range are preserved. Therefore, a 1 is added at position bit 15 in order to round up the number represented by bits 31 through 16. The eight most significant bits, and the sixteen least significant bits of this 32-bit multiplication result are then discarded. The net result is an 8-bit value which is passed to the zig-zag unit 109, to be described below. Because the quantization step tends to set the higher frequency components of the frequency matrix to zero, the quantization unit 108 acts as a low-pass digital filter. Because of the DCT algorithm, the lower frequency coefficients of the luminance (Y) or chrominance (U, V) in the original image are represented in the lower elements of the respective frequency matrices, i.e. element $A_{ij}$ represents higher frequency coefficients of the original image than element $A_{mn}$, in both horizontal and vertical directions, if $i>m$ and $j>n$.

The zig-zag unit 109 thus receives an 8-bit datum every clock period. Each datum is a quantized element of the 8 by 8 frequency matrix. As the data come in, they are individually written into a location of a 64-location memory array each location representing an element of the frequency matrix. As soon as the memory array is filled, it is read out in a manner corresponding to reading an 8 by 8 matrix in a zig-zag manner starting from the 00 position (i.e., in the order: $A_{00}$, $A_{10}$, $A_{01}$, $A_{02}$, $A_{11}$, $A_{20}$, $A_{30}$, $A_{21}$, $A_{12}$, $A_{03}$, etc.). Because the quantization steps tend to zero higher frequency coefficients, this method of reading the 8 by 8 frequency matrix is most likely to result in long runs of zeroed frequency coefficients, providing a convenient means of compressing the data sequence by representing a long run of zeroes as a run length rather than individual values of zero. The run length is encoded in the zero packer/unpacker unit of 110.

Because of double-buffering in the zig-zag unit 109 providing for accumulation of the current 64 8-bit values and simultaneous reading out of the prior 64 8-bit values in run-length format, a continuous stream of 8-bit data is made available to the zero packer/unpacker unit 110. This data stream is packed into a format of the pattern: DC-AC-RL-AC-RL . . . , which represents in order the sequence: a DC coefficient, an AC coefficient, a run of zeroes, an AC coefficient, a run of zeroes, etc. (Element $A_{00}$ of matrix A is the DC coefficient, all other entries are referred to as AC coefficients). This data stream is then stored in a first-in, first-out (FIFO) memory array 114 for the next step of encoding into a compressed data representation. The compressed data representation in this instance is Huffman codes. This memory array 114 provides temporary storage, which content is to be retrieved by the coder/decoder unit 111 under direction of a host computer through the host interface 113. In addition to storage of data to be encoded, the FIFO memory 114 also contains the translation look-up tables for the encoding. The temporary storage in FIFO memory 114 is necessary because, unlike the previous signal processing step on the incoming video signal (which is provided to the VBIU 102 continuously and which must be processed in real time) by functional units 102 through 110, the coding step is performed under the control of an external host computer, which interacts with this embodiment of the present invention asynchronously through the host bus interface 113.

Writing and reading out of the FIFO memory 114 is controlled by the FIFO/Huffman code bus controller unit 112. In addition to controlling reading and writing of zero-packed video data into FIFO memory 114, the FIFO/Huffman code bus controller 112 accesses the FIFO memory 114 for Huffman code translation tables during compression, and Huffman decoding tables during decompression. The use of Huffman code is to conform to the JPEG standard of data compression. Other coding schemes may be used at the expense of compatibility with other data compression devices using the JPEG standard.

The FIFO/Huffman code bus controller unit 112 services requests of access to the FIFO memory 114 from the zero packer/unpacker unit 110, and from coder/decoder unit 111. Data are transferred into and out of FIFO memory 114 via an internal bus 116. Because of the need to service in real time a synchronous continuous stream of video signals coming in through the VBIU 102 during compression, or the corresponding outgoing synchronous stream during decompression, the zero packer/unpacker unit 110 is always given highest priority into the FIFO memory 114 over requests from the coder/decoder unit 111 and the host computer.

Figures 1, 6A:
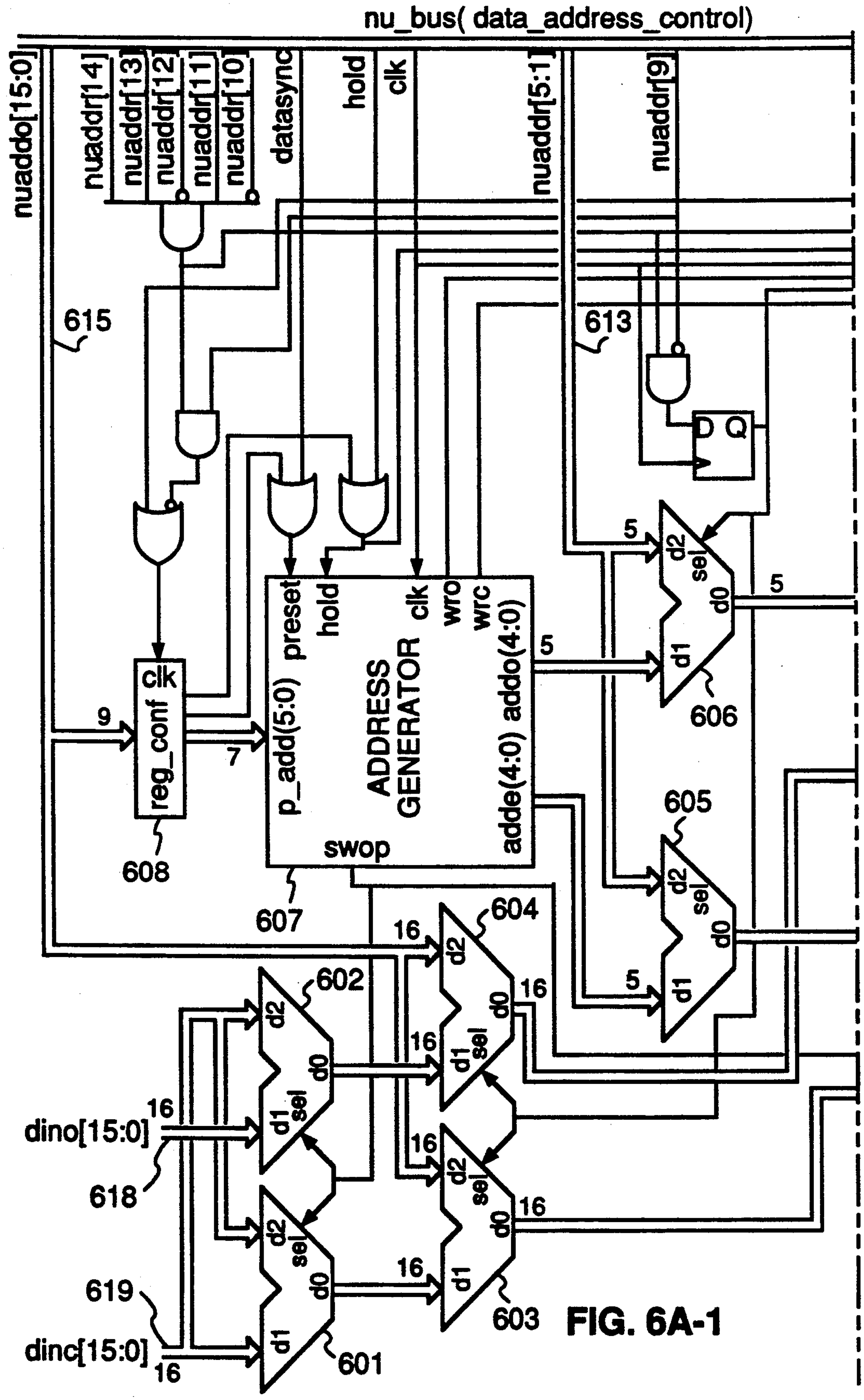
Figures 2, 6A:
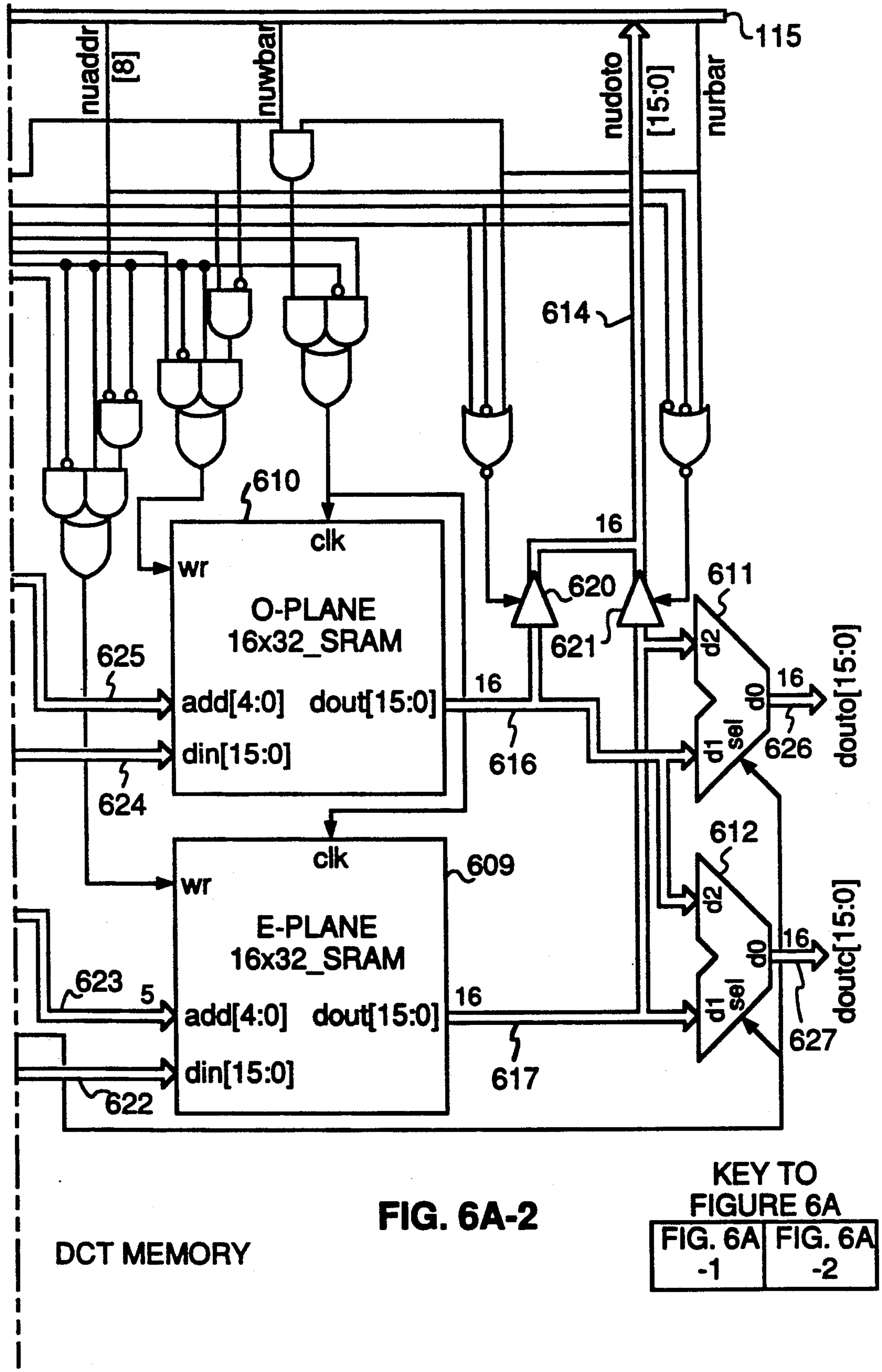

Besides requesting the FIFO/Huffman code bus controller unit 112 to read the zero-packed data from the FIFO memory 114, the coder/decoder unit 111 also translates the zero-packed data into Huffman codes by looking up the Huffman code table retrieved from FIFO memory 114. The Huffman-coded data is then sent through the host interface 113 to a host computer (not shown) for storage in mass storage media. The host computer may communicate directly with various modules of the system, including the quantizer 108 and the DCT block memory 103, through the host bus 115 (FIG. 6*a*). This host bus 115 implements a subset of the nubus standard to be discussed at a later section in conjunction with the host bus interface 113. This host bus 115 is not to be confused with internal bus 116. Internal bus 116 is under the control of the FIFO/Huffman code bus controller unit 112. Internal bus 116 provides access to data stored in the FIFO memory 114.

The architecture of the present embodiment is of the type which may be described as a heavily "pipe-lined" processor. One prominent feature of such processor is that a functional block at any given time is operating on a set of data related to the set of data operated on by another functional block by a fixed "latency" relationship, i.e. delay in time. To provide synchronization among functional blocks, a set of configuration registers are provided. Besides maintaining proper latency among functional blocks, these configuration registers also contain other configuration information.

Decompression of the video signal is accomplished substantially in the reverse manner of compression.

Structure and Operation of the Video Bus Controller Unit

The Video Bus Controller Unit 102 provides the external interface to as video input device, such as a video camera with digitized output or to a video display. The Video Bus Controller Unit 102 further provides conversion of RGB or YUV 4:4:4 formats to YUV 4:2:2 format suitable for processing with this embodiment of the present invention during compression, and provides RGB or YUV 4:4:4 formats when required for output during decompression. Hence, this embodiment of the present invention allows interface to a wide variety of video equipment.

Figures 1, 2:
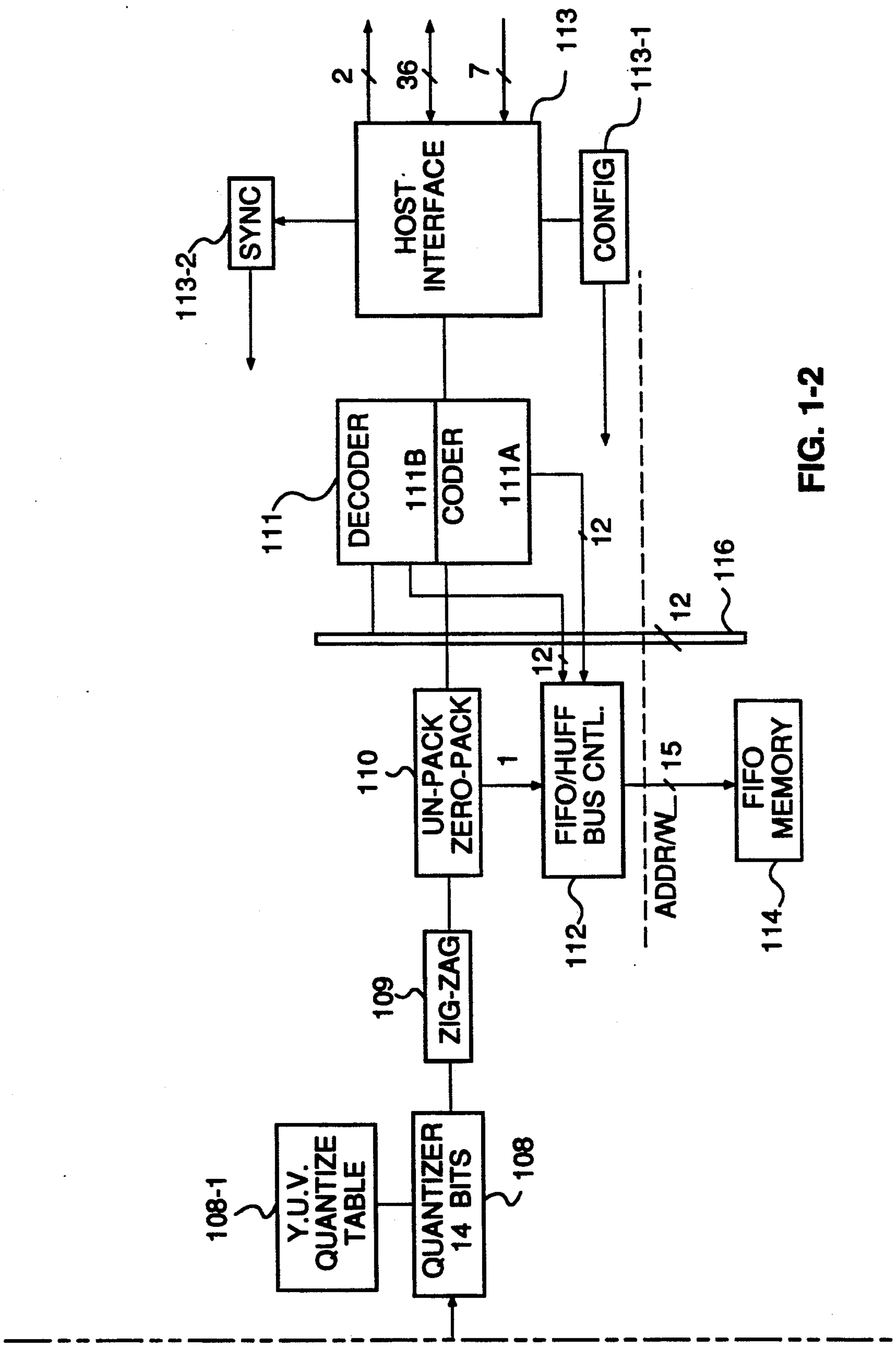
Figure 2:
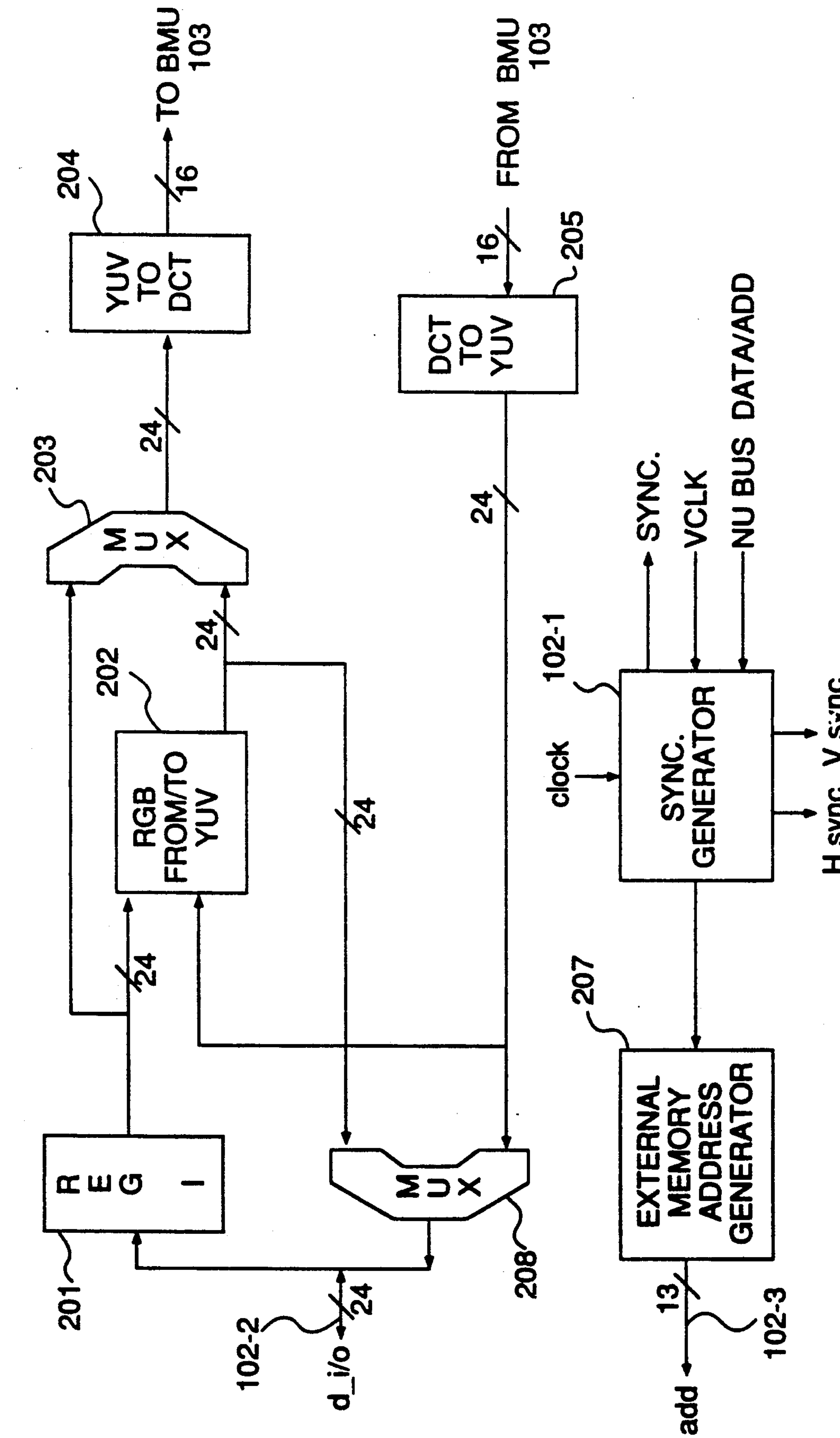

FIG. 2 is a block diagram of the video bus controller unit (VBIU) 102 of the embodiment discussed above. As mentioned before, RGB or YUV 4:4:4 video signals come into the embodiment as 64 24-bit values, representing an 8-pixel by 8-pixel area of the digitized image. Each pixel is represented by three components, the value of each component being represented by eight (8) bits. In the RGB format each component represents the intensity of one of three primary colors. In the YUV format, the Y component represent an index of luminance and the U and V components represent two indices of chrominance. Dependent upon the mode selected, the incoming video signals in RGB or YUV 4:4:4 formats are reduced by the VBIU 102 to 64 16-bit values: 4:4:4 YUV video data and RGB data are reduced to 4:2:2 YUV data. Incoming 4:2:2 and 4:1:1 YUV data are not reduced. The process of reducing RGB data to 4:4:4 YUV data follows the formulae:

$$Y = 0.3253R + 0.5794G + 0.0954B \quad \text{(luminance)} \quad E1$$

$$U = (0.8378B - Y)/2.03 \quad \text{(chrominance)} \quad E2$$

$$V = (1.088R - Y)/1.14 \quad \text{(chrominance)} \quad E3$$

In order to perform the 4:4:4 YUV to 4:2:2 YUV format conversion, successive values of the U and V type data are averaged (see below), so that effectively the U and V data are sampled at half the frequency as the Y data.

During compression mode, the 24-bit external video data representing each pixel comes into the VBIU 102 via the data I/O bus 102-2. The 24-bit video data are latched into register 201, the latched video data are either transmitted by multiplexor 203, or sampled by the RGB/YUV converter circuit 202.

During compression mode, the RGB/YUV converter circuit 202 converts 24-bit RGB data into 24-bit YUV 4:4:4 data. The output data of RGB/YUV converter circuit 202 is forwarded to multiplexor 203. Dependent upon the data format chosen, multiplexor 203 selects either raw input data (any of 4:4:4, 4:2:2, or 4:1:1 YUV formats), or YUV 4:4:4 format data (converted from RGB format) from the RGB/YUV converter circuit 202.

The input pixel data formats under compression mode are as follows: in RGB and YUV 4:4:4 formats, pixel data are written at the data I/O bus 102-2 at 24 bits per two clock periods, in the sequence (R,G,B) (R,G,B) . . . or (Y,U,V) (Y,U,V) . . . , i.e. 8 bits for each of the data types Y, U or V in YUV format, and R, G, or B in RGB format; in 4:2:2 YUV format, pixel data are written in 16 bits per two clock periods, in the sequence (Y,U) (Y,V) (Y,U) . . . ; and, in the 4:1:1 YUV format data are written in 12 bits per two clock periods, in the sequence (Y, LSB's U), (Y, MSB's U) (Y, LSB's V) (Y, MSB's V) (Y, LSB's U) . . . [MSB and LSB are respectively "most significant bits" and "least significant bits"].

The output data from multiplexor 203 is forwarded to the YUV/DCT converter unit 204, which converts the 24-bit input video data into 16-bit format for block memory unit 103. The 16-bit block storage format requires that each 16-bit datum be one of (Y,Y), (U,U), (V,V), i.e. two 8-bit data of the same type is packed in a 16-bit datum.

Therefore, the (Y,U,V) . . . (Y,U,V) format for the YUV 4:4:4 format data is repacked from 24-bit data sequence Y0U0V0, Y1U1V1, Y2U2V2, Y3U3V3, . . . Y7U7V7 to 16-bit data sequence Y0Y1, U01U23, Y2Y3, V01V23, Y4Y5, etc., where Umn denotes the 8-bit average of $U_m$ and $U_n$ 8-bit data. Because each element of the U, V matrices under YUV 4:2:2 representation is an average value, in the horizontal direction of two neighboring pixels, the 64-value 8×8 matrix is assembled from an area of 16 pixel by 8 pixel in the video image. The YUV 4:2:2 representation, as discussed above, may have originated from input data either YUV 4:4:4, RGB, or YUV 4:2:2 formats.

The (Y,U), (Y,V), (Y,U), (Y,V) . . . format for the YUV 4:2:2 format is repacked from 16-bit data sequence Y0U0, Y1V0, Y2U2, Y3V2, . . . Y7V6 to Y0Y1, U0U2, Y2Y3, V0V2 etc.

Similarly, the (Y, LSB's U), (Y, MSB's U), (Y, LSB's V), (Y, MSB's V) . . . format for YUV 4:1:1 format is repacked from 12-bit data sequence Y0U0L, Y1U0H, Y2V0L, Y3V0H, Y4U4L, etc. to 16-bit data sequence Y0Y1, Y2Y3, Y4Y5, U0U4, Y6Y7, V0V4 (for pixels in the even lines of the image) or from 12-bit data sequence Y0V0L, Y1V0H, Y2U0L, Y3U0H, Y4V4L . . . to 16-bit data sequence Y0Y1, Y2Y3, Y4Y5, V0V4, Y6Y7, U0U4 (for pixels in the odd lines of the image).

During decompression, data from the block memory unit 103 are read by VBIU 102 as 16-bit words. The block memory format data are translated into the 24-bits RGB, YUV 4:4:4, or 16-bit 4:2:2, or 12-bit 4:1:1 formats as required. The translation from the 16-bit representation to the various YUV representations is performed by DCT/YUV converter 205. If RGB data is the specified output format, the DCT/YUV converter 205 outputs 24-bit YUV 4:4:4 format data for the RGB/YUV converter 202 to convert into RGB format.

Either the output data of the RGB/YUV converter 202, or the output data of the DCT/YUV converter 205 are selected by multiplexor 208 for output onto data I/O bus 102-2.

Clock circuits in sync. generator 102-1 generate the display timing signals Hsync and Vsync (horizontal synchronization signal and vertical synchronization signal, respectively) if required by the external display. The external memory address generator 207 provides the addresses on address bus 102-3 for loading the video data into an external display's buffer memory, if required. This external memory provides conversion of horizontal line-by-line "natural" video data into 8×8 blocks of pixel data for input during compression, and conversion of 8×8 blocks output pixel data into horizontal line-by-line output pixel data during decompression using addresses provided by the external memory address generator 207. Hence, the external memory address generator 207 provides compatibility with a wide variety of video equipment.

Structure and Operation of Block Memory Unit

The block memory unit (BMU) 103 assembles the stream of Y U and V interleaved pixel data into 8×8 blocks of pixel data of the same type (Y, U, or V).

In addition, BMU 103 acts as a data buffer between the video bus interface unit (VBIU) 102 and the DCT input select unit 104 during data compression and, between VBIU 102 and DCT row/column separator unit 107 during decompression operations.

During data compression, VBIU 102 will output pixels every clock period in the sequence YUYV — — — YUYV — — — , if a 4:2:2 format is required (each Y, U, V is a 16-bit datum containing information of two pixels); or in a sequence of YXYX — — — YUYV — — — , if a 4:1:1 format is used. ("—" indicates no output data from VBIU 102 and "X" indicates output data are of the "don't-care" type.) Since DCT input select unit 104 requires all 64 pixels (8×8 matrix) in a block to be available during its two-pass operation, BMU 103 must be able to accumulate a full matrix of 64 pixels of the same kind from VBIU 102 before output data can be made available to DCT input select unit 104.

During data decompression, a reverse operation takes place. The DCT row/column separator 107 outputs 64 pixels of the same kind serially to BMU 103; the pixels are temporarily stored in BMU 103 until four complete matrices of Y type pixels and one complete matrix each of U and V type pixels have been accumulated so that VBIU 102 may reconstitute the required video data for output to an external display device.

Figure 3:
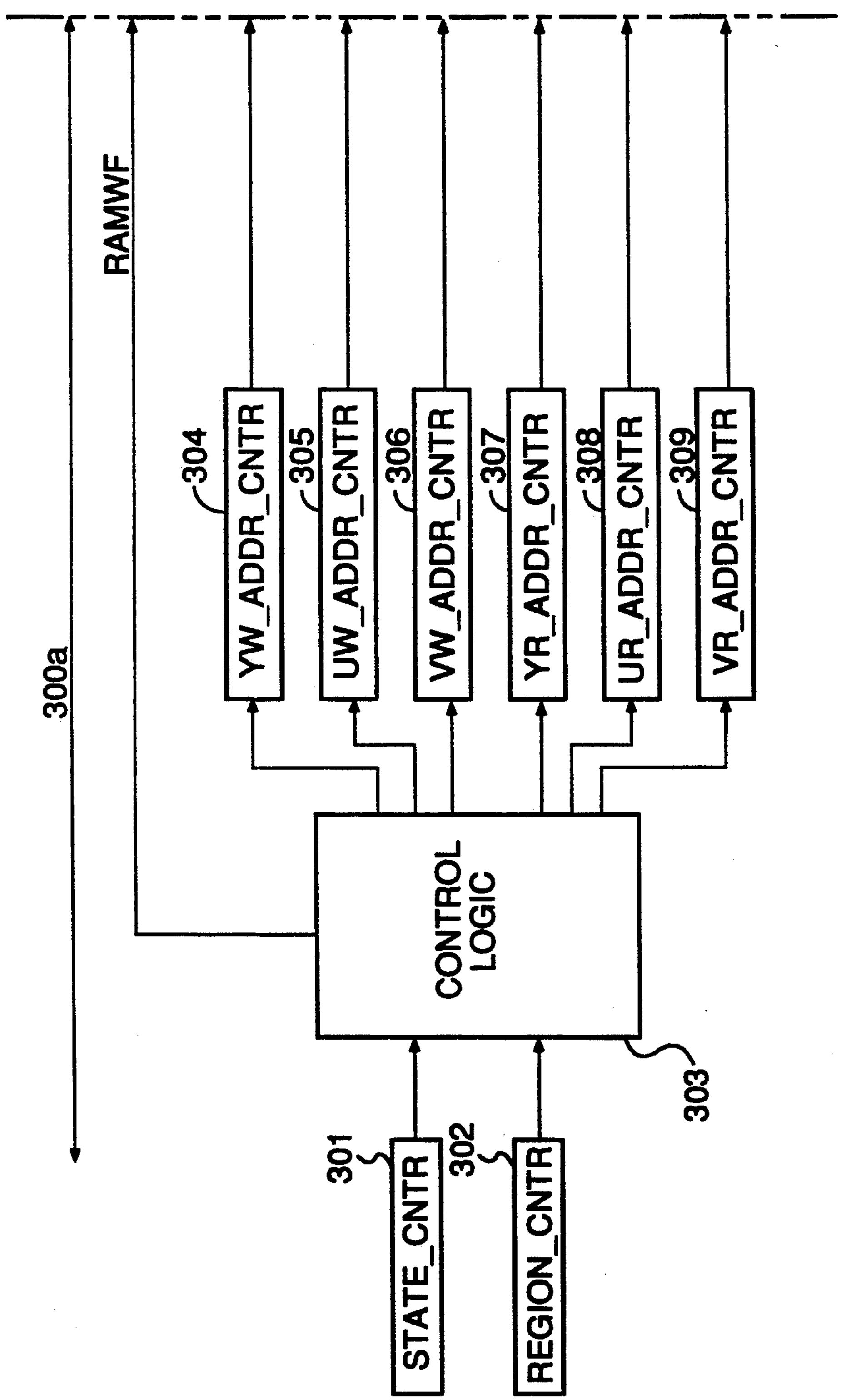
Figure 1:
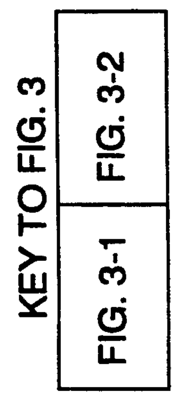
Figures 2, 3:
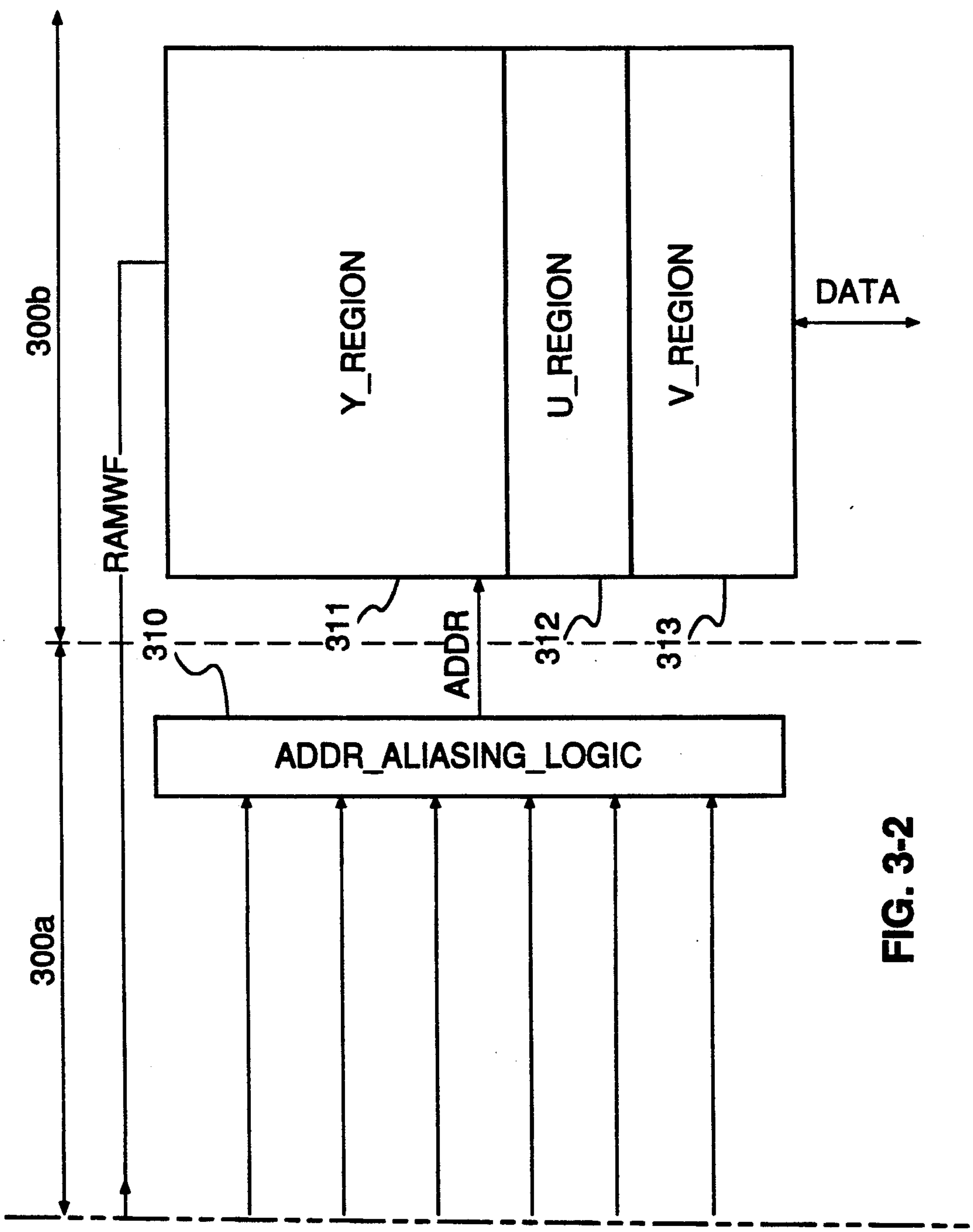

FIG. 3 shows a block diagram of BMU 103. BMU 103 consists of two parts: the control circuit 300*a*, and a memory core 300*b*. The memory core 300*b* is divided into three regions: Y_ region 311, U_ region 312, and V_ region 313. Each region stores one specific type of pixel data and may contain several 64-value blocks. In this embodiment, Y_ region 311 has a capacity of five blocks and contains Y pixels only. The U_ region 312 has a capacity of more than one block, but less than two blocks and contains U type pixels only. Similarly, the V_ region has a capacity of more than one block, but less than two blocks and contains V type pixels only. This arrangement is optimized for 4:1:1 format decompression, with extra storage in each of Y, U, or V type data to allow memory write while allowing a continuous output data stream to VBIU 102. Because data are transferred into and out of the block memory unit 103 at a rate of two values every clock period, a memory structure is constructed using address aliasing (described below) which allows successive read and write operations to the same address. Since data must be output to VBIU 102 in interleaved pixel format, and since data arrive from the DCT units 104–107 in matrices each of elements of the same pixel type (Y, U or V), there are instances when elements of the next U or V matrix arrive before the corresponding elements in the U or V matrix being currently output are provided to VBIU 102. During such time periods, the elements of the next U or V matrix is allocated memory locations not overlapping the current matrix being output. Hence, the physical memory allocated for U, V blocks must necessarily be greater than one block to allow for such situations. In practice, an extra one-quarter of a block is found to be sufficient for the data formats YUV 4:2:2 and YUV 4:1:1 handled in this embodiment. The starting addresses of the regions 311, 312 and 313 are designated 0, 256 and 320 respectively. While the data transaction between BMU 103 and VBIU 102 is in units of pixels, the transaction between BMU 103 and DCT input select 104 or DCT row/column separator 107 is in units of 64-value blocks.

Memory Access Modes in the Block Memory Unit

Another aspect of this embodiment is the aliasing of the memory core addresses in the memory core 300*b*. Aliasing is the practice of having more than one logical address pointing to the same physical memory location. Although aliasing of memory core addresses is not necessary for the practice of the present invention, address aliasing reduces the physical size of memory core 300*b* and saves significant chip area by allowing sharing of physical memory locations by two 64-value blocks. This sharing is discussed in detail next.

During compression or decompression operations, data flow from respectively the VBIU 102, through BMU 103 to DCT input select unit 104, or from DCT row/column separator 107, through BMU 103, to VBIU 102. Some parts of a block might have been read and will not be accessed again, while other parts of the block remain to be read. Therefore, the physical locations in the memory core 300*b* which contain the parts of a block that have been read may be written over before the entire block is completely read. The management of the address mapping to allow reuse of memory locations in this manner is known as address-aliasing or "in-line" memory. In this embodiment, address aliasing logic 310 performs such mapping. A set of six registers 304 to 309 generates the logical address of a datum which is mapped into a physical address by address aliasing logic 310. Accordingly, YW address counter 304, UW address counter 305 and VW address counter 306 provide the logical addresses for a write operation in regions Y_ region 311, U_ region 312, and V_ region 313 respectively. Similarly, YR address counter 307, UR address counter 308 and VR address 309 provide the read logical addresses for a read operation in Y_ region 311, U_ region 312, and V_ region 313 respectively.

The address generation logic 300*a* in BMU 103 mainly consists of a state counter 301, a region counter 302 and the six address counters 304 through 309 described above. Depending upon the format chosen and the mode of operation, the memory core access will follow the pattern:

A. 4:2:2 compression sequence—YUYVRRRR YUYVRRRR

B. 4:1:1 compression sequence—YXYXRRRR YUYVRRRR

C. 4:2:2 decompression sequence—WWWWYUYV WWWWYUYV

D. 4:1:1 decompression sequence—WWWWYUYV WWWWYUYV where the Y, U or V in compression sequence indicates a Y, U or V data is written from the VBIU 102 into BMU 103. The "R" in the compression sequence indicates a datum is to be read from BMU 103 to DCT input select unit 104. The Y, U or V in the decompression mode indicates a Y, U or V datum is to be read from BMU 103 into VBIU 102. The "W" in a decompression sequence indicates that a datum is to be written from DCT row/column separator 107 into BMU 103. Because the sequences repeat themselves every 16 clock periods, a 4-bit state counter 301 is sufficient to sequence the operation of the BMU 103.

The region counter 302 is used to indicate which region, among Y_ region 311, U_ region 312, and V_ region 313, the read or write operation is to take place. The region counter 302 output sequences in blocks for the several modes of operation are as follows:

4:2:2 compression: YYUV YYUV
4:1:1 compression: YY——YYUV
4:2:2 decompression: YYUVYYUV
4:1:1 decompression: YY——YYUVYYUV Data Flow in the Discrete Cosine Transform Units The Discrete Cosine Transform (DCT) function in the embodiment described above in conjunction with FIG. 1 involves five functional units: the block memory unit 103, the DCT input select unit 104, the DCT row storage unit 105, the DCT/IDCT processor 106, and the DCT row/column separator 107. The DCT function is performed in two passes, first in the row direction and then in the column direction.

Figures 1, 4A:
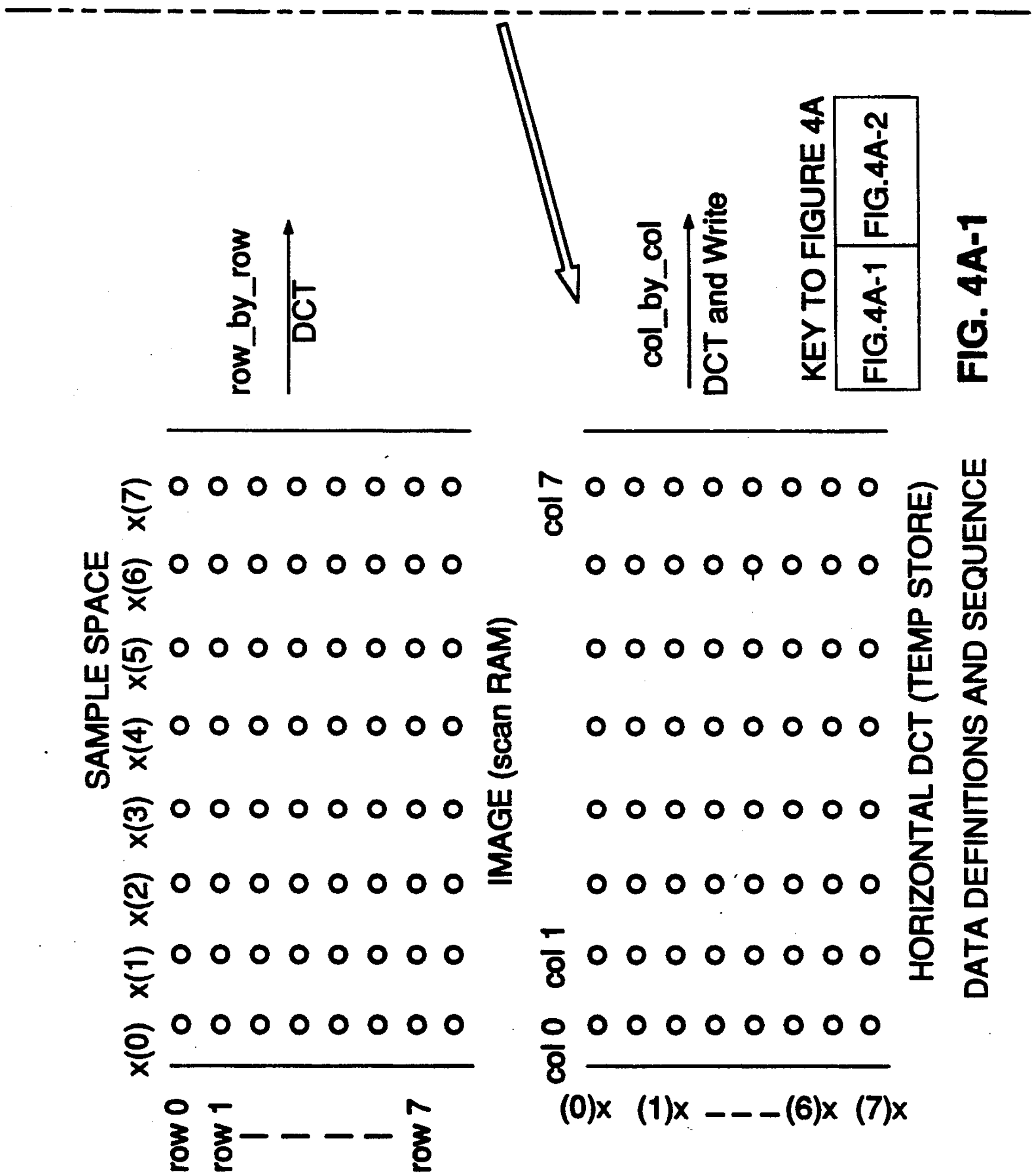
Figures 2, 4A:
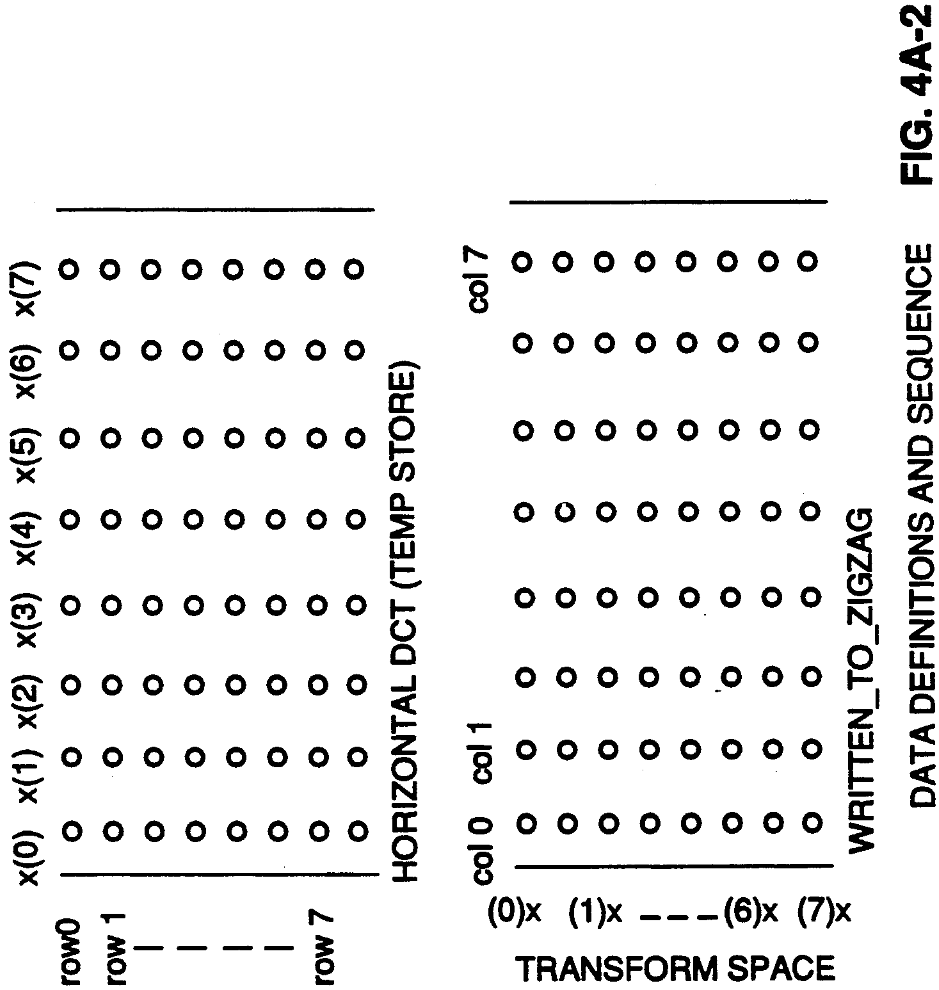

FIG. 4*a* shows a data flow diagram of the DCT units. The input video image in a 64-value pixel matrix is first processed two values at a time in the DCT/IDCT processor 106, row by row, shown as the horizontal rows row0–row7 in FIG. 4*a*. The row-processed data are serially stored temporarily into the DCT row storage unit 105, again the values at a time. The row processed data are then fed into the DCT/IDCT processor 106 for processing in the column direction col10–co17 in the second pass of the 2-dimensional DCT. The DCT row/-column separator 107 streams the row-processed data into the DCT row storage unit 105, and the data after the second pass (i.e., representation in transform space) into the quantizer unit 108.

Figures 1, 4B:
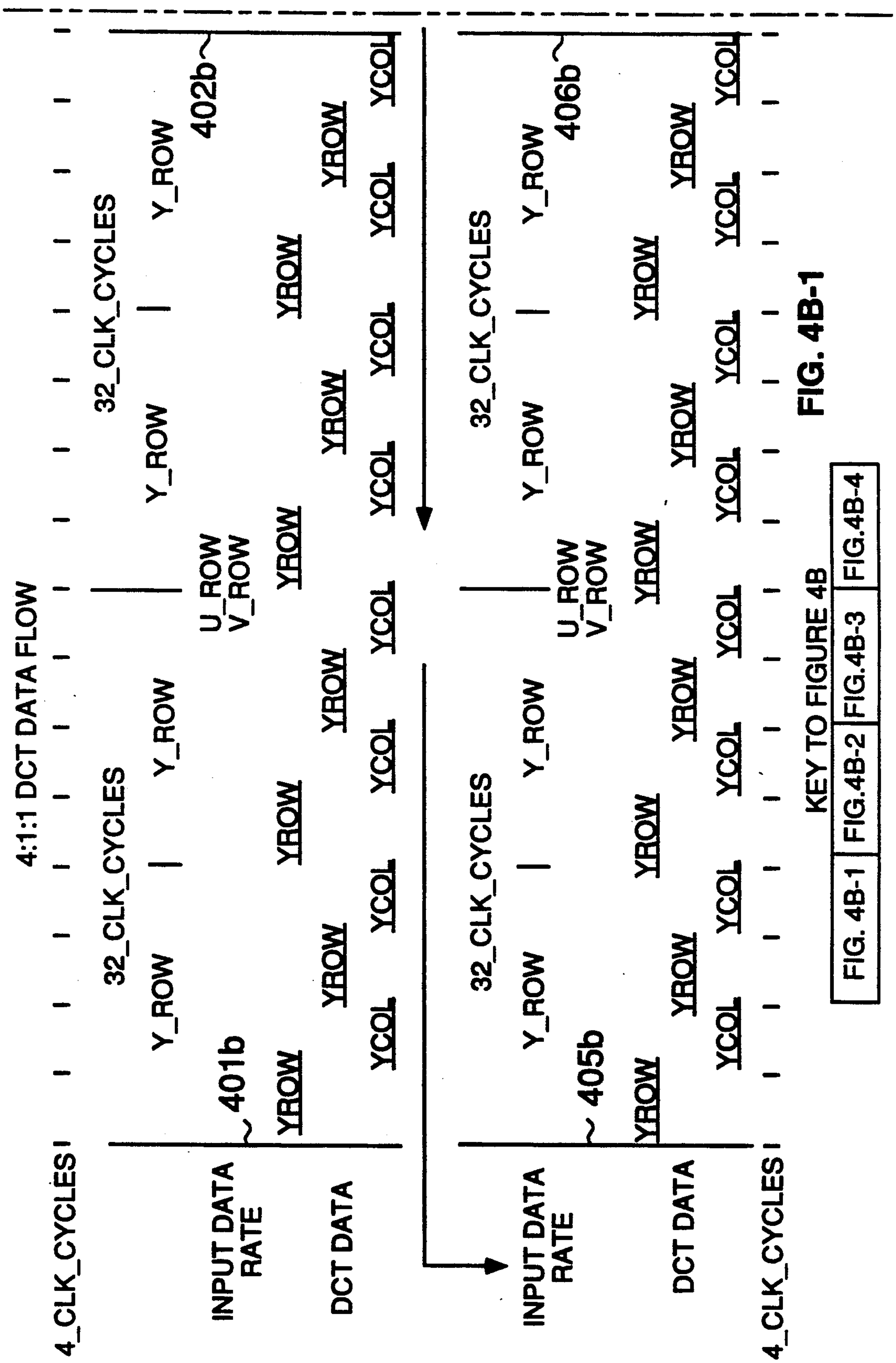
Figures 2, 4B:
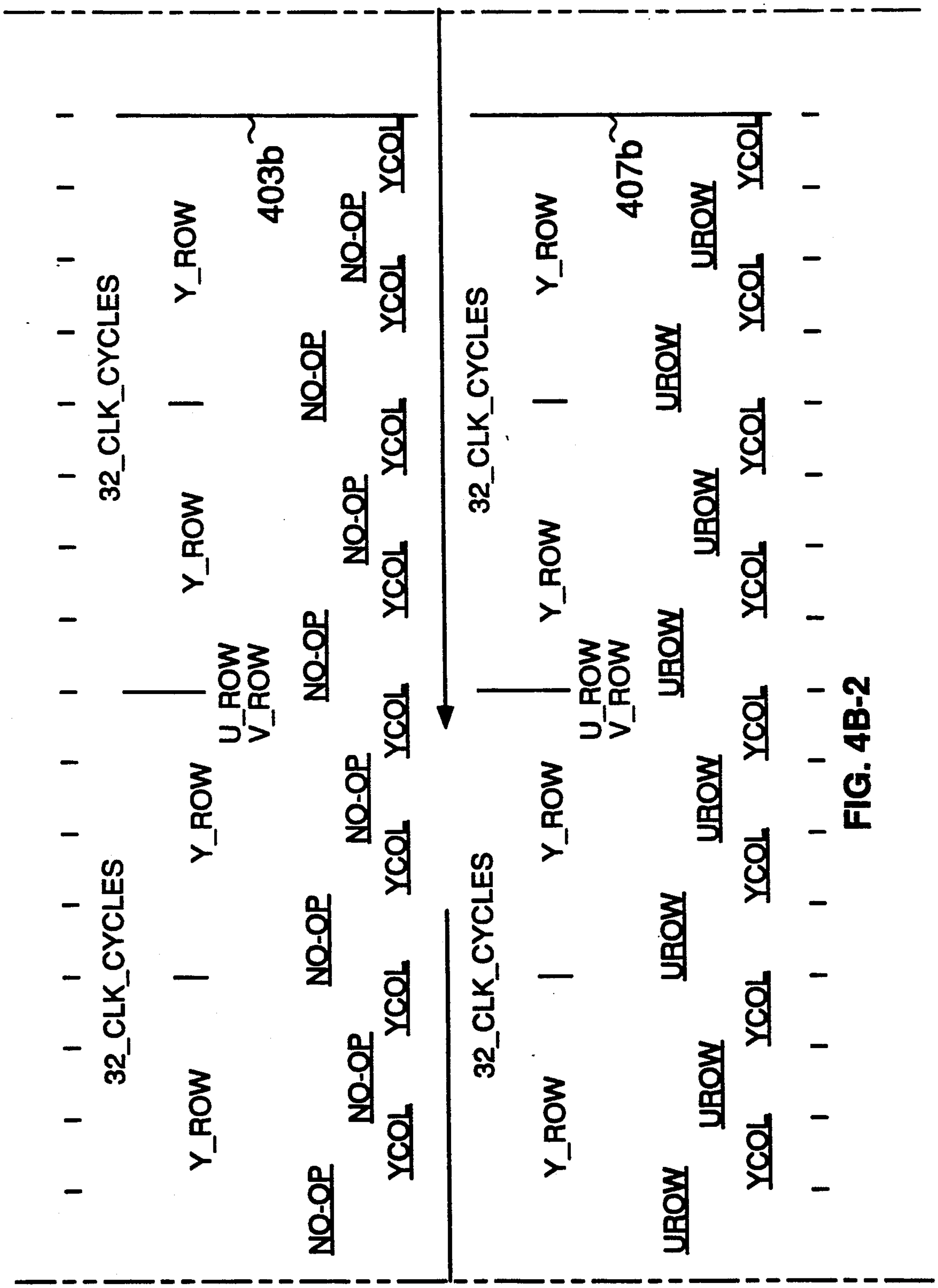
Figures 3, 4B:
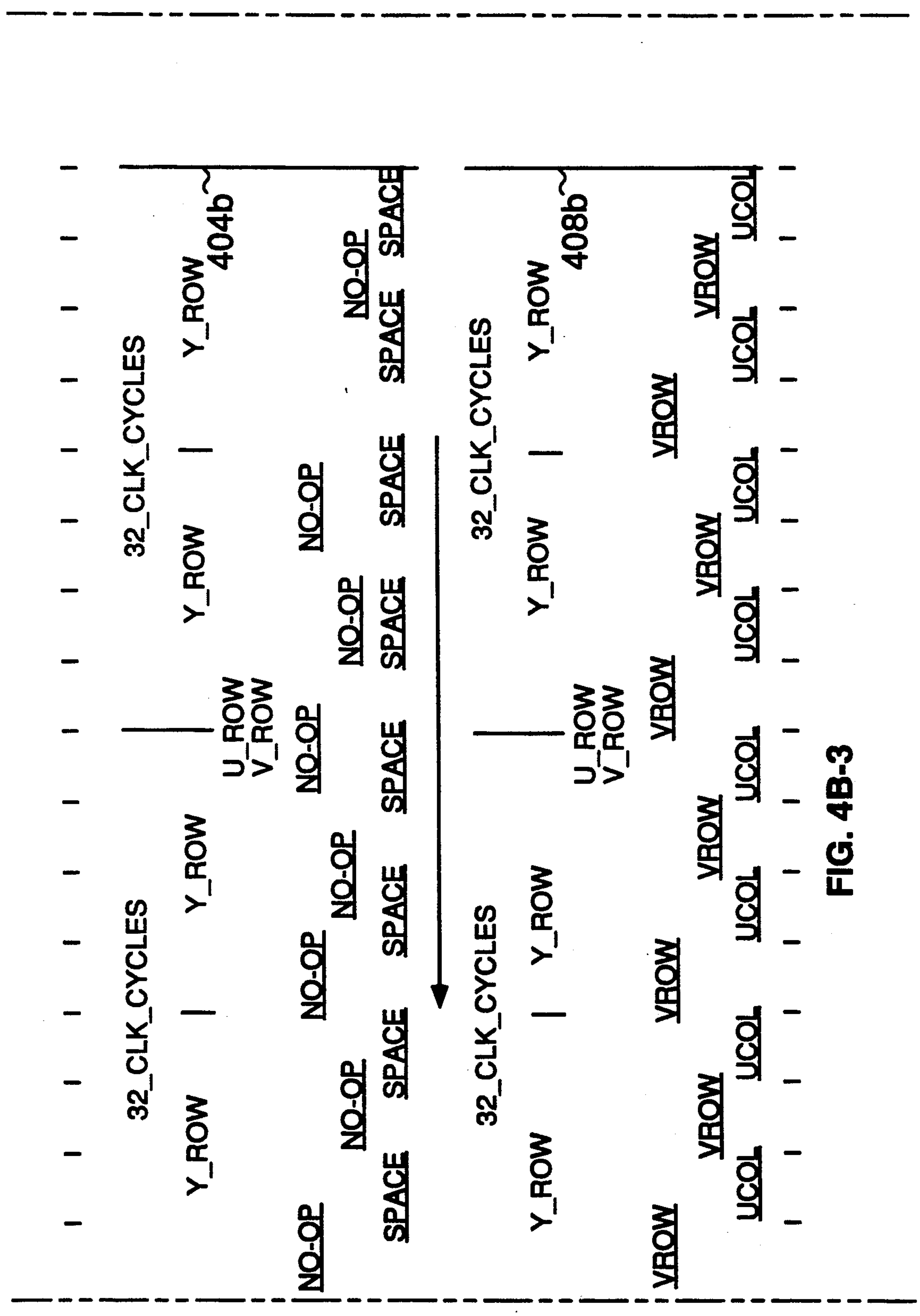

FIG. 4*b* shows the data flow schedule of the 4:1:1 data input into the DCT units 103–107 (FIG. 1) under compression mode. In FIG. 4*b*, the time axis runs from left to right, with each timing mark denoting four clock periods. In the vertical direction, this diagram in FIG. 4*b* is separated into upper and lower portions, respectively labelled "input data" and "DCT data." The input data portion shows the input data stream under the 4:1:1 format, and the DCT data portion shows the sequence in which data are selected from block memory unit 103 to be processed by the DCT/IDCT processor unit 106.

As described above in conjunction with VBIU 102, under the 4:1:1 YUV data format, the Y data come into the DCT units 103-107 at 8 bits per two clock periods, and the U, V data come in at 4 bits per two clock periods, with "don't-care" type data being sent by VBIU 102 50% of the time. Hence, for a 64-value 8 pixels by 8 pixels matrix, the U and V matrices each requires 512 clock periods to receive; during the same period of time, four 64-value Y matrices are received at DCT units 103-107. This 512-clock period of input data is shown in the top portion of FIG. 4*b*.

Under compression mode, as described above, the input data are assembled into 8×8 matrices of like-type pixels in the block memory unit 103. The DCT input select unit 104 selects alternatively DCT row storage unit 105 and the block memory unit 103 for input data into the DCT/IDCT processor unit 106. The input data sequence into the DCT/IDCT processor 106 is shown in the lower portion of FIG. 4*b*, marked "DCT data."

In FIG. 4*b*, first-pass YUV data (from block memory unit 103) coming into the DCT/IDCT processor unit 106 are designated Y_row, U_row, and V_row, the second-pass data (from DCT row storage unit 105) coming into the DCT/IDCT processor 105 are designated Y_col, U_col, and V_col. Between the time marked 401*b* and the time marked 403*b*, the processor unit 106 processes first-pass and second-pass data alternately. The first-pass and second-pass data during this period from 401*b* to 403*b* are data from a previous 64-value pixel matrix due to the lag time between the input data and the data being processed at DCT units 103–107. Because of the buffering mechanism described above in the block memory unit 103, pixel data coming in between the times marked 401*b* and 409*b* in FIG. 4*b* are stored in the block memory unit 103, while the pixel data stored in the last 512 clock periods are processed in the DCT units 104–107. The data from the last 512 clock periods are processed beginning at time marked 404*b*, and completes after the first 128 clock periods (identical to time period marked between 401*b* and 403*b*) of the next 512 clock periods.

The time period between marks 403*b* and 404*b* is "idle" in the DCT/IDCT processor 106 because the pipelines in DCT/IDCT 34 processor unit 106 are optimized for YUV 4:2:2 data. Since the YUV 4:1:1 type data contain only half as much U and V information as contained in YUV 4:2:2 type data, during some clock periods the DCT/IDCT processor unit 106 must wait until a full matrix of 64 values is accumulated in block memory unit 103. In practice, no special mechanism is provided in the DCT/IDCT processor unit 106 for waiting on the input data. The output data of DCT/IDCT processor unit 106 during this period are simply discarded by the zero packer/unpacker unit 110 according to its control sequence. The control structures for DCT input unit 104 and DCT row/column separator units 107 will be discussed in detail below.

Figures 4, 4B:
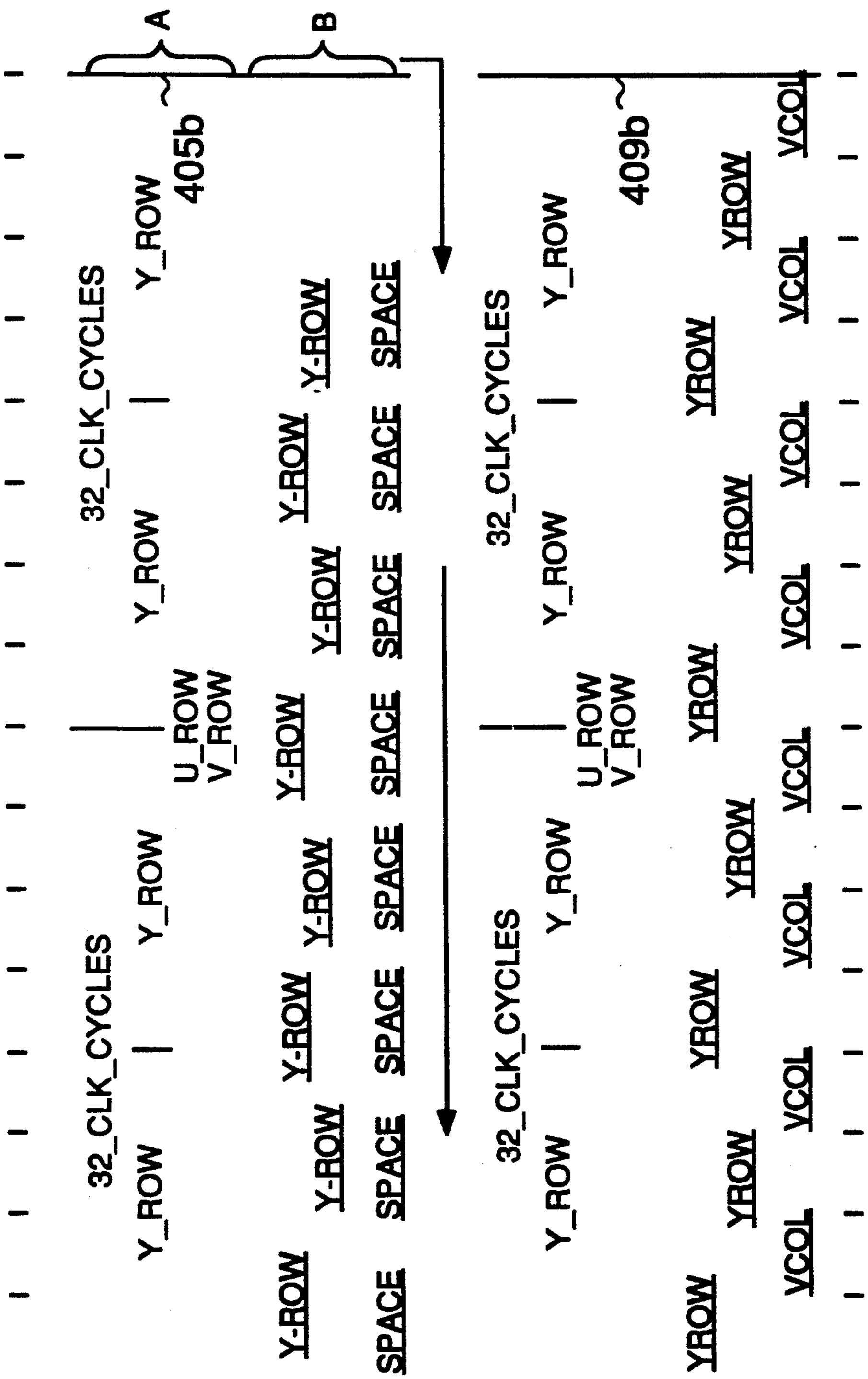
Figures 1, 4C:
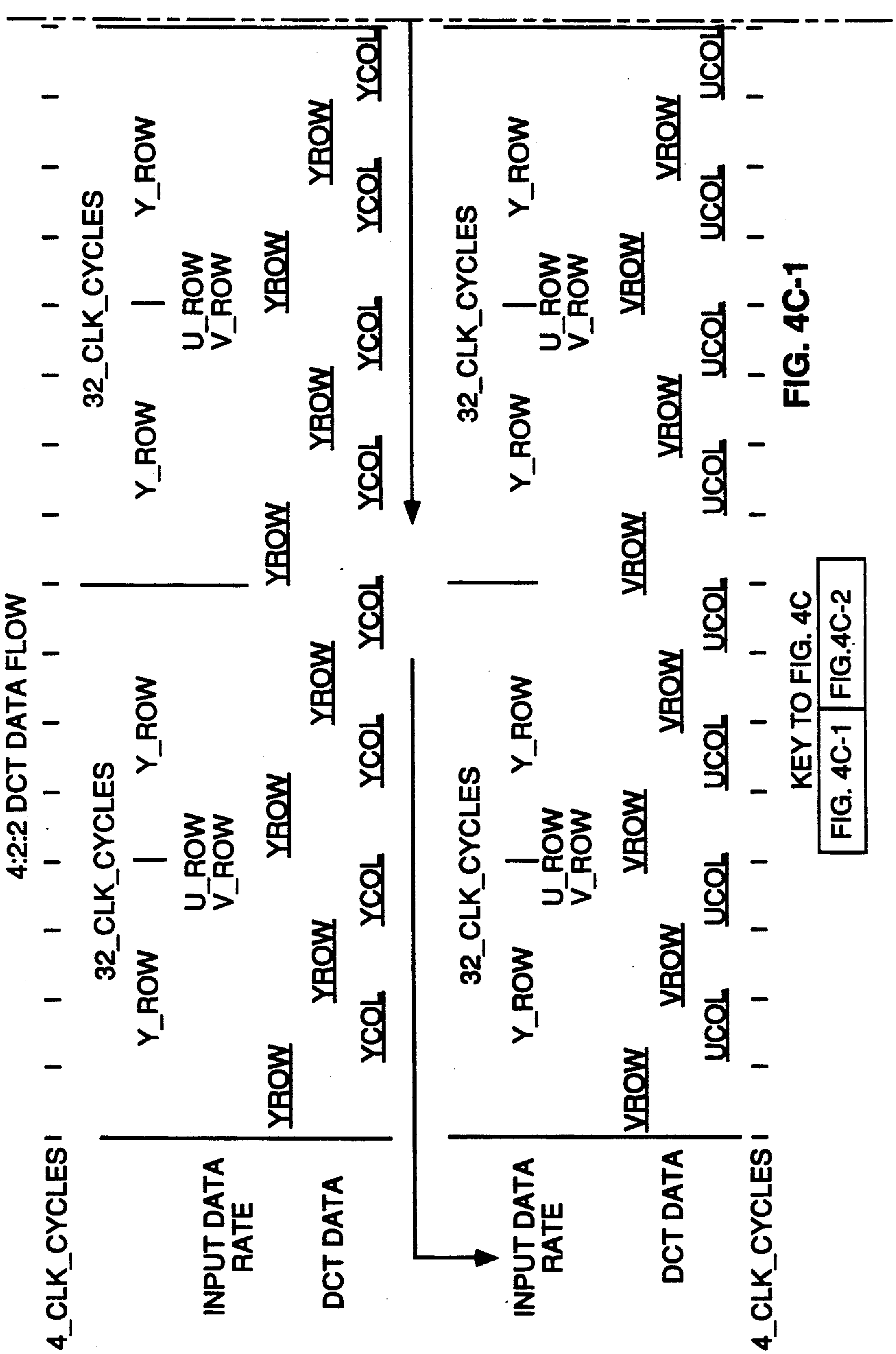
Figures 2, 4C:
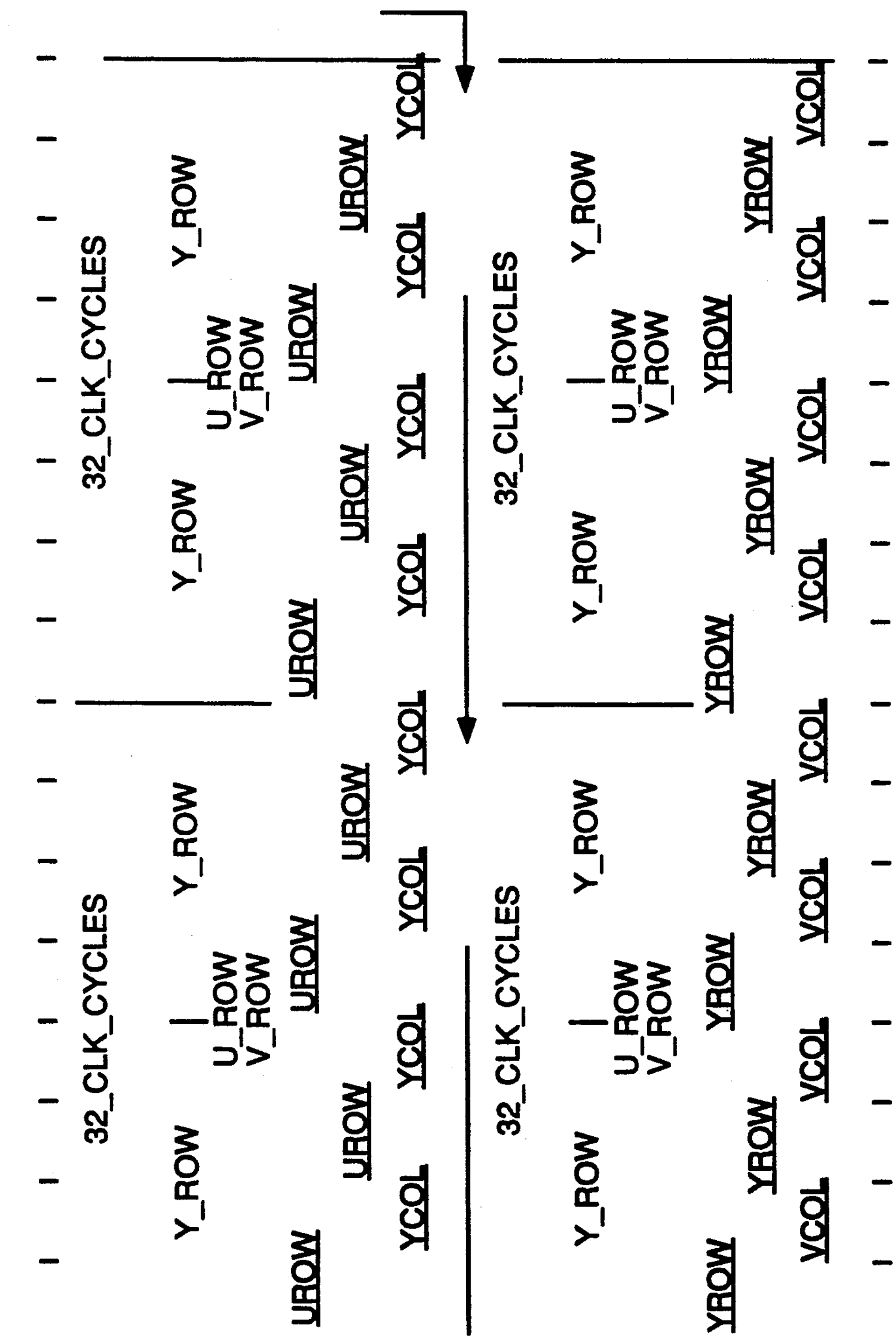

FIG. 4*c* shows the data flow schedule for YUV 4:2:2 type data under compression mode. Under this input data format, as discussed above, an 8-bit U or V type value is received at the DCT units 103–107 every two clock periods; so that it requires 256 clock periods to receive both 64 8-bit U and V matrices. During this 256-cycle period, two 64-value Y are received at DCT units 103–107. This 256-clock period is shown in FIG. 4*c*. There are not idle cycles under the YUV 4:2:2 type data. Again, because of the buffering scheme in the block memory unit 103, the DCT/IDCT processor 106 processes the data from the last 256-clock period, while the current incoming data are being buffered at the block memory unit 103.

Under decompression, the basic input data pattern to the DCT units 103–107 are: a) under YUV 4:1:1 format, two 64 16-bit values Y matrices, followed by the U and V matrices of 64 16-bit values each, and then two 64 16-bit values Y matrices; b) under YUV 4:2:2 format, two 64 16-bit values Y matrices, followed by the first U and V matrices of 64 16-bit values each, and then two 64 16-bit values matrices, followed by the second U and V matrices.

Figures 1, 4D:
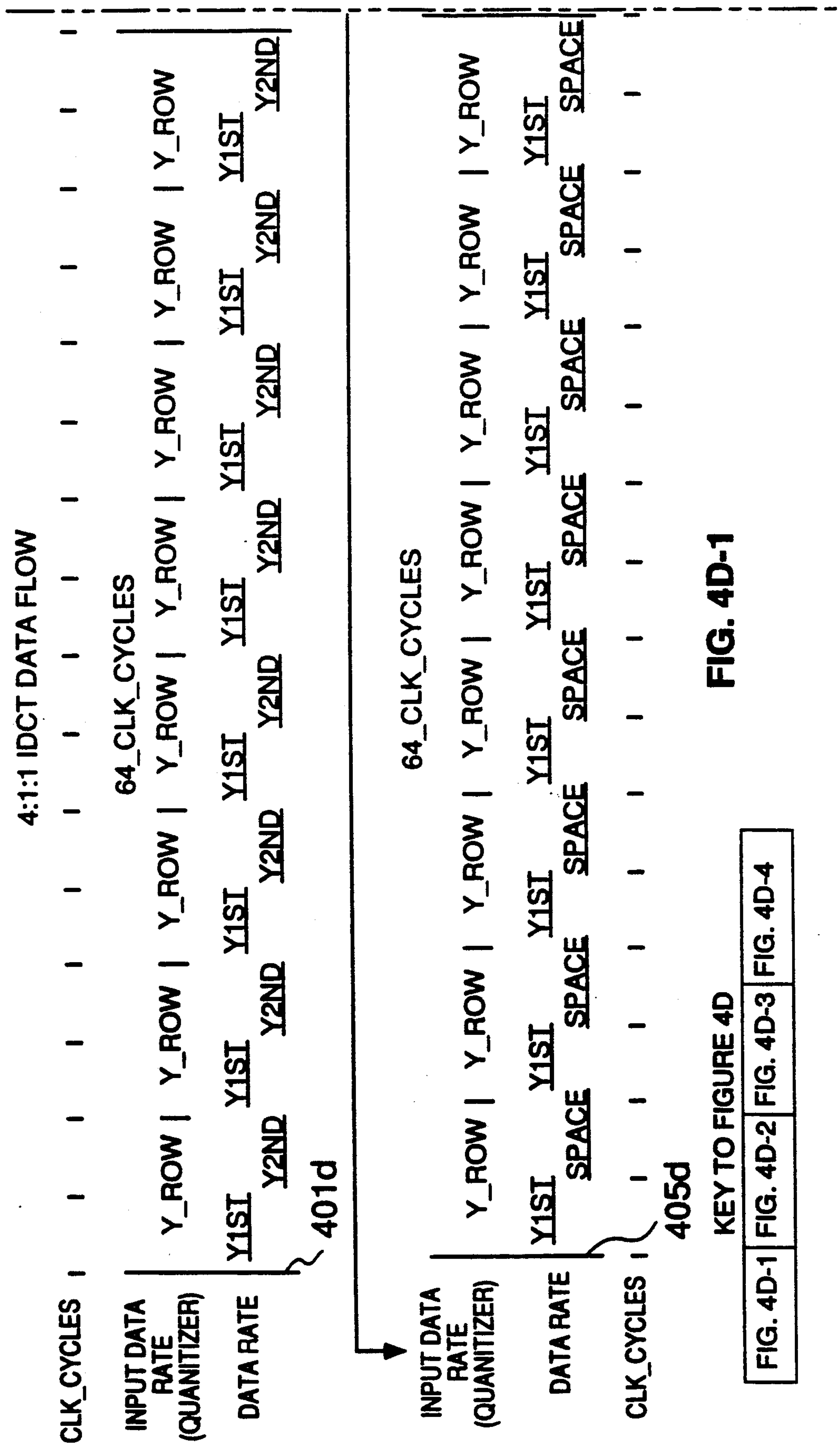
Figures 2, 4D:
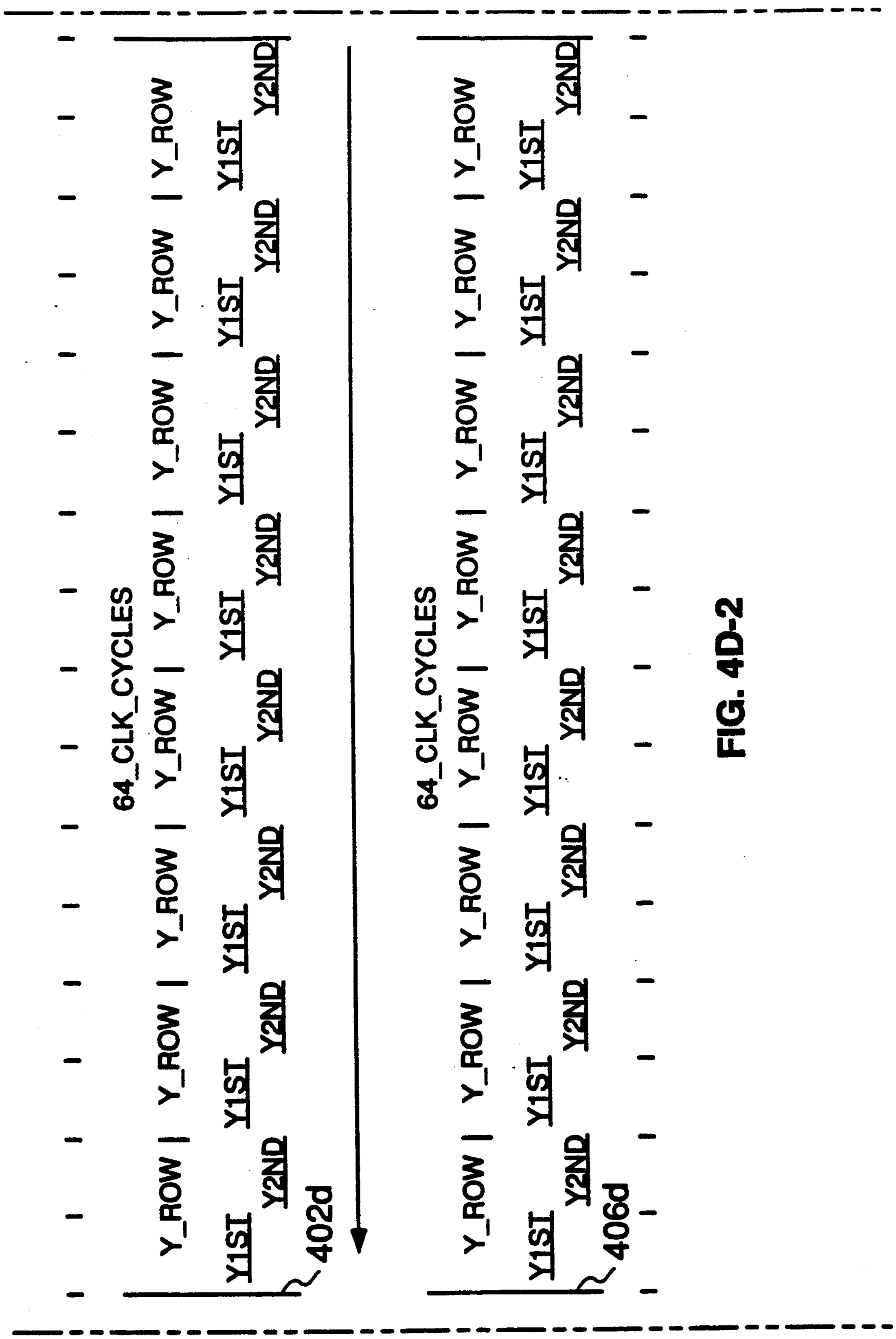
Figures 3, 4D:
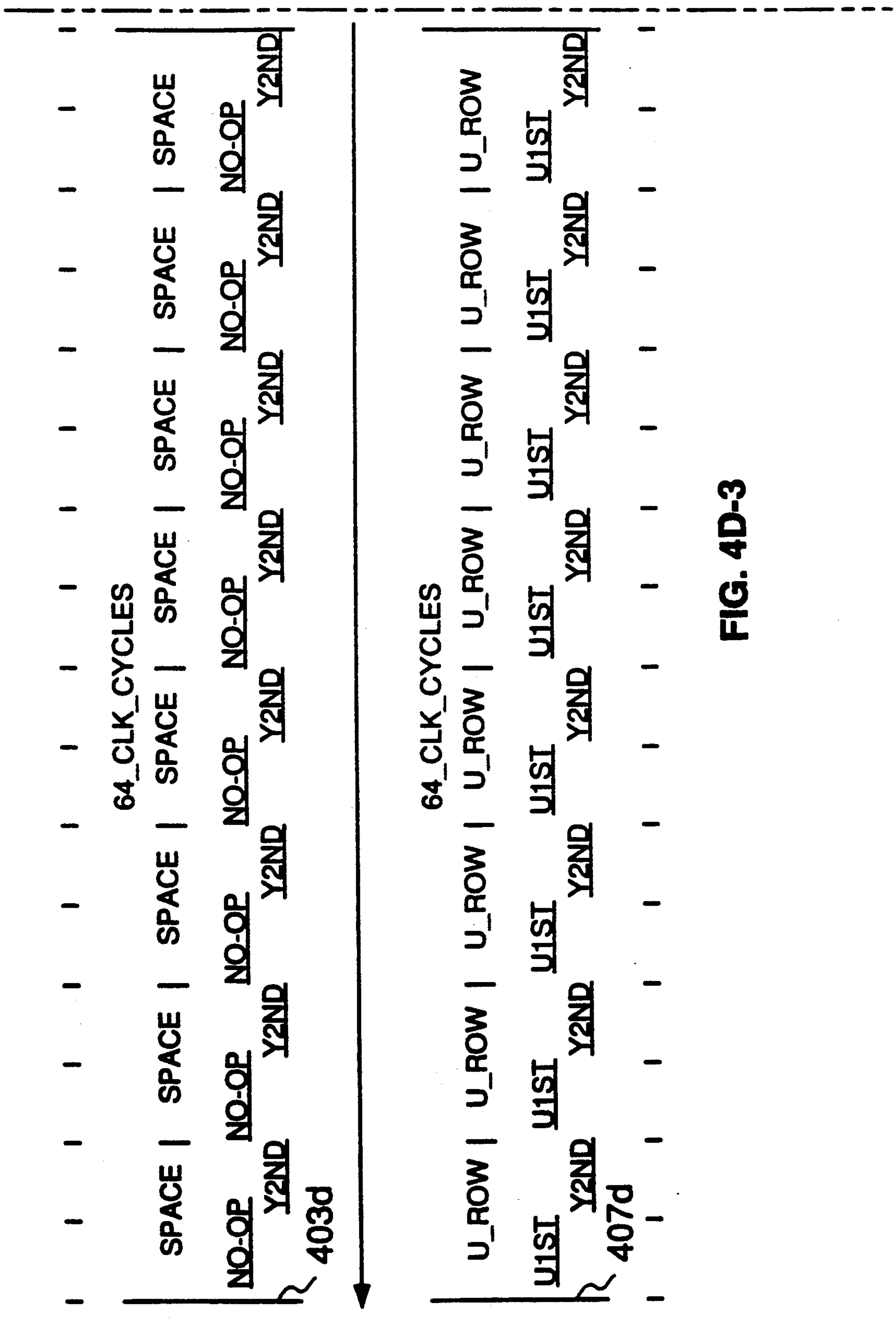
Figures 4, 4D:
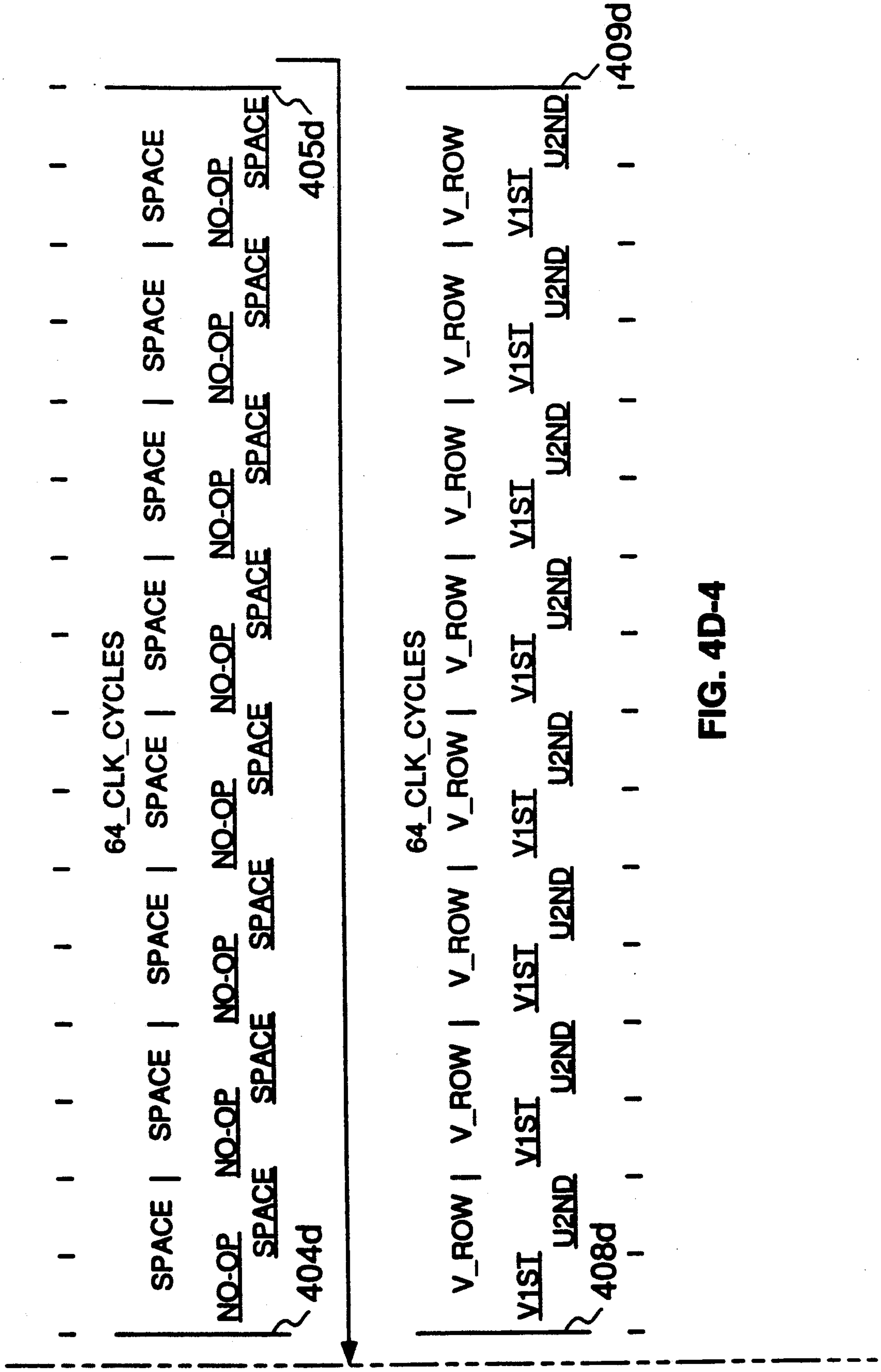

FIG. 4*d* shows the data flow schedule for the YUV 4:1:1 data format under decompression mode.

Since the decompression operation is substantially the reverse of the compression operation, the input data stream for decompression comes from the quantizer unit 108. The DCT input select unit 104, hence, alternately selects input data between DCT row storage unit 105 and the quantizer unit 108. Since the data stream must synchronize with timing of the external display, idle periods analogous to the period between the times marked 403*b* and 404*b* in FIG. 4*b* are present. An example of an idle period under YUV 4:1:1 format is the period between 404*d* and 405*d* in FIG. 4*d*. Instead of _row and _col designation under compression mode, FIG. 4*d* uses _1st and _2nd designation to highlight that the data being processed in the DCT/IDCT units 103–107 are values in the transform (frequency) domain.

Figures 1, 4E:
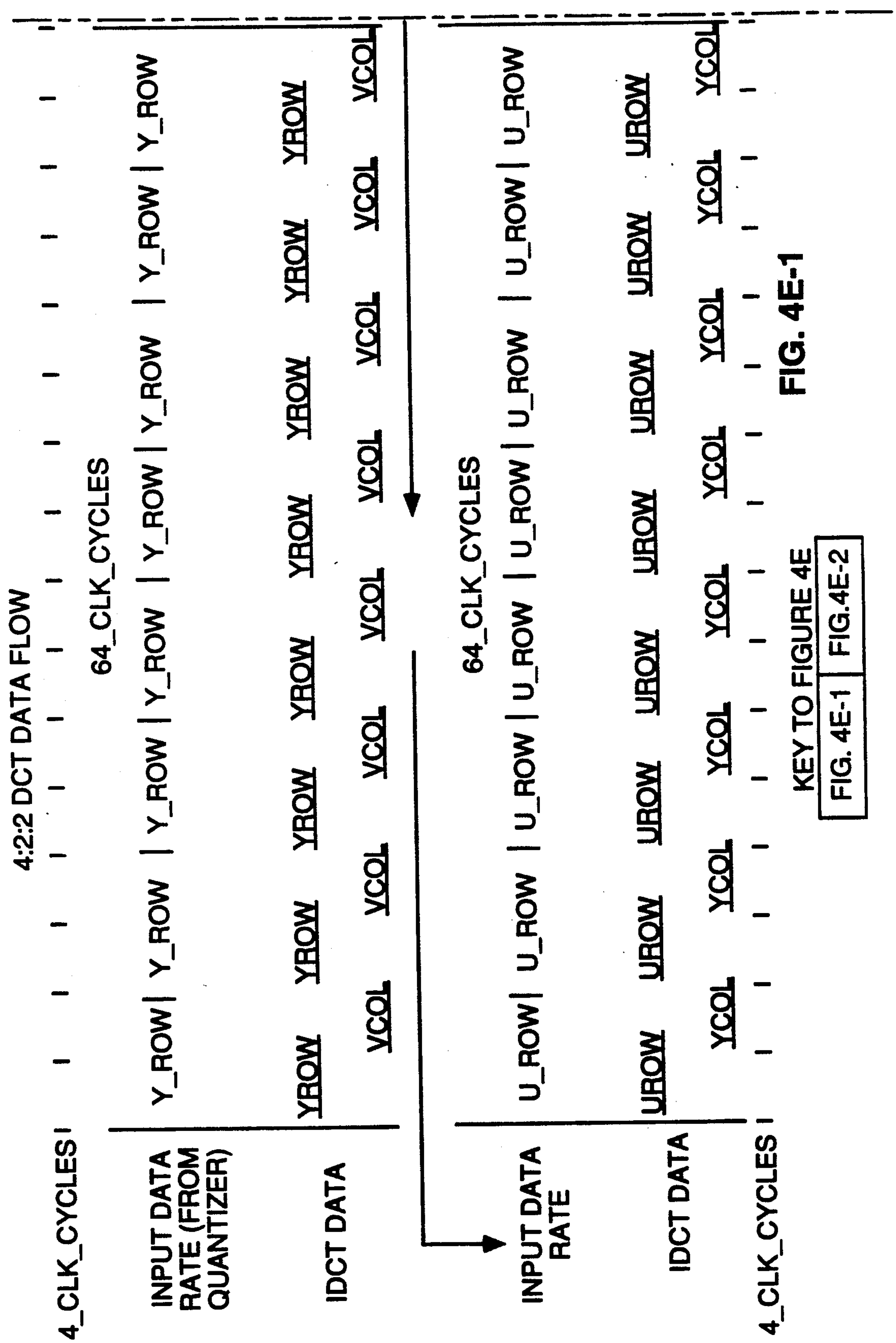
Figures 2, 4E:
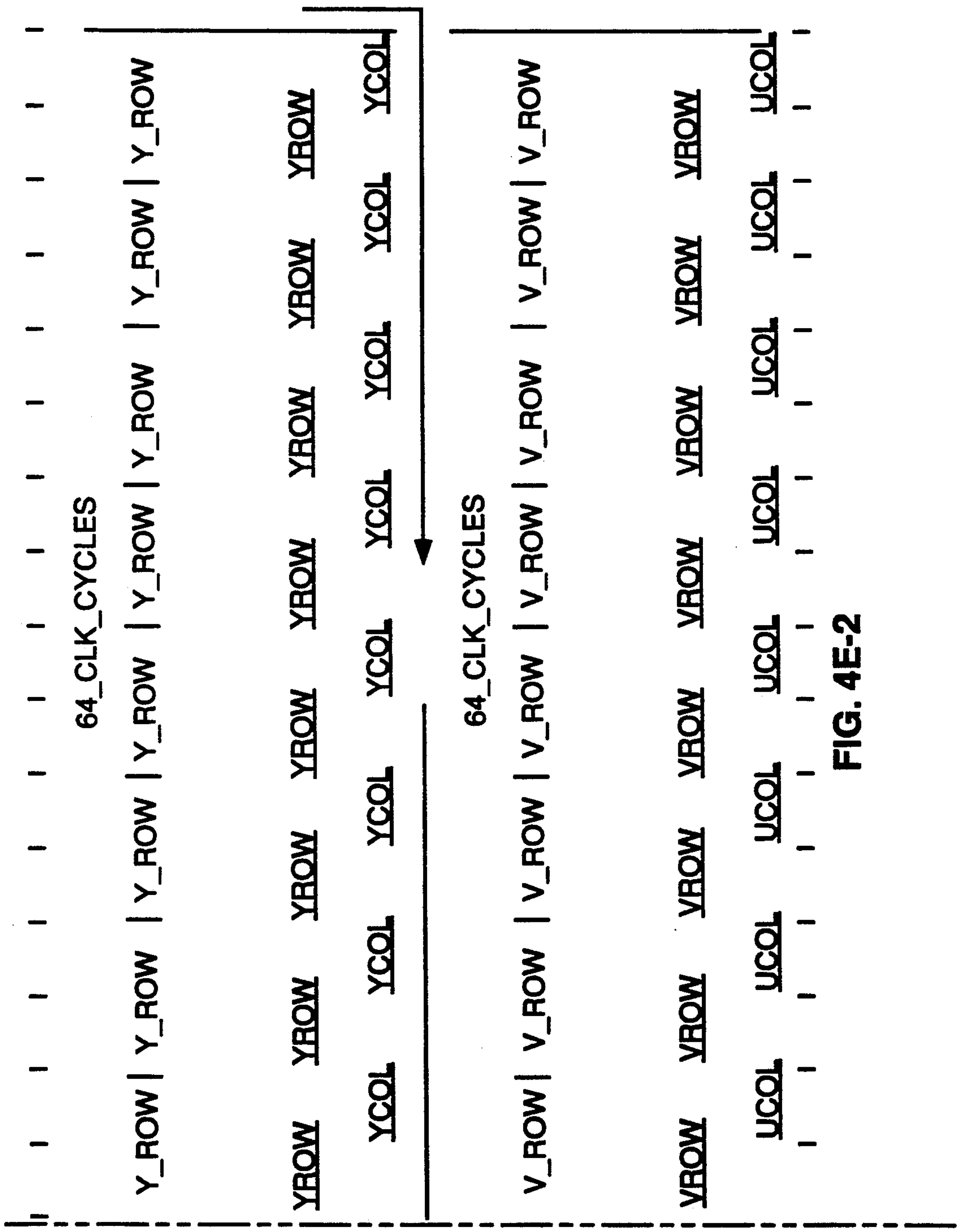

Similarly, FIG. 4*e* shows the data flow schedule for the YUV 4:2:2 data format under decompression. Again, because the design in the DCT/IDCT processor 106 is optimized for YUV 4:2:2 data, there are no idle cycles for data in this input format.

Structure and Operation of the DCT Input Select Unit

Figures 1, 5A:
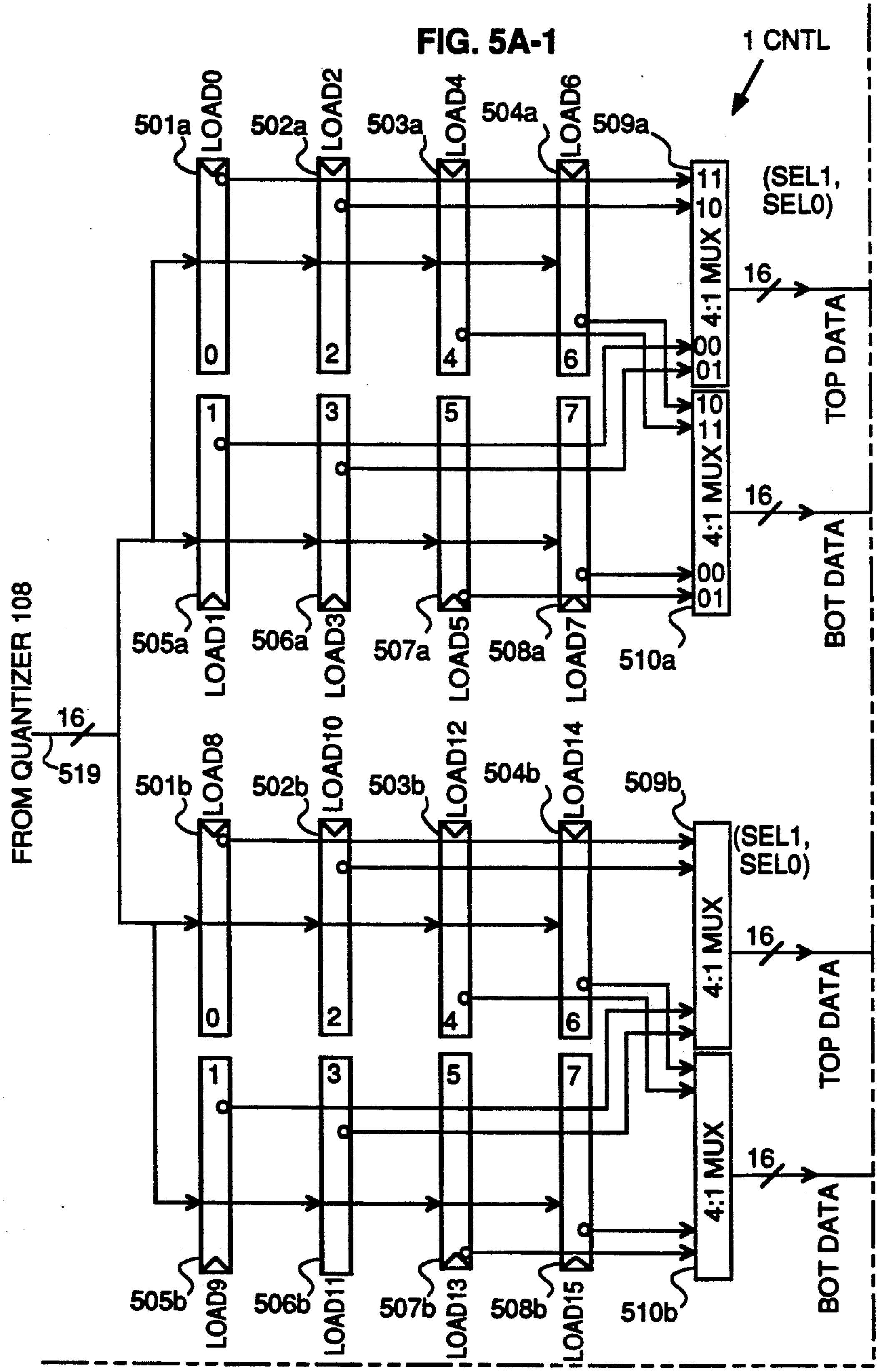
Figures 2, 5A:
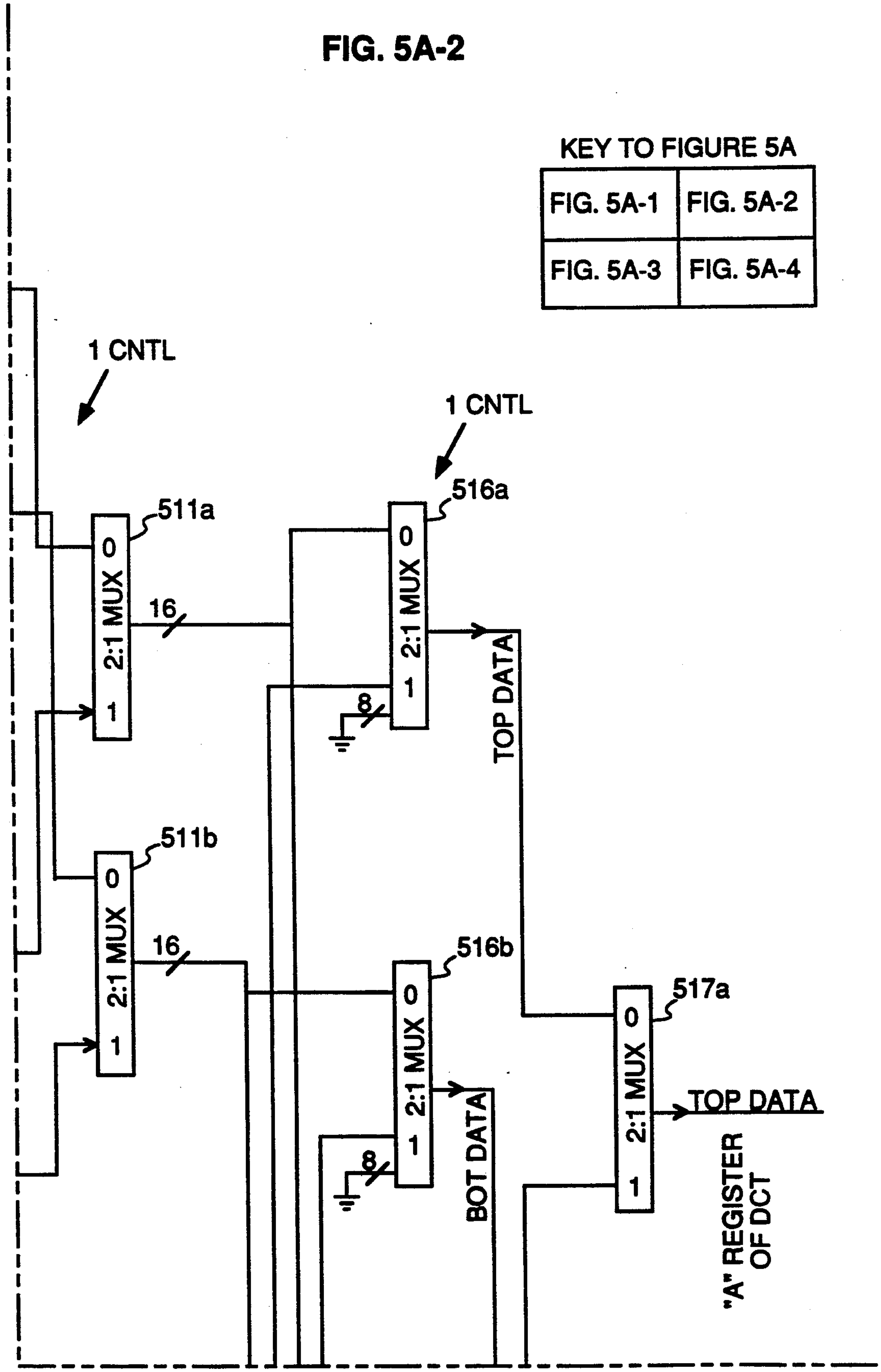
Figures 3, 5A:
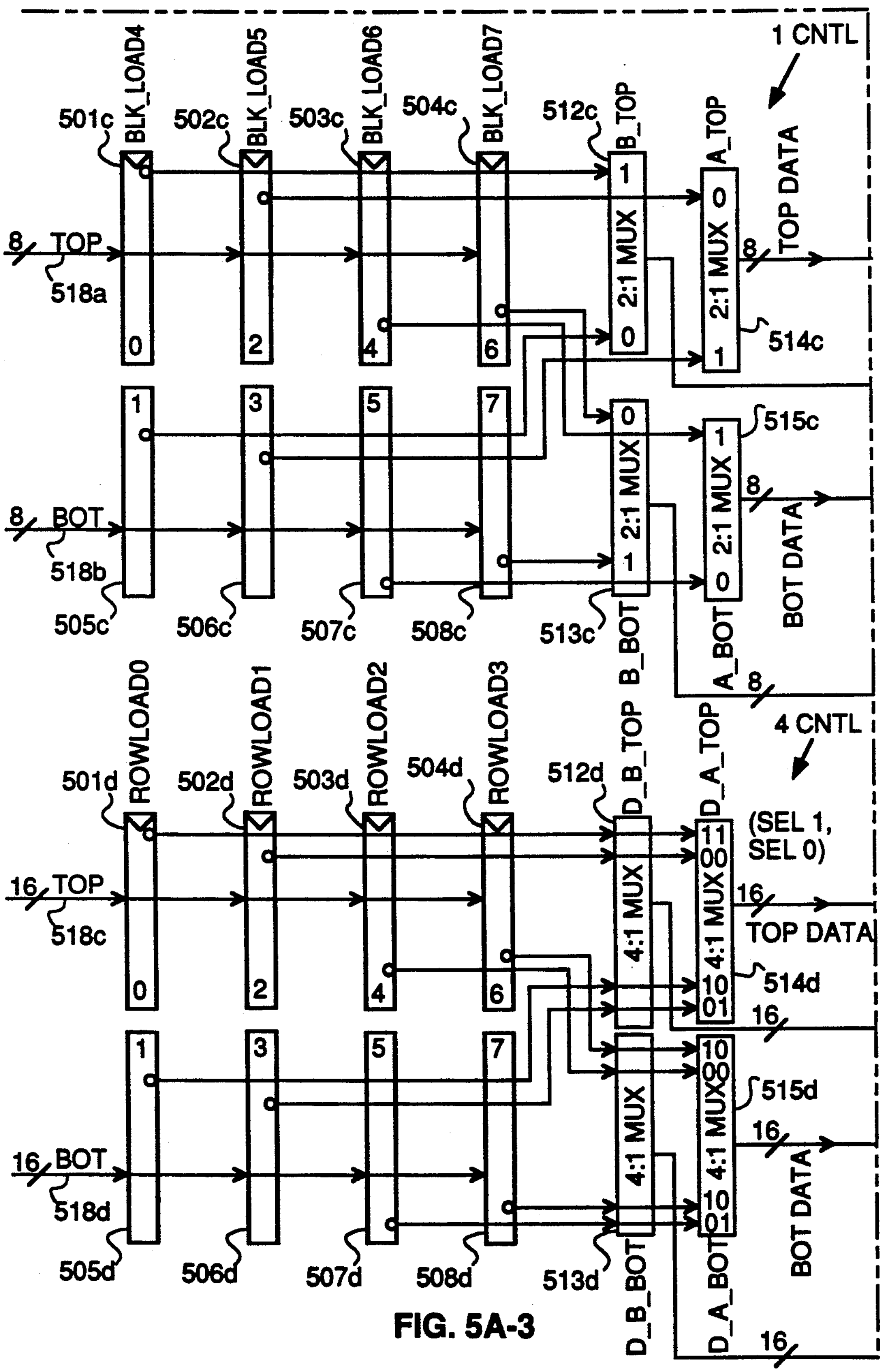
Figures 4, 5A:
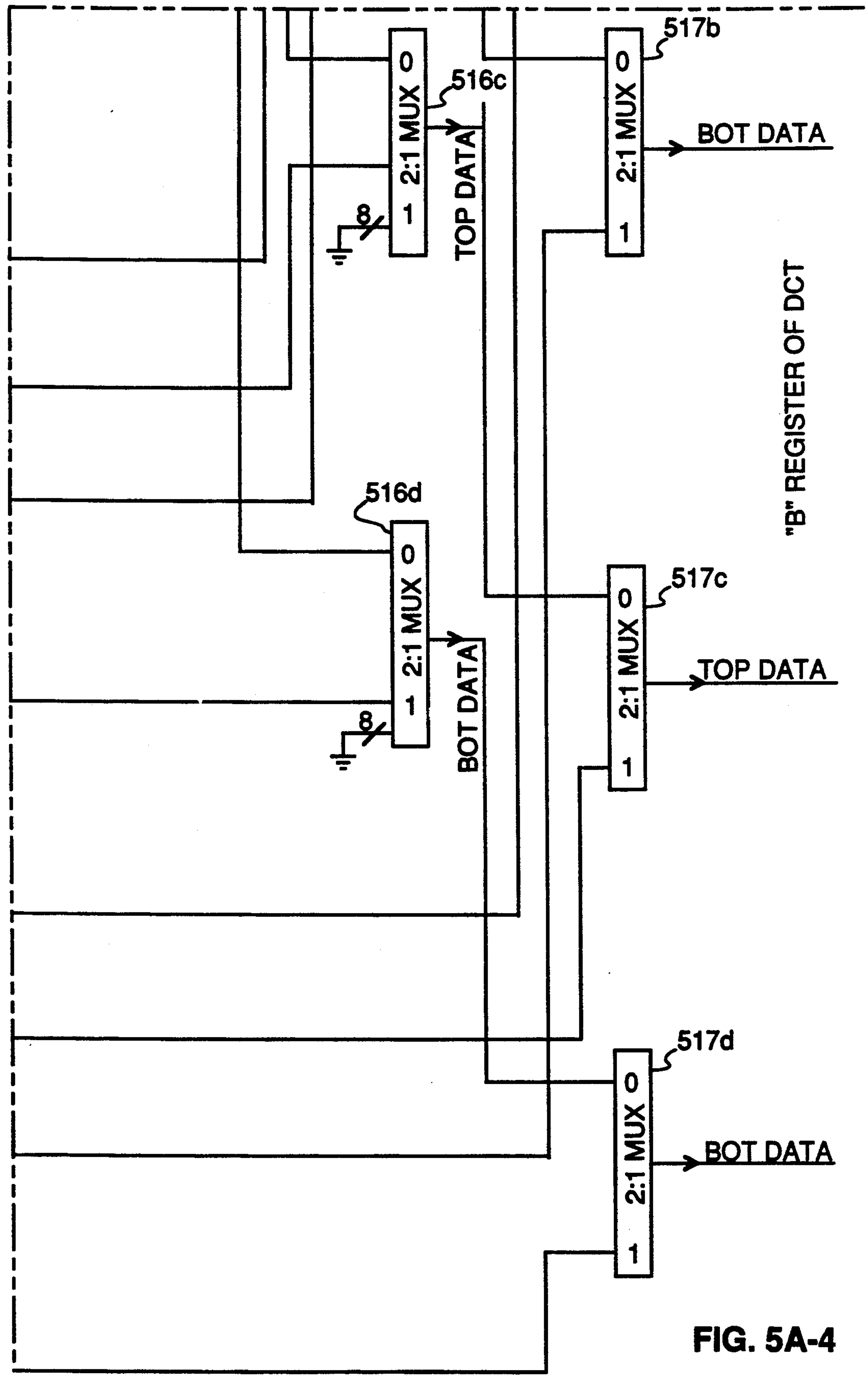
Figures 2, 5C:
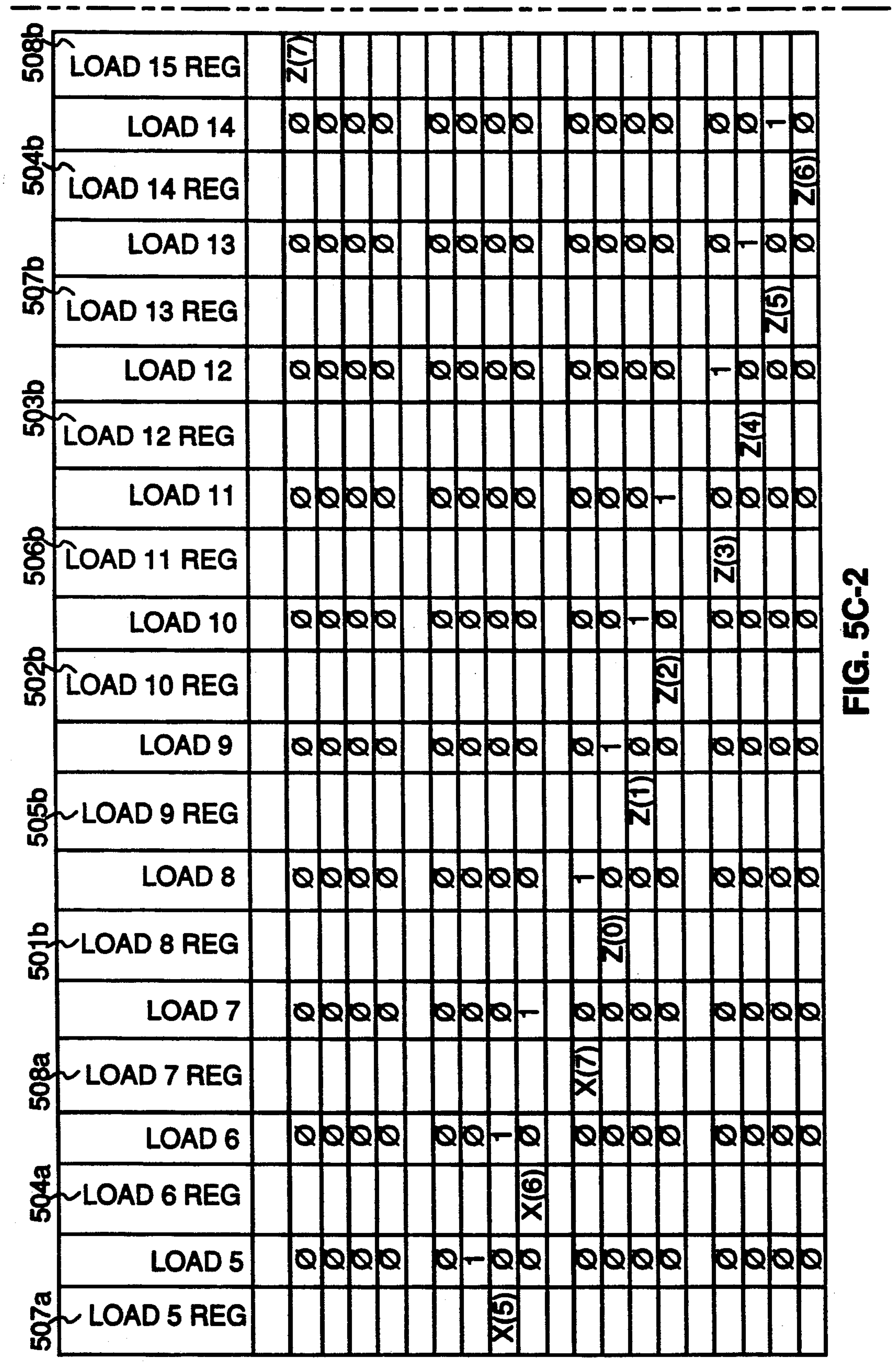
Figures 3, 5C:
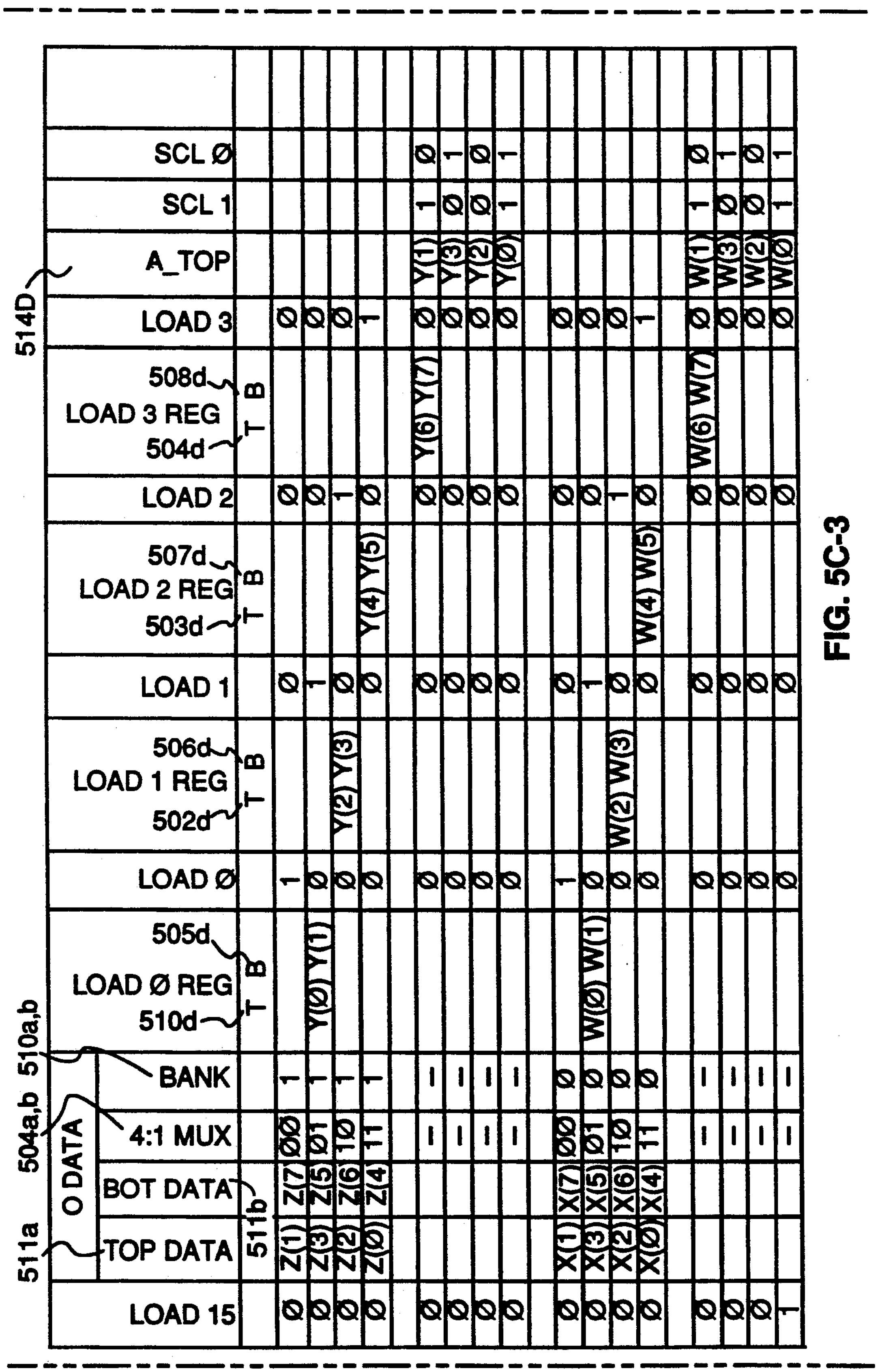

The implementation of the DCT input select unit 104 is next described in conjunction with FIGS. 5*a*, 5*b* and 5*c*.

The DCT Input Select Unit directs two streams of pixel data into the DCT/IDCT processor unit 106. The first stream of pixel data is the first-pass pixel data from either DCT block memory unit 103 or quantizer 108, dependent upon whether compression or decompression is required. This first stream of pixel data is designated for the first-pass of DCT or IDCT. The second stream of pixel data is streamed from the DCT row storage unit 105; the second stream of pixel data represents intermediate results of the first-pass DCT or IDCT. This second stream of pixel data needs to be further processed in a second-pass of the DCT or IDCT. By having the same DCT/IDCT processor unit 106 to perform the two passes of DCT or IDCT, utilization of resource is maximized. The DCT Input Select Unit 104 provides continuous input data stream into the DCT/IDCT processor unit 106 without idle cycle under YUV 4:2:2 format.

FIG. 5*a* is a schematic diagram of the DCT input select unit 104. As discussed above, the DCT input select unit 104 takes input data alternately from the quantizer unit 108 and DCT row storage unit 105 during decompression. During compression, input data to the DCT input select unit 104 are taken alternately from the block memory unit 103 and the DCT row storage unit 105.

During compression, when input data are taken from the block memory unit 103, two streams of 8-bit input data are presented on the 518*a* and 518*b* data busses. As shown in FIG. 5*a*, these two streams of data are then latched successively into one pair of the four pairs of latches (top-bot): 501*c* and 505*c*, 502*c* and 506*c*, 503*c* and 507*c*, 504*c* and 508*c* by the control signals blk_load4, blk_load5, blk_load6, and blk_load7 respectively. Each pair of latches consists of a top latch and a bottom ("bot") latch. The control signal (e.g. blk_load7) associated with a latch pair loads both the top and bottom latches. Latches 501*c* to 508*c* temporarily store data so that this can be properly sequenced into the DCT unit 106.

A set of four 2-to-1 8-bit multiplexors 512*c*, 513*c*, 514*c* and 515*c* (called block multiplexors) each selects either the top or bottom output datum from one of the four pairs of latches 501*c*-505*c*, 502*c*-506*c*, 503*c*-507*c* and 504*c*-508*c*, for input to another set of four 2:1 multiplexors 516*a*, 516*b*, 516*c*, and 516*d* (called block/quantizer multiplexors). The output datum selected by the block multiplexors from the pairs of latches 501*c*-505*c* and 502*c*-506*c* are denoted "block top data", and the output data selected from the pair of latches 503*c*-507*c* and 504*c*-508*c* are denoted "block bot data". The block/quantizer multiplexors 516*a*-*d* are 16-bit wide, and select between the output data of block multiplexors 512*c* to 515*c*, and the quantizer multiplexors 511*a* and 511*b*, in a manner to be discussed below.

During compression, the block/quantizer multiplexors 516*a*-*d* are set to select the output data of the block multiplexors 512*c* to 515*c*, since there is no output from the quantizer 108. The output data of the block/quantizer multiplexors 516*a* and 516*c* are denoted "block/quantizer top data"; being selected between block top data and quantizer top data (selected by multiplexer 511*a*, discussed below); the output data of the block/quantizer multiplexors 516*b* and 516*d* are denoted "block/quantizer bot data", being selected between block bot data and quantizer bot data (selected by multiplexor 511*b*, discussed below). Since the block multiplexors 512*c*-515*c* are each 8-bit wide, eight zero bits are appended to the least significant bits of each output datum of the block multiplexors 512*c*-515*c* to form a 16-bit word at the block/quantizer multiplexors 516*a*-*d*. The most significant bit of this 16-bit word is inverted to offset the resulting value by $-2^{15}$, to obtain a value in the appropriate range suitable for subsequent computation.

Two streams of input data, each 16-bit wide, are taken from the DCT row storage unit 105. The data flow path of the DCT row data in DCT row storage unit 105 to the DCT/IDCT processor unit 106 is very similar to the data flow path of the input data from the block memory storage unit 103 to the DCT/IDCT processor unit 106 described above. Four pairs of latches (top-bot): 501*d*-505*d*, 502*d*-506*d*, 503*d*-507*d*, and 504*d*-508*d* are controlled by control signals row_load0, row_load1, row_load2, and row_load3 respectively. A set of four 4:1 multiplexors 512*d*, 513*d*, 514*d* and 515*d* (called DCT row multiplexors) selects the output data (called DCT row top data) of two latches from the two pairs controlled by signals row_load0 and row_loadl (i.e. the two pairs 501*d*-505*d* and 502*d*-506*d*), and the output data (called DCT row bot data) of two latches from the two pairs controlled by signals row_load2 and row_load3 (i.e. the two pairs 503*d*-507*d*, and 504*d*-508*d*).

During decompression, as discussed above, data into the DCT/IDCT processor unit 106 (FIG. 1) are taken alternately from the the DCT row storage unit 105 and the quantizer 108. Hence, during decompression, the block/quantizer multiplexors (516*a*-*d*) are set to select from the quantizer multiplexors (511*a*-*b*), rather than the block multiplexors.

A single stream of 16-bit data flows from the quantizer unit 108 (FIG. 1) on bus 519. A 16-bit datum can be latched into any one of 16 latches assigned in two banks: 501*a*-508*a* (bank 0), or 501*b*-508*b* (bank 1), each latch is controlled by one of the control signals load0-load15. A set of four 4:1 multiplexors: 509*a* (called quantizer bank 0 top multiplexor), 510*a* (called quantizer bank 0 bot multiplexor), 509*b* (called quantizer bank 1 top multiplexor), and 510*b* (called quantizer bank 1 bot multiplexor) selects four data items, each from a separate group of four latches in response to signals to be described later. Quantizer bank 0 top multiplexor 509*a* selects one output datum from the latches 501*a*, 502*a*, 505*a*, and 506*a*. Quantizer bank 0 bot multiplexor 510*a* selects one output datum from the latches 503*a*, 504*a*, 507*a* and 508*a*. Quantizer bank 1 top multiplexor 509*b* selects one output datum from the latches 510*b*, 502*b*, 505*b*, and 506*b*. Quantizer bank 1 bot multiplexor 510*b* selects one output datum from the latches 503*b*, 504*b*, 507*b*, and 508*b*.

A set of two 2:1 multiplexors 511*a* and 511*b* (quantizer multiplexors) then selects a quantizer top data item and a quantizer bot data item respectively. Quantizer top data item is selected from the output data items of the quantizer bank 0 and bank 1 top data items (output data of multiplexors 509*a* and 509*b*); and likewise, quantizer bot data item is selected from the output data items of the quantizer bank 0 and bank 1 top data items (output data of multiplexors 510*a* and 510*b*). The quantizer top and bot data items are provided at the block-quantizer multiplexors 516*a*-516*d*, which are set to select the quantizer top and bot data items (output data of multiplexors 511*a* and 511*b*) during decompression.

Finally, a set of four 2:1 multiplexors 517*a*-*d* selects between the DCT row top and bot data (output data of multiplexors 512*d*-515*d*) and the block/quantizer top and bot data (output data of multiplexors 516*a*-516*d*) to provide the input data into the DCT/IDCT processor unit 106 (FIG. 1). Multiplexor 517*a* selects between one set of block/quantizer multiplexor top data 516*a* and DCT row storage top data 514*d* to provide "A" register top data 517*a*; multiplexor 517*c* selects from the other set of block/quantizer multiplexor top data 516*c* and row storage top data 512*d* to provide "B" register top data. The two sets of quantizer multiplexor top data 516*b* and 516*d* and DCT storage bot data 515*d* and 513*d* provide the "A" register bot data 517*b*, and "B" register bot data 517*d*, respectively.

Operation of DCT Input Select Unit During Compression

Having described the structure of DCT input select unit 104, the operation of the DCT input select unit 104 is next discussed.

FIG. 5*b* shows the control signal and data flow of the DCT input select unit 104 during compression mode. The DCT input select unit 104 can be viewed as having sixteen internal states sequenced by the sixteen successive clock periods. FIG. 5*b* shows sixteen clock periods, corresponding to one cycle through the sixteen internal states. For compression mode, the internal states of the DCT units 104–107 for clock periods 0 through 7 are identical to the internal states of the DCT units 104–107 for clock periods 8 through 15. FIG. 5*b* shows the operations of the DCT input select unit 104 (FIG. 1) with respect to one row of data from the DCT row storage unit 105 and one row of input data from the block memory unit 103.

The first four clock periods illustrated (i.e. clock periods 0, 1, 2 and 3) are the loading phase of data on busses 518*c* and 518*d* into the latches 501*d*–508*d* from the DCT row storage unit 105. These first four clock periods are also the processing phase of the data from the block memory unit 103 loaded into latches 501*c*–508*c* in the last four clock periods. The processing of the block memory data stored in latches 501*c*–508*c* will be described below using an example, in conjunction with discussion of clock periods 8 through 11, after the loading of block memory data from block memory unit 103 is discussed in conjunction with clock periods 4 through 7.

During the first four clock periods (0–3), a row of data from DCT row storage unit 105 is loaded in the order Y(0), Y(1) . . . Y(7) in pairs of two into latch pairs 501*d*–505*d*, 502*d*–506*d*, 503*d*–507*d* and 504*d*–508*d* by successive assertion of control signals row_load0 through row_load3.

In the next four clock periods 4 through 7, the DCT input select unit 104 (FIG. 1) forwards to the DCT/IDCT processor 106 the data loaded from the DCT row storage unit 105 in the last four clock periods 0–3, and at the same time, loads data from the block memory unit 103. The multiplexors 517*a* through 517*d* are set to select DCT row storage data in latches 501*d*–508*d*. The DCT row storage multiplexors 512*d* through 515*d* are activated in the next four clock periods to select, at clock period 4 and 5 elements Y(2) and Y(5) to appear as output data of multiplexors 517*a* and 517*b* respectively ("A" register top and bot multiplexors), and Y(1) and Y(6) to appear as output data of 517*c* and 517*d* ("B" register top and bot multiplexors) respectively. At clock periods 6 and 7, Y(3) and Y(4) appear as the output data of multiplexors 517*a* and 517*b* respectively, and Y(0) and Y(7) appear as output data of multiplexors 517*c* and 517*d* respectively. During this time, multiplexors 517*a* through 517*d* are selecting DCT row storage data in latches 501*d*–508*d*.

During clock periods 4 through 7, a row of block memory data x(0) x(1) . . . x(7) are latched into latches 501*c* through 508*c* by control signals blk_load4 through blk_load7 in the same manner as the latching of DCT row storage data into latches 501*d*–508*d* during clock periods 0 through 3.

During the next four clock periods 8 through 11, the DCT input select unit 104 is successively in the same states as it is during clock periods 0 through 3; namely, loading from DCT row storage unit 105 and forwarding to DCT/IDCT processor unit 106 the data X(0) . . . x(7) loaded in latches 501*c*–508*c* from block memory unit 103 during the last four clock periods 4–7.

In clock periods 8 through 11, multiplexors 517*a* through 517*d* select data from the block/quantizer multiplexors 516*a* through 516*d*, which in turn are set to select data from the block memory multiplexors 512*c* through 515*c*. The block memory multiplexors 512*c* through 515*c* are set such that during clock periods 8 through 9, x(2) and x(5) are available at multiplexors 517*a* and 517*b*, respectively; and during the same clock periods 8 through 9, x(1) and x(6) are available at multiplexors 517*c* and 517*d* respectively.

Operation of DCT Input Select Unit During Decompression

The operation of DCT input select unit 104 during decompression mode is next discussed in conjunction with FIG. 5*c*.

FIG. 5*c* shows the control and data flow of the DCT input select unit 104 during decompression mode. As mentioned above, the DCT input select unit 104 may be viewed as having 16 internal states. As shown in FIG. 5*c*, during the 16 clock periods 0 to 15, two rows of data from DCT row storage unit 105 (clock periods 0–3 and 8–11) and two columns of data from the quantizer unit 108 are forwarded as input data to the DCT/IDCT processor unit 106 (clock periods 0–15).

As shown in FIG. 5*c*, a continuous stream of 16-bit data is provided by the quantizer unit 108 to the DCT input select unit 104 at one datum per clock period. A double-buffering scheme provides that when latches in bank 0 (latches 501*a* through 508*a*) are being loaded, the data in bank 1 (latches 501*b* through 508*b*) are being selected for input to the DCT/IDCT processor unit 106. The latches are loaded, beginning at 501*a* through 508*a* in bank 0 by control signals load0 through load7 respectively (at clock periods 0 through 7), and then switching over to bank 1 to load latches 501*b* through 508*b* by control signals load8 through load15 respectively (clock periods 8 through 15). During clock periods 8 through 11, while bank 1 is being loaded, the data in bank 0 x(0) . . . x(7) (loaded during clock periods 0 through 7) are being selected for input into the DCT/IDCT processor unit 106. The order of selection is shown in FIG. 5*c* in the sequence (top-bot): x(1)–x(7) in clock period 8, x(3)–x(5) in clock period 9, x(2)–x(6) for clock period 10, and x(0)–x(4) in clock period 11. The same top data appear in both DCT "A" register top data and DCT "B" register top data. The bot data for the bot registers of "A" and "B" are the same as well. During clock periods 0 through 3 in the four clock periods following clock period 15 shown in FIG. 5*c* (analogous to clock periods 0 through 3 shown), the new data in latches 501*b* through 508*b* are selected in similar order for input to the DCT/IDCT processor unit 106.

Loading and processing of the data from the DCT row storage unit 105 follow the same pattern as in the compression mode: i.e. four clock periods during which the latch pairs in 501*d* through 508*d* are loaded by control signals row_load0 through row_load3 respectively at one pair of two 16-bit data per clock period. (The latches pairs are 501*d*–505*d*, 502*d*–506*d*, 503*d*–507*d* and 504*d*–508*d*). For example, during clock periods 0 through 3, the latches are loaded with a row of 16-bit data Y(0) . . . Y(7) from DCT row storage. In the next four clock periods, 4 through 7, 16-bit data Y(0) . . . Y(7) in the latches 501*d* through 508*d* are provided as input to DCT/IDCT processor unit 106 in the sequence ("A" register top, "A" register bot, "B" register top, "B" register bot): (Y(1), Y(7), Y(1), Y(7)), at clock period 4, (Y(3), Y(5), Y(3), Y(5)) at clock period 5, (Y(2), Y(6), Y(2), Y(6)) at clock period 6, and (Y(0), Y(4), Y(0), Y(4)) at clock period 7.

Analogous loading and processing phases are provided at clock periods 8 through 15. Data in the latches 501*d* through 508*d* (DCT row storage data) are alternately selected every 4 clock periods with the data from the quantizer unit 108 for input to DCT/IDCT processor unit 106. For example, during clock periods 0 through 3, and 8 through 11, data from the quantizer unit 108 is provided for input to DCT/IDCT processor unit 106 and during clock periods 4 through 7, and 12 through 15, DCT row storage data are provided for input to DCT/IDCT processor unit 106.

Structure and Operation of the DCT Row Storage Unit

The structure and operation of DCT row storage unit 105 (FIG. 1) is next described in conjunction with FIGS. 6a–c.

FIG. 6a is a schematic diagram of the DCT row storage unit 105.

The storage in DCT row storage unit 105 is implemented by two 32×16-bit static random access memory (SRAM) arrays 609 and 610, organized as "even" and "odd" planes. 2:1 multiplexors 611 and 612 forward to DCT input select unit 104 the output data read respectively from the odd and even planes of the memory arrays 609 and 610.

Configuration register 608 contains configuration information, such as latency values (for either compression or decompression) to synchronize output from the DCT row/column separator into DCT row storage 105, so that, according to the configuration information in the configuration register 608, the address generator 607 generates a sequence of addresses for the SRAM arrays 610 and 609.

The memory arrays 609 and 610 can be read or written by a host computer via the bus 115 (FIG. 6a). 2:1 multiplexors 605, 606 select the input address provided by the host computer on bus 613 when the host computer requests access to SRAM arrays 609 and 610.

Incoming data from the DCT row/column separator unit 107 arrive at DCT row storage unit 105 on two 16-bit buses 618 and 619. As described above, a host computer may also write into the SRAM arrays 609 and 610. The data from the host computer are latched into the SRAM arrays 609 and 610 from the 16-bit BUS 615. Alternatively, a set of 2:1 multiplexors 601–604 multiplex the data from DCT/IDCT processor unit 106 on buses 618, 619 to be written into either SRAM array 609 or 610 according to the memory access schemes to be described below.

Two 16-bit outgoing data words are placed on busses 616 and 617, transmitting to output data from the SRAM arrays 610 and 609, respectively. 2:1 multiplexors 611 and 612 select the data on busses 616 or 617 to place on busses 626 and 627, two 16-bit data words per clock period, in the order required by the DCT/IDCT algorithms implemented in the DCT/IDCT processor unit 106, already described in conjunction with DCT input select unit 104.

Alternatively, output data from the SRAM arrays 609 and 610 on busses 616 and 617 may be output on bus 614 under direction of a host computer (not shown). The host computer (not shown) would be connected onto host bus 115 as described in the IEEE standard attached hereto as Appendix B.

In-Line Memory of the DCT Row Storage Unit

Because two 16-bit values are written into or read from DCT row storage unit 105 per clock period, and because of the order in which DCT or IDCT first-pass data is accessed, an efficient scheme of reading and writing the SRAM arrays 609 and 610 is provided, such that the same memory locations may be written into with a row of data in the incoming 8×8 matrix after a column of data is read from the last 8×8 matrix. In this manner, an "in-line" memory access scheme implemented, which requires 50% less storage than a comparable double-buffering scheme.

In order to achieve the "in-line" memory advantage, the SRAM arrays 609 and 610 are written and read under the "horizontal" and "vertical" access pattern alternately. Memory maps (called "write patterns") are shown in FIG. 6b and 6c for the horizontal and vertical access patterns respectively.

FIG. 6b shows the content of the SRAM arrays 609 and 610 with an 8×8 first pass result matrix written. For example, even and odd portions of logical memory location 0, 0e and 0o, contain elements respectively X0(0) and X0(1) of row X0; 0e and 0o correspond to address 0 in the E-plane (SRAM array 609) and O-plane (SRAM array 610) respectively. Because of their independent input and output capabilities, an E-plane datum and an O-plane datum may be accessed simultaneously during the same clock period. There are 32 memory locations in each of the E-plane and O-plane of the SRAM arrays 609 and 610; the "e" addresses are found in the E-plane, and the "o" addresses are found in the O-plane. Thus a total of 64 data words can be stored in the even and odd plane taken together.

During compression, the use of the words "row" and "column" refer to the rows and columns of the pixel matrix, while during decompression, "rows" and "columns" refer to the "rows" and "columns" of the frequency matrix.

During any clock period, either two 16-bit data arrive from DCT row/column separator unit 107 on busses 618 and 619 (input mode), or two 16-bit data go to the DCT input select unit 104 via busses 626 and 627 (output mode). The period of horizontal access pattern consists of 64 clock periods, during which there are eight (8) cycles each of four clock periods of read memory access followed by four clock periods of write memory access. In the horizontal access pattern, during compression, the outgoing data are provided to DCT input select unit 104 column by column "horizontally," and the incoming data are written into the SRAM arrays 609 and 610 row by row "horizontally." During decompression, the outgoing data are provided to DCT input select unit 104 row by row horizontally, and the incoming data are written column by column horizontally.

The following description is based on the data flow during compression only. During decompression, the incoming data into the DCT row storage unit 105 are columns of a matrix and the outgoing data into DCT input select unit 104 are rows of a matrix, but the principles of horizontal and vertical accesses are the same.

FIG. 6b shows a 8×8 matrix X with rows X0–X7 completely written horizontally into the SRAM arrays 609 and 610. FIG. 6b is the map of SRAM arrays 609 and 610 at the instant in time after the last two 16-bit data from the previous matrix are read, and the last two 16-bit data of the current matrix X (X7(6) and X7(7) are written into the SRAM arrays 609 and 610.

Because the second pass of the 2-dimensional DCT requires data to be read in pairs, and in column order, i.e. in the order X0(0)–X1(0), X2(0)–X3(0), . . . X6(0)–X7(0), X0(1)–X1(1) . . . X6(7)–X7(7), after a column (for example, X0(0), X1(0) . . . X7(0)), is read, the memory locations Oe, 4o, 8e, 12o, . . ., 28o previously occupied by the column X0(0) . . . X7(0) are now available for storage of the incoming row y0 with elements Y0(0) . . . Y0(7).

After the first column X0(0) . . . X7(0) is read and replaced by row Y0(0) . . . Y0(7), the second column X0(1) . . . X7(1) is read and replaced by row Y1(0) . . . Y1(7). This process is repeated until all of matrix X is read and replaced by all of matrix Y, as shown in FIG. 6c. Since during this period, data are read and written "vertically," this access pattern is called vertical access pattern.

The output of matrix Y will be column by column to DCT input select unit 104. Because these columns are located "horizontally" in the SRAM array 609 and 610, the writing of the next incoming matrix row by row will be horizontally also, i.e., to constitute the horizontal access pattern.

In order to allow data to be written vertically and accessed horizontally, or vice versa, each row's first element, e.g., X0(0), X1(0) etc. must be alternately written in the E-plane and O-plane, as shown in FIGS. 6b and 6c, since adjacent 16-bit data in the same column must be accessed in pairs at the same time.

In this manner, an "in-line" memory is implemented resulting in a 50% saving of storage space over a double buffering scheme.

Structure and Operation of the DCT/IDCT Processor Unit

Figures 1, 7A:
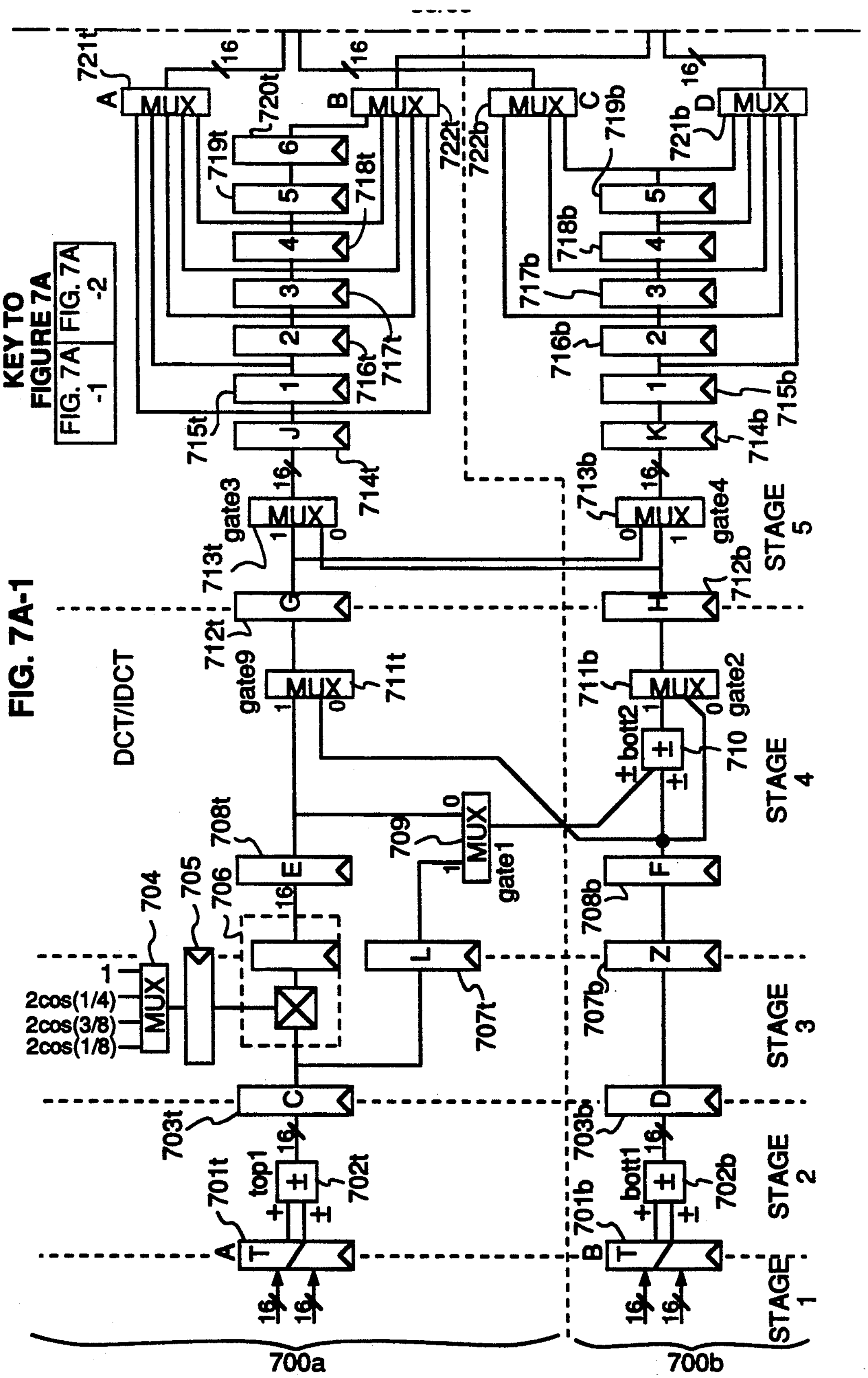
Figures 2, 7A:
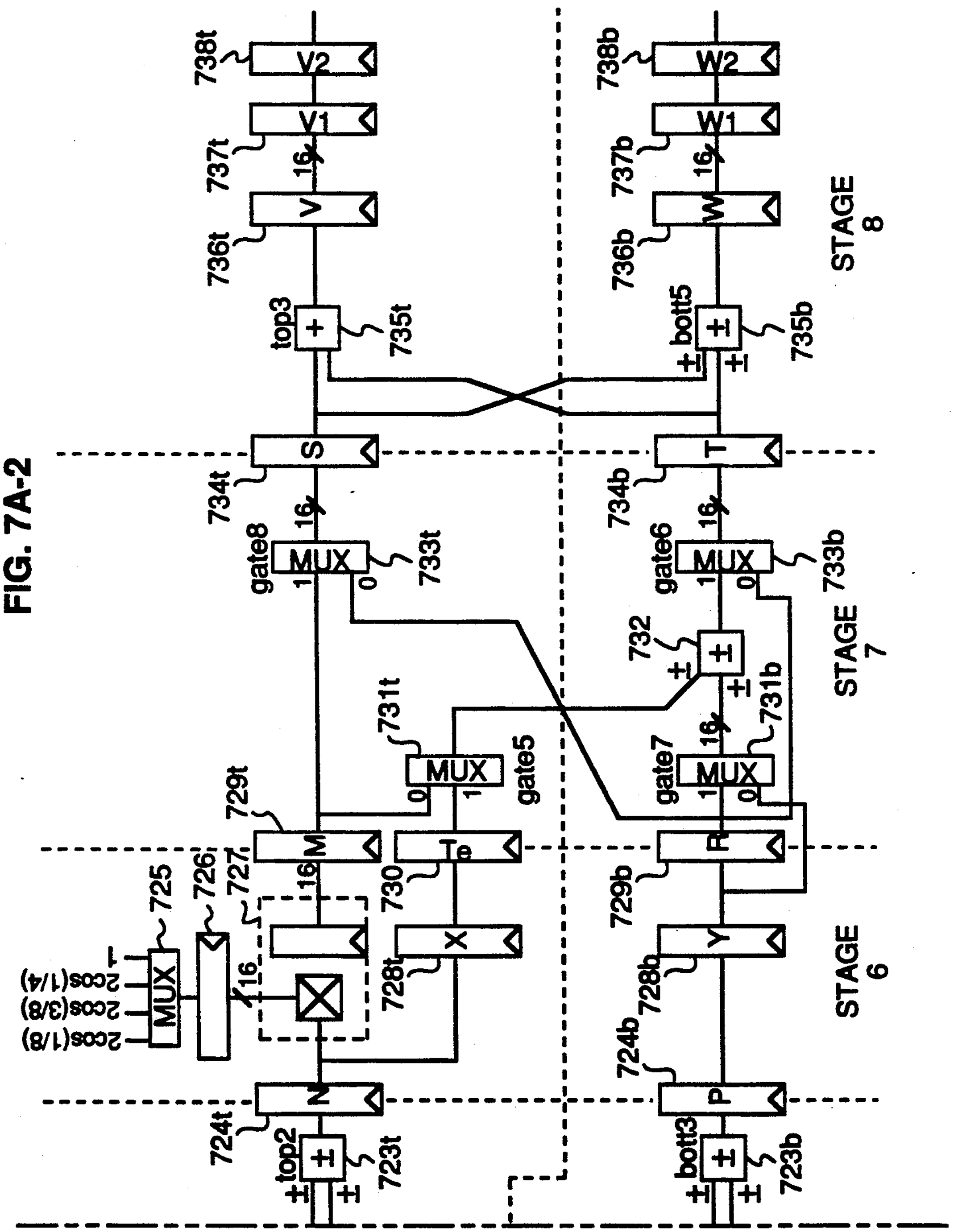

Input data for the DCT/IDCT processor unit 106 are selected by the multiplexors 517*a* through 517*d* in the DCT input select unit 104. The input data to the DCT/IDCT processor 106 are four 16-bit words latched by the latches 701*t* and 701*b* (FIG. 7a). The DCT/IDCT processor unit 106 calculates the discrete cosine transform or DCT during compression mode, and calculates the inverse discrete cosine transform IDCT during decompression mode.

Figure 7B:
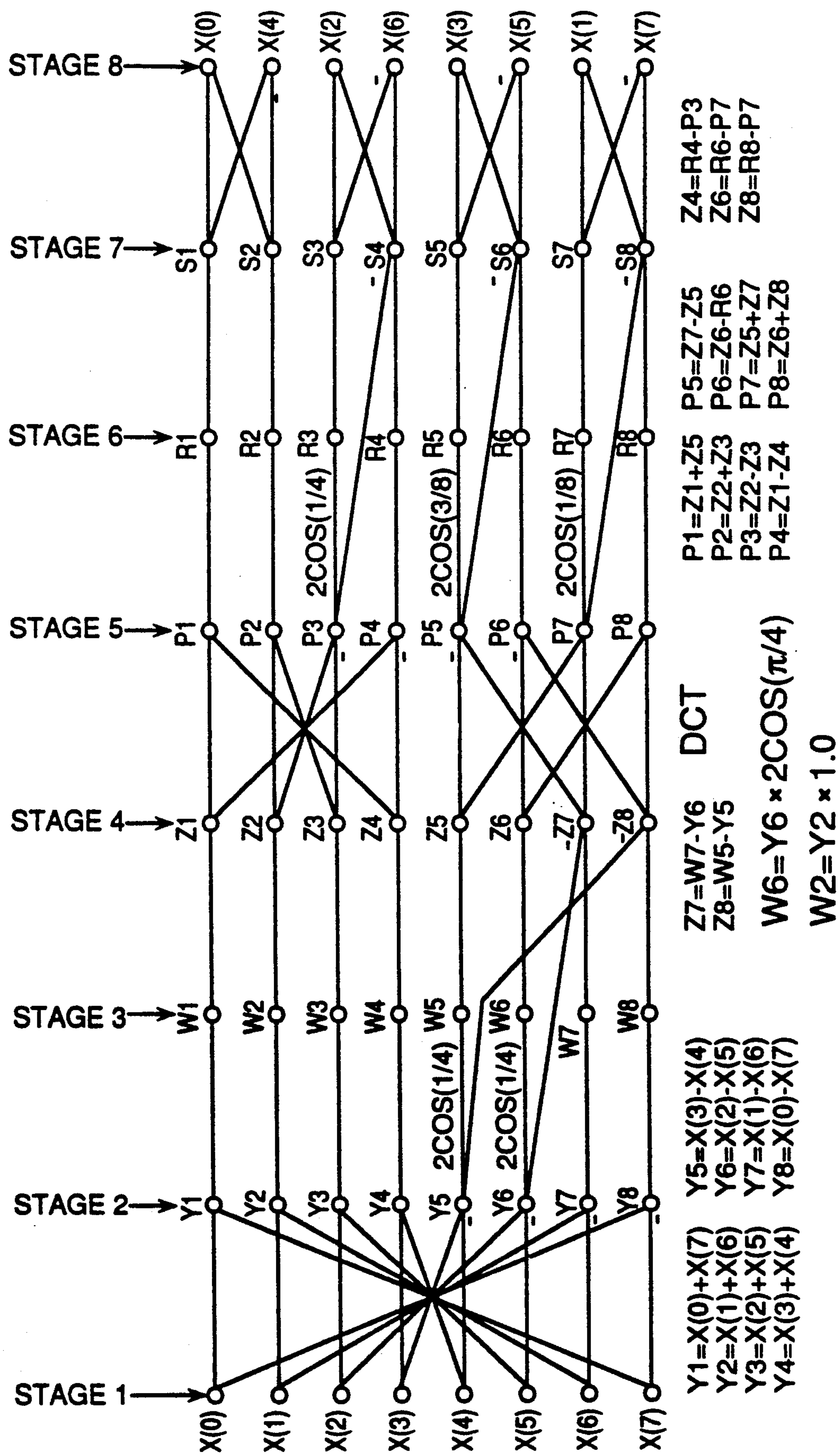
FIG. 7*b* shows a flow diagram of the DCT computational algorithm used under compression condition in the DCT/IDCT processor unit 105 of FIG. 7*a*.
Figures 2, 7C:
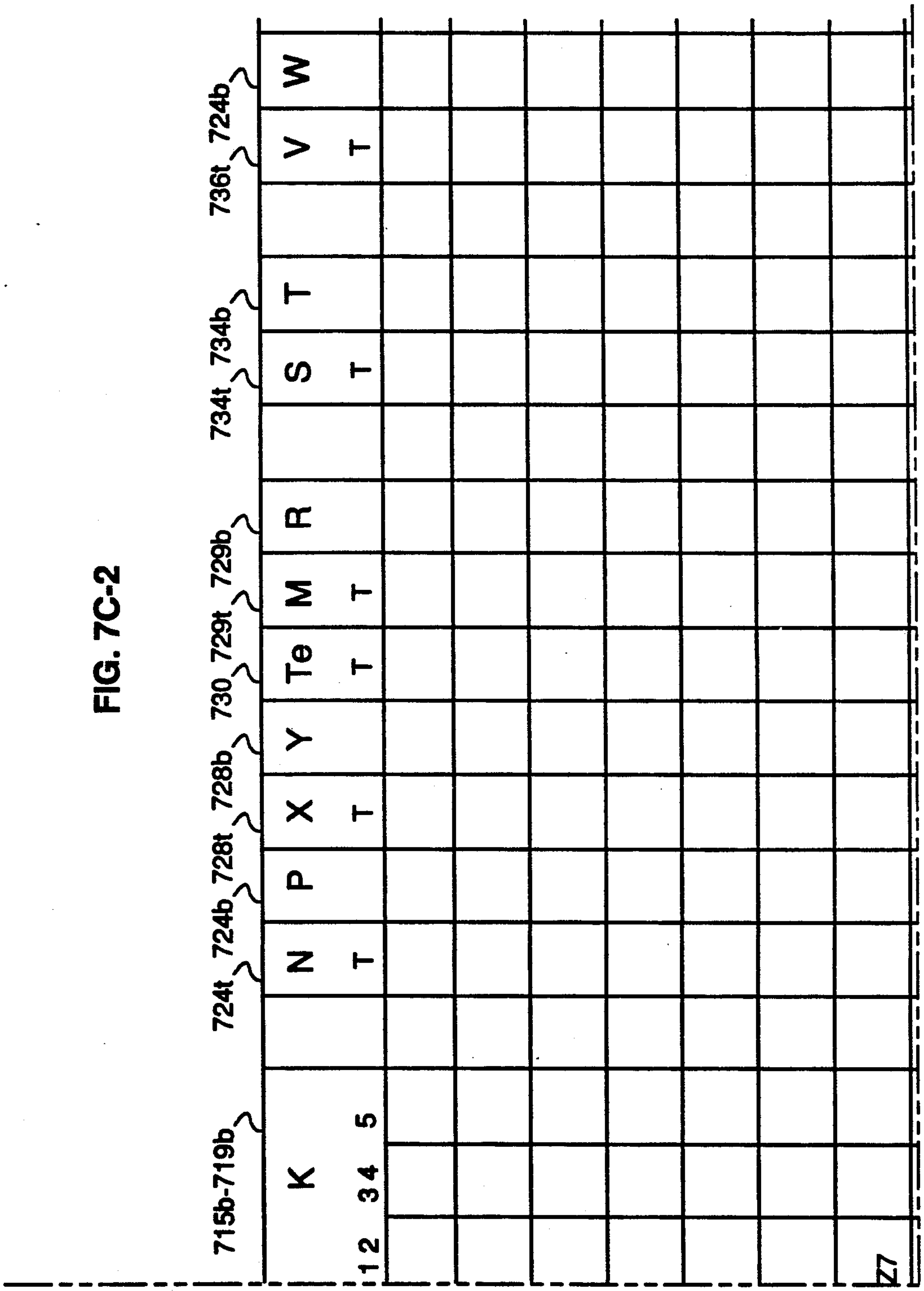
Figures 4, 7C:
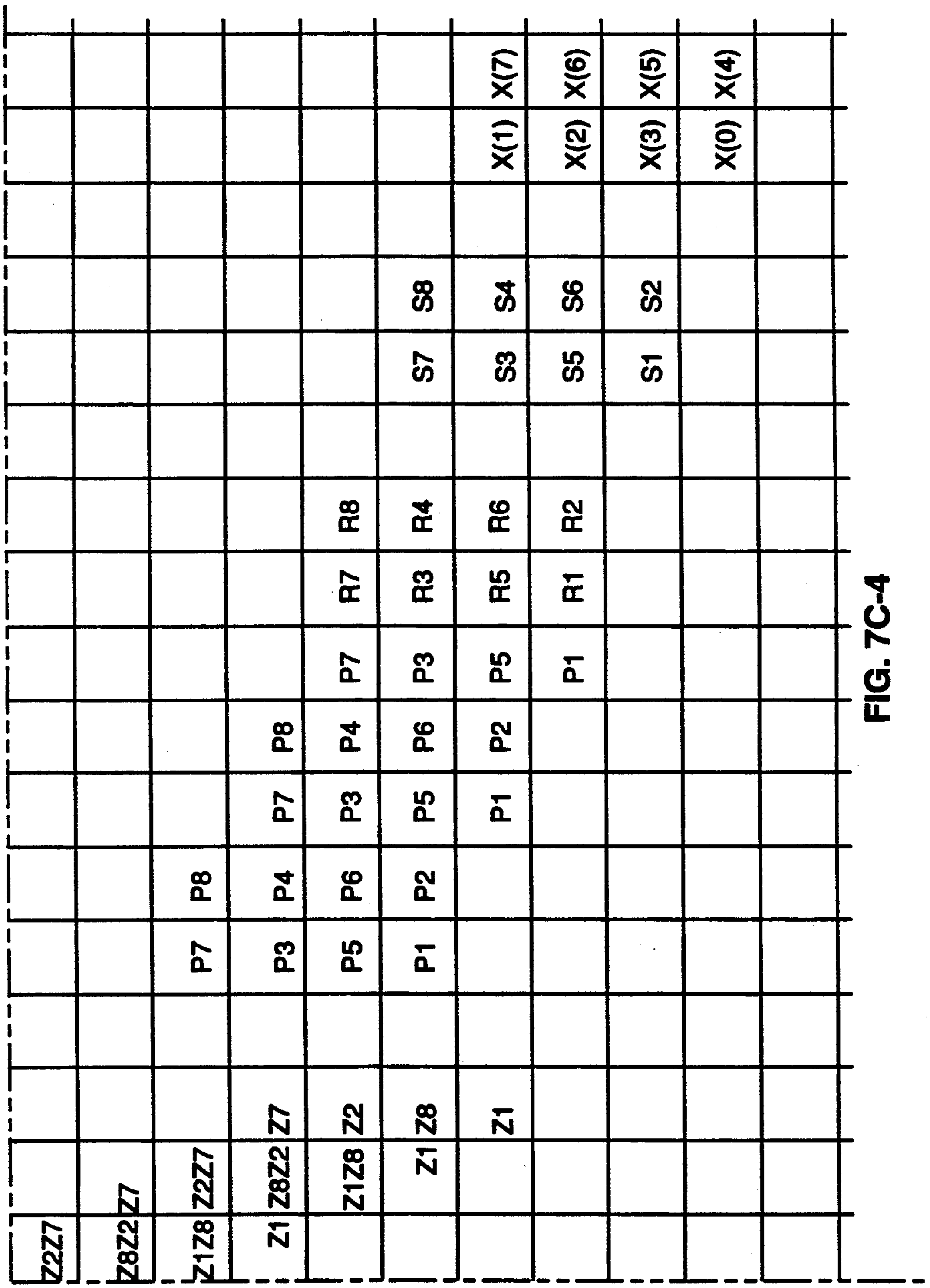
Figure 7E:
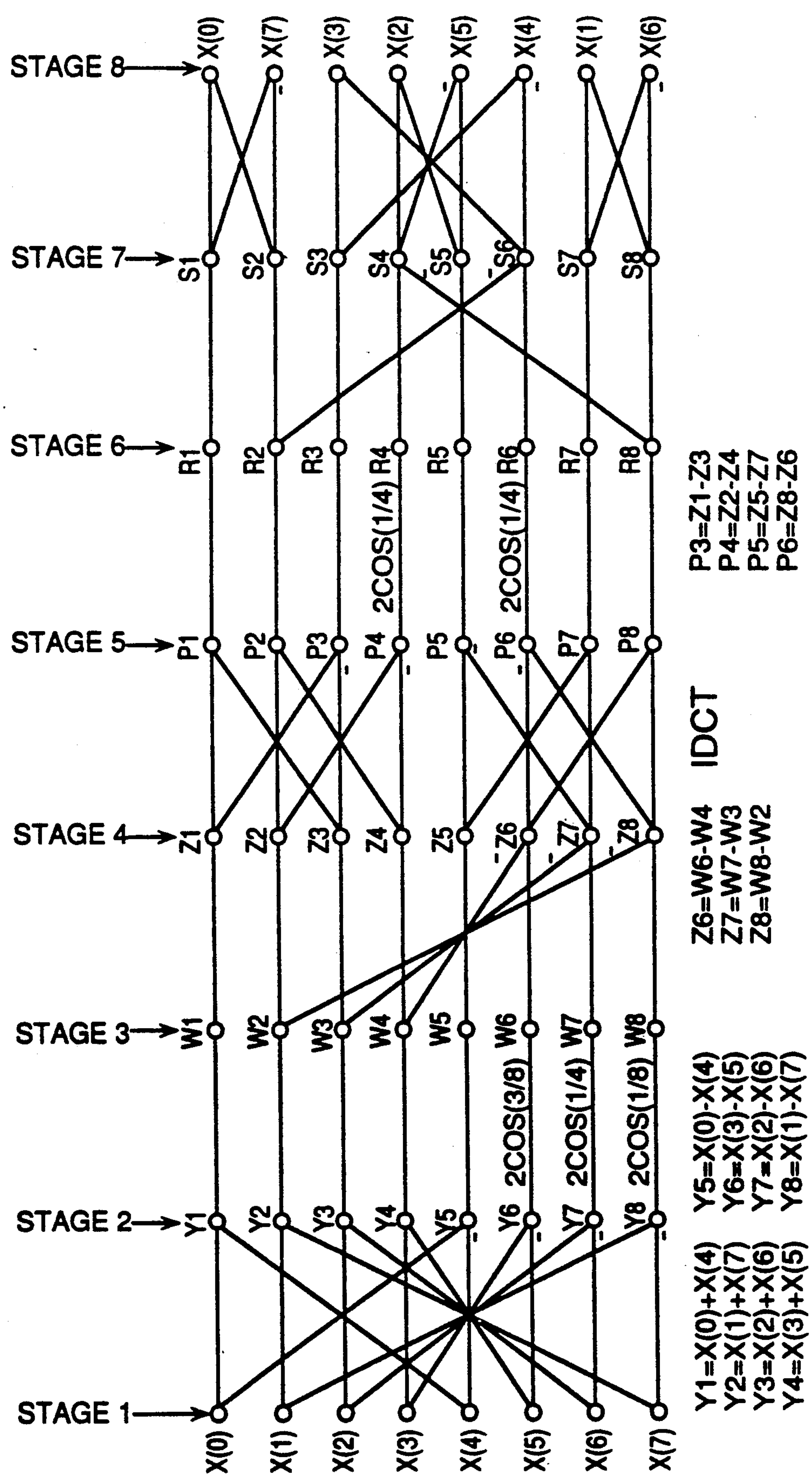
FIG. 7*e* shows a flow diagram of the DCT computational algorithm used under decompression condition in the DCT/IDCT processor unit 105 of FIG. 7*a*.

According to the present invention, the DCT and IDCT algorithms are implemented as two eight-stage pipelines, in accordance with the flow diagrams in FIGS. 7b and 7e. During compression the flow diagram in FIG. 7b is the same as FIG. 15d, except for the last multiplication step involving g[0], h[0] . . . i[0] (FIG. 15d). Because the quantization step involves a multiplication, the last multiplication of the DCT is deferred to be performed with the quantization step in the quantizer 108, i.e., the quantization coefficient actually employed is the product of the default JPEG standard quantization coefficient and the two deferred DCT multiplicands, one from each pass through the DCT/IDCT processor unit 106. During IDCT, multiplicands are premultiplied in the dequantization step. This deferment or premultiplication is possible because during DCT, all elements in a column have the same scale factor, and during IDCT all elements in a row have the same scale factor. By deferring these multiplication steps until the quantization step, two multiplies per pixel are saved. In the flow diagrams of FIGS. 7b and 7e, input data flows from left to right. A circle indicates a latch or register, and a line joining a left circle with a right circle indicates an arithmetic operation performed as a datum flow from the left latch (previous stage) to the right latch (next stage). A constant placed on a line joining a left latch to a right latch indicates that the value of the datum at the left latch is scaled (multiplied) by the constant as the datum flows to the right latch; otherwise, if no constant appears on the joining line, the datum on the left latch is not scaled. For example, in FIG. 7b, r3 in stage 6 is derived by having p3 scaled by 2 cos (pi/4), and r2 is derived by having p2 scaled by 1 (unscaled). A latch having more than one line converging on it, and each line originating from the left, indicates summation at the right latch of the values in each originating left latch, and according to the sign shown on the line. For example, in FIG. 7b, y5 is the sum of x(3) and −x(4).

As shown in FIG. 7b, for the forward transform (DCT) algorithm, between stages 1 and 2 is a shuffle-and-add network, with each datum at stage 2 involving exactly two values from stage 1. Between the stages 2 and 3 are scaling operations involving either constants 1 or 2 cos (pi/4). Stage 4 is either an unscaled stage 3 or a shuffle-and-add requiring a value at stage 2 and a value at stage 3. Between stages 4 and 5 is another shuffle-and-add network, and again each datum at stage 5 is the result of exactly two data items at stage 4. Stage 6 is a scaled version of stage 5, involving scaling constants 2 cos (pi/4), 2 cos (pi/8), 2 cos (3pi/8) and 1. Stage 7 data are composed of scaled stage 6 data and summations requiring reference to stage 5 data. Finally, between stage 8 and stage 7 is another shuffle-and-add network, each datum at stage 8 is the result of summation of two data items at stage 7.

According to the present invention as shown in FIG. 7e, the algorithm for the inverse transform (IDCT) follows closely an 8-stage flow network as in the forward transform, except that scaling between stages 2 and 3 involves additionally the constants 2 cos (pi/8) and 2 cos (3pi/8), and the shuffle-and-add results at stages 4 and 7 involve values from their respective immediately previous stage, rather than requiring reference to two stages. Hence, with accommodation for the differences noted in the above, it is feasible to implement the forward and inverse algorithms with the same 8-stage processor.

Because no shuffle-and-add in the data flow involves more than two values from the previous stage, these algorithms may be implemented in two 8-stage pipelines with cross-over points where shuffle-and-add operations are required.

FIG. 7a shows the hardware implementation of the flow diagrams in FIGS. 15d and 15e derived above in the discussion of filter implementation. The two 8-stage pipelines shown in FIG. 7a implement, during compression, the filter tree of FIG. 15b in the following manner: operations between stages 1 and 2 implement the first level filters 1501 and 1502; operations between stages 2–8 implement the second level filters 1503–1506; and, between stages 5–8 implement the third level filters 1507–1514. As explained above, the operation of each of the filters 1515–1530 corresponds to the last multiplication step in each pixel. This last multiplication step is performed inside the quantizer 108 (FIG. 1).

The DCT/IDCT processor unit 106 is implemented by two data paths 700*a* and 700*b*, shown respectively in the upper and lower portions of FIG. 7a. Data may be transferred from one data path to the other via multiplexors such as 709, 711*t*, 722*t*, 722*b*, 731*t*, or 733*t*. Adders 735*t* and 735*b* also combine input data from one data path with input data in the other data path. Control signals in the data path are data-independent, providing proper sequencing of data in accordance with the DCT or IDCT algorithms shown in FIGS. 7b and 7e. All operations in the DCT/IDCT processor 106 shown in FIG. 7a involve 16-bit data. Adders in the DCT/IDCT processor unit 106 perform both additions and subtractions.

The two pairs of 16-bit input data are first latched into latches 701*t* ("A" register) and 701*b* ("B" Register). The adders 702*t* and 702*b* combine the respective 16-bit data in the A and B registers. The "A" and "B" latches each holds two 16-bit data words. The A and B registers are the stage 1 latches shown in FIGS. *7b* and *7e*. The results of the additions in adders 702*t* and 702*b* are latched respectively into the latches 703*t* and 703*b* (stage 2 latches). The datum in latch 703*t* is simultaneously latched by latch 707*t*, and multiplied by multiplier 706 with a constant stored in latch 705, which is selected by multiplexor 704. The constant in latch 705 is either 1, 2 cos (pi/4), 2 cos (3pi/8) or 2 cos (pi/8). The result of the multiplication is latched into latch 708*t* (a stage 3 latch).

Alternatively, the datum in latch 703*t* may be latched by latch 707*t* to be then selected by multiplexor 709 for transferring the datum into data path 700*b*. 2:1 Multiplexor 709 may alternatively select the datum in latch 708*t* for the transfer. The datum in 703*b* is delayed by latch 707*b* before being latched into 708*b* (a stage 3 latch). This datum in 708*b* may either be added in adder 710 to the datum selected from the data path 700*a* by multiplexor 709 and then latched into latch 712*b* through multiplexor 711*b* or be passed into data path 700*a* through 2:1 multiplexor 711*t* and be latched by latch 712*t* (a stage 4 latch), or be directly latched into 712*b* (a stage 4 latch) through multiplexor 711*b*.

The datum in latch 708*t* may be selected by multiplexer 711*t* to be latched into latch 712*t*, or as indicated above, passed into data path 700*b* through multiplexor 709. The data in latches 712*t* and 712*b* may each pass over to the opposite data path, 700*b* and 700*a* respectively, selected by 2:1 multiplexors 713*t* and 713*b* into latches 714*t* or 714*b* respectively. Alternatively, the data in latches 712*t* and 712*b* may be latched in their respective data path 700*a* and 700*b* into latches 714*t* or 714*b* through multiplexors 713*t* and 713*b*.

A series of latches, 715*t* through 720*t* in data path 700*a*, and 715*b* to 719*b* in data path 700*b*, are provided for temporary storage. Data in these latches are advanced one latch every clock cycle, with the content of latches 720*t* and 719*b* discarded, as data in 719*t* and 718*b* advance into latches 720*t* and 719*b*. In data path 700*a*, the 5:1 multiplexor 721*t* may select any one of the data in the latches 715*t* through 718*t*, or from 714*t*, as an input operand of adder 723*t*. 5:1 multiplexor 722*t* selects a datum in any one of 714*t*, 716*t* through 718*t* or 720*t* as an input operand into adder 723*b* in data path 700*b*. Similarly, in data path 700*b*, 3:1 multiplexor 722*b* selects from latches 716*b*, 717*b*, and 719*b* an input operand into adder 723*t* in data path 700*a*. 5:1 multiplexor 721*b* selects one datum from the latches 715*b* through 719*b*, as an input operand to adder 723*b*.

The results of the summations in adders 723*t* and 723*b* are latched into latches 724*t* and 724*b* (stage 5 latches) respectively. The datum in latch 724*t* may be multiplied by multiplier 727 to a constant in latch 726, which is selected by 4:1 multiplexor 725, from among the constants 1, 2 cos (pi/8), 2 cos(3pi/8), or 2 cos(pi/4). Alternatively, the datum in latch 724*t* may be latched into latch 730 after a delay at latch 728*t*. The result of the multiplication is stored in latch 729*t* (a stage 6 latch). The 2:1 multiplexor 731*t* may channel either the datum in latch 729*t* or in latch 730 as an input operand of adder 732 in data path 700*b*. The datum in latch 729*t* can also be passed to latch 734*t* (a stage 7 latch) through 2:1 multiplexor 733*t*.

The datum in latch 724*b* is passed to latch 728*b*, which is then either passed to adder 732 through 2:1 multiplexor 731*b*, to be added to the datum selected by 2:1 multiplexor 731*t*, or passed to latch 729*b* (a stage 6 latch). The datum in latch 729*b* may be passed to data path 700*a* by 2:1 multiplexor 733*t*, or passed as operand to adder 732 through 2:1 multiplexor 731*b*, to be added to the datum selected by 2:1 multiplexor 731*t*, or be passed to latch 734*b* (stage 7 latch) through 2:1 multiplexor 733*b*.

Adders 735*t* and 735*b* each add the data in latches 734*t* and 734*b*, and deliver the results of the summation to latches 736*t* and 736*b* (both stage 8 latches) respectively. The data in latches 736*t* and 736*b* leave the DCT/IDCT processor 106 through latches 738*t* and 738*b* respectively, after one clock delay at latches 737*t* and 737*b* respectively.

Multipliers 706 and 727 each require two clock periods to complete a multiplication. Each multiplier is provided an internal latch for storage of an intermediate result at the end of the first clock period, so that the input multiplicand need only be stable during the first clock period at the input terminals of the multiplier. Both during compression and decompression, every four clock periods a new row or a column of data (eight values) are supplied to the DCT/IDCT Processor Unit 106 two values at a time. Hence, the control signals inside the DCT/IDCT Processor Unit 106 repeats every four clock periods.

Operation of DCT/IDCT Processor Unit During Compression

Having described the structure of the DCT/IDCT processor unit 106, the algorithms implemented are next described in conjunction with FIGS. *7b*, *7c* and *7d* for compression mode, and in conjunction with FIGS. *7e*, *7f* and *7g* for decompression mode.

The DCT/IDCT processor unit 106 calculates a 1-dimensional discrete cosine transform for one row (eight values) of pixel data during compression, and calculates a 1-dimensional inverse discrete cosine transform for one column (eight values) of pixel data during decompression.

FIG. *7b* is a flow diagram representation of the DCT algorithm for a row of input data during compression mode. FIG. *7c* shows the implementation of the DCT algorithm shown in FIG. *7b* in accordance with the present invention. FIG. *7d* shows the timing of the control signals for implementing the algorithm as illustrated in FIG. *7b*.

The input data entering the DCT/IDCT processor 106 (FIG. 1) are either selected from the block memory unit 103, or from DCT row storage unit 105; the sequence in which a row of data from either source is presented to the DCT/IDCT processor 106 is described above in conjunction with the description of DCT input select unit 104.

Accordingly, at clock period 0, elements x(2) and x(5) are latched into latch 701*t*, and elements x(1) and x(6) are latched into latch 702*b*.

At the next clock period 1, the results of the sum $y3=x(2)+x(5)$, and the difference $y7=x(1)-x(6)$, are latched into latches 703*t* and 703*b* respectively.

At clock period 2, elements x(3) and x(4), x(0) and x(7) are latched into latches 701*t* and 701*b* respectively. At the same time, data y3 and y7 are advanced to latches 707*t* and 707*b*, and y3 and y7 are replaced at latches 703*t* and 703*b* by the difference $y6=x(2)-x(5)$ and the sum $y2=x(1)+x(6)$ respectively.

At clock period 3, data y3 and y7 are advanced to latches 708*t* and 708*b* as data w3 and w7 respectively. At the same time, data y6 and y2 are advanced to latches 707*t* and 707*b*. Latches 703*t* and 703*b* now contains respectively, the sum $y4=x(3)+x(4)$, and the difference $y8=x(0)-x(7)$, resulting from operations at adders 702*t* and 702*b* respectively.

At clock period 4, data y4 and y8 advance to latches 707*t* and 707*b*, while latches 703*t* and 703*b* now contain the difference $y5=x(3)-x(4)$, and the sum $y1=x(0)+x(7)$. Multiplier 706 multiplies constant 2 cos(pi/4) to datum y6 to form datum w6 to be latched by latch 708*t*, and datum y2 advances to latch 708*b* as w2. Datum w3 advances to latch 712*t* and is renamed z3. At the same time, the difference $z7=w7-y6$ is latched into 712*b*.

Figures 2, 7F:
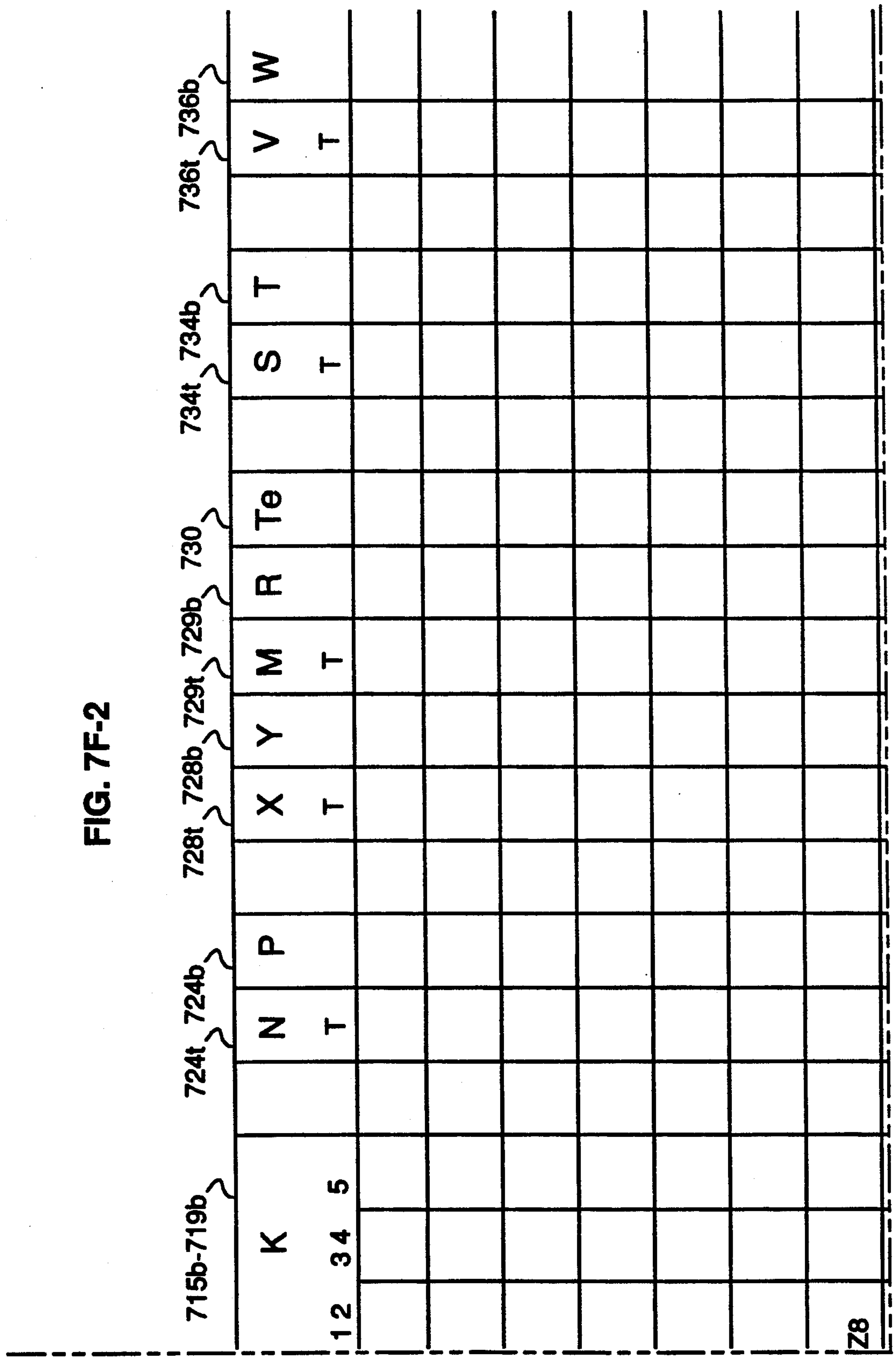
Figures 4, 7F:
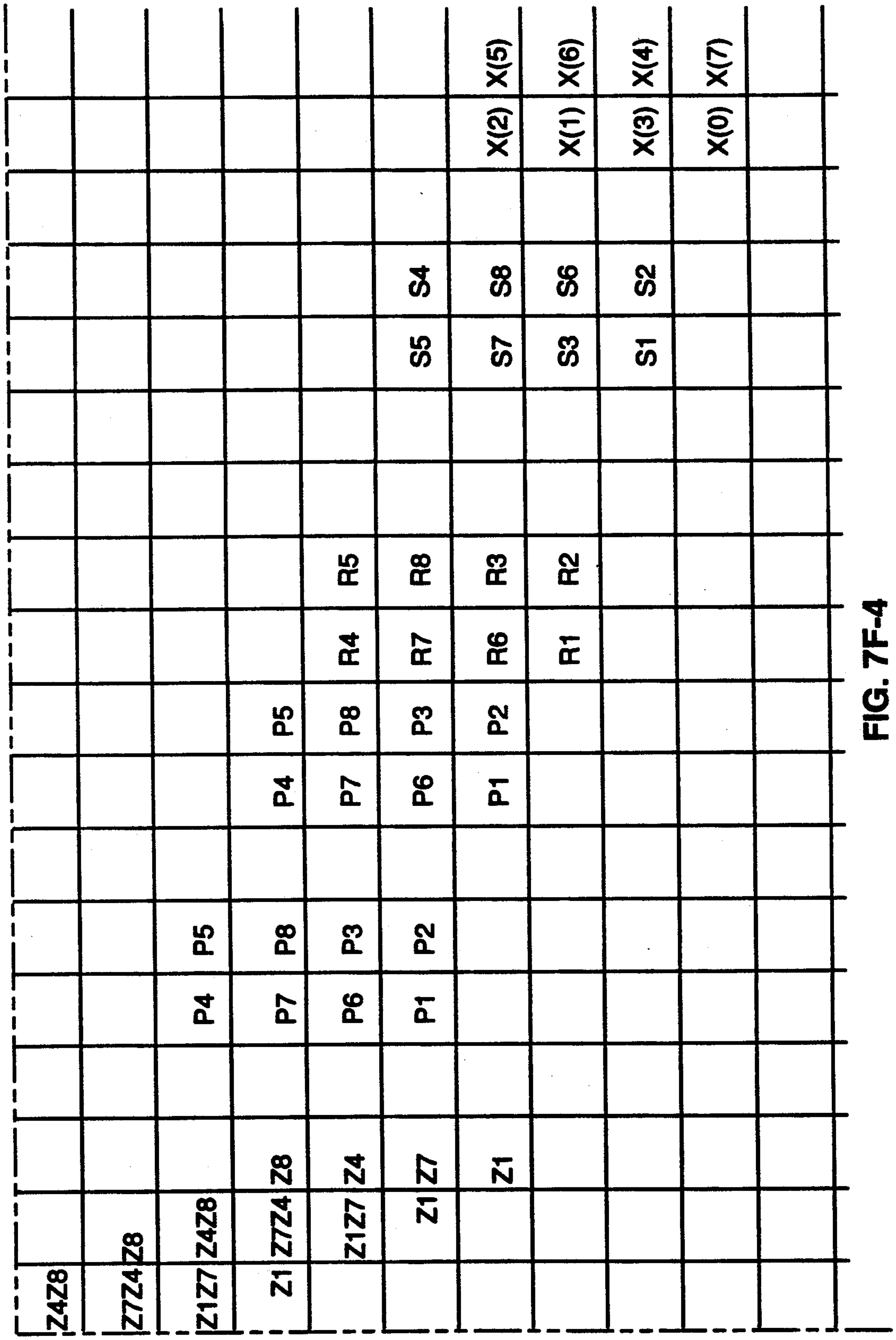

It should be noted that the data is continuously being brought into the DCT/IDCT processor unit 106. Although FIG. 7*c*, and likewise FIG. 7*f*, shows no data for clock periods 4–16 residing in latches 701*t* and 701*b*, it is so shown for clear presentation to the reader. In fact, a new row or column (eight values) is brought into the DCT/IDCT processor 105 every four clock cycles. These rows or columns are alternatively selected from either DCT row storage unit 105 or block memory unit 103. For example, if the data brought into DCT/IDCT processor unit 106 during clock periods 0–3 are selected from block memory unit 103, the data brought into DCT/IDCT processor unit 106 during clock period 4–7 is from the DCT row storage unit 105. In other words, the pipelines are always filled.

At clock period 5, data y5 and y1 advance to 707*t* and 707*b*; data y4 and y8 advance to latches 708*t* and 708*b* to become w4 and w8 respectively; data z3 and z7 advance to latches 714*t* and 714*b* respectively; and, data w6 and w2 advance to latches 712*t* and 712*b* respectively to become z6 and z2.

At clock period 6, data z3 and z7 advance to latches 715*t* and 715*b* respectively; data z6 and z2 advance to latches 714*t* and 714*b* respectively; datum w4 advance to latch 712*t* and becomes z4, and $z8=w8-y5$ is latched into 712*b* as a result of subtraction at adder 710. At the same time, datum y1 is latched at latch 708*b* as w1, datum y5 has completed multiplication at multiplier 706 with the constant 2 cos(pi/4) and latched at latch 708*t*.

At clock period 7, all data advance to the next latch in their respective data paths, to result in data z4, z6 and z3 in latches 714*t*, 715*t* and 716*t* respectively, and z8, z2 and z7 in latches 714*b*, 715*b*, and 716*b* respectively. The data w5 and w1 advance to latches 712*t* and 712*b* as data z5 and z1 respectively.

At clock period 8, all data advance one latch in their respective data path, so that data z1 through z8 are each stored in one of the temporary latches 714*t* through 720*t* in the 700*a* data path, or 714*b* through 719*b* in the data path 700*b*.

At clock period 9, multiplexors 721*t* and 722*b* select data z5 and z7 to input of adder 723*t*; the result of the sum $p7=z5+z7$ is latched into latch 724*t*. At the same time, multiplexors 722*t* and 721*b* select data z6 and z8 for adder 723*b*; the result of the sum $p8=z6+z8$ is latched into latch 724*b*.

At clock period 10, while data p7 and p8 advance to latches 728*t* and 728*b* respectively, multiplexors 721*t*, 721*b*, 722*t* and 722*b* select z1, z2, z3 and z4 for adders 723*t* and 723*b*, such that the results $p3=z2-z3$, $p4=z1-z4$ are latched into 724*t* and 724*b* respectively.

At clock period 11, the results of adders 723*t* and 723*b*, respectively, $p5=z7-z5$ and $p6=z8-z6$, are latched into latches 724*t* and 724*b*. At the same time, p3 and p4 are advanced to latches 728*t* and 728*b* respectively. P3 is present at the input terminals of multiplier 727. Datum p7 has, in clock period 9, been present at the input terminals of multiplier 727, has now completed the multiplication at multiplier 727 with constant 2 cos(pi/8) to yield r7, which is latched at latch 729*t*. A copy of datum p7 is advanced to latch 730, while datum p8 is advanced to latch 729*b* as r8.

At clock period 12, results of adders 723*t* and 723*b*: respectively, $p1=z1+z4$ and $p2=z2+z3$ are latched into latches 724*t* and 724*b*. Data p5 and p6 are advanced to 728*t* and 728*b* respectively. Datum p1 is also present at the inputs of multiplier 727. Datum p3 is advanced to latch 730, while p3 has completed the multiplication at multiplier 727 with constant 2 cos (pi/4) to yield r3, which is latched into latch 729*t*. The datum p4 is advanced to latch 729*b* as r4. At the same time, datum r7 is advanced to 734*t* as s7. The result of adder 732, corresponding to $s8=r8-p7$, is latched at latch 734*b*. Z5, z4 and z6 are advanced one latch to the J latches 718*t*, 719*t* and 720*t* while z1 and z8 are advanced one latch to the K latches 718*b*, 719*b* while z2 is lost (no latch is available to receive z2 when it is shifted out of latch 719*b*).

At clock period 13, Data p1 and p2 are advanced to 728*t* and 728*b* respectively. Datum p1 is present at the inputs of multiplier 727 at clock period 12. Datum p5 is advanced to latch 730, while p5, which is present during the clock period 11 at the inputs of multiplier 727, has also completed a multiplication by constant 2 cos (3pi/8) at multiplier 727, to yield datum r5, which is latched into latch 729*t*. Datum p6 is advanced to latch 729*b* as r6. Datum r3 is advanced through multiplexor 733*t* to latch 734*t* as s3. The result at adder 732, $s4=r4-p3$ is latched into latch 734*b*. The first DCT output data $X(1)=s7+s8$ and $X(7)=s8-s7$ are provided by adders 735*t* and 735*b*, respectively, and are latched into latches 736*t* and 736*b* respectively. Z5 and z4 are shifted to latches 719*t* and 720*t*, respectively, and z1 is shifted to latch 719*b* while z8 is shifted out of latch 719*b* and lost.

At clock period 14, datum p1 in 728*t* is advanced into latch 730, datum p1 is advanced to latch 729*t* through multiplier 727 as r1, datum p2 is advanced to latch 729*b* as r2, and datum r5 is advanced from latch 729*t* to latch 734*t* as s5. Latch 734*b* holds adder 732's result $s6=r6-p5$. DCT outputs $X(2)=s3+s4$ and $X(6)=s4-s3$ are latched into latches 736*t* and 736*b*, respectively. The results of X(1) and X(7) of clock period 13 are advanced to latches 737*t* and 737*b* respectively.

At clock period 15, data r1 and r2 are advanced to latch 734*t* and 734*b* as s1 and s2 respectively. DCT output data $X(3)=s5+s6$ and $X(5)=s6-s5$ are computed by adders 735*t* and 735*b*, respectively, and are available at latches 736*t* and 736*b*, respectively. The prior results X(2), X(6), X(1) and X(7) are advanced to latches 737*t*, 737*b*, 738*t* and 738*b* respectively.

At clock period 16, the last results of this row $X(0)=s1+s2$ and $X(4)=s1-s2$ are computed by adders 735*t* and 735*b*, respectively, and latched into latches 736*t* and 736*b* respectively. The output X(1) and X(7) are available at the input of the DCT row/column separator unit 107, for either storage in the DCT row storage unit 105, or to be forwarded to the quantizer unit 108, dependent respectively on whether X(0) . . . X(7) are first-pass DCT output (row data) or second-pass DCT output (column data). DCT output X(3), X(5), X(2) and X(6) are respectively advanced to latches 737*t*, 737*b*, 738*t*, and 738*b*.

At the next 3 clock periods, the pairs X(2)–X(6), X(3)–X(5), and X(0)–X(4) are successively available as output data of the DCT/IDCT processor unit 106 for input into DCT row/column separator unit 107.

FIG. 7*d* shows the control signals for the multiplexer and address of FIG. 7*a* during the 16 clock periods. Each control signal is repeated every four clock cycles.

Operation of DCT/IDCT Processor During Decompression

The operation of DCT/IDCT processor unit 106 in the decompression mode is next described in conjunction with FIGS. 7*a*, 7*e* and 7*f*.

At clock period 0, data X(1) and X(7) are presented at the top and bottom latches, respectively, of each of "A" and "B" registers (latches 701*t* and 701*b*). Data X(1) and X(7) are selected by DCT input select unit 104 from either the quantizer unit 108 or the DCT row storage unit 105, as discussed above.

At clock period 1, data X(3) and X(5) are respectively presented at both top and bottom latches of latches 701*t* and 701*b*. At the same time, latches 703*t* and 703*b* latch respectively $y8=X(1)-X(7)$ and $y2=X(1)+X(7)$.

At clock period 2, data X(2) and X(6) are respectively presented at both top and bottom latches of latches 701*t* and 701*b* in the same manner as input data from the last two clock periods 0–1. The results y8 and y2 have advanced to latches 707*t* and 707*b*, and latches 703*t* and 703*b* latch the result $y6=X(3)-X(5)$ and $y4=X(3)+X(5)$ respectively from adders 702*t* and 702*b*.

At clock period 3, the input data at both the top and bottom latches of latches 701*t* and 701*b* are respectively X(0) and X(4). Results $y7=X(2)-X(6)$ and $y3=X(2)+X(6)$ are latched at latches 703*t* and 703*b*. At the same time, y8, which was present at the inputs of multiplier 706 at clock period 1 is scaled by multiplier 706 with the constant 2 cos (pi/8) as w8 and latched into latch 708*t*, while y2 is advanced to and stored in latch 708*b* as w2. Y6 is transferred to latch 707*t* after serving as input to multiplier 706 during clock period 3. Y4 is transferred to latch 707*b*.

At clock period 4, w2 is advanced to latch 712*t* as z2, and adder 710 subtracts w2 from w8 to form z8 which is latched into latch 712*b*. The datum y4 is advanced to latch 708*b* as w4, and datum y6 which is present at the inputs of multiplier 706 at clock period 2, is scaled by multiplier 706 with the constant 2 cos (3pi/8) to yield w6 latched into latch 708*t*. Data y7 and y3 are advanced to latches 707*t* and 707*b* respectively. The latches 703*t* and 703*b* contain respectively the results $y5=X(0)-X(4)$ and $y1=X(0)+X(4)$. Y5 is now input to multiplier 706.

At clock period 5, z2 and z8 are advanced to latches 714*t* and 714*b*, while w4 has crossed over to data path 700*a* via 2:1 multiplexor 711*t* and is latched at latch 712*t* as z4. Adder 710 subtract w4 from w6, the result being latched as z6 at latch 712*b*. At the same time, datum y7 is scaled by 2 cos(pi/4) to become datum w7 and then advanced to latch 708*t*. Y3 is advanced to and stored in latch 708*b* as w3 and y5 and y1 are advanced to latches 707*t* and 707*b* respectively.

At clock period 6, y5 (scaled by unity) and y1 are advanced to latches 708*t* and 708*b* respectively as w5 and w1. Datum w3 crosses over to data path 700*a* and is latched as z3 at latch 712*t*, and adder 710 subtracts w3 from w7 to yield z7 latched at latch 712*b*. Z6 is transferred from latch 712*b* through multiplexor 713*t* to latch 714*t*. Z4 is transferred from latch 712*t* through multiplexor 713*b* to latch 714*b*. Z2 is advanced from latch 714*t* to latch 715*t* while z8 is advanced from latch 714*b* to latch 715*b*.

At clock period 7, w5 and w1 are advanced to latches 712*t* and 712*b* as z5 and z1 respectively, and data z3, z7, z6, z4, z2 and z8 are advanced to latches 714*t*, 714*b*, 715*t*, 715*b*, 716*t* and 716*b*, respectively.

At clock period 8, z5, z1, z3, z7, z6, z4, z2, and z8 are advanced to latches 714*t*, 714*b*, 715*t*, 715*b*, 716*t*, 716*b*, 717*t* and 717*b*, respectively.

At clock period 9, z5, z1, z3, z7, z6, z4, z2, and z8 are advanced to latches 715*t*, 715*b*, 716*t*, 716*b*, 717*t*, 717*b*, 718*t* and 718*b*. At the same time, multiplexors 721*t* and 722*b* select data z2 and z4, respectively, into adder 723*t* to yield the result $p4=z2-z4$ which is latched into latch 724*t*. Likewise, multiplexors 722*t* and 721*b* select data z5 and z7, respectively, into adder 723*b* to yield the result $p5=z5-z7$, which is then loaded into latch 724*b*.

At clock period 10, multiplexors 721*t* and 722*b* select data z5 and z7, respectively, into adder 723*t* to yield the result $p7=z5+z7$, which is loaded into latch 724*t*. At the same time, multiplexors 722*t* and 721*b* select data z6 and z8, respectively, into adder 723*b* to yield the result $p8=z6+z8$, which is then loaded into latch 724*b*.

Data p4 and p5 from latches 724*t*, 724*b* are advanced to latch 728*t* and 728*b* respectively. The data z5, z3, z6 and z2 in latches 715*t*–718*t* are advanced one latch to 716*t*–719*t*, respectively. Similarly, data z1, z7, z4 and z8 are advanced to 716*b*–719*b*, respectively.

At clock period 11, the results of adders 723*t* and 723*b* $p6=z8-z6$ and $p3=z1-z3$ are latched at latches 724*t* and 724*b*, the operands z8, z6, z1 and z3 being selected by 722*b*, 721*t*, 721*b* and 722*t*, respectively. Data p7 and p8 are advanced to latches 728*t* and 728*b* respectively. At the same time, p4, having been presented as input to multiplier 727 at clock period 9, is scaled by multiplier 727 with a constant 2 cos (pi/4) and latched as r4 at latch 729*t*, and p5 is advanced from latch 728*b* to latch 729*b* as r5. The data in latches 716*t*–719*t*, and 716*b*–719*b* are each advanced one latch to 717*t*–720*t* and 717*b*–720*b*, respectively. Datum z8 in latch 719*b* is discarded.

At clock period 12, p7 and p8 are advanced to latches 729*t* and 729*b* respectively as r7 and r8. Data p6 and p3 are advanced to latches 728*t* and 728*b* respectively. Datum r5 is advanced to latch 734*t* via multiplexor 733*t* as s5; r4 crosses over to data path 700*b*, and is subtracted r8 by adder 732 to yield s4 and is latched at latch 734*b*. At the same time, data z1 and z3 are selected by multiplexors 722*b* and 721*t*, respectively, into adder 723*t* to yield result $p1=z1+z3$ which is latched into latch 724*t*. Likewise, data z2 and z4 are selected by multiplexors 722*t* and 721*b*, respectively, into adder 723*b* to yield result $p2=z2+z4$ which is latched into latch 724*b*.

At clock period 13, data p1 and p2 are advanced to latches 728*t* and 728*b* respectively. Datum p6, which served as input to multiplier 727 during clock period 11, is scaled by multiplier 727 with a constant 2 cos (pi/4) and latched as r6 at latch 729*t*, and datum p3 is advanced from latch 728*b* to latch 729*b* as r3. Data r7 and r8 are advanced to latches 734*t* and 734*b* respectively as s7 and s8. Adders 735*t* and 735*b* operated on s5 and s4, which are respectively in latches 734*t* and 734*b* in clock period 12, to yield respectively IDCT results $x(2)=s4+s5$ and $x(5)=s5-s4$, and latched into latches 736*t* and 736*b* respectively.

At clock period 14, data p1 and p2 are advanced to latches 729*t* and 729*b* as r1 and r2. Datum r6 crosses over to data path 700*b* through multiplexor 731*t*, and is then subtracted r2 by the adder 732 to yield the result s6, which is latched by latch 734*b*. Datum r3 crosses over to data path 700*a* through multiplexor 733*t* and is latched by latch 734*t* as s3. IDCT results $x(1)=s7+s8$ and $x(6)=s7-s8$ are computed by adder 735*t* and 735*b* respectively and are latched into latches 736*t* and 736*b* respectively. The previous results x(2) and x(5) are advanced to latches 737*t* and 737*b* respectively.

At clock period 15, r1 and r2 are advanced to latches 734*t* and 734*b* respectively as s1 and s2. IDCT results $x(3)=s3+s6$ and $x(4)=s3-s6$ are computed by adders 735*t* and 735*b* respectively and are latched at latches 736*t* and 736*b*. The prior results x(1), x(6), x(2), x(5) are advanced to latches 737*t*, 737*b*, 738*t* and 738*b*.

At clock period 16, IDCT results $x(0)=s1+s2$ and $x(7)=s1-s2$ are computed by adders 735*t* and 735*b* respectively and are latched into latches 736*t* and 736*b*. IDCT results x(2) and x(5) latches 738*t* and 738*b* respectively are latched into the DCT row/column separator unit 107. X(2) and x(5) are then channeled by the DCT row/column separator to the block memory unit 103, or DCT row storage unit 105 dependent upon whether the IDCT results are first-pass or second pass-results.

IDCT output pairs x(1)–x(6), x(3)–x(4) and x(0)–x(7) are available at the DCT row/column separator unit 107 at the next 3 clock periods.

FIG. 7*g* shows the control signals for the adders and multiplexors of the DCT/IDCT Processor 106 during decompression. Again these control signals are repeated every four clock cycles.

Structure and Operaton of the DCT Row/Column Separator Unit 107

The DCT Row/Column Separator separates the output of the DCT/IDCT Processor 106 into two streams of the data, both during compression and decompression. One stream of data represents the intermediate first-pass result of the DCT or the IDCT. The other stream of data represents the final results of the 2-pass DCT or IDCT. The intermediate first-pass results of the DCT or IDCT are streamed into DCT Row storage unit 105 for temporary storage and are staged for the second pass of the 2-pass DCT or IDCT. The other stream containing the final results of the 2-pass DCT or IDCT is streamed to the quantizer 108 or DCT block memory 103, dependent upon whether compression or decompression is performed. The DCT Row/Column Separator is optimized for 4:2:2 data format such that a 16-bit datum is forwarded to the quantizer 108 or DCT block memory 103 every clock period, and a row or column (eight values) of intermediate result is provided in four clock periods every eight clock periods.

Figures 1, 8A:
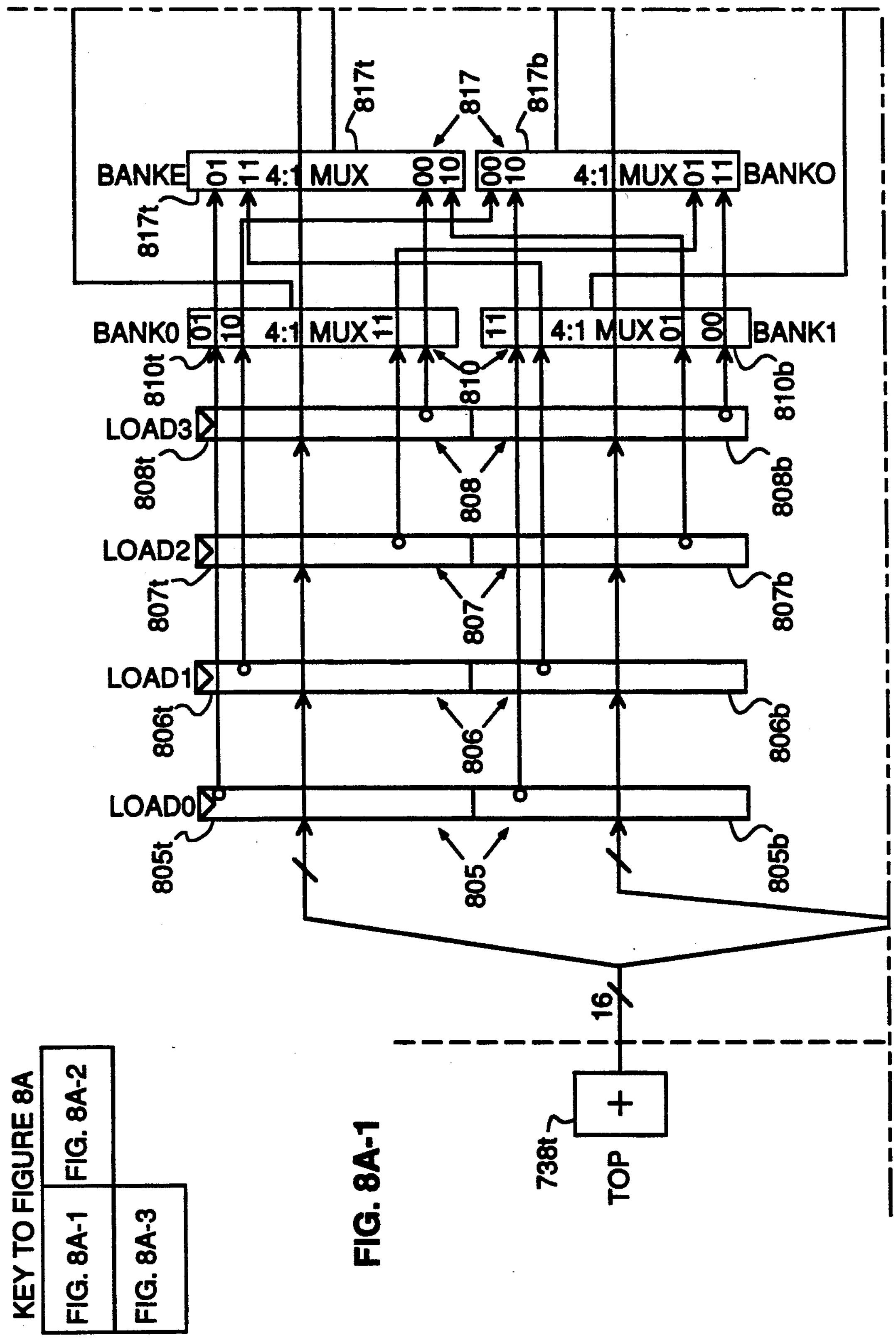
Figures 2, 8A:
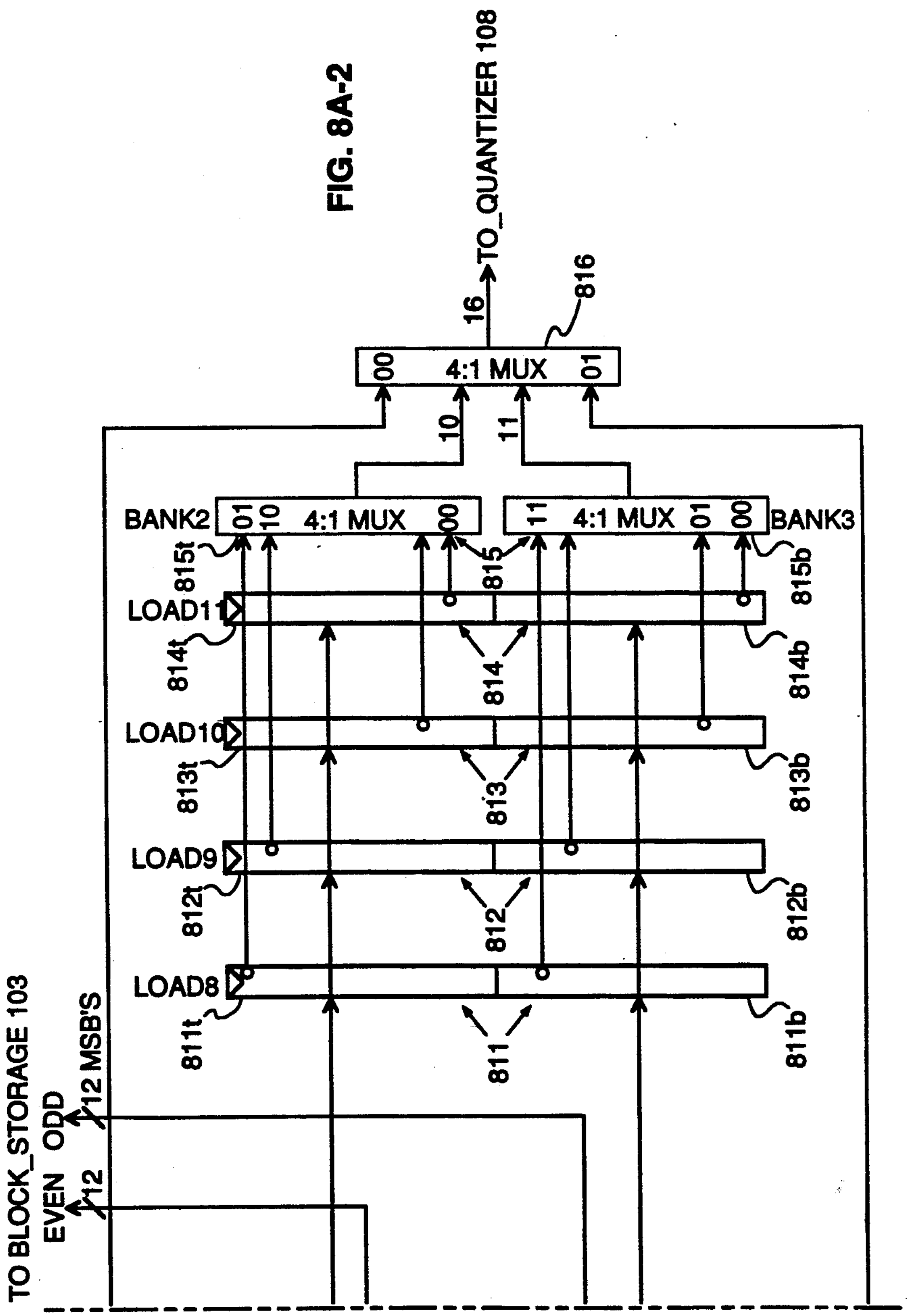
Figures 3, 8A:
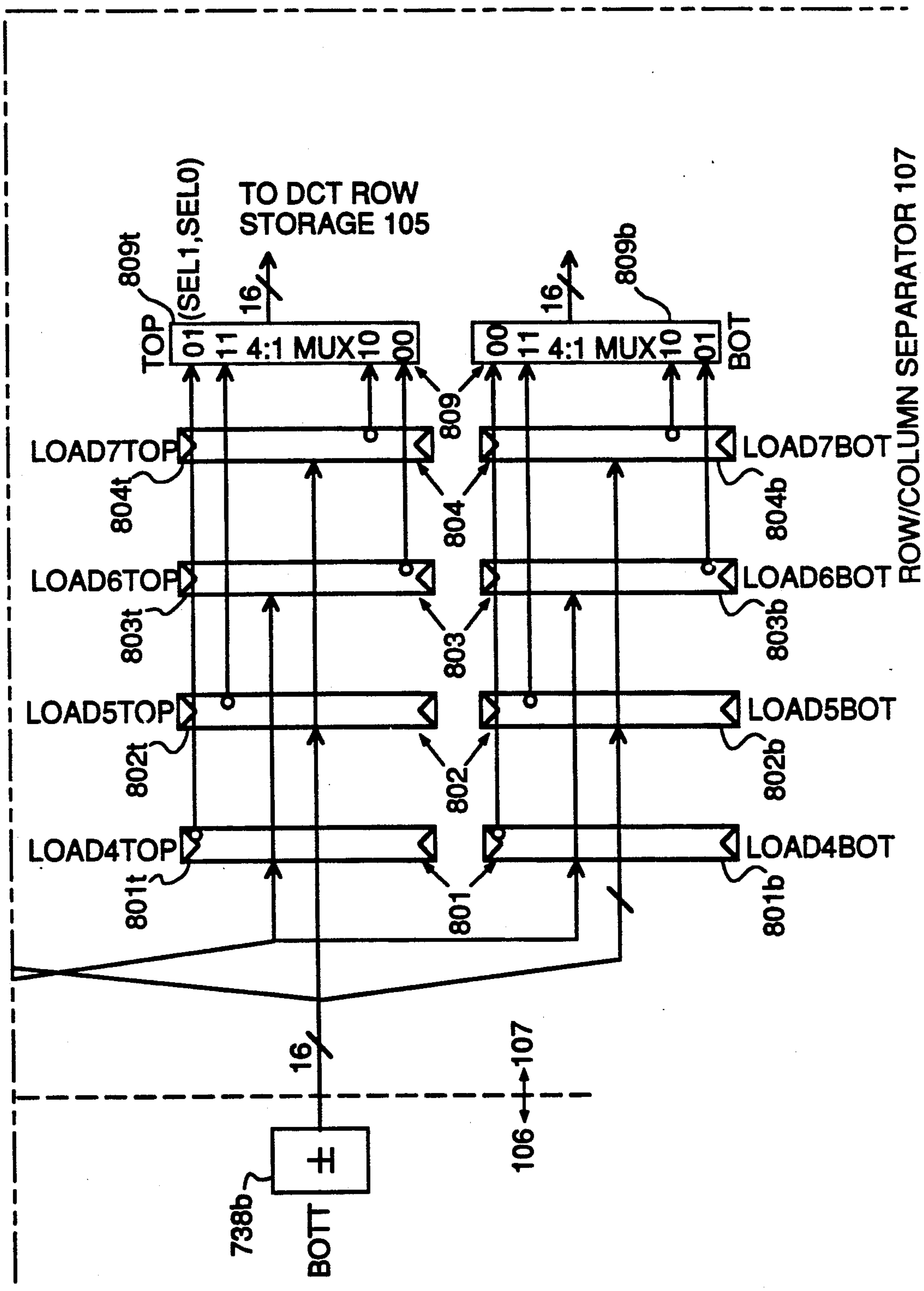
Figures 5, 8B:
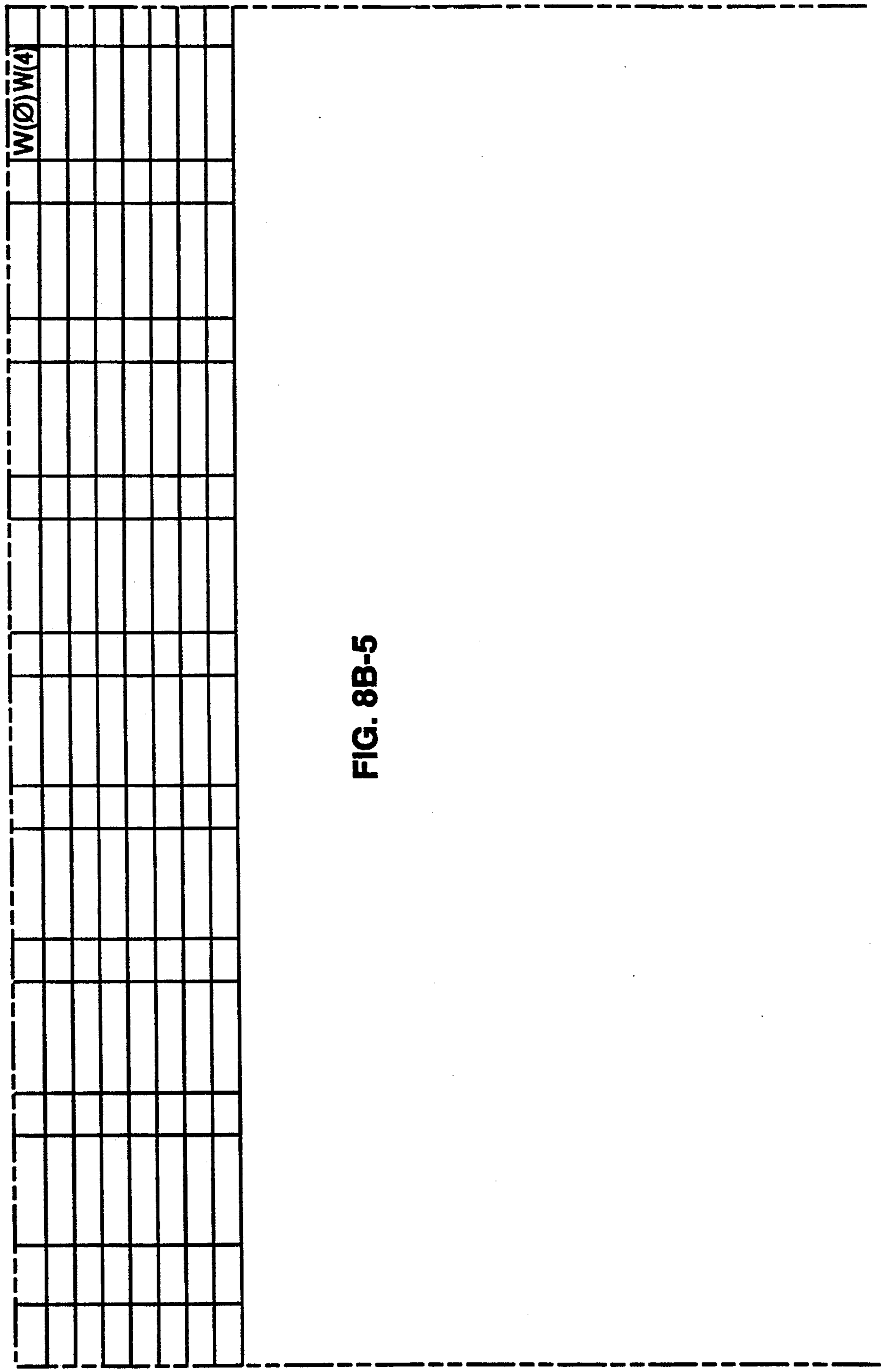
Figures 4, 8C:
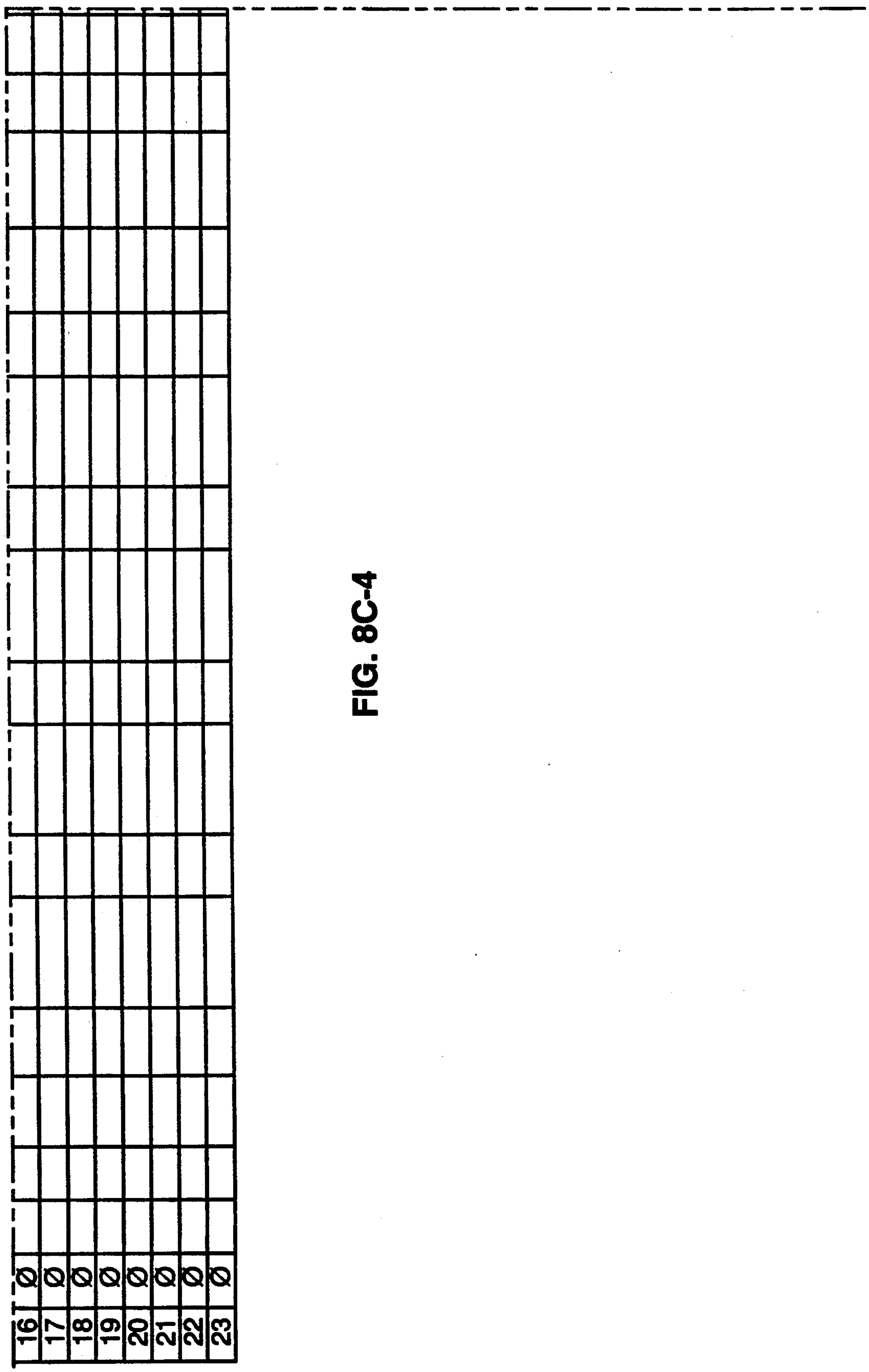
Figures 5, 8C:
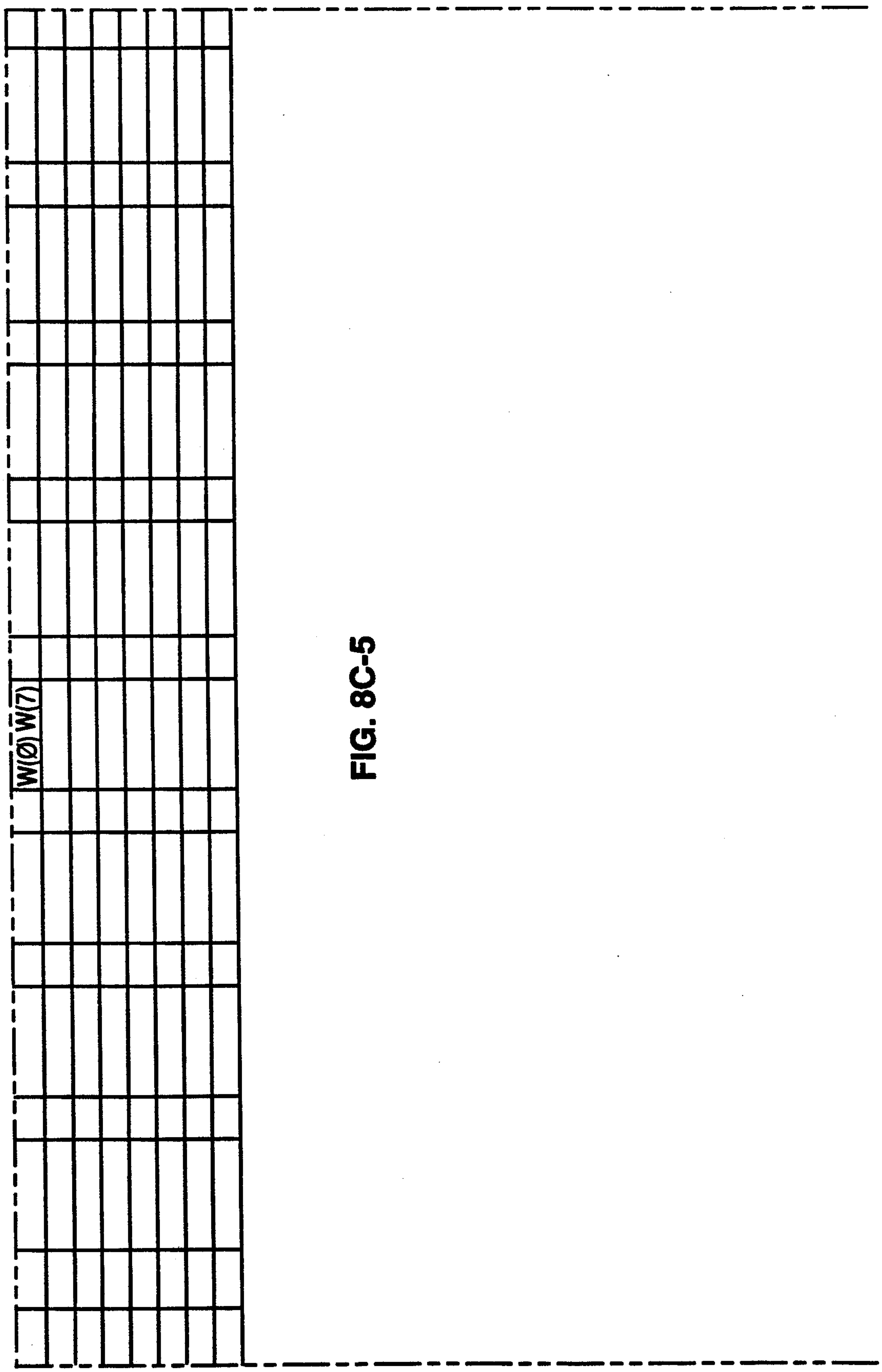

The structure and operation of the DCT row/column separator unit (DRCS) 107 are next described in conjunction with FIGS. 8*a*, 8*b* and 8*c*.

FIG. 8*a* shows a schematic diagram for DRCS 107. As shown, two 16-bit data come into the DRCS unit 107 every clock period via latches 738*t* and 738*b* in the DCT/IDCT processor unit 106. Hence, a row or column of data are supplied by the DCT/IDCT processor unit 106 every four clock cycles. The incoming data are channeled to one of three latch pair groups: the DCT row storage latch pairs (801*t*, 801*b* to 804*t*, 804*b*), the first quantizer latch pairs (805*t*, 805*b* to 808*t*, 808*b*) or the second quantizer latch pairs (811*t*, 811*b* to 814*t*, 818*b*). Each of these latch pairs are made up of two 16-bit latches. For example, latch pair 801 is made up of latches 801*t* and 801*b*.

The DCT row storage latch pairs 801*t*, 801*b* to 804*t*, 804*b* hold results of the first-pass DCT or IDCT; hence, the contents of these latches will be forwarded to DCT row storage unit 105 for the second-pass of the 2-dimensional DCT or IDCT. Multiplexors 809*t* and 809*b* select the contents of two latches, from among latches 801*t*–804*t* and 801*b*–804*b* respectively, for output to the DCT row storage unit 105.

On the other hand, the data channeled into the first and second quantizer latch pairs (805*t* and 805*b* to 808*t* and 808*b*, 811*t* and 811*b* to 814*t* and 814*b*) are forwarded to the quantizer unit 108 during compression, or forwarded to the block memory unit 103 during decompression, since such data have completed the 2-dimensional DCT or IDCT. 4:1 multiplexors 810*t* and 810*b* select two 16-bit data contained in the latches 805*t*–808*t* and 805*b*–808*b*. Similarly 4:1 multiplexors 815*t* and 815*b* select two 16-bit data contained in latches 811*t*–814*t* and 811*b*–814*b*. The four 16-bit data selected by the four 4:1 multiplexors 810*t*, 810*b*, 815*t* and 815*b* are again selected by 4:1 multiplexor 816 for output to quantizer unit 108.

During compression, the first and second quantizer latch pairs (805*t* and 805*b* to 808*t* and 808*b*, 811*t* and 811*b* to 814*t* and 814*b*) form a double-buffer scheme to provide a continuous output 16-bit data stream to the quantizer 108. As the first quantizer latch pairs (805*t*, 805*b* to 808*t*, 808*b*) are loaded, the second quantizer latch pairs (811*t*, 811*b* to 814*t*, 814*b*) are read for output to quantizer unit 108. 4:1 multiplexors 810*t* and 810*b* select the two 16-bit data contained in the latches 805*t*–808*t* and 805*b*–808*b*. Similarly 4:1 multiplexors 815*t* and 815*b* select two 16-bit data contained in latches 811*t*–814*t* and 811*b*–814*b*. The four 16-bit data selected by the four 4:1 multiplexors 810*t*, 810*b*, 815*t* and 815*b* are again selected by 4:1 multiplexor 816 for output to quantizer unit 108.

During decompression, however, the second quantizer latch pairs (811*t* and 811*b* to 814*t* and 814*b*) are not used. The incoming data stream from the DCT/IDCT processor unit 106 is latched into the first quantizer latch pairs (805*t*, 805*b* to 808*t*, 808*b*). 4:1 multiplexors 817*t* and 817*b* select two 16-bit data per clock period for output to the block memory unit 103. Since only the first 12 bits of each of these selected datum is considered significant, the 4 least significant bits are discarded from each selected datum. Therefore, two 12-bit data are forwarded to block memory unit 103 every clock period.

Operation of DCT Row/Column Separator Unit During Compression

FIG. 8*b* illustrates the data flow for DCT row/column separator unit 107 (FIG. 1) during compression.

At clock periods 0–3, the first-pass DCT pairs of 16-bit data X(1)–X(7), X(2)–X(6), X(3)–X(5), X(0)–X(4) are successively made available from latches 738*t* and 738*b* in the DCT/IDCT processor unit 106, at the rate of two 16-bit data per clock period. As shown in FIG. 8*b*, during clock periods 1–4, a pair of data is separately latched as they are made available at latches 738t and 738b at the end of each clock period into two latches among latches 801t–804t and 801b–804b. Therefore, X(2) and X(1), X(6) and X(7), X(0) and X(3) and X(4) and X(5) are, as a result, stored in latch pairs 801t and 801b, 802t and 802b, 803t and 803b, and 804t and 804b, respectively by the end of clock period 4.

Also, during clock periods 0–7, data loaded into latch pairs 811t, 811b to 814t, 814b previously are output from the second quantizer latch pairs 811t, 811b to 814t, 814b at the rate of an 16-bit datum per clock period. These data were loaded into latch pairs 811–814 in the clock periods 12–15 of the last 16-clock period cycle and clock period 0 of the current 16 clock period cycle. The loading and output of the quantizer latch pairs 805t, 805b to 808t, 808b and 811t, 811b to 814t, 814b are discussed below.

During clock periods 4–7, the first-pass data in latch pairs 801t, 801b to 804t, 804b loaded in clock periods 1–4 are output to the DCT row storage unit 103, at the rate of two 16-bit data per clock period, in order of X(0)–X(1), X(2)–X(3), X(4)–X(5), and X(6)–X(7). At the same time, second-pass 16-bit data pairs Y(1)–Y(7), Y(2)–Y(6), Y(3)–Y(5), and Y(0)–Y(4) are made available at latches 738t and 738b of the DCT/IDCT processor unit 106 for transfer to the row/column separator 107 at the rate of one pair of two data every clock period. These data are latched successively and in order into the first quantizer latch pairs 805t, 805b to 808t, 808b during clock periods 5–8.

During clock periods 8–11, the data Z(0) to Z(7) arriving from DCT/IDCT processor unit 106 are again first-pass DCT data. These data Z(0)–Z(7) arrive in the identical order as the X(0)–X(7) data during clock periods 0–3 and as the Y(0)–Y(7) data during clock period 4–7. The second-pass data Y(0)–Y(7) which arrived during clock periods 4–7 and latched into latch pairs 805t, 805b to 808t, 808b during clock periods 5–8 are now individually selected for output to quantizer unit 108 by multiplexors 810t, 810b and multiplexor 816, at the rate of a 16-bit datum per clock period, and in order Y(0), Y(1), . . . Y(7) beginning with clock period 8. The read out of Y(0)–Y(7) will continue until clock period 15, when Y(7) is provided as an output datum to quantizer 108.

During clock periods 12–15, the data W(0) to W(7) arriving from DCT/IDCT processor unit 106 are second-pass data. These data W(0)–W(7) are channeled to the second quantizer latch pairs 811t, 811b to 814t, 814b during clock periods 13 to 16, and are latched individually in the order as described above for the data Y(0-)–Y(7). During clock periods 12 to 15, the data Z(0)–Z(7) received during clock periods 8–11 and latched into latch pairs 801t, 801b to 804t, 804b during clock periods 9–12 are output to the DCT row storage unit 105 in the same order as described for X(0)–X(7) during clock periods 4–7. The W(0)–W(7) data are selected by multiplexors 815t, 815b, and 816 in the next eight clock periods (clock periods 0–7 in the next 16-clock period cycle corresponding to clock periods 16 to 23 in FIG. 8b.

Because of the DCT/IDCT Processor 106 provides alternately one row/column of first-pass and second-pass data, the latches 801t and 801b to 804t and 804b, 805t and 805b to 808t and 808b, and 811t and 811b to 814t and 814b form two pipelines providing a continuous 16-bit output stream to the quantizer 108, and a row/column of output data to the DCT row storage unit 105 every eight clock cycles. There is no idle period under 4:2:2 input data format condition in the DCT Row/Column Separator Unit 107.

Operation of DCT Row/Column Separator Unit During Decompression

FIG. 8c shows the data flow for DCT row/column separator unit 107 during decompression.

During clock periods 0–3, 16-bit first-pass IDCT data pairs are made available at latches 738t and 738b of the DCT/IDCT processor unit 106, in the order X(2)–X(5), X(1)–X(6), X(3)–X(4) and X(0)–X(7), at the rate of two 16-bit data per clock period. Each datum is latched into one of the latches 801t–804t and 801b–804b, such that X(0) and X(1), X(2) and X(3), X(4) and X(5), X(6) and X(7) are latched into latch pairs 801t, 801b, to 804t, 804b as a result during clock periods 1–4. During clock periods 0–3, second-pass IDCT data latched into the DCT row/column separator unit 107 during the four clock periods beginning at clock period 13 of the last 16-clock period cycle and ending at clock period 0 of the present 16-clock period cycle is output to block memory unit 103 at two 12-bit data per clock period by 4:1 multiplexors 817t and 817b, having the lower four bits of the 16-bit IDCT data truncated as previously discussed. The loading and transferring of second-pass IDCT data is discussed below with respect to clock periods 4–11.

During clock periods 4–7, the first-pass IDCT data in latch pairs 801t and 801b to 804t and 804b are forwarded to the DCT row storage unit 105, two 16-bit data per clock period, selected in order of latch pairs 801t, 801b to 804t, 804b. At the same time, 16-bit second-pass IDCT data are made available at latches 738t and 738b in the DCT/IDCT processor unit 106, two 16-bit data per clock period, in the order, Y(2)–Y(5), Y(1)–Y(6), Y(3)–Y(4) and Y(0)–Y(7). These 16-bit data pairs are successively latched in order into latch pairs 805t and 805b to 808t and 808b during clock period 5–8.

During clock periods 8–11, first-pass IDCT data Z(0)–Z(7) are made available at latches 738t and 738b, and in order discussed for X(0)–X(7) during clock periods 0–3. The data Z(0)–Z(7) are latched into the latch pairs 801–804 in the same order as discussed for X(0)–X(7). At the same time, second-pass IDCT data Y(0)–Y(7) latched during the clock periods 5–8 are output at 4:1 multiplexors 817t and 817b at two 12-bit data per clock period, in the order Y(0)–Y(1), Y(2-)–Y(3), Y(4)–Y(5), and Y(6)–Y(7).

During clock periods 12–15, first-pass IDCT data Z(0)–Z(7) are output to DCT row storage unit 105 in the order discussed for X(0)–X(7) during clock periods 4–7. At the same time, second-pass IDCT data W(0)–W(7) arrives from DCT/IDCT processor 106 in the same manner discussed for Y(0)–Y(7) during clock periods 4–7. The data W(0)–W(7) will be output to block memory unit 103 in the next four clock periods (clock periods 0–3 in the next 16-clock period cycle), in the same manner as discussed for Y(0)–Y(7) during clock periods 8–11. Because the DCT/IDCT processor 106 provides alternately one row/column of first-pass and second-pass data, the latches 801t and 801b to 804t and 804b, and 805t and 805b to 808t and 808b form two pipelines providing a continuous 12-bit output stream to DCT block storage 103, and a row/column of output data to the DCT row storage unit 105 every eight clock cycles. Under 4:2:2 output data format condition, there is no idle period in the DCT Row/Column Separator Unit 107.

Structure and Operation of Quantizer Unit 108

Figures 1, 9:
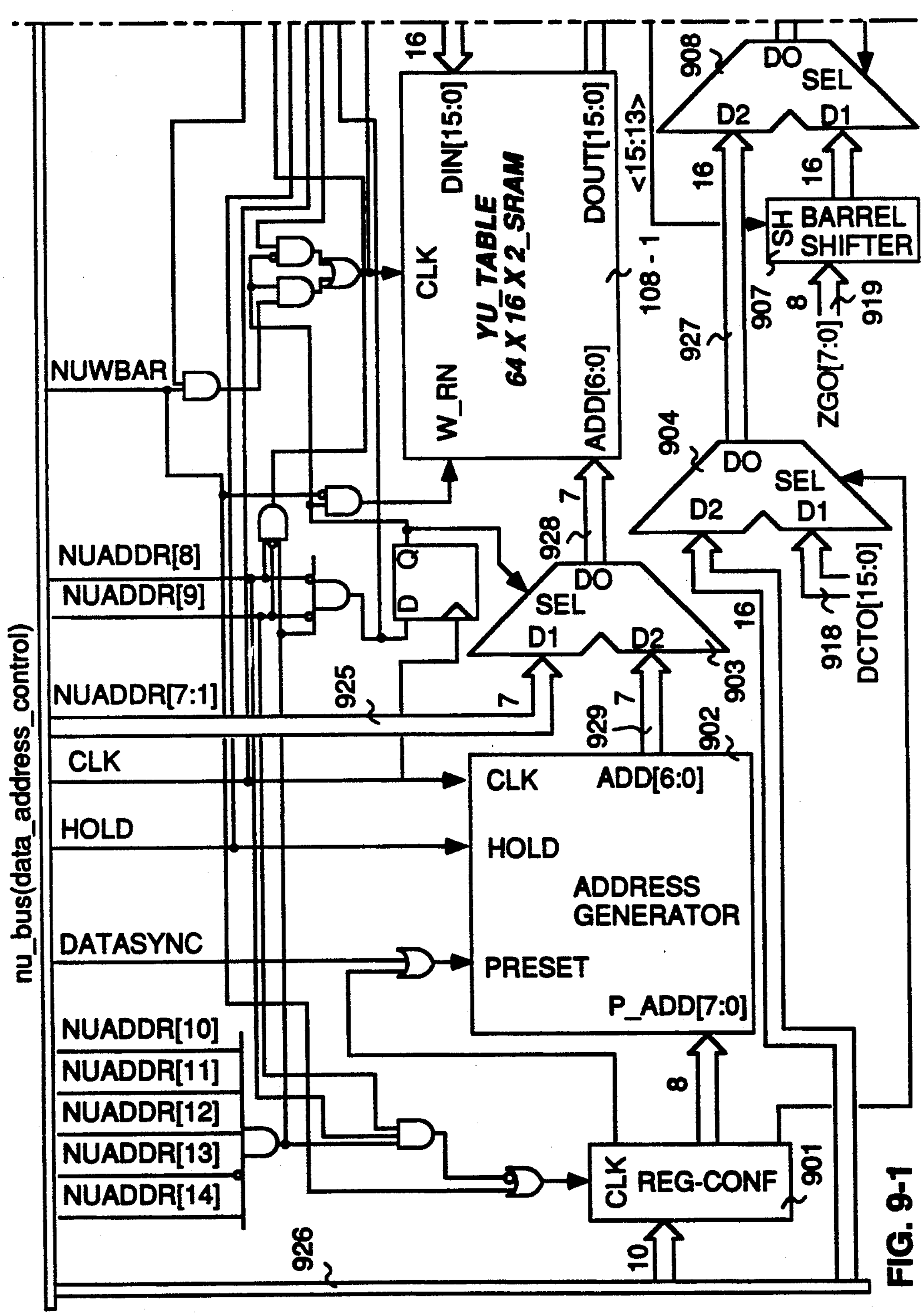
Figures 2, 9:
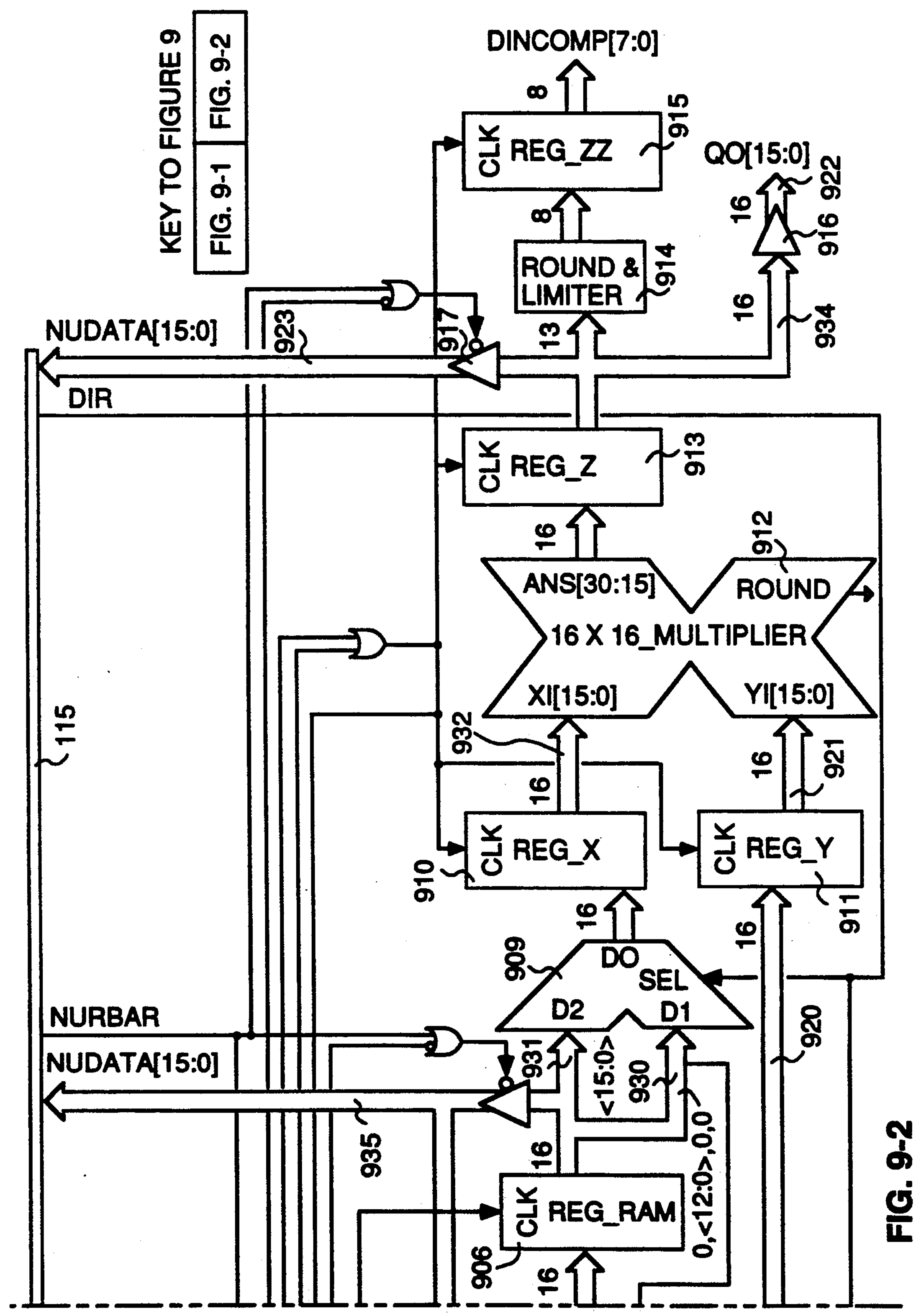

The structure and operation of the quantizer unit 108 are next described in conjunction with FIG. 9.

The quantizer unit 108 performs a multiplication to each element of the Frequency Matrix. This is a digital signal processing step which scales the various frequency components of the Frequency Matrix for further compression.

FIG. 9 shows a schematic diagram of the quantizer unit 108.

During compression, a stream of 16-bit data arrive from the DCT row/column separator unit 107 via bus 918. Data can also be loaded under control of a host computer from the bus 926 which is part of the host bus 115. 2:1 multiplexor 904 selects a 16-bit datum per clock period from one of the busses 918 and 926, and place the datum on data bus 927.

During decompression mode, 8-bit data arrives from the zig-zag unit 109 via bus 919. Each 8-bit datum is shifted and scaled by barrel shifter 907 so as to form a 16-bit datum for decompression.

Dependent upon whether compression or decompression is performed, 2:1 multiplexor 908 selects either the output datum of the barrel shifter (during decompression) or from bus 927 (during compression). The 16-bit datum thus selected by multiplexor 908 and output on bus 920 is latched into register 911, which stores the datum as an input operand to multiplier 912. The other input operand to multiplier 912 is stored in register 910, which contains the quantization (compression) or dequantization (decompression) coefficients read from YU_table 108-1, discussed in the following.

Address generator 902 generates addresses for retrieving the quantization or dequantization coefficients from the YU_table 108-1, according to the data type (Y, U or V), and the position of the input datum in the 8×8 frequency matrix. Synchronization is achieved by synchronizing the DC term (element 0) in the frequency matrix with the external datasync signal. The configuration register 901 provides the information of the data format being received at the VBIU 102, to provide proper synchronization with each incoming datum.

The YU_table 108-1 is a 64×16×2 static random access memory (SRAM). That is, two 64-value quantization or dequantization matrices are contained in this SRAM array 108-1, with each element being 16-bit wide. During compression, the YU-table 108-1 contains 64 16-bit quantization coefficients for Y (luminance) type data, and 64 common 16-bit quantization coefficients for UV (chrominance) type data. Similarly, during decompression, YU-table 108-1 contains 64 16-bit dequantization coefficients for Y type data and 64 16-bit dequantization coefficients for U or V type data. Each quantization or dequantization coefficient is applied specifically to one element in the frequency matrix and U,V type data (chrominance) share the same sets of quantization or dequantization coefficients. The YU_table 108-1 can be accessed for read/write directly by a host computer via the bus 935 which is also part of the host bus 115. In this embodiment, the content of YU_table 108-1 is loaded by the host computer before the start of compression or decompression operations. If non-volatile memory components such as electrically programmable read only memory (EPROM) are provided, permanent copies of these tables may be made available. Read Only Memory (ROM) maybe also be used if the tables are fixed. Allowing the host computer to load quantization or dequantization constants provides flexibility for the host computer to adjust quantization and dequantization parameters. Other digital signal processing objectives may also be achieved by combining quantization and other filter functions in the quantization constants. However, non-volatile or permanent copies of quantization tables are suitable for every day (turn-key) operation, since the start-up procedure will thereby be greatly simplified. When the host bus access the YU_table 108-1, the external address bus 925 contains the 7-bit address (addressing any of the 128 entries in the two 64-coefficient tables for Y and U or V type data), and data bus 935 contains the 16-bit quantization or dequantization coefficients. 2:1 multiplexor 903 selects whether the memory access is by an internally generated address (generated by address generator 902) or by an externally provided address on bus 925 (also part of bus 115), at the request of the host computer.

The quantization or dequantization coefficient is read into the register 906. 2:1 multiplexor 909 selects whether the entire 16 bits is provided to the multiplier operand register 910, or have the datum's most significant bit (bit 15) and the two least significant bits (bits 0 and 1) set to 0. The bits 15 to 13 of the dequantization coefficients (during dequantization) are also supplied to the barrel shifter 907 to provide scaling of the operand coming in from bus 919. By encoding a scaling factor in the dequantization coefficient the dynamic range of quantized data is expanded, just as in any floating point number representation.

Multiplier 912 multiplies the operands in operand registers 910 and 911 and, after discarding the most significant bit, retains the sixteen next most significant bits of the 32-bit result in register 913 beginning at bit 30. This sixteen bits representation is determined empirically to be sufficient to substantially represent the dynamic range of the multiplication results. In this embodiment, multiplier 912 is implemented as a 2-stage pipelined multiplier, so that a 16-bit multiplication operation takes two clock periods but results are made available at every clock period.

The 16-bit datum in result register 913 can be sampled by the host computer via the host bus 923. Thirteen bits of the 16-bit result in the result register 913 are provided to the round and limiter unit 914 to further restrict the range of quantizer output value. Alternatively, during decompression, the entire 16-bit result of result register 913 is provided on bus 922 after being amplified by bus driver 916.

During decompression, the data_sync signal indicating the beginning of a pixel matrix is provided by VBIU 102. During compression, the external video data source provices the data_sync signal. Quantization and dequantization coefficients are loaded into YU_table 108-1 before the start of quantization and dequantization operations. An interval sync counter inside configuration register 901 provides sequencing of the memory accesses into YU_table 108-1 to ensure synchronization between the data_sync signal with the quantizer 108 operation. The timing of the accesses depends upon the input data formats, as extensively discussed above with respect to the DCT units 103-107.

During compression, the data coming in on bus 918 and the corresponding quantizer coefficients read from YU_table 108-1 are synchronously loaded into registers 911 and 910 as operands for multiplier 912. Two clock periods later, the bits 30 to 15 of the results from the multiplication operation are available and are latched by result registers 913.

Round and limiter 914 then adds 1 to bit 15 (bit 31 being the most significant bit) of the datum in result register 913 for rounding purpose. If the resulting datum of this rounding operation is not all "1"s or "0"s in bits 31 through 24, then the maximum or minimum representable value is exceeds. Bits 23 to 16 are then set to hexadecimal 7F or 81, corresponding to decimal 127 or −127, dependent upon bit 30, which indicates whether the datum is positive or negative. Otherwise, the result is within the allowed dynamic range. Bits 23 to 16 is output by the round and limiter 914 as an 8-bit result, which is latched by register 915 for forwarding to zig-zag unit 109.

Alternatively, during decompression, the 16-bit result in register 913 is provided in toto to the DCT input select unit 104 for IDCT on bus 922.

During decompression, the VBIU 102 provides the data-sync synchronization signal in sync unit 102-1 (FIG. 1). Data come in as an 8-bit stream, one datum per clock period, on bus 919 from zig-zag unit 109. To perform the proper scaling for dequantization, barrel shifter 907 first appends four zeroes to the datum received from zig-zag unit 109, and then sign-extends four bits the most significant bit to produce an intermediate 16-bit result. (This is equivalent to multiplying the datum received from the zig-zag unit 109 by 16). In accordance to the scaling factor encoded in the dequantization coefficient, as discussed earlier in this section, this 16-bit intermediate result is then shifted by the number of bits indicated by bits 15 to 13 of the 16-bit dequantization coefficient corresponding to the datum received from the zig-zag unit 109. The shifted result from the barrel shifter 907 is loaded into register 911, as an operand to the 16×16 bit multiplication.

The 16-bit dequantization constant is read from the YU_table 108-1 into register 906. The first three bits 15 to 13 are used to direct the number of bits to shift the 16-bit intermediate result in the barrel shifter 907 as previously discussed. The thirteen bits 12 through 0 of the dequantization coefficient form the bits 14 to 2 of the operand in register 910 to be multiplied to the datum in register 911. The other bits of the multiplier, i.e., bits 15, 1 and 0, are set to zero.

Just as in the compression case, the sixteen bits 30 to 15 of the 32-bit results of the multiplication operation involving the contents in registers 910 and 911 are loaded into register 913. Unlike compression, however, the 16-bit content of register 913 is supplied to the DCT input select unit 104 on bus 922 through buffer 916, without modification by the round and limiter unit 914.

Structure and Operation of the Zig-Zag Unit

Figure 10:
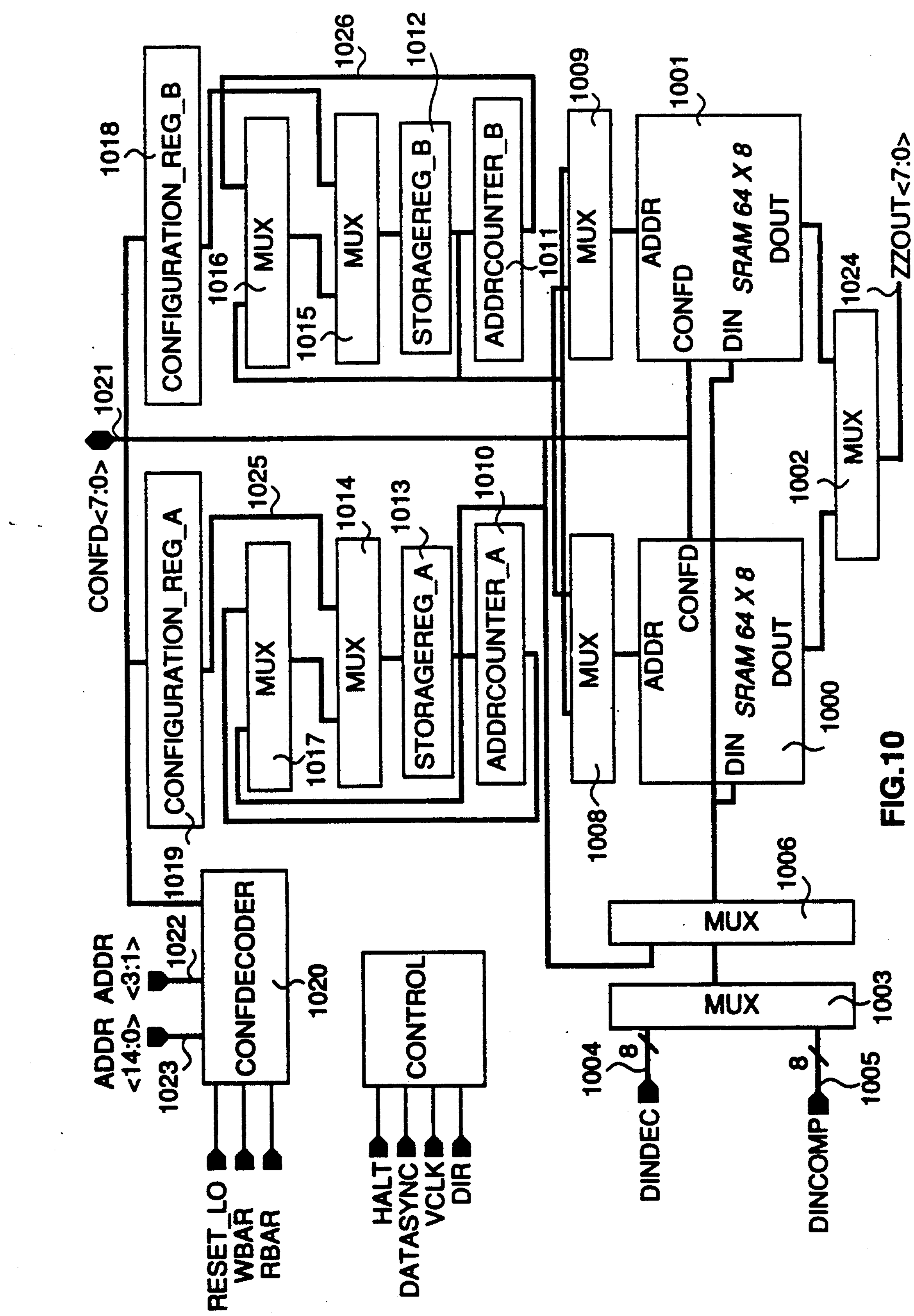
FIG. 10 shows a schematic diagram of the zig-zag unit 109 in the embodiment shown in FIG. 1.

The function and operation of zig-zag unit 109 are next described in conjunction with FIG. 10.

The Zig-Zag unit 109 rearranges the order of the elements in the Frequency Matrix into a format suitable for data compression using the run-length representation explained below.

FIG. 10 is a schematic diagram of zig-zag unit 109. During compression, the zig-zag unit 109 accumulates the output in sequential order (i.e. row by row) from the quantizer unit 108 until one full 64-element matrix is accumulated, and then output 8-bit elements of the frequency matrix in a "zig-zag" order, i.e. $A_{00}$, $A_{01}$, $A_{10}$, $A_{02}$, $A_{11}$, $A_{20}$, $A_{30}$, etc. This order is suitable for gathering long runs of zero elements of the frequency matrix created by the quantization process, since many higher frequency AC elements in the frequency matrix are set to zero by quantization.

During decompression, the incoming 8-bit data are in "zig-zag" order, and the zig-zag unit 109 reorders this 8-bit data stream in sequential order (row by row) for IDCT.

The storage in the zig-zag unit 109 is comprised of two banks of 64×8 SRAM arrays 1000 and 1001, so arranged to set up a double-buffer scheme. This double-buffering scheme allows a continuous output stream of data to be forwarded to the coder/decoder unit 111, so as not to require idle cycles during processing of 4:2:2 type input data. As one bank of 64×8-bit SRAM is used to accumulate the incoming 8-bit elements of the current frequency matrix, the other bank of 64×8 SRAM is used for output of a previously accumulated frequency matrix to zero packer/unpacker unit 110 during compression or to the quantizer unit 108 during decompression.

The SRAM arrays 1000 and 1001 can be accessed from a host computer on bus 115. Various parts of bus 115 are represented as busses 1021, 1022 and 1023 in FIG. 10. The host computer accesses the SRAM arrays 1000 or 1001 by providing an 8-bit address in two parts on busses 1023 and 1022:bus 1023 is 5-bit wide and bus 1022 is 3-bit wide.

During initialization, the host computer also loads two latency values, one each into configuration registers 1019 and 1018 to provide the synchronization information necessary to direct the zig-zag unit 109 to begin both sequential and zig-zag operations after the number of clock periods specified by each latency values elapses. Observation or test data read from or to be written into the SRAM arrays 1000 and 1001 are transmitted on bus 1021.

The address into each of SRAM banks 1000 and 1001 are generated by counters 1010 and 1011. 7-bit counter 1010 generates sequential addresses, and 6-bit counter 1011 generates "zig-zag" addresses. The sequential and zig-zag addresses are stored in registers 1013 and 1012 respectively. Bit 6 of register 1012 is used as a control signal for toggling between the two banks of SRAM arrays 1000 and 1001 for input and output under the double-buffering scheme.

During decompression, 8-bit data come in from zero packer/unpacker unit 110 on bus 1004. During compression, 8-bit data come in from quantizer unit 108 on bus 1005. 2:1 multiplexer 1003 selects the incoming data according to whether compression or decompression is performed. As previously discussed, data may also come from the external host computer; therefore, 2:1 multiplexor 1006 selects between internal data (from busses 1005 or 1004 through multiplexer 1003) or data from the host computer on bus 1021.

The zig-zag unit 109 outputs 8-bit data on bus 1024 via 2:1 multiplexer 1002, which alternatively selects between the output data of the SRAM arrays 1000 and 1001 in accordance with the double-buffering scheme, to the zero packer/unpacker unit 110 during compression and to the quantizer unit 108 during decompression.

During compression, 8-bit incoming data from the quantizer 108 arrive on bus 1005 and is each written into the memory address stored in register 1013, which points to a location in the SRAM array which is selected as the input buffer (in the following discussion, for the sake of convenience, we will assume SRAM array 1000 is selected for input.)

During this clock period, SRAM 1001 is in the output mode, register 1012 contains the current address for output generated by "zig-zag" counter 1011. The output datum of SRAM array 1001 residing in the address specified in register 1012 is selected by 2:1 multiplexor 1002 to be output on bus 1024.

At the end of the clock period, the next access address for sequential input is loaded into register 1013 through multiplexors 1014 and 1017. Counter 1010 also generates a new next address on bus 1025 for use in the next clock period. Multiplexer 1014 selects between the address generated by counter 1010 and the initialization address provided by the external host computer. Multiplexer 1017 selects between the next sequential address or the current sequential address. The current sequential address is selected when a "halt" signal is received to synchronize with the data format (e.g. inactive video time).

At the end of every clock period, the next "zig-zag" address is loaded into register 1012 through multiplexers 1016 and 1015 while a new next zig-zag address is generated by the zig-zag counter 1011 on bus 1026. Multiplexor 1015 selects between the address generated by counter 1011 and the initialization address provided by the host computer. Multiplexor 1016 selects between the next zig-zag address or the next zig-zag address. The current zig-zag address is selected when a halt signal is received to synchronize with the data format (e.g. inactive video time).

The operation of zig-zag unit 109 during decompression is similar to compression, except that the sequential access during decompression is a read access, and the zig-zag access is a write access, opposite to the compression process. The output data stream of the sequential access is selected by multiplexor 1002 for output to the quantizer unit 108.

Structure and Operation of the Zero-packer/unpacker Unit

Figure 11:
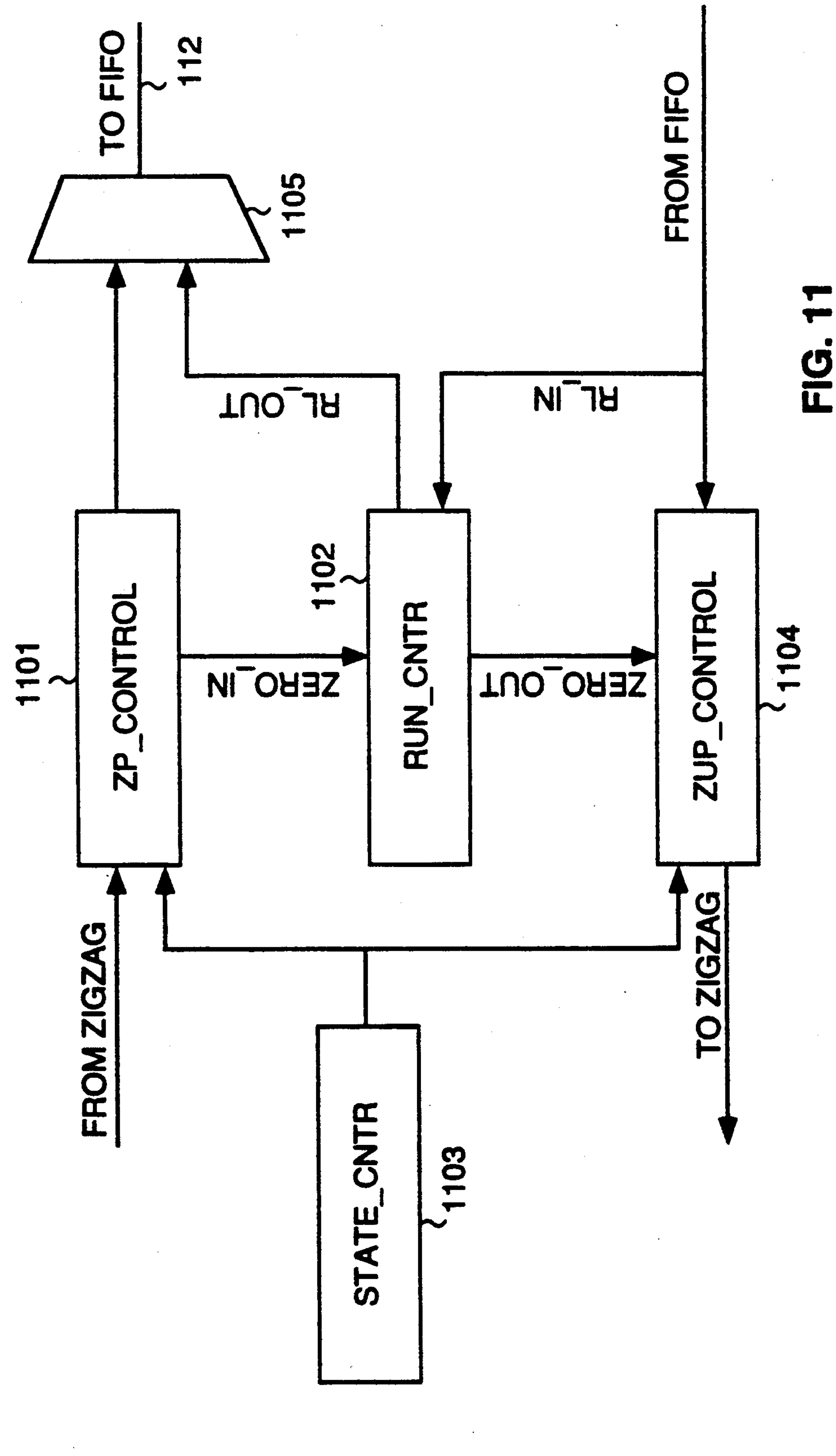
FIG. 11 shows a schematic diagram of the zero pack/unpack unit 110 in the embodiment shown in FIG. 1.

The structure and operation of the zero packer/unpacker (ZPZU) 110 (FIG. 1) are next described in conjunction with FIG. 11.

The ZPZU 110 consists functionally of a zero packer and a zero unpacker. The main function of the zero packer is to compress consecutive values of zero into a representation of a run length. The advantage of using run length data is the tremendous reduction of storage space requirement resulting from the fact that many values in the frequency matrix are reduced to zero during the quantization process. The zero unpacker provides the reverse operation of the zero packer.

A block-diagram of the ZPZU unit 110 is shown in FIG. 11. As shown, the ZPZU 110 consists of a state counter 1103, a run counter 1102, the ZP control logic 1101, a ZUP control logic 1104 and a multiplexer 1105. The state counter 1103 contains state information such as the mode of operation, e.g., compression or decompression, and the position of the current element in the frequency matrix. A datum from the zig-zag unit 109 is first examined by ZP control 1101 for zero value and passed to the FIFO/Huffman code bus controller unit 112 through the multiplexor 1105 for storage in FIFO means 114 if the datum is non-zero. Alternatively, if a value of zero is encountered, the run counter 1102 keeps a count of the zero values which follow the first zero detected and output the length of zeroes to the FIFO/Huffman code bus controller unit 112 for storage in FIFO Memory 114. The number of zeros in a run length is dependent upon the image information contained in the pixel matrix. If the pixel matrix corresponds to an area where very little intensity and color fluctuations occur in the sixty-four pixels contained, longer run-lengths of zeros are expected over an area where such fluctuations are greater.

During decompression, data arrive from the FIFO/Huffman code bus controller unit 112 via the ZUP (zero unpacker) unit 1104 and then forwarded to the zig-zag unit 109. If a run length is read during the decompression phase, the run length is unpacked to a string of zeroes which length corresponds to the run length read and the output string of zeroes is forwarded to the zig-zag unit 109.

There are four types of data that the zero packer/unpacker unit 110 will handle, i.e. DC, AC, RUN and EOB, together with the pixel type (Y, U or V) the information is encoded into four bits. During compression, as ZP_control 1101 received the first element of any frequency matrix from zig-zag unit 109, which will be encoded as a DC datum with an 8-bit value passed directly to the FIFO/Huffman code bus controller unit 112 for storage in FIFO Memory 114 regardless of whether its value is zero or not. Thereafter, if a non-zero element in the frequency matrix is received by ZP_control 1101 it would be encoded as an AC datum with an 8-bit value and passed to the FIFO/Huffman code bus controller unit 112 for storage in FIFO Memory 114. However, if a zero-value element of the frequency matrix is received, the run length counter 1102 will be initiated to count the number of zero elements following, until the next non-zero element of the frequency matrix is encountered. The count of zeroes is forwarded to the FIFO/Huffman code bus controller unit 112 for storage in FIFO Memory 114 in a run length (RUN) representation. If there is not another non-zero element in the remainder of the frequency matrix, instead of the run length, an EOB (end of block) code is output to the FIFO/Huffman code bus controller unit 112. After every run length or EOB code is output, the run counter 1102 is reset for receiving the next burst of zeroes.

During decompression, the ZUP control unit 1104 examines a stream of encoded data from the FIFO/Huffman code bus controller unit 112, which retrieves the data from FIFO Memory 114. As a DC or AC datum is encountered by the ZUP control unit 1104, the least significant 8 bits of data will be passed to the zig-zag unit 109. However, if a run length datum is encountered, the value of the run length count will be loaded into the run length counter 1102, zeroes will be output to the zig-zag unit 109 as the counter is decremented until it reaches zero. If an EOB datum is encountered, the ZUP control unit 1104 will automatically insert zeroes at its output until the the 64th element, corresponding to the last element of the frequency matrix, is output.

Structure and Operation of the Coder/Decoder Unit

The structure and operation of the coder/decoder unit 111 (FIG. 1) are next described in conjunction with FIGS. **12*a* and 12*b***.

The coder unit **111*a* directs encoding of the data in run-length representation into Huffman codes. The decoder unit 111*b*** provides the reverse operation.

During compression, in order to achieve a high compression ratio of the DCT data coming from the zero packer/unpacker unit 110 the coder unit 111*a* of the coder/decoder unit 111 provides the translation of zero-packed DCT data in the FIFO memory 114 into a variable length Huffman code representation. The coder unit 111*a* provides the Huffman coded DCT data to Host Bus Interface Unit (HBIU) 113, which in turn transmits the Huffman encoded data to an external host computer.

During decompression, the decoder unit 111*b* of the coder/decoder unit 111 receives Huffman-coded data from the HBIU 113, and provides the translation of the variable length Huffman-coded data into zero-packed representation for the decompression operation.

The Coder Unit

Figure 12A:
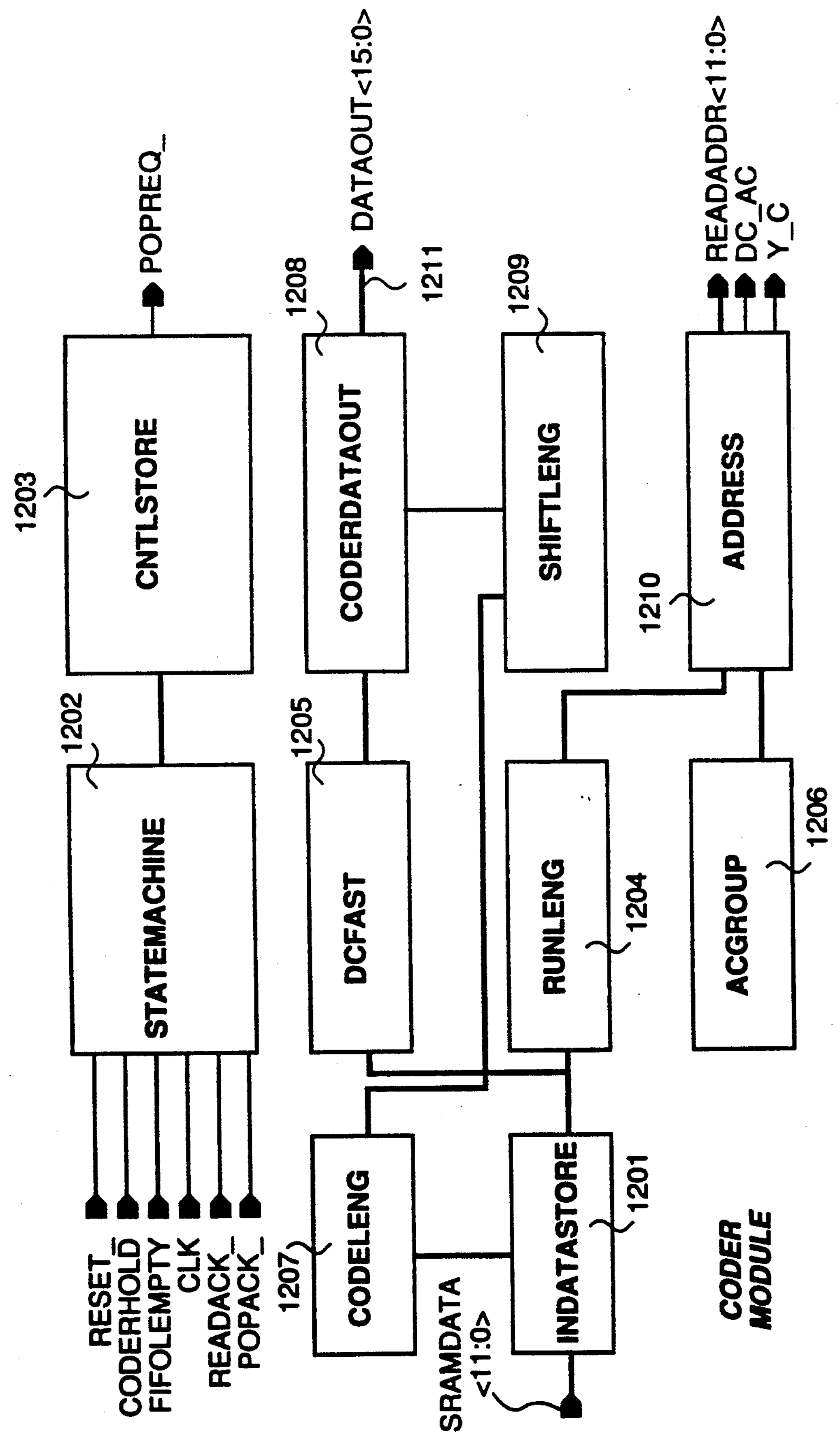
FIG. 12*a* shows a schematic diagram of the coder unit 11*a* of the coder/decoder unit 111 in the embodiment shown in FIG. 1.

FIG. 12*a* is a schematic diagram for the coder unit 111*a* (FIG. 1).

During compression, read control unit 1203 asserts a "pop-request" signal to the FIFO/Huffman code bus controller unit 112 to request the next datum for Huffman coding. Data storage unit 1201 then receives from internal bus 116 (FIG. 1) the datum "popped" into data storage unit 1201 for temporary storage, after receiving a "pop-acknowledge" signal from the FIFO/Huffman code bus controller unit 112. Since the coder unit 111*a* must yield priority of the internal bus 116 to the zero packer/unpacker unit 110, as will be discussed below in conjunction with the FIFO/Huffman code bus controller unit 112, the pop request will remain asserted until a "pop-acknowledge" signal is received from FIFO/-Huffman code bus controller unit 112 indicating the data is ready to be latched into data storage 1201 at the data bus 116.

The encoding of data is according to the data type received: encoding types are DC, runlength and AC pair, or EOB. In order to retrieve the Huffman encoding from the FIFO/Huffman code bus controller unit 112, the address unit 1210 provides a 14-bit address consisting of a 2-bit type code (encoding the information of Y or C, AC or DC) and a 12-bit offset into one of the four tables (Y_DC, Y_AC, C_DC and C_AC) according to the encoding scheme. The encoding scheme is discussed in section 7.3.5 et seq. of the JPEG standard, attached hereto as Appendix A. The interested reader is referred to Appendix A for the details of the encoding scheme. The 2-bit type code indicates whether the data type is luminance or chrominance (Y or C), and whether the current datum is an AC term or a DC term in the frequency matrix. According to the 2-bit data type code, one of the four tables (Y_DC, Y_AC, C_DC, and C_AC) is searched for the Huffman code. The difference of the previous DC value in the last frequency matrix and the DC value in the current frequency matrix is used to encode the DC value Huffman code (this method of coding the difference of successive DC values is known as "linear predictor" coding). The organization of the Huffman code tables within FIFO memory 114 will be discussed below in conjunction with the FIFO/Huffman code bus controller unit 112. The "run length" unit 1204 extracts the run length value from the zero-packed representation received from the Zero packer/unpacker unit 110 and combine the next AC value received by the "ACgroup" unit 1206 to form a runlength-AC value combination to be used as a logical address for looking up the Huffman code table.

The Huffman code returned by the FIFO/Huffman code bus controller unit 112 on internal bus 116, and retrieved from the Huffman tables in FIFO Memory 114, is received by the Data storage unit 1201. The code-length unit 1207 examines the returned Huffman code to determine the number of bits used to represent the current datum. Since the Huffman code is of variable length, the Huffman-coded data are concatenated with previous Huffman-coded data and accumulated at the "shift-length" unit 1209 until a 16-bit datum is formed. The "DCfast" unit 1205 contains the last DC value, so that the difference between the last DC value and the current DC value may be readily determined to facilitate the encoding of the DC difference value under the linear predictor method.

Whenever a 16-bit datum is formed, coder 111*a* halts and requests the host bus interface unit 113 to latch the 16-bit datum from the coderdataout unit 1208. Coder 111*a* remains in the halt state until the datum is latched and acknowledged by the host bus interface unit 113.

Internal control signals for the coder unit 111*a* of the coder/decoder unit 111 is provided by the "statemachine" unit 1202.

The Decoder Unit

Figures 2, 12B:
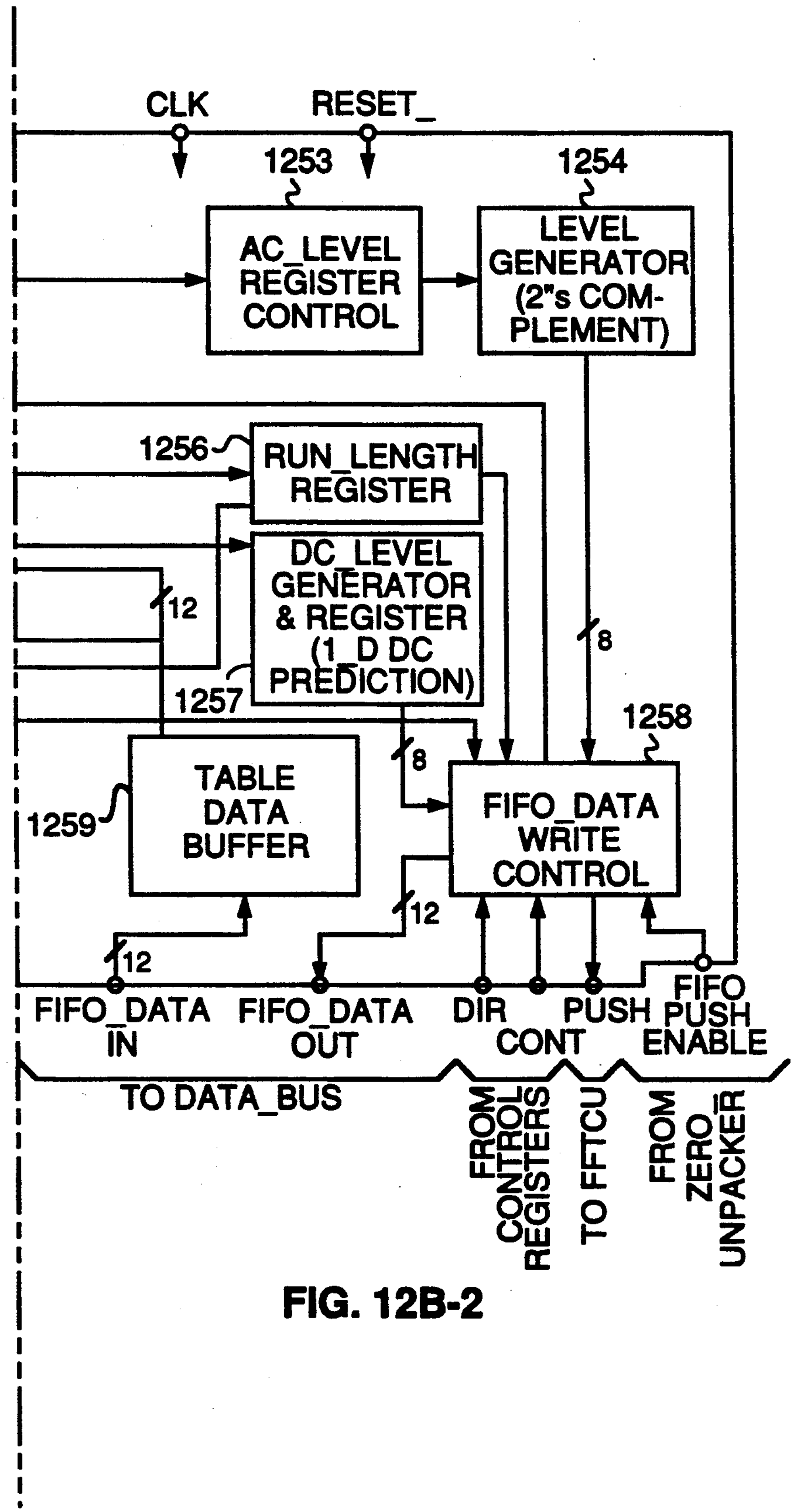

Each structure of the decoder unit 111*b* of the coder/decoder unit 111 (FIG. 1) is shown in block diagram form in FIG. 12*b*.

The decoding scheme is according to a standard established by JPEG, and may be found in section 7.3.5 et seq. in Appendix A hereto. The following description outlines the decoding process. The interested reader is referred to Appendix A for a detail explanation.

During decompression, 2-bit data from the Host Bus Interface Unit (HBIU) 113 (FIG. 1) come into the decoder unit at the input control unit 1250. The "run" bit from the HBIU 113 requests decoding and signals the readiness of a 2-bit datum or bus 1405.

Each 2-bit datum received is sent to the decoder main block 1255, which controls the decoding process. The decoded datum is of variable length, consist of either a "level" datum, a runlength-AC group, or EOB Huffman codes. A level datum is an index encoding a range of amplitude rather than the exact amplitude. the DC value is a fixed length "level" datum. The runlength-AC group consists of an AC group portion and a run length portion. The AC group portion of the runlength-AC group contains a 3-bit group number, which is decoded in the level generator 1254 for the bit length of the significant level datum from HBIU 113 to follow.

If the first bit or both bits of the 2-bit datum from HBIU 113 is "level" data, i.e. significant index of the AC/DC value, the decoding is postponed until two bits of Huffman code is received. That is, if the first bit of the 2-bit datum is "level" and the second bit of the 2-bit datum is Huffman code, then the next 2-bit datum will be read, and decode will proceed using the second bit of the first 2-bit datum, and the first bit of the second 2-bit datum. Decoding is accomplished by looking up the Huffman decode table in FIFO memory 114 using the FIFO/Huffman code bus controller unit 112. The table address generator 1261 provides to the FIFO/Huffman code bus controller unit 112 the 12-bit address into the FIFO memory 114 for the next entry in the decoding table to look up. The returned Huffman decode table entry is stored in the table data buffer 1259. If the datum looked up indicates that further decoding is necessary (i.e. having the "code_done" bit set "0"), the 10-bit "next address" portion of the 12-bit datum is combined with the next 2-bit datum input from the HBIU 113 to generate the 12-bit address for the next Huffman decode table entry.

When the "code_done" bit is set "1", it indicates the current datum contains a 5-bit runlength and 3-bit AC group number. The Huffman decode table entry also contains a "code_odd" bit which is used by the AC_level order control 1252 to determine the bit order in the next 2-bit input datum to derive the level data. The AC group number is used to determine the bit-length and magnitude of the level data previously received in the AC_level register control 1253. The level generator 1254 the takes the level datum and provides the fully decoded datum, which is forwarded to be written in the FIFO memory 114, through the FIFO write control unit 1258, which interface with the FIFO/Huffman code controller unit 112. The write request is signalled to the FIFO/Huffman code controller unit 112 by asserting the signal "push", which is acknowledged by the FIFO/Huffman code controller unit 112 by asserting the signal "FIFO push enable" after the datum is written.

The data counter 1260 keeps a count of the data decoded to keep track of the datum type and position presently being decoded, i.e. whether the current datum being decoded is an AC or a DC value, the position in the frequency matrix which level is currently being computed, and whether the current block is of Y, U or V pixel type. The runlength register 1286 is used to generate the zero-packed representation of the run length derived from the Huffman decode table. Because the DC level encodes a difference between the previous DC value with the current DC value, the DC_level generator 1257 derives the actual level by adding the difference value to the stored previous DC value to derive current datum. The derived DC value is then updated and stored in DC_level generator 1257 for computing the next DC value.

The decoded DC, AC or runlength data are written into the FIFO memory 114 through the FIFO data write control 1258. Since the zero packer/unpacker unit 110 must be given priority on the bus 116 (FIG. 1), data access by the decoder unit 111*b* must halt until the zero packer/unpacker unit 110 relinquishes its read access on bus 116. Decoder main block 1255 generates a hold signal to the HBIU to hold transfer of the 2-bit datum until the read/write access to the FIFO/Huffman code controller 112 is granted.

Structure and Operation of the FIFO/Huffman Code Bus Controller Unit

Figures 1, 13A:
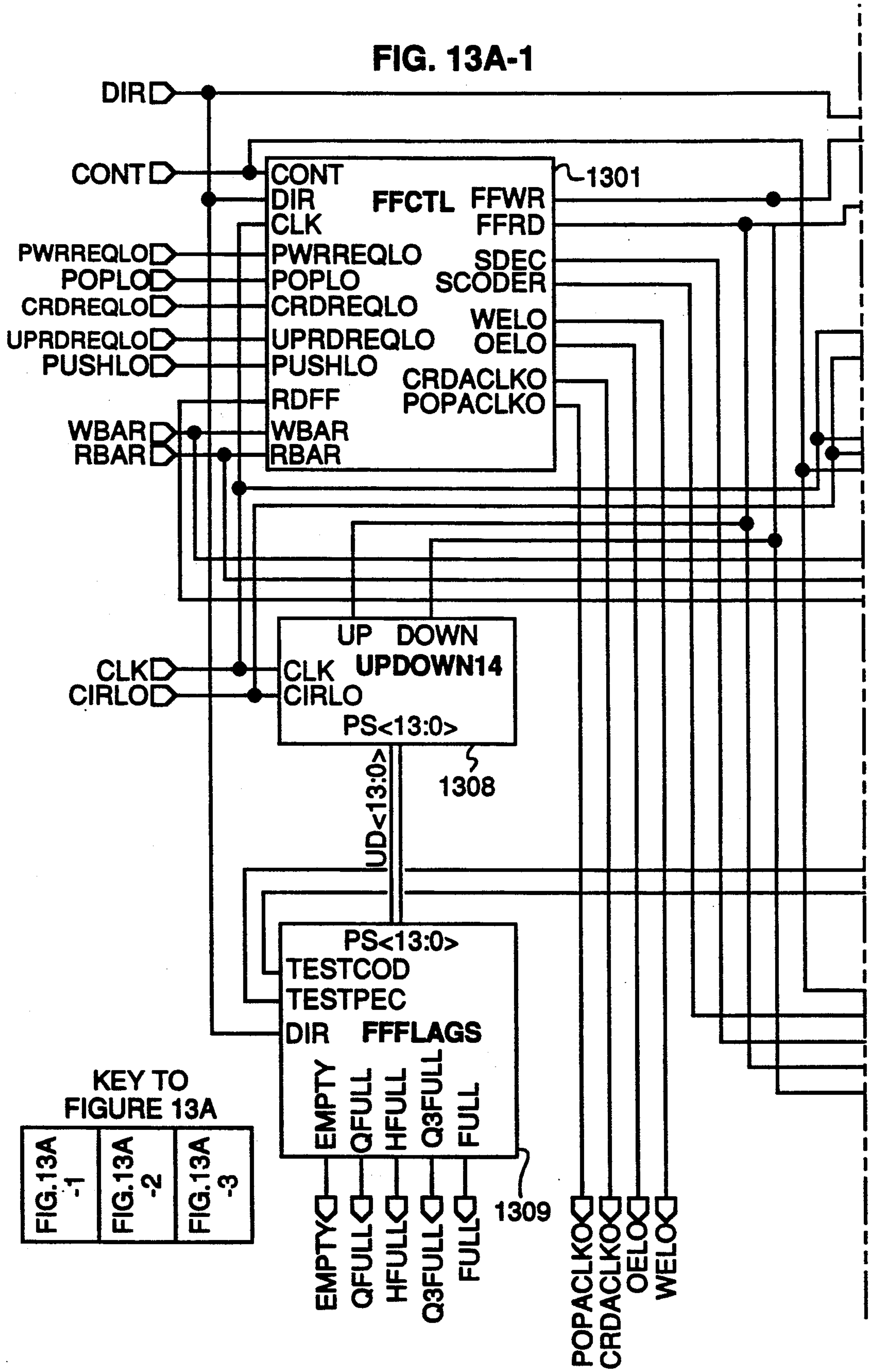
Figures 2, 13A:
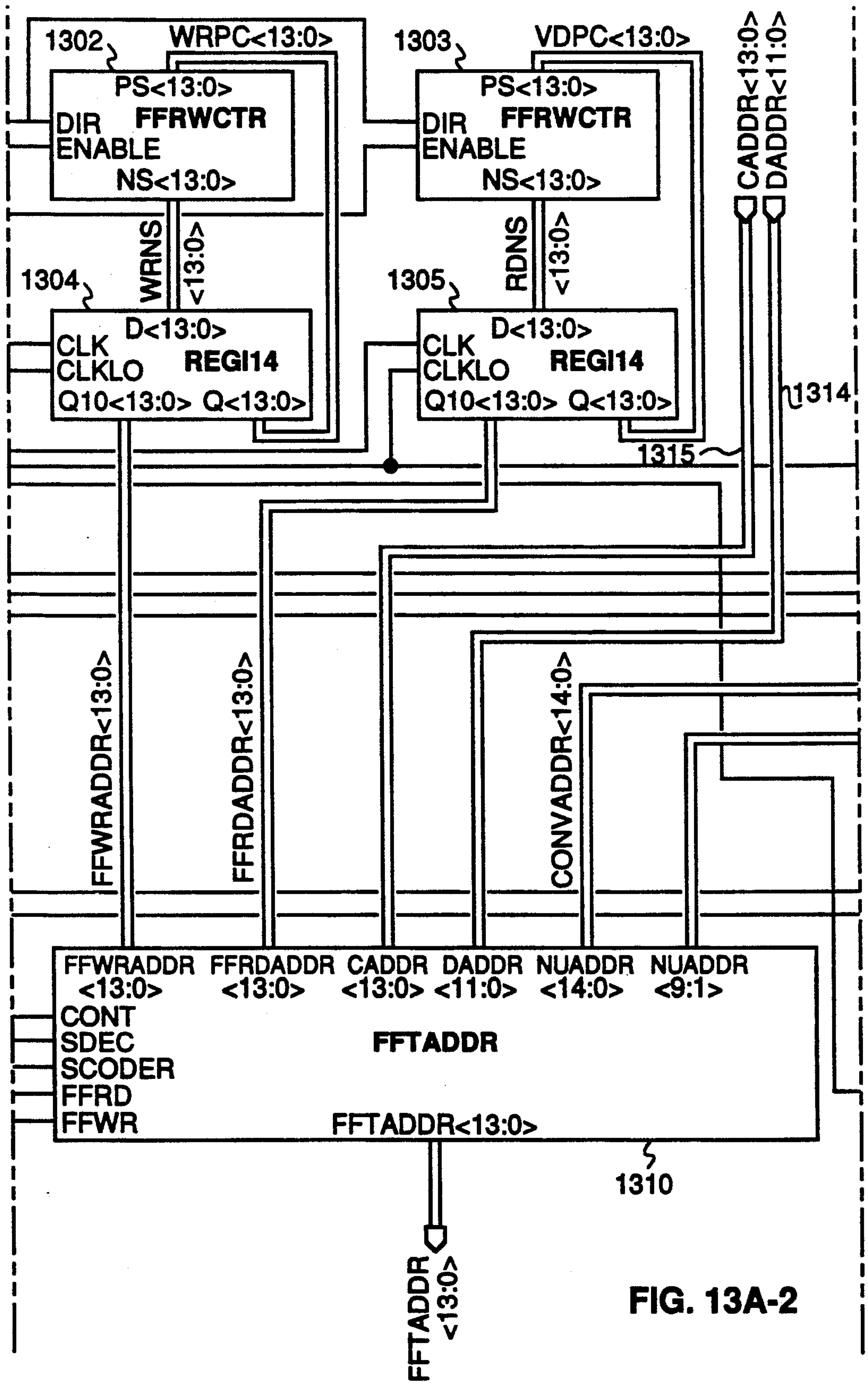
Figures 3, 13A:
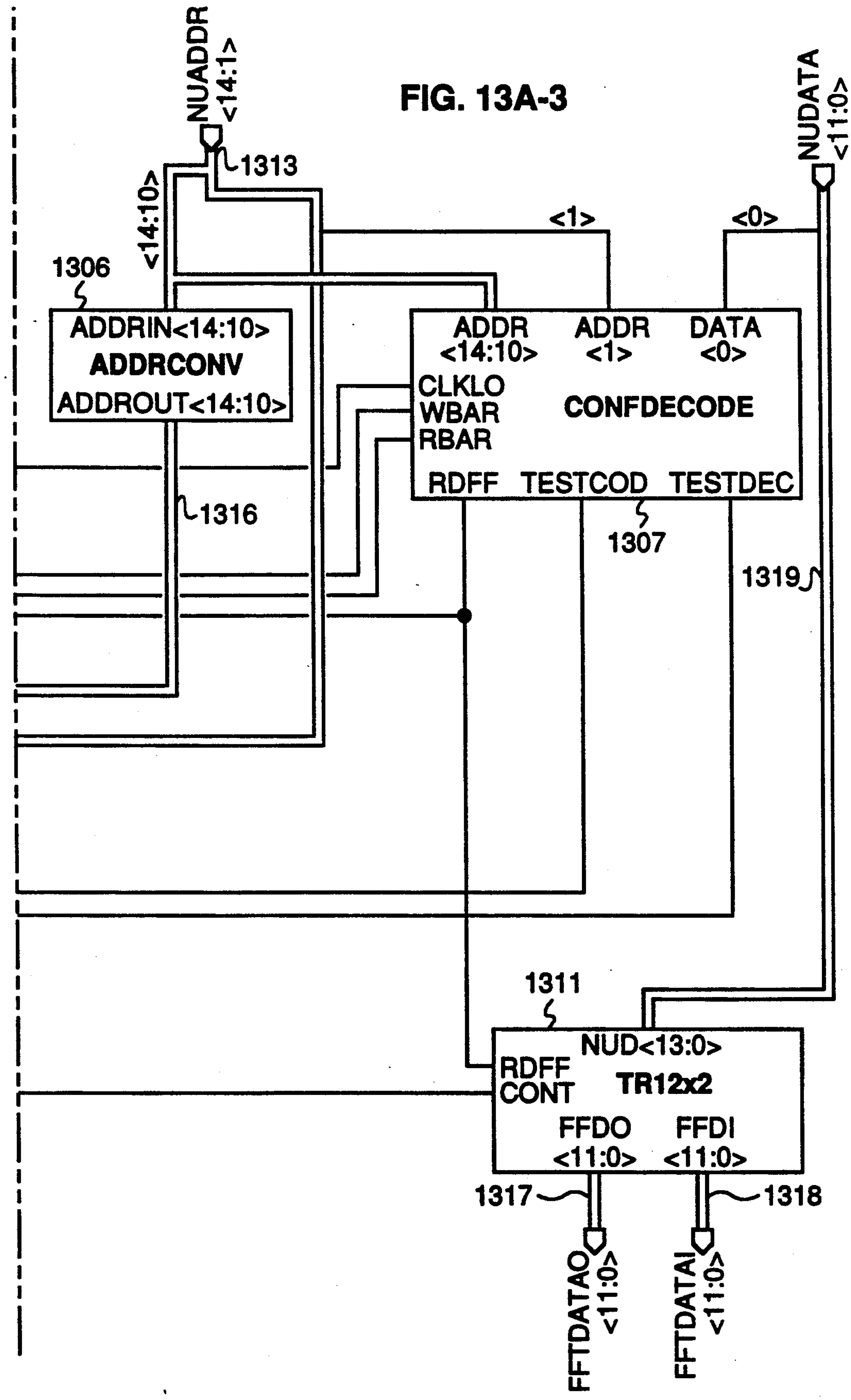
Figure 13B:
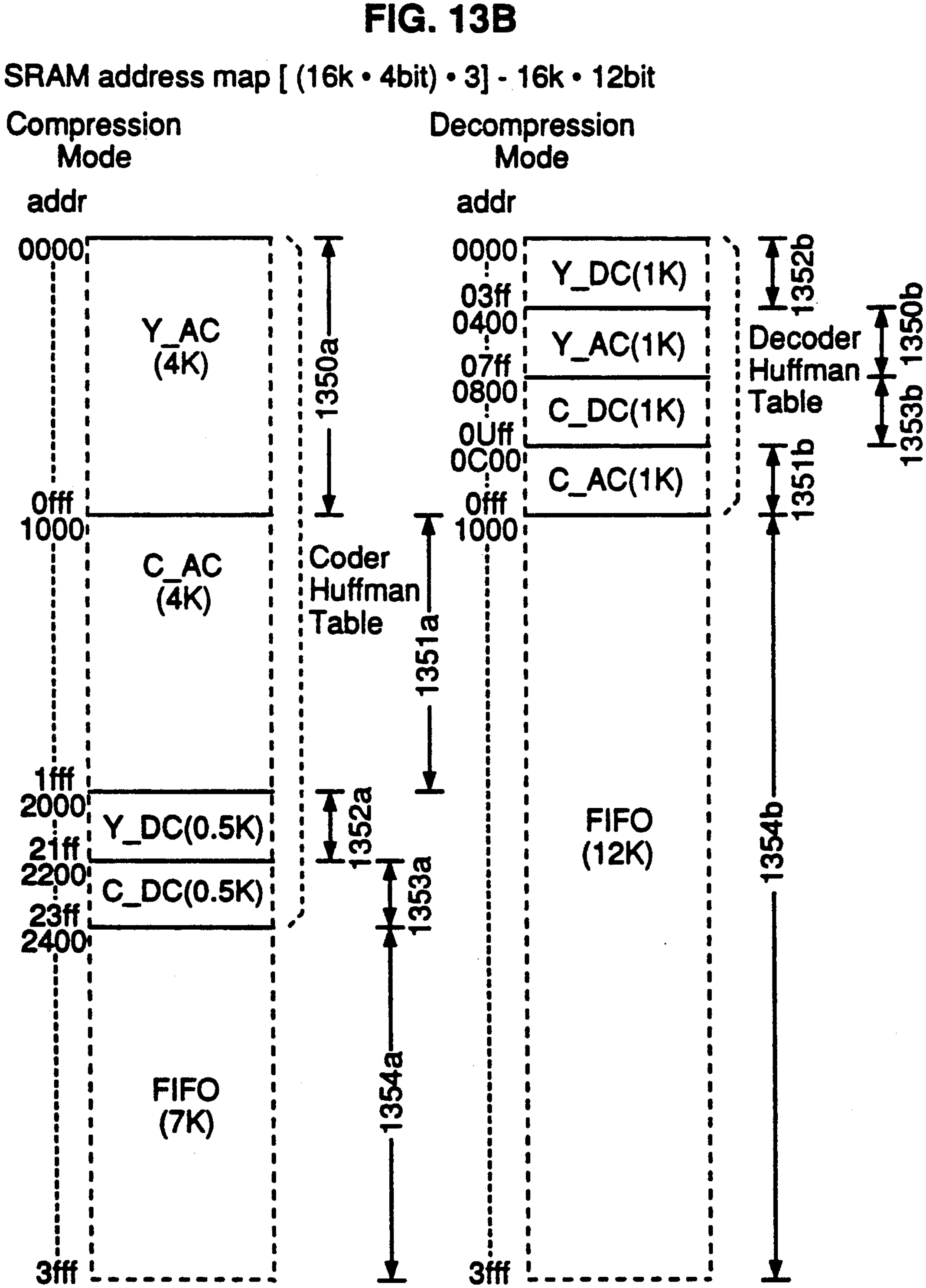
FIG. 13*b* shows the memory maps of the FIFO Memory 114 of the preferred embodiment in FIG. 1, under compression and decompression conditions.

The structure and operation of the FIFO/Huffman code controller unit 112, together with an off-chip FIFO memory array 114 are next described in conjunction with FIGS. 13*a* and 13*b*.

The FIFO/Huffman code bus controller unit (FIFOC) 112, shown in FIG. 13*a*, interfaces with the Coder/decoder unit 111, the zero packer/unpacker unit 110, and host bus interface unit 113. The FIFOC 112 provides the interface to the off-chip first-in-first-out (FIFO) memory implemented in a 16K×12 SRAM array 114 (FIG. 1).

The implementation of the FIFO Memory 114 off-chip is a design choice involving engineering trade-off between complexity of control and efficient use of on-chip silicon real estate. Another embodiment of the present invention includes an on-chip SRAM array to implement the FIFO Memory 114. By moving the FIFO Memory 114 on-chip, the control of data flow may be greatly simplified by using a dual port SRAM array as the FIFO memory. This dual port SRAM arrangement allows independent accesses by the zero packer/unpacker unit 110 and the coder/decoder unit 111, instead of sharing a common internal bus 116.

During compression, the off-chip SRAM array 114 contains the memory buffer for temporary storage for the 2-dimensional DCT data from the zero packer/unpacker unit 110. In addition, the tables of Huffman code which are used to encode the data into further compressed representation of Huffman code are also stored in this SRAM array 114.

During decompression, the off-chip SRAM array 114 contains the memory buffer for temporary storage of the decoded data ready for the unpack operation in the zero packer/unpacker unit 110. In addition, the tables used for decoding Huffman coded DCT data are also stored in the SRAM array 114.

The memory maps for the SRAM array 114 are shown in FIG. 13*b*; the memory map for compression is shown on the left, and the memory map for decompression is shown on the right. In this embodiment, during compression, address locations (hexadecimal) 0000–0FFF (1350*a*), 1000–1FFF (1351*a*), 2000–21FF (1352*a*), and 2200–23FF (1353*a*) are respectively reserved for Huffman code tables: the AC values of the luminance (Y) matrix, the AC values of the chrominance matrices, the DC values of the luminance matrix, and the DC values of the chrominance (U or V) matrices. As a result, the rest of SRAM array 114—a 7K×12 memory array 1354*a*—is allocated as a FIFO memory buffer 1354*a* for the zero-packed representation datum.

During decompression, addresses 0000–03FF (1352*b*), 0400–07FF (1350*b*), 0800–0BFF (1353*b*), 0C00–0FFF are reserved for tables used in decoding Huffman codes: for DC values of the luminance (Y) matrix, the AC values of the luminance matrix, the DC values of the chrominance (U or V) matrices, and the AC values of the chrominance matrices, respectively. Since the space allocated for tables are much smaller during decompression, a 12K×12 area 1354*b* is available as the FIFO memory buffer 1354*b*.

FIG. 13*a* is a schematic diagram of the FIFOC unit 112. The SRAM array 114 may be directly accessed for read or write by a host computer via busses 1313 and 1319 (for addresses and data respectively), which are each a part of the host bus 115. The read or write request from the host computer is decoded in configuration decoder 1307. Address converter 1306 maps the logical address supplied by the host computer on bus 1313 to the physical addresses of the SRAM array 114. Together with the bits 9:1 of bus 1313, a host computer may load the Huffman coding and decoding tables 1350*a*–1353*a* or 1350*b*–1353*b* or the FIFO memory buffers 1354*a* or 1354*b*.

During compression, 12-bit data arrive from the zero packer/unpacker unit 110 on bus 116. During decompression, 12-bit data arrive from the coder/decoder unit 111 on bus 1319. Bus 1319 is also a part of host bus 115.

Since the FIFO memory 114 is organized as a first-in-first-out memory, to facilitate access, register 1304 contains the memory address for the next datum readable from the FIFO memory buffer 1354*a* or 1354*b*, and register 1305 contains the memory address for the next memory location available for write in the FIFO memory buffers 1354*a* or 1354*b*. The next read and write addresses are respectively generated by address counters 1302 and 1303. Each counter is incremented after a read (counter 1302) or write (counter 1303) is completed.

Logic unit 1301 provides the control signals for SRAM memory array 114 and the operations of the FIFOC unit 112. Up-down counter 1308 contains read and write address limits of the FIFO memory buffers 1354*a* or 1354*b*. FIFO memory tag unit 1309 provides status signals indicating whether the FIFO memory buffer is empty, full, quarter-full, half-full or three-quarters full.

Address decode unit 1310 interfaces with the off-chip SRAM array 114, and supplies the read and write addresses into the FIFO memory 114. A 12-bit datum read is returned from SRAM array 114 on bus 1318, and a 12-bit datum to be written is supplied to the SRAM array 114 on bus 1317. Busses 1317 and 1318 together form the internal bus 116 shown in FIG. 1.

Upon initialization, the host computer loads the Huffman code or decode tables 1350*a*–1353*a* or 1350*b*–1353*b*, dependent upon whether the operation is compression or decompression, and loads configuration information into configuration decode unit 1307 to synchronize the FIFOC unit 112 with the rest of the chip.

During compression, 12-bit data arrive from zero packer/unpacker unit 110 and are written sequentially into the SRAM array 114. The FIFO memory buffer 1354*a* fills as the incoming data are latched from bus 1319. Since a request from the zero packer/unpacker unit 110 has the highest priority, data on bus 116 from the zero packer zero unpacker unit 110 are automatically given priority to access SRAM array (FIFO Memory) 114 over coder/decoder 111, so as to avoid loss of incoming data.

Data in the FIFO memory buffer 1354*a* decrease as they are read by coder 111*a* of the coder/decoder unit 111, which requests read by asserting the "pop-request" signal. The coder 111*a* also request reads from the Huffman code tables according to the value of the datum read by providing the read address on the bus 1315. The code/decoder unit 111 then encodes the datum in Huffman code for storage by an external computer in a mass storage medium.

During decompression, 12-bit decoded data arrive from the decoder 111*b* of the coder/decoder unit 111 to be stored in the FIFO memory buffer 1354*b* by asserting a "push" request. The decoder 111*b* also requests reading of the Huffman decode tables by providing an address on bus 1314. The entry read from the Huffman decode table allows the decoder 111*b* to decode a compressed Huffman-coded datum provided by an external host computer.

Structure and Operation of the Host Bus Interface Unit

Figures 1, 14:
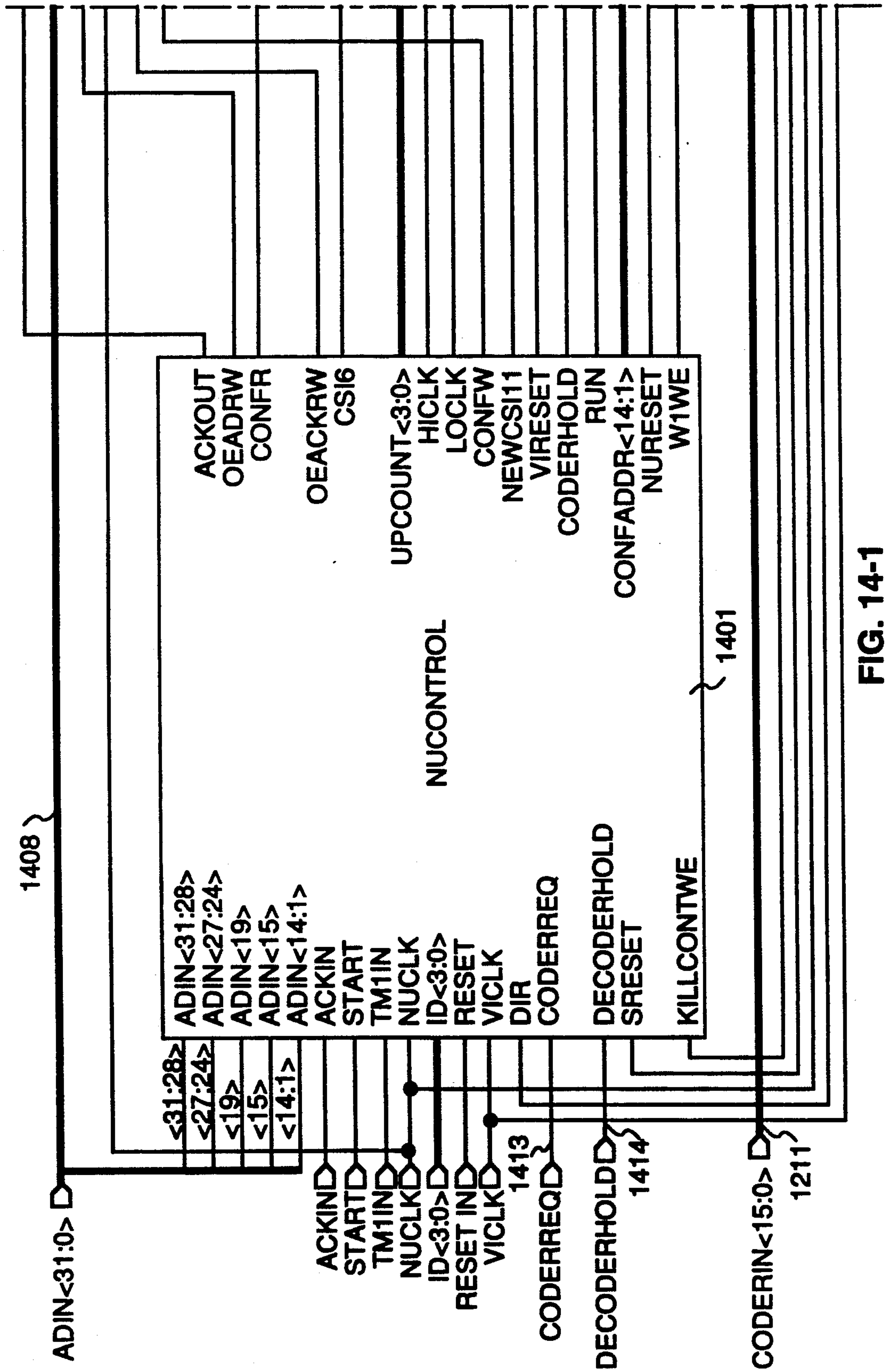
Figures 2, 14:
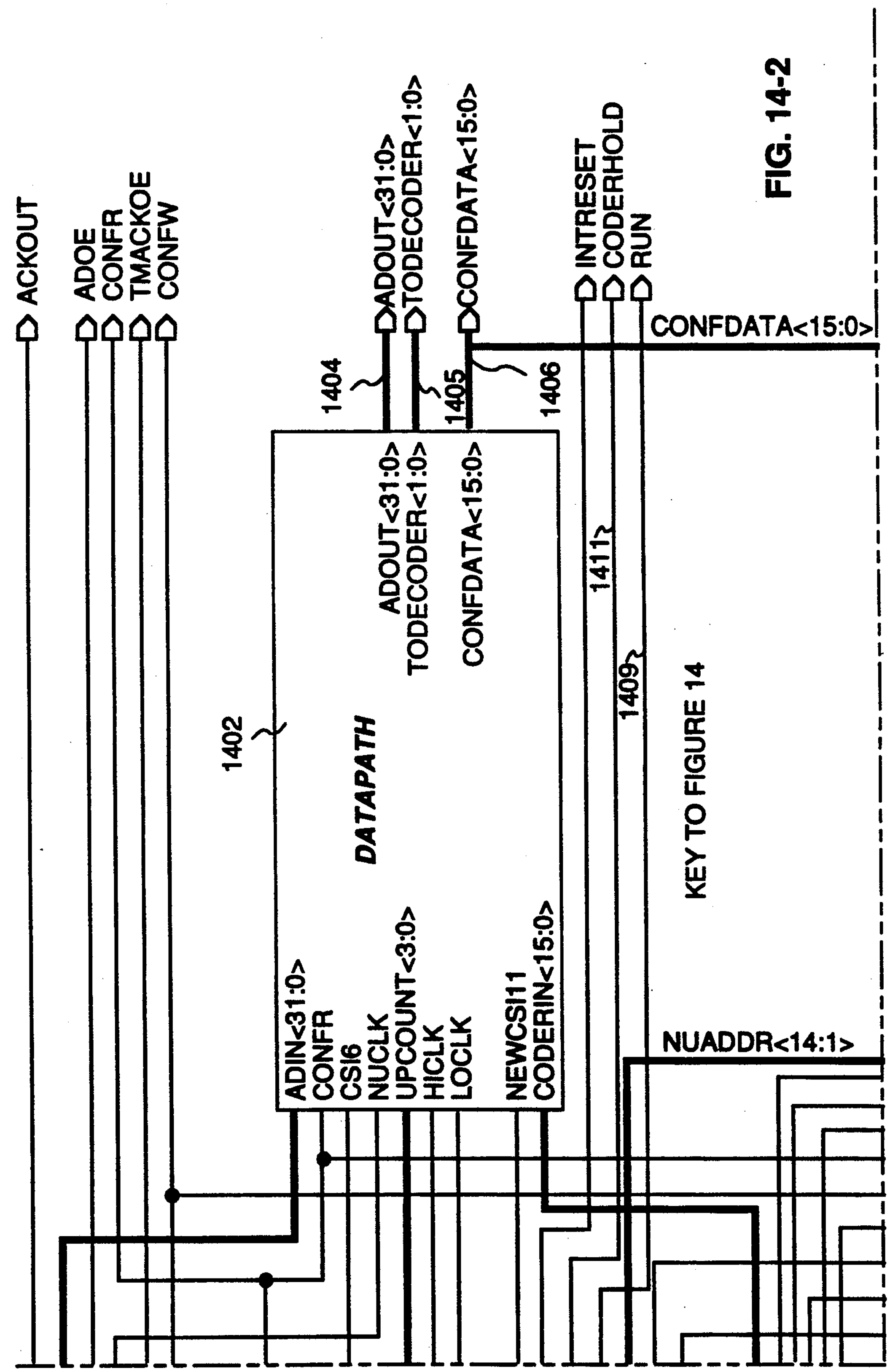
Figures 3, 14:
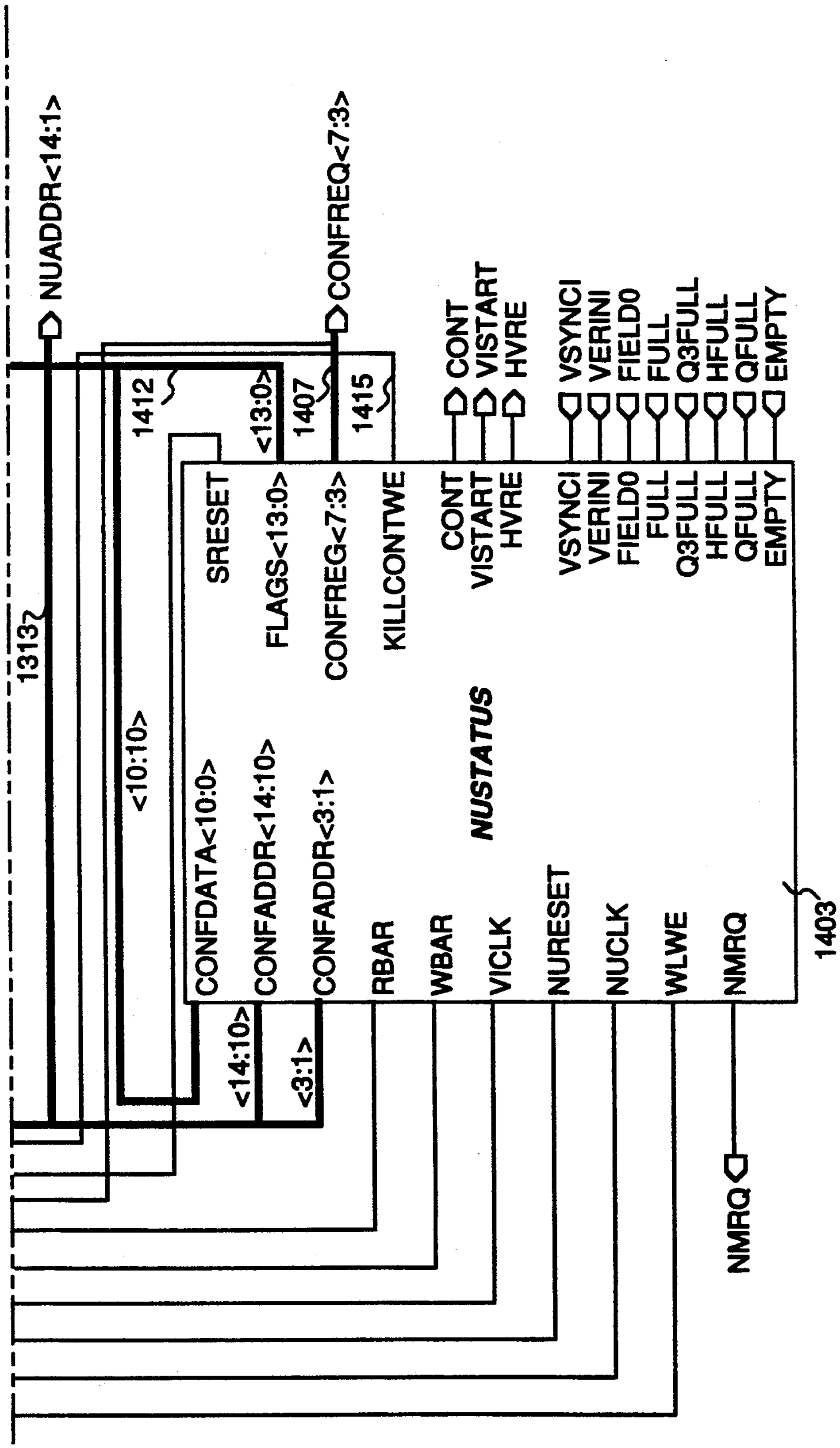

The structure and operation of the host bus interface unit (HBIU) 113 are next described in conjunction with FIG. 14.

FIG. 14 shows a block diagram of the HBIU 113. The main functions of the host bus interface are implemented by the three blocks: nucontrol block 1401, datapath block 1402, and nustatus block 1403.

The nucontrol block 1401 provides control signals for interfacing with a host computer and with the coder/decoder unit 111. The control signals follow the NuBus industry standard (see below). The datapath block 1402 provides the interface to two 32-bit busses 1404 (output) and 1408 (input), a 2-bit output bus 1405 to the decoder unit 111*b*, a 16-bit input bus 1211 to the coder unit 111*a*, and a 16-bit bi-directional configuration bus 1406 for interface with the various units 102–112 shown in FIG. 1 for synchronization and control purposes, for loading the Huffman code/decode tables into FIFO memory 104, and for the loading the quantization/dequantization coefficients into the quantizer unit 108. The datapath block 1402 also provides handshaking signals for these bus transactions.

The nustatus block 1403 monitors the status of the FIFO memory 114, and provides a 14-bit output of status flags in bus 1412, which is part of the output bus 1406. The nustatus block 1403 also provides the register addresses for loading configuration registers throughout the chip, such as configuration register 608 in the DCT row storage unit 105. Global configuration values are provided on 5-bit bus 1407. These configuration values contain information such as compression or decompression, 4:1:1 or 4:2:2 data format mode etc.

The host bus interface unit 113 implements the "NuBus" communication standard for communicating with a host computer. This standard is described in ANSI/IEEE standard 1196–1987, which is attached as Appendix B.

Internally, the HBIU 113 interfaces with the coder/decoder unit 111. During compression mode, the coder 111*a* sends the variable length Huffman-coded data sixteen bits at a time, and the HBIU 113 forwards a Huffman-coded 32-bit datum (comprising two 16-bit data from coder 111*a*) on bus 1404 to the host computer. The coder 111*a* asserts status signal "coderreq" 1413 when a 16-bit segment of Huffman code forming a 16-bit datum is ready on bus 1211 to be latched, unless "coderhold" on line 1411 is asserted by the HBIU 113. Coder 111*a* expects the data to be latched in the same clock period as "coderreq" is asserted. Therefore, the coder 111*a* resets the data count automatically at the end of the clock period. When "coderhold" is asserted by the HBIU 113, it signals that the external host computer has not latched the last 32-bit datum from HBIU 113. Coder 111*a* will halt encoding until its 16-bit datum is latched after the next opportunity to assert the coderreq signal. Meanwhile, data output of zero packer/unpacker unit 110 accumulate in FIFO Memory 114.

During decompression mode, Huffman-coded compressed data are sent from the host computer thirty two bits at a time on bus 1408. The datapath 1402 sends the thirty two bits received from the host computer 2 bits at a time to the decoder unit 111*b* on bus 1405. The "run" bit 1409 signals the decoder unit 111*b* that a 2-bit datum is ready on bus 1405. The 2-bit datum stays on bus 1405 unit until the decoder 111*b* latches the 2-bit datum and signals the latching by asserting "decoderhold" bit 1414 indicating readiness for the next 2-bit datum.

During initialization, the dequantization or quantization coefficients are loaded into the YU_table 108-1 of the quantizer unit 108 (FIG. 9*a*), and the Huffman code or or decode tables are loaded into SRAM array 114. The "cont" bit 1415 request the FIFOC unit 112 for access to the external SRAM array 114. The addresses and data are generated at the datapath unit 1402.

Furthermore, through the system of configuration registers accessible from the HBIU 113, a host computer may monitor, diagnose or test control and status registers throughout the chip, random access memory arrays throughout the chip, and the external SRAM array 114.

An Application of the Present Invention

One application of the present invention is found in the implementation of local memories of displays or printers. A video display device usually has a frame buffer for refresh of the display. A similar kind of buffer, called page buffer, is used in a printer to compose the printed image. As discussed above, an uncompressed image requires a large amount of memory. For example, a color printer at 400 dpi at 24 bits per pixel (i.e. 8 bits for each of the intensities for red, green and blue) will require 48 megabytes of storage for a standard $8\frac{1}{2}\times 11$ image. The required amount of memory can be drastically reduced by storing compressed data in the frame or page buffers. However, decompressed data must be made available to the display or the print head when needed for output purpose. The present invention described above, such as the embodiment shown in FIG. 1, will allow decompression of data at a rate sufficient to support display refresh and composition of printed image in a printer.

Figure 16:
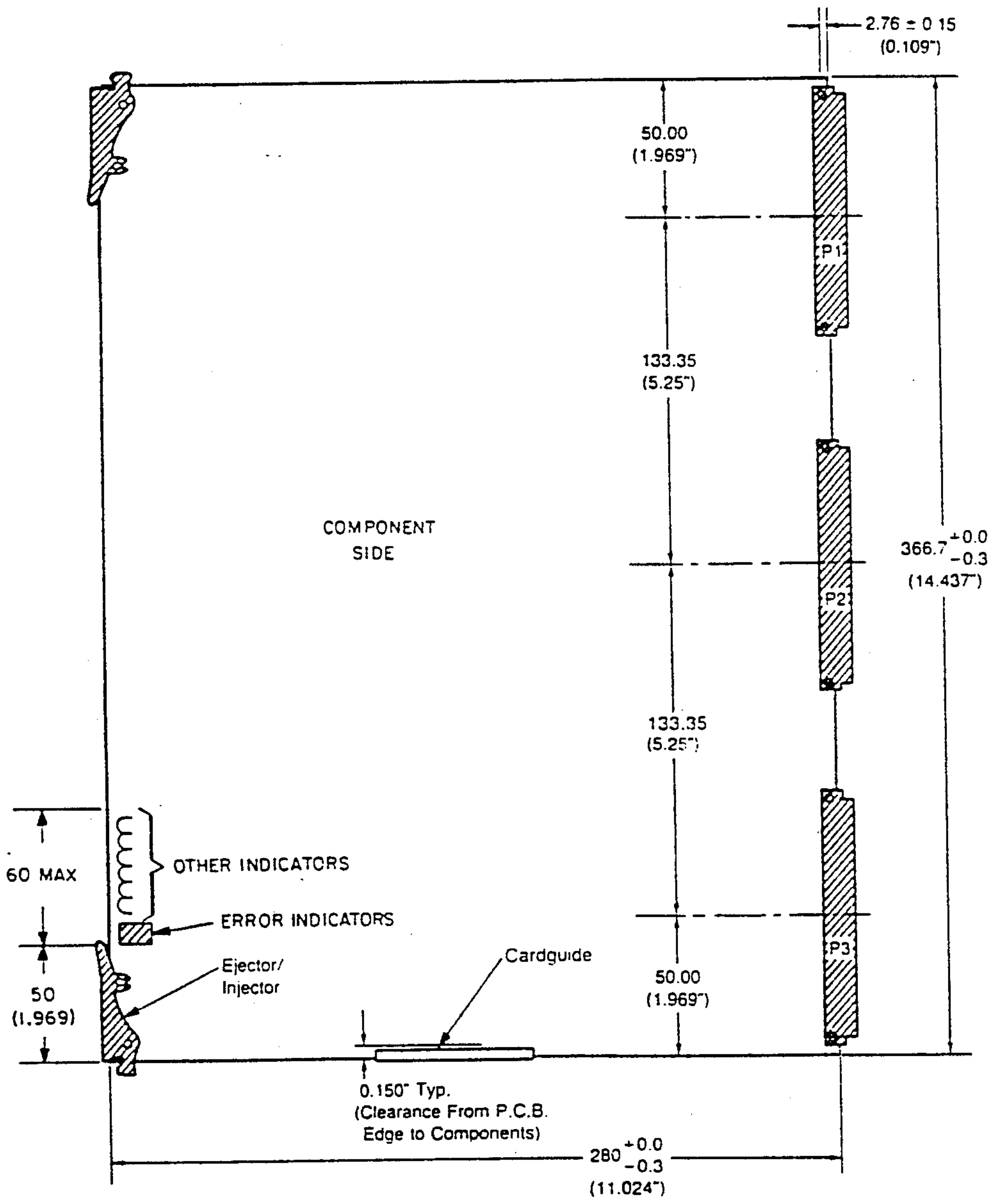
FIG. 16 shows a scheme by which the speed of data compression and decompression achieved by the present invention may be used to provide image reproduction sending only compressed data over the communication channel.

An embodiment of the present invention for applications in frame buffers for display refresh, and for printed image composition in printers is shown in FIG. 16. A source of compressed image data is provided by data compression unit 1602, under direction from a controller 1601. Controller 1601 may be a conventional computer, or any source suitable for providing image data for a display or for a printer. The data compression unit 1602 may be implemented by the embodiment of the present invention shown in FIG. 1. The compressed data are sent in small packets (e.g. 8 pixel by 8 pixel blocks as described above) over a suitable communication channel 1606, which can be as simple as a cable, to the display or printer controlling device 1604. Since compressed data rather than uncompressed data is sent over the communication channel 1606, the bandwidth required for sending entire images is drastically reduced by a factor equal to the compression ratio. As discussed previously in the Description of Prior Art section, a compression ratio of 30 is desirable, and is attainable according to the embodiment of the present invention discussed in conjunction with FIG. 1. This advantage is especially beneficial to applications involving large amounts of image data, which must be made available with certain time limits, such as applications in high speed printing or in a display of motion sequences.

The compressed data are stored in the main memory 1603 associated with the display or printer controlling device 1604. The compressed data memory maps into the physical locality of the image displayed or printed, i.e. the memory location containing the compressed data representing a portion of the image may be simply determined and randomly accessed by the display controller unit 1604. Because the compressed data are stored in small packets, compressed data corresponding to small areas in the image may be updated locally by the display controller unit 1604 without decompressing parts of the image not affected by the update. This is especially useful for intelligent display applications which allow incremental updates to the image.

The compressed data stored in main memory 1603 is decompressed by decompression unit 1607, on demand of the display or printer controlling device 1604 when required for the display or printing purpose. The decompressed image are stored in the cache memory 1605. Because the physical processes of painting a screen or printing an image are relatively slow processes, the bandwidth of decompressed data needed to supply for the needs of these functions can be easily satisfied by a high speed decompression unit, such as the embodiment of the present invention shown in FIG. 1.

Because the cost of memory in frame buffer or page buffer applications is a significant portion of the total cost of a printer or display, the embodiment of the present invention shown in FIG. 16 provides enormous cost advantage, and allows applications of image processing to areas hitherto deemed technically difficult or economically impractical.

The above detailed description is intended to be exemplary and not limiting. To the person skilled in the art, the above discussion will suggest many variations and modifications within the scope of the present invention.

APPENDIX I

JPEG Still Picture Compression Algorithm

December 15, 1989

JPEG Still Picture Compression Standard Documentation:

The algorithm specified by this document is the latest algorithm being considered by the Joint Photographic Expert Group (JPEG), a joint ISO/CCITT committee, in the standardization process. It is important to note that this draft has not yet been approved by the committee and any or all of the algorithmic techniques presented herein are subject to change.

C-Cube Microsystems is providing this document for general information purposes only and assumes no responsibility for errors or ommissions.

For additional information or questions, please contact:

Eric Hamilton
C-Cube Microsystems, Inc.
(408) 944-6300

Background

QUANTIZATION is chosen for the nominal picture quality, to minimize the VISIBLE QUANTIZATION ERROR.

FLEXIBILITY for future improvements is provided by the possible redefinition of VLC tables and of quantization matrices through overhead information - e.g. according to progress in psychovisual perception and understanding of image. This allows versatility for not yet defined or unforseen applications.

4. The SEQUENTIAL and PROGRESSIVE build-up of the received image, are available through the appropriate sequencing of the transformed and quantized coefficients in a variable number of display stages. For LOW data rate channels, such as 1200 bit/s, very low coding rate (0.08 bit per pixel to 0.25 bit per pixel) gives good recognisability of the picture at the early stages of the progressive update.

5. The use of the discrete cosine transform may allow COMPATIBILITY with the intra-mode coding of Videophone, Videoconferencing and Digital Television CODEC - CCITT sg XV and CCIR -.

2.2 Basic Coding Technique 2.2.1 Sypnosis of the coding method

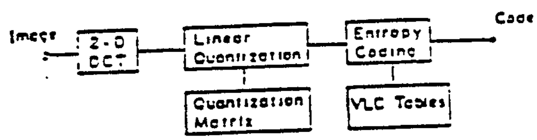

Fig.1 : basic coding method

The processing is three-fold :

1. Transformation : a 2-dimensional DCT is applied to 8 x 8 blocks of pixels

2. Linear Quantization : After transformation, the coefficients are quantized linearily, in using quantization steps that are dependent upon the psychovisual sensitivity of the associated DCT - 8 x 8 subimages.
note : predifined quantization matrices will be defined in the future standard, but customized ones can be embedded in the compressed data (128 bytes) to fit specific applications.

3. Entropy Coding : The content of the block is transmitted by sending information on the value and the position of the quantized coefficients described along a zig-zag scan.

The DC coefficients are treated separately. They are quantized in simple DPCM on the prediction from previous 8 x 8 block DC value.
The AC coefficients relative positions and number of bits to represent the quantized values are encoded via 2-dimensional VLC tables.
note : predifined VLC tables will be defined in the future standard, but customized tables (few hundred bytes) might be associated to compressed images to fit specific applications.

2.3 Progressive Update

The progressive update is achieved through different mechanisms. One relates to the classical pyramidal decomposition of an image, another one uses spectral selection of the DCT coefficients and a last one is made through a recursive structure. However, it is worth noting that "spectral selection" is the basic option.

Spectral Selection

It simply consists of sending first, low frequency terms (DC and 1st AC) of each 8x8 block for a crude version of the image and then to refine by sending more and more "high frequency" content to get the final image. The to-day most efficient procedure has been to send one (three) coefficient(s)-(Y,Cr,Cb)-at a time per each 8x8 block. This technique is rather simple, although requiring a buffer, but it suffers from blockiness at the earliest stage (about 0.15 bit per pixel).

Hierarchical Decomposition

This relates to classical pyramidal coding technique, where the full image is filtered-subsampled prior, here, to ADCT coding, as self explained in the fig.2 :

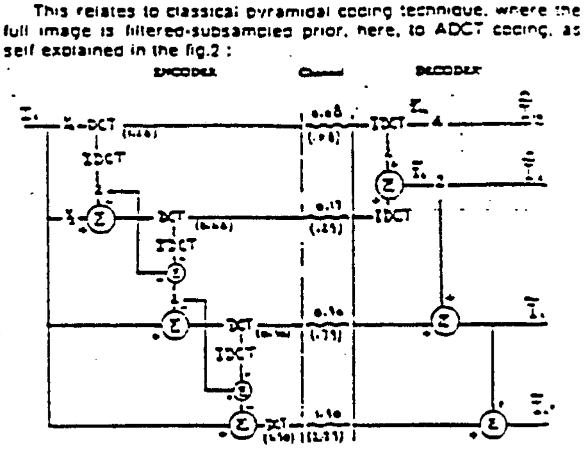

Fig.2 : hierarchical decomposition

The technique is very efficient for coding images below 0.1 bit per pixel, for the required subsampling ratio that is only 1/4 in both directions, limits the extension of the produced artefacts on the displayed-interpolated image.

Recursive Structure

The idea is to code recursively the difference between the decoded and the original images as exampiified in fig.2. This process increases the fineness of the quantized coefficients, like spectral selection does for frequency definition.

2.4 Reversibility

To-day, it is simply performed from escaping the Transform Domain and by Entropy Coding, in the spatial domain, Differences between the very last DCT decoded image and the original. Again, a subsampling scheme can be devised for smooth S/N ratio upgrading of the reconstructed image. A replica of the original image is attainable at a compression factor of about 2 (i.e. 8 bits per pixel for a CCIR 4.2.2. image).

Overview

JPEG Still Picture Color Standard

Baseline System:

Mandatory part of the standard, all decoders must have it.

Extended System:

Optional part of the standard,

Special Function:

Direct Path to Reversible

Baseline System
The baseline system is a lossy sequential 2 component system based on huffman entropy coding. The decoder is optimized for the CCIR 601 (Y, Cr, Cb) colour model.
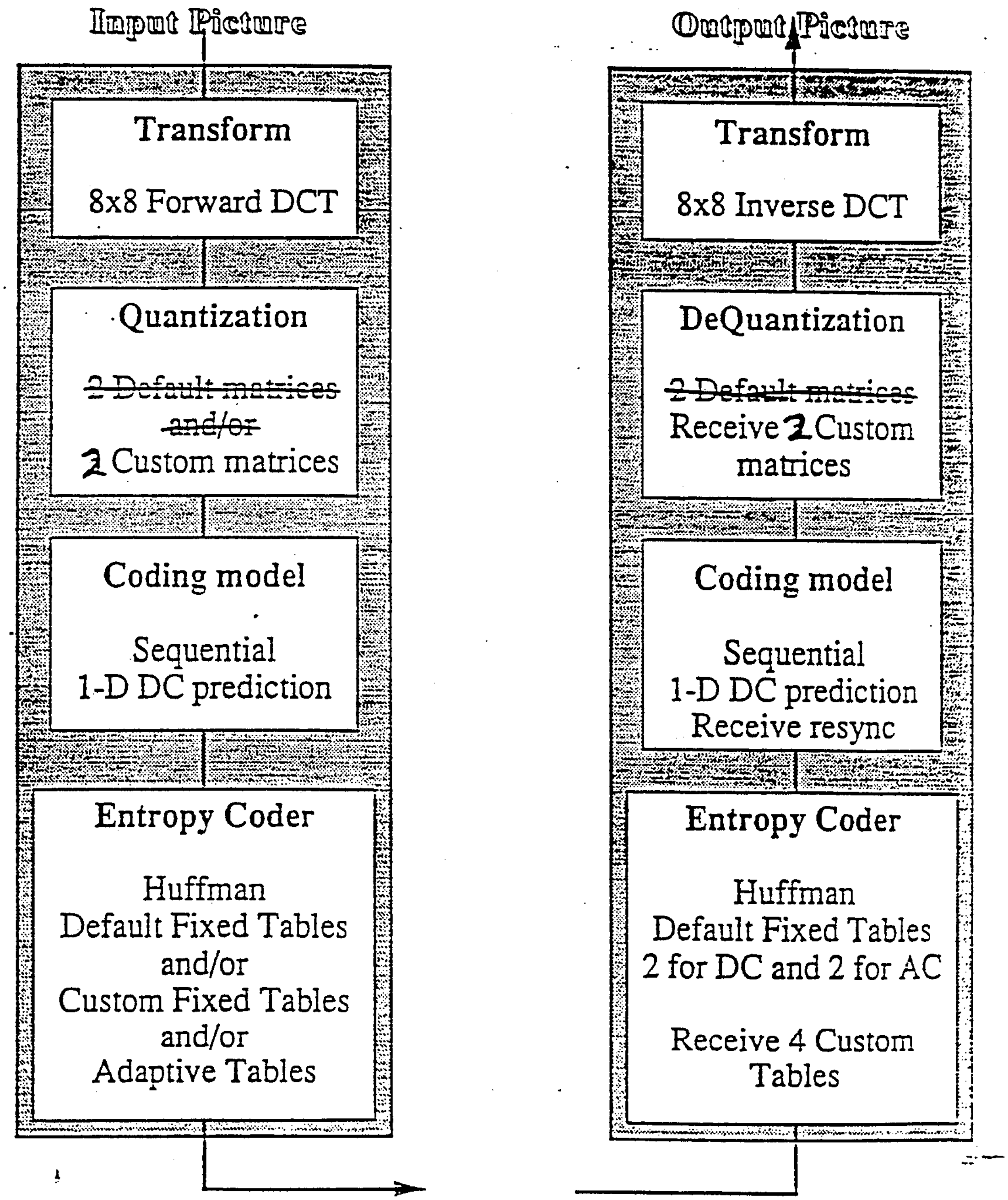

Pre - Encoder: Color Conversion
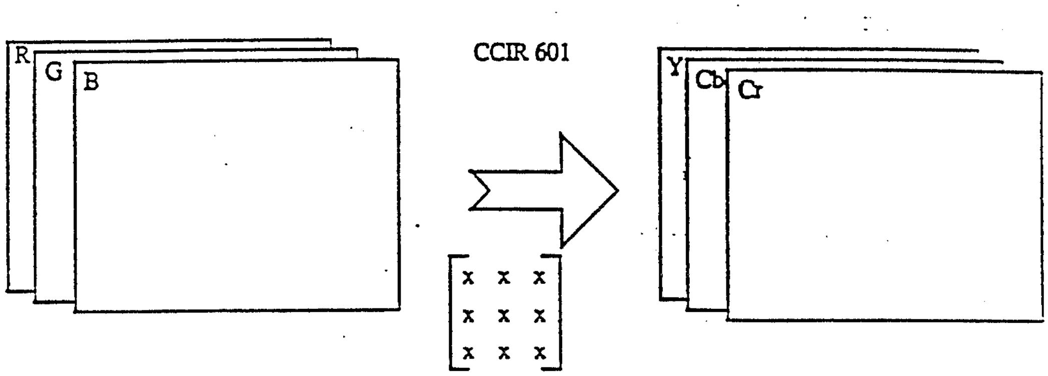
Filtering and Sub-sampling
Most likely format
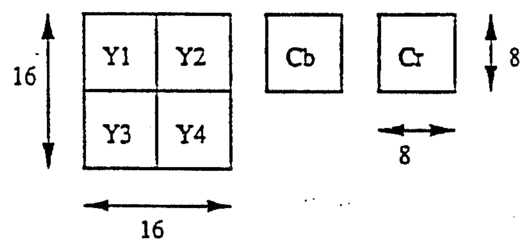
To Encoder Input data: 8-bits, Y, Cr, Cb according to CCIR 601
Questions ? What if we don't have Y, Cr, Cb
What if the pixels are more than 8 bits

Encoder: Forward Transform

8x8 Discrete Cosine Transform put formula here

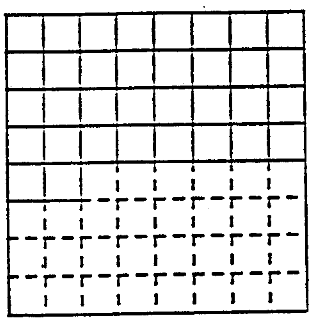

Seperation of image into 8x8 blocks

Each block get transformed into an 8x8 blo of DCT coefficients

Example coefficient (1,1) is the DC value of the block.

DCT-transform requirements:

- fast implementation on 16 bit micro processor.
- The forward transform followed by the inverse transform yields a picture close to the original.

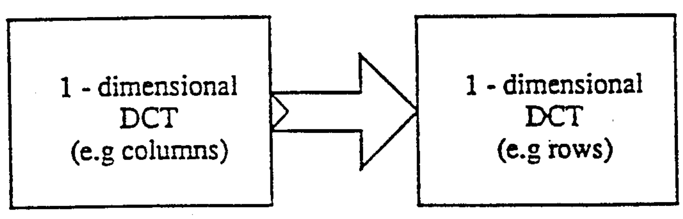

Encoder: Coding Model
• Separation of DC and AC coefficients
DC Coefficients
in each block
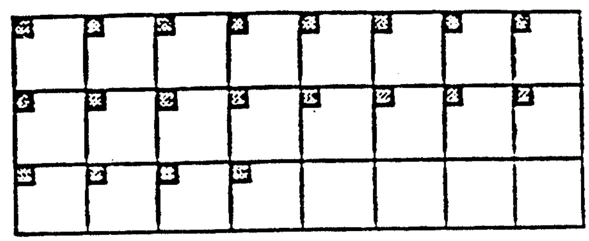
AC coefficient ordering within a block
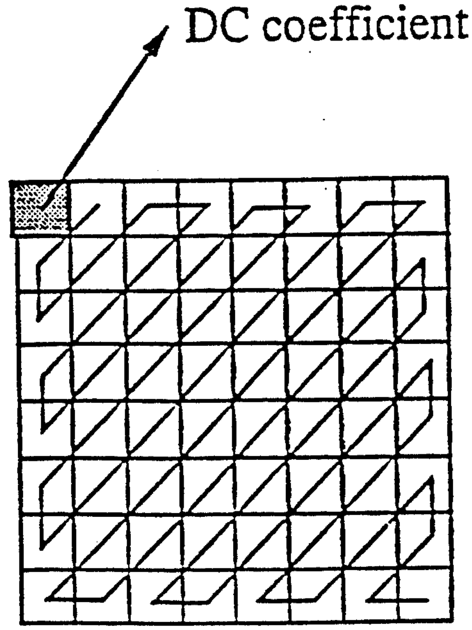

AC coding sequence a) Start counting run length of zero's b) if a signifcant number is found -> determine most significant but and position in 2D Huffman table.

c) code the sign + residue value with code-length given by index d) repeat a,b,c until End of Block is reached.

The Decoder follows the encoder but in a reverse order.

Exception:

The decoder can detect a special code used for resynchronization !!

5. Overview 5.1 Introduction

This specification defines a set of still picture gray scale and color image data compression algorithms. The algorithms are applicable to digital images corresponding to natural scenes and other types of continuous tone images, and are expected to give good compression performance on images with precisions from 4 to 16 bits per component sample. The algorithm can be applied to arbitrary source image resolutions, many color models, multiple image components, various sampling formats, and continuous tone renditions of text. The technique does not apply to bi-level images.

Two classes of compression algorithms are defined, a set based on the two-dimensional discrete cosine transform (DCT) and a set based on spatial prediction techniques. The DCT based algorithms are intended to give output image quality relative to the source images ranging from very good to visually indistinguishable. The spatial algorithms use differential pulse code modulation (DPCM) techniques, and are intended primarily for lossless and nearly lossless coding.

Two modes of operation are defined, sequential and progressive. In the sequential mode, the top row or segment of data in the image is coded and either stored or distributed; then a second row or segment is coded and either stored or distributed. The process continues until the entire image has been coded. In each case, each segment is fully coded. The decoder decodes the segments in the order in which they were coded.

In the progressive mode of operation, an entire image is first coded at some level of quality which is less than the final quality needed. This same image is then coded again, but at a higher level of quality. Each time the image is coded, only the incremental information needed to improve the quality is transmitted. The process is repeated successively until the desired level of quality has been obtained. The decoder decodes the first quality level image and the incremental information in the same order in which they were coded.

A "baseline system" is defined which guarantees that a reasonable level of function will be present in all decoders which use the DCT algorithms. This baseline system uses a restricted version of the sequential DCT algorithm. The baseline system must be present in all systems which use the DCT compression algorithms.

The baseline DCT system capabilities can be enhanced in a number of ways. These so called "extended systems" can use progressive modes of compression, higher precision (up to 12 bits/sample), and alternative coding techniques. They have fewer constraints in several other important parts of the system.

A separate lossless coding system is defined which uses a DPCM algorithm. The baseline DCT system is not required in a lossless decoding system.

The compression achieved with these algorithms is dependent on the characteristics of the images. For the color images of natural scenes which have been used for testing and development of the algorithms, recognizable images are obtained at about 0.1 bits per pixel and useful images are obtained at about 0.25 bits per pixel. At 0.75 bits per pixel the images are typically of excellent quality, and at about 1.5 bits per pixel or less the images are essentially indistinguishable from the original source images. Lossless coding is obtained at about 2:1 compression for these test images. All of these ratios are based on tests of 4:2:2 CCIR 601 format Y,Cb,Cr images with an average of 16 bits/pixel.

5.2 The coding system

The coding system consists of two distinct structural blocks in both the encoder and the decoder. Figure 5.2.1 provides a sketch of the basic structure.

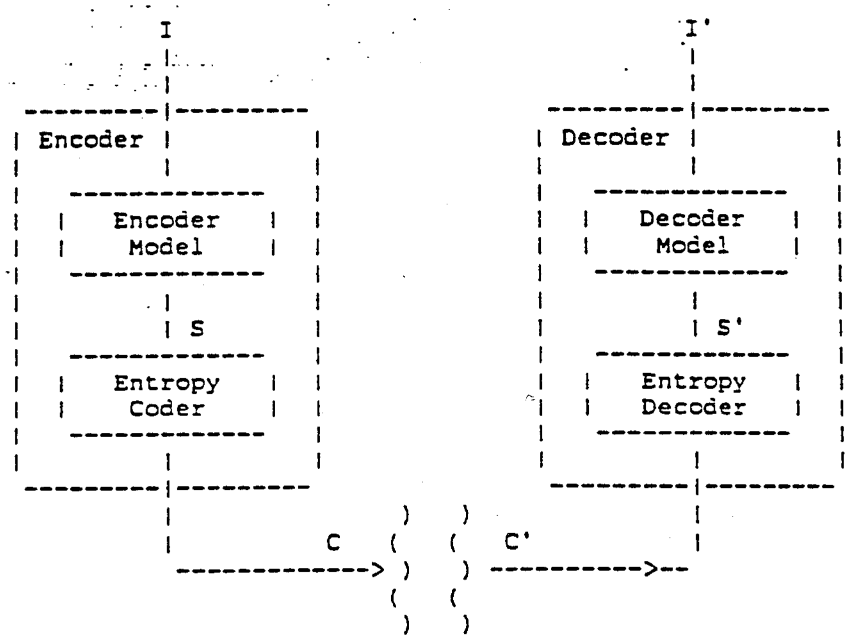

Figure 5.2.1 Encoder and Decoder systems

Input data I is fed into the encoder model. The encoder model creates a set of symbols or coding decisions S from the input data, and this representation of the input data is fed to the entropy coder. The entropy coder in turn creates a coded data stream C, which - after transmission or storage - is the input C' to the entropy decoder. The entropy decoder reconstructs the set of symbols or coding decisions S', and this representation is fed to the decoder model which creates the output image data I'.

In general, I' may not be an exact replica of I. However, S' should be exactly the same as S, provided that C' is exactly the same as C. Therefore, the entropy coder and entropy coder are lossless, and the difference (distortion) between I' and I is introduced only in the encoder and decoder model.

The possibility of channel errors which can make C not equal to C' is recognized to exist in some environments. Procedures have been defined which permit extra, optional, redundancy to be incorporated into C in order to make it possible to recover from some error conditions.

The coding models fall into two classes, those for DCT based systems and those for DPCM based systems.

5.2.1 Models for DCT based systems

The models for the DCT based systems can be divided into three parts, as shown in figure 5.2.1.1.

```
         I                                          I'
         |                                          |
         |                                          |
 ---------|---------                      ---------|---------
| Encoder |         |                    | Decoder |         |
|         |         |                    |         |         |
|   -------------   |                    |   -------------   |
|  |    FDCT     |  |                    |  |    IDCT     |  |
|  |   (8x8)     |  |                    |  |   (8x8)     |  |
|   -------------   |                    |   -------------   |
|         |         |                    |         |         |
|         |         |                    |         |         |
|   -------------   |                    |   -------------   |
|  |  Quantize   |  |                    |  | Dequantize  |  |
|   -------------   |                    |   -------------   |
|         |         |                    |         |         |
|         |         |                    |         |         |
|   -------------   |                    |   -------------   |
|  | Coefficient |  |                    |  | Symbol to   |  |
|  |  to Symbol  |  |                    |  | Coefficient |  |
|  |  conversion |  |                    |  | conversion  |  |
|   -------------   |                    |   -------------   |
|         |         |                    |         |         |
 ---------|---------                      ---------|---------
          |                                        |
          | S                                      | S'
```

Figure 5.2.1.1 Encoder and Decoder models for the DCT based systems

In the encoder 8x8 blocks of input samples are transformed using the forward DCT (FDCT) into an 8x8 array of DCT coefficients. These coefficients are quantized using an 8x8 matrix of quantization values, and the quantized output is fed to a procedure which converts the coefficient values to a set of symbols. This last step is lossless.

In the decoder the symbols decoded by the entropy decoder are fed to a procedure which converts them to quantized DCT coefficient values. These quantized DCT coefficients are dequantized using the same quantization values employed by the encoder. The inverse DCT (IDCT) then converts the 8x8 DCT array back into an 8x8 array of sample values.

The distortion between I and I' is governed entirely by the FDCT, quantization, dequantization and IDCT procedures.

5.2.2 Models for the DPCM algorithms

The models for the DPCM algorithms can be divided into two parts, as shown in figure 5.2.2.1.

```
             I                                   I'
             |                                   |
             |                                   |
    ---------|---------                 ---------|---------
    | Encoder |         |               | Decoder |         |
    |         |         |               |         |         |
    |   -------------   |               |   -------------   |
    |   | calculate  |  |               |   | reconstruct | |
    |   | Difference |  |               |   |   Output    | |
    |   -------------   |               |   -------------   |
    |         |         |               |         |         |
    |   -------------   |               |   -------------   |
    |   | Difference |  |               |   | Symbol to   | |
    |   |  to Symbol |  |               |   | Difference  | |
    |   |  conversion|  |               |   | conversion  | |
    |   -------------   |               |   -------------   |
    |         |         |               |         |         |
    ---------|---------                 ---------|---------
             |                                   |
             | S                                 | S'
```

Figure 5.2.2.1 Encoder and Decoder models for DPCM algorithms

In the DPCM encoder a prediction is generated from neighboring values which have already been coded and are known to the decoder. The difference between the sample and this predicted value is then calculated and fed to the Difference-to-Symbol conversion procedure. Alternatively, a difference can be calculated between the sample and a corresponding sample taken from an image I' generated by an earlier stage of a hierarchical progression.

In the DPCM decoder, the symbols are converted back into differences, and these differences are added to the prediction (the same prediction as in the encoder) to generate the output values I'.

The distortion between I and I' is governed entirely by the calculation of the difference and the calculation of the reconstructed output. The Difference-to-Symbol and Symbol-to-Difference conversions are lossless.

5.3 The two-dimensional Discrete Cosine Transform (DCT)

The 8x8 two-dimensional discrete cosine transform is a key part of the DCT based algorithms. The transform used is an 8x8 transform, which means that the FDCT transforms 8x8 blocks of pixel data into 8x8 blocks of DCT coefficients.

Image quality is determined by frequency dependent quantization of the DCT coefficients. A matrix of quantization values is used which has 64 independent elements.

5.3.1 8x8 sample block and 8x8 DCT Coefficient block conventions

The 8x8 blocks of samples are obtained by dividing the input sample array into contiguous 8x8 blocks. As an example, the subdivision of a Y-Cb-Cr image with vertical resolution of 576 rows and horizontal resolution of either 720 columns (Y) or 360 columns (Cb and Cr) is shown in figure 5.3.1.1.

```
               |<----720----------->|                       |<---90------------>|
               |     columns        |                       |  blocks           |
   -----       --------------------           -------       -+-+-+-+-----------
     |         |                    |            |          |-+-+-+-+-----------|
     |         |                    |            |          |-+-+-+-+-----------|
 576 rows      |        Y           |  ===>  72 blocks      |-+-+-+-+-----------|
     |         |                    |            |          | + + + +           |
     |         |                    |            |          | + + + +           |
   -----       --------------------           -------       -------------------

               |<--360--->|                                 |<---45--->|
               | columns  |                                 |  blocks  |
   -----       ----------                     -------       -+-+------
     |         |          |                      |          |-+-+------|
     |         |          |                      |          |-+-+------|
 576 rows      |    Cb    |           ===>  72 blocks       |-+-+------|
     |         |          |                      |          | + +      |
     |         |          |                      |          | + +      |
   -----       ----------                     -------       ----------

               |<--360--->|                                 |<---45--->|
               | columns  |                                 |  blocks  |
   -----       ----------                     -------       -+-+------
     |         |          |                      |          |-+-+------|
     |         |          |                      |          |-+-+------|
 576 rows      |    Cr    |           ===>  72 blocks       |-+-+------|
     |         |          |                      |          | + +      |
     |         |          |                      |          | + +      |
   -----       ----------                     -------       ----------
```

Figure 5.3.1.1 Example of 8x8 block division

Note that this subdivision process is defined relative to the internal representation of the image - the representation that is used in the encoding and decoding. The relationship between this internal representation and the actual image is determined by the application.

The samples within each 8x8 block are assigned horizontal indices i with values from 0 to 7, and vertical indices j with values from 0 to 7. Figure 5.3.1.2 illustrates the convention.

```
                     horizontal sample index i

                       0   1   2   3   4   5   6   7
                     _|__|___|___|___|___|___|___|___|_
                  0  _|__|___|___|___|___|___|___|___|_
       vertical   1  _|__|___|___|___|___|___|___|___|_
        sample    2  _|__|___|___|___|___|___|___|___|_
       index j    3  _|__|___|___|___|___|___|___|___|_
                  4  _|__|___|___|___|___|___|___|___|_
                  5  _|__|___|___|___|___|___|___|___|_
                  6  _|__|___|___|___|___|___|___|___|_
                  7  _|__|___|___|___|___|___|___|___|_
                      |  |   |   |   |   |   |   |   |
```

Figure 5.3.1.2. Convention for sample indices in 8x8 block

The 8x8 array of DCT coefficients is ordered with the DC component in the upper left corner, increasing horizontal "frequencies" to the right and increasing vertical "frequencies" going down the array. Figure 5.3.1.3 illustrates the convention. The DC coefficient position is crosshatched, while the AC coefficients are left blank.

```
                      horizontal frequency index u

                         0   1   2   3   4   5   6   7
                       _|___|___|___|___|___|___|___|___|_
                    0  _|XX |___|___|___|___|___|___|___|_
      vertical      1  _|___|___|___|___|___|___|___|___|_
      frequency     2  _|___|___|___|___|___|___|___|___|_
      index v       3  _|___|___|___|___|___|___|___|___|_
                    4  _|___|___|___|___|___|___|___|___|_
                    5  _|___|___|___|___|___|___|___|___|_
                    6  _|___|___|___|___|___|___|___|___|_
                    7  _|___|___|___|___|___|___|___|___|_
                        |   |   |   |   |   |   |   |   |
```

Figure 5.3.1.3. Convention for 2-D DCT coefficient array

5.3.2 Forward DCT (FDCT) and Inverse DCT (IDCT) reference models

The reference models for the two-dimensional FDCT and IDCT calculations are based on the following formulae:

FDCT:

$$F(u,v) = (1/4)C(u)C(v) \sum_{i=0}^{7} \sum_{j=0}^{7} f(i,j) \cos(2i+1)u\,\pi/16 \cos(2j+1)v\,\pi/16$$

IDCT:

$$f(i,j) = (1/4) \sum_{u=0}^{7} \sum_{v=0}^{7} C(u)C(v)F(u,v) \cos(2i+1)u\,\pi/16 \cos(2j+1)v\,\pi/16$$

where

| | | |
|---|---|---|
| $C(u)$ | $= 1/\sqrt{2}$ | for u=0 |
| $C(u)$ | $= 1$ | for u not =0 |
| $C(v)$ | $= 1/\sqrt{2}$ | for v=0 |
| $C(v)$ | $= 1$ | for v not =0 |

f(i,j): input/output picture element (from -128 to 127 for baseline system)

F(u,j): DCT coefficient (from -1023 to 1023 for baseline system)

The reference calculation should be carried out in a double precision (64 bit) floating point representation.

There are quite a few FDCT and IDCT implementations which use algorithms designed to reduce the number of multiplications and additions in the transformation. These practical, fast, DCT algorithms use fixed precision integer arithmetic. Because round-off and truncation effects depend on the way the calculations are done, different IDCT implementations will give slightly different answers.

Although there is no formal specification of the implementation, the techniques for computing the FDCT and IDCT should have sufficient accuracy relative to the reference calculation to meet the requirements of the application.

5.3.2.1 Level Shift

Unless a difference image is being coded, the input data has an unsigned representation. When coding unsigned data of precision P, the input is level shifted by subtracting 2**(P-1) before processing with the forward DCT. (For 8 bit precision, 128 is subtracted.) After processing with the IDCT, the same level shift must be added to the output values to return them to an unsigned representation.

5.3.3 Quantization and Dequantization

A property of the FDCT is that it typically concentrates the energy of the 64 samples contained in each 8x8 block of data into just a few of the 64 transform coefficients. Within a given block, eight times the average of the values of the 64 pixels is found in one, so called, DC coefficient. If the entire block has a constant value, then only this DC term can be non-zero. Deviations from a constant-value block will generally introduce non-zero values in some of the other 63, so called, AC coefficients.

5.3.3.1 Quantization transfer function

Quantized coefficient values are obtained by linearly quantizing each DCT coefficient with the quantization value, Q(u,v), assigned to that coefficient. Figure 5.3.3.1.1 illustrates the relationship between the unquantized DCT coefficient, F(u,v) and the quantized DCT coefficient, C(u,v).

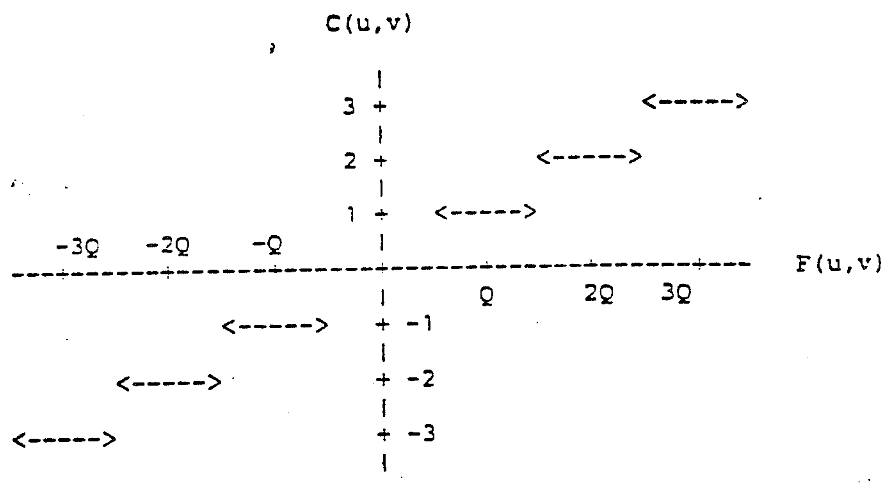

Figure 5.3.3.1.1. Illustration of linear quantization procedure

The mathematical relationship for the quantization procedure is:

For F(u,v) >= 0,

C(u,v) = ( F(u,v) + (Q(u,v)/2 ) / Q(u,v)

and for F(u,v) < 0,

C(u,v) = ( F(u,v) - (Q(u,v)/2 ) / Q(u,v)

The dequantization should also be linear; letting F'(u,v) denote the dequantized DCT coefficients, the dequantization procedure is:

F'(u,v) = C(u,v) * Q(u,v)

Loss is introduced during the quantization process, making the process irreversible in general.

.3.3.2 The matrix of quantization values

Tests with human observers have shown that the AC coefficients are not of equal importance. Taking advantage of the variation in the sensitivity of the human eye, one can use coarse quantizers for the "high frequency" coefficients.

The quantization of each of the 64 coefficients is separately specified by a quantization matrix of 64 independent values. In principle, a different matrix should be defined for each color coordinate system, spatial resolution, data precision and application. Therefore, default matrices are not specified - instead, the quantization matrix is always included in the compressed data signaling information.

As a guide and example, however, tables 5.3.3.2.1 and 5.3.3.2.2 give two matrices which have been used with good results on 8 bit/sample Y,Cb,Cr images of the format illustrated in figure 5.3.1.1. Note that these quantization values are appropriate for the DCT normalization defined in section 5.3.2.

Table 5.3.3.2.1. Luminance quantization matrix

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Table 5.3.3.2.2. Chrominance quantization matrix

| | | | | | | | |
|---|---|---|---|---|---|---|---|
| 17 | 18 | 24 | 47 | 66 | 99 | 99 | 99 |
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

If these quantization values are divided by 2, the resulting image is usually nearly indistinguishable from the original.

5.4 Entropy coding

Both a Huffman coding technique and a one-pass adaptive arithmetic coding technique have been defined for the lossless entropy coding procedure of figure 5.2.1.

5.4.1 Huffman coding

The Huffman coding procedures use codes from a table of code words which is fixed for the duration of the coding procedure. Each symbol supplied by the model is coded using a particular code word extracted from the table.

The tables used by the Huffman coding technique can be constructed from information which can (optionally) be included as part of the signaling parameters. It is therefore possible to create custom Huffman tables whic are appropriate for a class of images, or even specifically optimized f each individual image.

Alternatively, default Huffman code tables are included in the ba system - two tables for DC coefficient coding (DPCM algorithm) and two for AC coefficient coding --and these tables may be used in place of the custom tables. For each type of table, one default is intended for use with luminance data; the other is intended for chrominance data.

The baseline system uses only the Huffman coding technique.

5.4.2 Arithmetic coding

Adaptive binary arithmetic coding procedures and associated coding models have also been defined for each of the coding systems. Custom tables are not necessary for this type of coder, since the functional equivalent of the code tables - the set of probability estimates - is adapted dynamically to each image, and even to regions within each image. The arithmetic coding procedures thus provide a one-pass adaptive mode of coding.

5.5 Coding models for the DCT compression systems

The coding models for the DCT algorithms can be divided into two basic classes - the DPCM model for coding the DC coefficients and a separate model for coding the AC coefficients. These models are designed for the sequential algorithm and (with some minor enhancements) the first stages of the progressive DCT sequence. A modified set of models is required for later stages of the DCT progression.

5.5.1 DPCM coding model for the DC coefficients

The DPCM coding model for the DC coefficients is a one-dimensional coding model in which the DC value of the previous 8x8 block of a given component is used as to predict the DC value being coded. The difference is coded losslessly.

In the progressive modes, the precision of the DC coefficient is reduced by truncating the low order bits before coding the value with the DPCM algorithm. The full precision of the DC coefficient is recovered in later stages of the progression by sending the low order bits of the DC coefficient one bit plane at a time.

5.5.2 Coding model for the AC coefficients

For purposes of compression, the two-dimensional DCT array is reordered using a zigzag scan or sampling pattern. This sampling pattern creates a one-dimensional array with DCT coefficients qualitatively in order of ascending spatial frequency. The order of position in the one-dimensional vector is given in table 5.5.2.1. Coefficient 0 is the DC coefficient.

Table 5.5.2.1. Zigzag ordering of DCT coefficients

| | | | | | | | |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

5.5.2.1 Sequential DCT algorithm

In the sequential algorithm the coefficients are coded in order of occurrence in the one-dimensional zigzag array, starting with the DC coefficient. Since many coefficients are zero - especially at high frequencies - the coding models use a run length coding mechanism and an end-of-block symbol to efficiently code runs of zero coefficients.

5.5.2.2 Progressive DCT algorithms -

Two complementary progressive coding techniques are defined for coding the DCT, spectral selection and successive approximation. Spectral selection can be used within stages of successive approximation. The underlying FDCT and IDCT calculations are the same as in the sequential system, and when the last progressive stage is complete, the image quality is identical for the progressive DCT and sequential DCT systems.

5.5.2.2.1 Spectral selection

One way of achieving a progressive coding sequence is to segment the one-dimensional zigzag vector of coefficients into bands and code each band as a separate stage of the progression. This mode is called "spectral selection".

5.5.2.2.2 Successive approximation

Another way of achieving a progressive coding sequence is to send approximate values of the coefficients in the first stage and send the additional information needed to accurately represent the full precision DCT coefficient in later stages. This mode of progressive coding is called "successive approximation". The precision of the DCT coefficient magnitude is truncated in the first stage, and the full precision is recovered in later stages by sending the smaller coefficients and the missing low order magnitude bits one bit plane at a time.

5.6 Lossless DPCM coding model

The lossless coding system uses a DPCM coding model which is derived from the DPCM model used for coding the DC coefficients of the DCT. The predictor is two-dimensional, and is the average of the samples immediately above and to the left of the sample being coded.

Input data precision of up to 16 bits/sample may be used with the lossless coding system.

5.7 Hierarchical mode of progression

A set of additional capabilities is provided through the hierarchical progressive modes. After the first stage (which can be coded with any of the DCT or spatial algorithms), the difference between a reference (the output for the same component from the previous hierarchical stage) and the current source image is coded. The algorithms for coding differences are subsets of the DCT and spatial algorithms already defined.

The hierarchical mode allows changes in spatial resolution as part of the progressive transmission. The resolution changes are accomplished by means of upsampling filters which double the spatial resolution of the reference image both horizontally and vertically.

5.8 Organization of the technical specification

The sections which follow this introduction and overview are as follows:

Section 6 provides a detailed specification of the input data organization, compressed data organization and all signaling parameters required for decoding of an image.

Section 7 describes sequential DCT coding with Huffman coding. This section also defines the baseline system.

Section 8 describes the sequential DCT mode with arithmetic coding.

Section 9 describes the successive approximation and spectral selection progressive modes for coding the DCT.

Section 10 describes the DPCM lossless coding algorithm.

Section 11 describes the hierarchical modes which provide for progressive coding with resolution changes between stages as well as refinement of image quality at a fixed resolution. The algorithms for coding difference images are described in this section.

Section 12 describes the arithmetic coding procedures used in the coding models defined for arithmetic coding.

Section 13 contains a variety of material which is not part of the specification of the algorithm, but nonetheless is important for an understanding of how to use the system. Among the topics covered in this section are the techniques for generating custom Huffman tables, some of the decoding procedures, a typical downsampling filter for use in the hierarchical mode, some test data for arithmetic coding, and a procedure for suppressing blocking artifacts in the output images.

Detailed Specifications

6. Data organization and signaling parameters

This section first describes the data organization for input data and compressed data. It then defines the signaling parameters contained in the compressed data.

Each component of the image is represented internally in the compression/decompression system as a rectangular array of samples. The relationship between this internal representation as a rectangular array and the placement of pixels in the physical image is defined by the application. All signaling parameters and conventions for processing the data are defined with respect to the internal representation.

Some of the signaling parameters may also be useful in the application. Since the internal and external representations may not be identical, applications may need to duplicate some of the information in additional application specific signaling information.

6.1 Image data ordering

An image can contain up to 255 unique components. The components are grouped into frames, and each frame can contain up to four components.

6.1.1 Image frames and scans

Each frame of an image contains data for up to four image components; a frame consists of one or more scans through the image data for each component defined in the frame signaling parameters. Each frame in an image is independently specified, except that down-loaded matrices and tables may be retained from one frame to the next.

Within each scan, two basic types of data ordering are defined, interleaved and non-interleaved. With non-interleaved data, each scan contains only one component; with interleaved data, each scan contains data from all of the components in the frame.

All scans within a single frame must use the same data ordering.

6.1.1.1 Minimum data unit (MDU)

The minimum data unit (MDU) is the smallest unit of data which is allowed for a given class of compression algorithm and data ordering.

In the encoder any incomplete MDU are completed by replication of the right-most column and the bottom row of each component. Any extra rows and columns added by the encoder are discarded by the decoder.

6.1.1.1.1 MDU for the DCT algorithms - 8x8 blocks and block interleaves

For DCT algorithms with non-interleaved data, the MDU is an 8x8 block of samples. The 8x8 block units result from the division of each component into contiguous 8x8 sample blocks for purposes of computing the DCT. The upper left 8x8 block is aligned with the upper left 8x8 group of pixels in the array. The blocks in the component are processed from left to right along block rows, and from top block row to bottom block row of each component.

For DCT algorithms with interleaved data the MDU is a block interleave. A block interleave consists of a sequence of 8x8 blocks of samples containing one or more 8x8 blocks from each component in the frame. The order of blocks and the number of blocks in a block interleave are determined from the sampling ratio signaling parameter. The sampling ratio defines the relative frequency both horizontally and vertically for the sampling of the individual components in the frame. This will be described in more detail in the section which defines the sampling ratio.

6.1.1.1.2 MDU for the spatial algorithms - samples and sample interleaves

For spatial algorithms with non-interleaved data the MDU is one sample. The samples from each component are processed from left to right along rows, and from top row to bottom row.

For spatial algorithms with interleaved data the MDU is a sample interleave. A sample interleave is comprised of a sequence of samples containing one or more samples from each component in the frame. The order of samples and the number of samples in a sample interleave are determined from the sampling ratio signaling parameter; this will be described in the section which defines the sampling ratio.

6.1.1.2 Coding interval

The coding interval is defined to be an integer multiple of MDUs. If resynchronization is enabled, the coding interval is also the resynchronization interval.

For the spatial algorithms only certain integer values are allowed. The coding interval for the spatial algorithms must be a multiple of the number of MDU in one row of the frame.

6.1.1.2.1 Coding interval for the sequential DCT mode

In the sequential DCT mode the 8x8 blocks are coded in one pass. For this mode, either block interleaved or non-interleaved data ordering is allowed within a scan. However, each 8x8 block is coded as a separate unit. Therefore, for the sequential DCT mode the coding interval is only used to define the resynchronization interval.

6.1.1.2.2 Coding interval for the progressive DCT and spatial modes

In the progressive DCT and spatial algorithms the coding interval and sampling ratio are used to define a data interleave with a periodicity which can be much larger than the periodicity of the block interleave. Within a coding interval the components are coded in the sequence defined in the sampling ratio, but without any interleaving. The order of coding of the components within a coding interval is defined by the sampling ratio.

For some of the progressive coding algorithms, code words have been defined which describe features from more than one 8x8 block. These code words may only be used to describe features from a sequence of blocks of a single component within a single coding interval. In addition, in the progressive modes the DC coefficient is coded separately from the AC coefficients within a coding interval.

6.1.1.2.3 Incomplete coding interval at the end of a scan

If the coding interval specified is not a factor of the total number of MDU in the frame, the final coding interval will be incomplete. The size of the final interval is then reduced such that it contains the number of MDU required to complete the frame.

6.1.1.2.4 Non-interleaved data ordering within a scan

For non-interleaved data ordering the coding interval has the same function as in the interleaved data organizations. However, only one component is coded in each coding interval.

6.1.1.3 Constraints on data ordering

Only one data ordering can be used within a single frame.

The sequential DCT mode can use either non-interleaved data ordering or block interleaved data ordering. The sequential DCT mode uses only one scan per frame when using block interleave, and only one scan per component when using non-interleaved data ordering.

The progressive DCT algorithms and the spatial algorithms use the extended data interleave defined by the coding interval and sampling ratio.

6.2 Compressed data organization and conventions

The compressed data stream contains delineated segments for each frame in the image. The compressed data stream segment for each frame contains a segment with signaling parameters followed by delineated segments for each scan. Each scan contains a segment with signaling parameters and a coded data segment. The coded data segments contain data generated using either Huffman coding or Arithmetic coding techniques. Special resynchronization codes may also be imbedded within the coded data segment.

The image frames and the segments within a frame are delineated by unique byte aligned "marker" codes consisting of two eight bit integers. The marker codes and associated length fields allow the various segments to be located in the compressed data without decompression of the coded data.

6.2.1 Bit ordering and byte ordering conventions in the compressed data

The bit ordering and byte ordering conventions in the compressed data are as follows:

1. The coded data are byte aligned; if the data are converted to a serial bit stream, bytes are sent least-significant-bit first.

2. Sixteen bit integers are sent least-significant-byte first.

3. Huffman codes are sent root first.

4. Variable length integers associated with Huffman coding are sent least-significant-bit first.

5. Arithmetic codes are sent most-significant-byte first.

6.2.2 Marker code definitions

Unique marker codes have been defined which make it possible for a decoder to parse the compressed data and locate specific segments without having to decompress data in other segments.

The marker codes consist of two byte-aligned 8 bit integers. The first 8 bit integer is always X'FF'; the second integer is any value greater than or equal to X'C0'. The X'FF' byte occurs first in the compressed data. Table 6.2.2.1 contains the definitions of the various marker codes.

The Huffman and Arithmetic codes are constrained such that a marker code cannot be created by any valid sequence of normal coding operations. For Huffman coding the constraint is introduced by inserting ("stuffing") a zero byte following any X'FF' byte which is created by any combination of Huffman codes or appended bits. 1-bits are used to pad the coded data to get byte alignment of the marker code. If these 1-bits happen to create a X'FF' byte, a zero byte is stuffed before appending the X'FF' prefix to the marker code. Further discussion on the use of marker codes within the coded data is contained in the sections on Huffman coding.

In arithmetic coding the constraint which keeps marker codes unique is introduced by a bit stuffing procedure which must be invoked whenever a byte aligned X'FF' is produced in the coded data. This procedure guarantees that the arithmetic coder will not generate a byte with a value greater than X'8F' following a X'FF'. The byte aligned X'FF' prefix for the marker code is generated in the process of emptying (flushing) the current contents of the arithmetic coder code register. Further discussion on the use of marker codes within the coded data is contained in the sections on arithmetic coding.

For those marker codes followed by a variable length field, the first two bytes of the variable length field contain an unsigned 16 bit integer giving the length of the field in bytes (the length includes the two bytes specifying the length). The variable length field may contain accidental marker code patterns.

| bit msb 7 | 6 | 5 | 4 | 3 | 2 | 1 | lsb 0 | field length | category |
|---|---|---|---|---|---|---|---|---|---|
| 1 | 1 | 0 | 0 | x | x | x | x | V | PRV - Private use |
| 1 | 1 | 0 | 1 | x | x | x | x | V | APP - Application use |
| 1 | 1 | 1 | 0 | x | x | x | x | V | SOF - Start of frame |
| 1 | 1 | 1 | 1 | 0 | j | k | m | 0 | RSC - Fixed interval resync |
| 1 | 1 | 1 | 1 | 1 | 0 | 0 | 0 | V | SOS - Start of scan |
| 1 | 1 | 1 | 1 | 1 | 0 | 0 | 1 | 2 | LCT - Line count follows (16 bits) |
| 1 | 1 | 1 | 1 | 1 | 1 | 0 | 0 | 0 | SOI - Start of image |
| 1 | 1 | 1 | 1 | 1 | 1 | 1 | 0 | 0 | EOI - End of image |
| 1 | 1 | 1 | 1 | 1 | 1 | 1 | 1 | 0 | FIL - fill bits |

Table 6.2.2.1 Definition of the second 8-bit integer of the Marker codes

The SOI (Start Of Image) marker code always starts the compressed data stream. Usually (for the exception, see PRV and APP marker code descriptions below), the SOI marker code is followed immediately by the SOF marker code. Note that the SOI marker code can be used to detect problems with either bit order or bit sense of the data.

The SOF (Start Of Frame) marker code starts the signaling parameter sequence for the signaling parameters which apply to all scans within a given image frame. The length field gives the length in bytes for this portion of the signaling parameters. The SOF marker code contains a four bit field which can be used (optionally) for modulo 16 numbering of the image frames.

The SOS (Start Of Scan) marker code starts the signaling parameter sequence for a scan within the image frame. The length field gives the length in bytes for this portion of the signaling field. Each scan in the frame must start with this marker code.

The EOI (End Of Image) marker code terminates the compressed data stream.

The RSC (Resynchronization) marker code may be added to the compressed data at the start of each coding interval. If used, it provides a unique byte aligned code which can be located by scanning the compressed data. A three bit field in this marker code provides a modulo 8 resynchronization interval count. The decoder must be able to bypass this marker code if it is unable to interpret it.

The LCT (Line Count) marker code provides a mechanism for transmitting the line count at the end of the scan. It is followed by a 16 bit unsigned integer value containing the number of lines in the frame. If the LCT marker code is used, it should be added to the compressed data at a point where the decoder will intercept the information before it is needed to terminate the decoding process. The procedure for doing this is different for Huffman coding and Arithmetic coding, and therefore will be described in the sections on these coders. The LCT marker code can only be used at the end of the final coding interval of the first scan in a frame.

The FIL (Fill) marker code provides a mechanism for extending the 1-bit sequence in the marker code prefix (X'FF'). The FIL marker code must always be followed by another marker code.

The PRV and APP marker codes are marker code categories reserved for private use and application specific use respectively. Information contained in these fields should not affect the decoding of the compressed data. These codes and associated fields may be inserted into the compressed data before the SOF and SOS marker codes (which then occur immediately after the inserted field). They can also be inserted immediately after the scan signaling field. The decoder must be able to bypass these fields if it is unable to interpret them. PRV and APP marker codes and associated fields may be followed by other PRV and APP marker codes and by any other marker codes which are allowed at that position in the compressed data.

Marker codes with values less than X'C0' are reserved.

6.2.3 Structure of the compressed data stream

The structure of a typical compressed data set is as follows:

```
SOI
     SOF, frame parameter field length, frame parameters
          SOS, scan parameter field length, scan  parameters
               RSC *,  coded data for coding interval
               RSC **, coded data for coding interval
               ... etc. ...
               RSC **, coded data for final coding interval
          SOS, scan parameter field length, scan  parameters
               RSC *,  coded data for coding interval
               RSC **, coded data for coding interval
               ... etc. ...
               RSC **, coded data for final coding interval
          ... etc. ...
     SOF, frame parameter field length, frame parameters
          ... etc. ...
     ... etc. ...
EOI
```

* Optional marker code which enables resynchronization at the start of each coding interval.

** RSC Marker must be present if resynchronization is enabled.

where the SOI, SOF, SOS, RSC and EOI marker codes are defined in section 6.2.2. The coded data is the portion of the data stream created by Huffman or Arithmetic coding. Coded data segments are always terminated by a marker code.

6.4 Signaling parameters for a frame

The signaling parameters following the SOF marker code are as follows:

| parameter | number of bits in field |
|---|---|
| Signaling field length | 16 |
| Mode selection | 8 |
| Data precision | 8 |
| Number of lines (internal) | 16 |
| Line length (internal) | 16 |
| Coding interval | 16 |
| Sampling ratio | V |
| Quantization matrix assignment | V/0 |
| Quantization matrix specification | V/0 |

V variable length

When a parameter precision is indicated by N/0, the field is N bits when present. However, the field is omitted when not needed.

All integer signaling parameters are unsigned.

6.4.1 Signaling field length

A 16 bit integer gives the length in bytes of the signaling parameters for the frame. The length value excludes the two bytes allocated to the SOF marker code, but includes the two bytes in the length field.

6.4.2 Mode selection

An 8 bit integer identifies the mode selected for the compression algorithm. The bit assignments in the mode selection parameter are given in table 6.4.2.1.

Table 6.4.2.1 Bit assignments in the mode selection byte.

| bit position | bit assignment | |
|---|---|---|
| | bit=1 | bit=0 |
| 7 (msb) | reserved | reserved |
| 6 | extended system | baseline system |
| 5 | spatial algorithm | DCT algorithms |
| 4 | differential coding | non-differential coding |
| 3 | hierarchical | non-hierarchical |
| 2 | progressive | sequential |
| 1 | arithmetic coding | Huffman coding |
| 0 (lsb) | reserved | reserved |

A value of zero for the mode selection signals the baseline sequential mode.

Some combinations of bit patterns are illegal. For example, if the baseline system is selected, all other bits must also be zero. However, sequential DCT algorithms with Huffman coding may use extensions beyond the baseline system capabilities.

To give other examples, the selection of either independent lossless or difference coding is only meaningful if spatial algorithms are selected, the difference coding can only be invoked in the hierarchical mode, and selection of progressive and sequential is only meaningful when the DCT algorithms are selected.

Reserved bits must always be set to zero.

6.4.3 Data precision

An 8 bit integer specifies the input data precision in bits. Input precisions of from 1 to 12 bits are allowed for the DCT algorithms. Input precisions of up to 16 bits are allowed for the lossless coding system. All image components in a frame must have the same input data precision.

The precision of the quantized DCT is determined by the input data precision, the smallest quantization matrix value, and the normalization defined for the DCT calculations. The largest quantized DCT coefficient precision possible is 15 bits, corresponding to an input precision of 12 bits and quantization matrix values of one.

In the baseline system the input data precision is 8 bits per component sample and the quantized DCT coefficient precision is limited to a maximum of 11 bits.

Output data have the same precision as input data. However, since the DCT is quantized, it is possible for the the IDCT output to overflow the input data range. Provisions should be made for properly interpreting the output data when this occurs.

Both input and output data have an unsigned representation.

6.4.4 Number of lines in internal representation

A 16 bit integer specifies the number of raster lines in the internal representation of the frame. The value excludes any lines added to complete the block rows. The raster line count for the component with the largest number of samples vertically is used for this field.

If the number of raster lines is set to zero, the number of raster lines is unspecified at the start of compression. If the number of raster lines is unspecified, the marker code which signals the line count must be used in the first scan.

6.4.5 Line length of internal representation

A 16 bit integer specifies the number of pixels per raster line in the internal representation of the frame. The value excludes any columns added to complete a block row. A value of zero is not allowed. The number of samples per raster line for the component with the largest number of samples horizontally is used for this field.

6.4.6 Coding interval

A 16 bit integer specifies the number of MDU in a coding interval. If this value is zero, the coding interval defaults to the number of MDU in the scan.

If resynchronization is enabled, the coding interval is also the resynchronization interval.

6.4.7 Sampling ratio and component identification number

A variable length field specifies the number of components in a frame, the component identification number for each component and the relative sampling ratio for each component. The sampling ratio is defined for the internal representation of the data. The sampling patterns defined for the image components should be regular, rectangular, and appropriate for the compression algorithms.

The signaling information is given by:

Nc, C1, (V1 H1), C2, (V2 H2), ... , Cn, (Vn Hn)

where the (Vk Hk) are 8 bit integers.

Nc = number of components in sampling ratio (8 bit integer).

Ck = number assigned to kth image component (8 bit integer).

Vk = number of vertical samples of kth component (low order 4 bits).

Hk = number of horizontal samples of kth component (high order 4 bits).

Nc must have a value of 1, 2, 3 or 4. All other values are undefined.

The values of Ck are assigned by the application; any 8 bit value other than zero is allowed, but each component must be assigned a unique number which is used for that component in all of the frames in the image. The value of zero is reserved to signal the presence of interleaved data in the scan.

The (Vk Hk) fields make up an 8 bit integer where the Hk value is in the high order four bits and the Vk value is in the low order four bits. The allowed values of Hk and Vk are 1, 2 and 4. All other values are undefined for these parameters. One (Vk Hk) value must be provided for each of the Nc components in the frame.

If interleaved data is used, the sampling ratio and the coding interval define the ordering of blocks (or samples) within the interleave. If non-interleaved data is used, the sampling ratio defines the relative number of rows and the relative number of columns in each component.

For algorithms using interleaved data ordering in a scan, the total number of blocks (or samples) in the minimum data unit (MDU) is the sum over the blocks (or samples) from all of the components.

$$Nb = \sum_{k=1}^{Nc} (Vk)*(Hk)$$

For a given frame, the total number of blocks (or samples) in the MDU must be in the range from 1 to 10 inclusive.

When the frame has only one component, both V1 and H1 are present in the signaling field and should be set to one. The image line length and number of raster lines specified in the signaling fields are the values appropriate for that component.

If the number of lines or the line length would give a fraction of a sample at the right edge or bottom of a component, the component dimensions are rounded up to the next full sample.

6.4.7.1 Relationship to data interleaving

When an interleaved data organization is used, the sequence of blocks in a data interleave follows the order defined in the sampling ratio. Each image component is partitioned into 8x8 blocks, and each 8x8 block becomes one block in the block interleave. Blocks from a given component are contiguous in the interleave, and are concatenated in the interleave in left-to-right, top-to-bottom order relative to the internal representation.

Coding of the blocks is in the order of concatenation within the interleave. Each component uses an independent predictor for coding the DC coefficient.

For example, if a frame is defined with three components, ABC, and the sampling is (2h:2v):(2h:1v):(1h:1v) for A, B and C:

A1,A2 B1,B2 C1
A3,A4

If the coding interval is one, the block sequence is:

A1,A2,A3,A4, B1,B2, C1

Each of the quantities A1,...,C1 represents an 8x8 block of data from a given component. Blocks A1, A2, A3 and A4 use one DC predictor. Blocks B1 and B2 use a second DC predictor and block C1 uses a third DC predictor. The predictor for a given DC coefficient is the DC coefficient of the previous block of the same component.

If the coding interval is two (progressive DCT mode only), the block sequence is:

A1,A2,A1,A2,A3,A4,A3,A4, B1,B2,B1,B2, C1,C1

If the components are numbered X'52', X'47' and X'42' (the ASCII codes for R, G and B), the sampling ratio parameters for this sequence would be:

Nc,C1(H1 V1),C2(H2 V2),C3(H3 V3) = X'03 52 22 47 21 42 11'

As a second example, consider Y,Cb,Cr with (2h:1v):(1h:1v):(1h:1v) sampling:

Nc,C1(H1 V1),C2(H2 V2),C3(H3 V3) = X'03 01 21 02 11 03 11'

For a coding interval of one, the interleave consists of two 8x8 Y blocks, one 8x8 Cb block and one 8x8 Cr block. In this example the Y, Cb and Cr components are numbered 1, 2 and 3, respectively. Note that a component number of 0 is reserved for signaling purposes.

6.4.8 Quantization matrix assignment and point transform assignment

The quantization matrix assignment is required for DCT algorithms.

Each component in a frame is assigned a specific quantization matrix which must be down-loaded as part of the frame signaling information. Up to four matrices are allowed, one for each possible component.

The assignment of quantization matrices is specified by a set of four bit integers, one for each component in the frame.

Tq(1), .... , Tq(Nc)

Up to four quantization matrices can be defined and must be numbered 0, 1, 2 or 3. The Tq values are catenated together in the order in which the components have been defined, forming an integer of either 8 bit or 16 bit precision, where Tq(1) is always placed in the low order four bits of the integer. Any unused high order bits in the integer should be set to zero.

For example, a three component system which used matrix 0 for the first component, matrix 1 for the second component and matrix 2 for the third component would use a 16 bit integer signaling field with a value of X'0210'.

The selections in these fields must be consistent with the number of components and the quantization matrix specification.

The baseline system is restricted to two matrices, 0 and 1.

6.4.8.1 Point transform assignment

For spatial algorithms the quantization matrix assignment field is replaced by a point transform assignment field. The point transform for each component is specified by a four bit field, one four bit field for each component in the frame.

Pt(1), .... , Pt(Nc)

The Pt values are catenated together in the order in which the components have been defined, forming an integer of either 8 bit or 16 bit precision, where Pt(1) is always placed in the low order four bits of the integer. Any unused high order bits in the integer should be set to zero.

6.4.9 Quantization matrix specification

The quantization matrix specification is required for DCT algorithms.

The down-load of a quantization matrix is preceded by an 8 bit integer containing two four bit fields, Pm and Nm.

Pm = precision of matrix elements (high order 4 bits). A value of zero signals an 8 bit integer precision; a value of one signals a 16 bit integer precision. No other values are allowed.

Nm = matrix number (low order 4 bits). Values of 0, 1, 2 and 3 are allowed.

For input precisions of 8 bits or less, Pm must be zero (8 bit precision).

The matrix values are downloaded in zigzag scan order. Following the last matrix value, a new matrix can be downloaded. The matrix downloading sequence is terminated when the 8 bit field comprising Nm and Pm is X'80'; any values other than X'80' or a combination of the allowed values of Nm and Pm are undefined.

Matrices down-loaded in a given image frame may be used in a subsequent image frame. If a matrix is selected which has not yet been down-loaded for the current image, the results will be unpredictable.

The quantization matrix specification field is omitted for the spatial algorithms.

6.5 Signaling parameters for a scan

The signaling parameters for a scan are preceded by the SOS marker code and associated 16 bit integer length field. The signaling parameters which follow are:

| field | precision(bits) |
|---|---|
| Component identification | 8 |
| Progressive coding parameters | 24/0 |
| Code table selection(s) | V |
| Code table specification(s) | V |

When a parameter precision is indicated by N/0, the field is N bits when present. However, the field is omitted when not needed.

6.5.1 Component identification

If the component identification is zero, the data from all components in the frame is interleaved in the manner specifed by the coding interval.

If the component identification is not zero, non-interleaved data ordering is used. In this case, the scan codes one component and the component identification for the scan must match one of the component identification numbers specified in the sampling ratio.

6.5.2 Progressive coding parameters

Progressive coding parameters must be specified when using the progressive modes for coding the DCT. However, in the sequential DCT and spatial algorithms (and in hierarchical modes selecting these algorithms) the progressive coding parameters are omitted.

When present, the progressive coding parameters are:

| field | precision(bits) |
|---|---|
| Successive approximation bit position(s) | 8 |
| Start of spectral selection (inclusive) | 8 |
| End of spectral selection (inclusive) | 8 |

6.5.2.1 Successive approximation bit position(s)

The successive approximation bit positions are specified by an 8 bit integer.

The low order four bits of the 8 bit integer give the magnitude least significant bit position for data which will be coded in the current scan. For the first scan of a given band, this four bit field gives the scaling of the DCT coefficients. The DCT coefficients are divided by 2**B, where B is the value given for the bit position. For subsequent (successive approximation) scans, this field gives the bit position of the magnitude bit which will be coded in the scan.

The high order four bits of the 8 bit integer give the magnitude least significant bit position for data coded in the preceding scan of the band. In the first scan for a given spectral selection band this field must be set to zero. For scans after the first for a given band, this four bit value must be one unit larger than the current successive approximation bit position value. Any other combinations of values for the two four bit fields are undefined.

All coefficients in a band must be coded to the precision set in the previous successive approximation field before invoking the successive approximation algorithm.

6.5.2.2 Start of spectral selection

The start of spectral selection is the index of the first coefficient in the spectral band. The minimum value for the start of spectral selection is 0. A value of 0 signals that DC data is included in the band.

6.5.2.3 End of spectral selection

The end of the spectral selection is the index of the last coefficient in the spectral band. The end of the band must be greater than or equal to the start of the band. The maximum value for the end of spectral selection is 63. The minimum value is the start of spectral selection value.

Each band is coded independently; bands do not have to be contiguous.

6.5.2.4 Coding order for a single coding interval

In progressive modes it is necessary to code the DC coefficients separately from the AC coefficients. It is also necessary to code each component independently. Therefore, the order in which coding operations are carried out is as follows: Within a coding interval the components are coded in the order defined by the sampling ratio (section 6.4.7). If both DC and AC coefficients are coded in a band, the DC coefficient is coded first for all blocks of the component in the coding interval. The band of AC coefficients is then coded, block-by-block, for all blocks of the component in the coding interval.

6.5.3 Code table assignment

The code table assignment specifies which Huffman code tables are to be used with each component. If arithmetic coding is used, this field selects the statistics area to be used.

Depending on the signaling parameters, either AC and/or DC tables may be required.

For interleaved data in the scan the code table selection fields are a set of four bit fields:

(Td(1) Ta(1)), .........., (Td(Nc) Ta(Nc))

DC and AC tables are specified for each component in the frame.

For non-interleaved data in the scan the code table selection field is two four bit fields:

Td(K) Ta(K)

where K is inferred from the component identification field.

Each pair of entries is an 8 bit integer where the DC table specified in the low order four bits and the AC table is specified in the high order four bits. If one of the four bit fields is not needed it should be set to zero.

Td(K) specifies the DC code table to be used for the Kth image component. The DC code tables are numbered 0, 1, 2, and 3.

Ta(K) specifies the AC code table to be used for the Kth image component. The AC code tables are numbered 0, 1, 2, and 3.

For interleaved data the order of assignment of tables to components follows the order in which components are assigned in the sampling ratio. For example, if the first 8 bit integer of the table selection field is X'10', Td(1) is set to zero and Ta(1) is set to one. If C1 is component 47, DC table zero and AC table one are assigned to component 47.

The selections in these fields must be consistent with the number of components and the Huffman table specifications. If the selections are inconsistent, the results will be unpredictable.

Two default sets of code tables are defined; one set (the luminance default) is typically used with luminance and the other (the chrominance default) is typically used with chrominance. Tables numbered 0 and 2 are assigned the luminance defaults and tables numbered 1 and 3 are assigned the chrominance defaults.

For the baseline system, only tables numbered 0 and 1 are allowed.

Defaults defined for each table may be replaced with corresponding custom tables. If custom tables are down-loaded, the table number is identified at the start of the down-load sequence.

6.5.4 Code table specification

The down-load of each Huffman code table or arithmetic coding preset is preceded by an 8 bit integer field containing two four bit integers, Td and Nd, where Nd is in the low order four bits of the 8 bit integer field. Nd specifies the table number, and Td specifies the information being down-loaded for that table. The binary values for Td are defined in table 6.5.4.1.

Table 6.5.4.1 Bit assignments for custom table specification

| Td | Nd | Meaning |
|---|---|---|
| 0000 | 00XX | Custom DC Huffman table/arithmetic coding preset XX |
| 0001 | 00XX | Custom AC Huffman table/arithmetic coding preset XX |
| 0010 | 00XX | Default DC Huffman table/arithmetic coding preset XX |
| 0011 | 00XX | Default AC Huffman table/arithmetic coding preset XX |
| 1000 | 0000 | End of matrix/table download sequence |

All other values of Td and Nd are undefined. Nd may have values of 0, 1, 2 and 3. However, Nd is restricted to a value of 0 or 1 in the baseline system.

If a given table is selected in the code table selection field and is not down-loaded, the most recent definition of that table from a previous frame or scan in the sequence is used. If the table has never been specified, the default assigned to that table is used. If Td is 2 or 3, the defaults defined for the table are restored as specified above.

A value of X'80' terminates the table specification list.

6.5.4.1 Table specification

If Td is 0, a DC Huffman code table or statistics preset follows. If Td is 1, an AC Huffman code table or statistics preset follows.

6.5.4.1.1 Huffman table specification

The Huffman tables are specified by identifying the number of codes of each length in the table; for each code length a list of all symbols with codes of that length is specified.

The code table is constrained such that only codes between 1 bit and 16 bits in length are allowed. Since the coding model never requires more than 256 symbols, sixteen 8-bit integers specify the number of codes of each possible length.

L1, L2,.....,L16,

The symbols (numeric values between 0 and 255) then follow, one 8-bit integer for the number of codes of each length specified in the first 16 bytes of the download. The values are sent in order of increasing code length.

V<1,1>, ... V<1,N1>, V<2,1>,...,V<2,N2>, ... ,V<16,1>,...,V<16,N16>

A procedure described in Section 7.3.5.4.2 is used to generate the actual Huffman table.

6.5.4.1.2 Arithmetic coding preset

The arithmetic coding preset contains a one byte conditioning field and a variable length field defining a preset of statistics bins.

The conditioning field for the DC algorithm contains two four bit fields. The low order four bits contain the value of L and the high order four bits contain the value of U. (L and U will be defined in section 8.4.1.)

The conditioning field for the AC algorithm contains an 8 bit integer value Kx which is used for conditioning the magnitude decisions on coefficient position in the zigzag vector when coding magnitudes of non-zero AC coefficients. (Kx is defined in section 8.4.2.)

Statistics preset information then follows. An 8-bit integer gives the number of statistics estimate presets; it is followed by a list of 8-bit integers, one for each statistics estimate which is to be preset. Each integer specifies an index to the estimation state machine for a particular probability estimate. The list of indices follows the order in which storage locations (statistics "bins") are defined. This ordering is given in the sections describing the arithmetic coding statistical models. Any statistics estimate which is not specified is set to the default statistics initialization.

Unless the resynchronization interval is relatively small, statistics preset is not normally needed.

6.5.5 Resynchronization

Resynchronization is normally disabled. It is enabled for a scan by appending the RSC marker code to the code stream immediately after the end of the SOS signaling fields. If either the PRV or the APP marker codes are also needed there, the RSC marker code must follow the field for that marker code. If resynchronization is enabled, a RSC marker code must be placed in the code stream at the end of each coding interval. If the LCT code occurs at the end of the final coding interval, the RSC marker code must follow it.

The RSC code includes a modulo 8 count of the resynchronization intervals. This count is started at zero and is incremented by one after each RSC code is added to the code stream.

At each resynchronization point the coder and decoder are reset to known starting conditions. All DC predictions are reset to 0 for the DCT algorithms. For the lossless algorithms the prediction is reset to 2**(P-1), where P is the precision.

7. Sequential DCT System with Huffman Coding (Baseline system)

This section describes the sequential DCT system with Huffman coding. A restricted version of this sequential system provides a baseline capability which must be present in all of the DCT based systems.

Within a scan the sequential DCT algorithm (and therefore the baseline system) is restricted to either block interleaved data or non-interleaved data. In block interleaved data the components are interleaved and coded in a single scan. In non-interleaved format, each component is sent in a separate scan.

7.1 Signaling information required for decoding

The signaling information has been defined in section 6. A brief synopsis is given here for the restricted format defined for the sequential system.

| | size of field (bits) | value |
|---|---|---|
| marker code prefix | 8 | X'FF' |
| SOI (Start-Of-Image) marker code | 8 | X'FE' |
| **Signaling parameters for a frame** | | |
| marker code prefix | 8 | X'FF' |
| SOF (Start-Of-Frame) marker code | 8 | X'E0' to X'EF' |
| Frame signaling data field length | 16 | < 65536 |
| Mode selection | 8 | 0 or X'40' |
| Data precision | 8 | see Section 6.4.3 |
| Number of lines (internal) | 16 | < 65536 |
| Line length (internal) | 16 | 1 to 65535 |
| Coding interval * | 16 | 0 to 65535 |
| Sampling ratio | variable | see Section 6.4.7 |
| Quantization matrix assignment | variable | see Section 6.4.8 |
| Quantization matrix specification | variable | see Section 6.4.9 |
| **Signaling parameters for a scan** | | |
| marker code prefix | 8 | X'FF' |
| SOS (Start-Of-Scan) marker code | 8 | X'F8' |
| Scan signaling data field length | 16 | < 65536 |
| Component identification ** | 8 | 0 to 255 |
| Code table assignment | variable | see Section 6.5.3 |
| Code table specification | variable | see Section 6.5.4 |

* If set to zero, the coding interval is defaulted to the number of minimum data units (MDU) in the full scan.

** If set to zero, interleaved data ordering is used.

7.1.1 Restrictions for baseline system

In the baseline system the mode parameter is zero and the precision is restricted to 8 bits. In addition, no more than two quantization matrices, two DC Huffman tables and two AC Huffman tables may be downloaded. These tables and matrices must be numbered either 0 or 1.

7.1.2 Additional signaling with marker codes

Marker codes are defined in section 6.2.2.

The LCT marker code is followed by a 16 bit integer giving the number of lines in the frame. This marker code may be used only at the end of the final coding interval of the first scan in the frame. If used, it must precede the marker code (SOS, SOF or EOI) which terminates the final coding interval of the first scan.

The PRV and APP marker codes and associated fields may be inserted just before the SOF and SOS marker codes, and also immediately following the scan parameters.

A RSC marker code may follow the scan parameters. If it does, resynchronization is enabled and RSC marker codes will then be placed at the beginning of each coding interval in the scan.

The baseline decoder must be able to skip over PRV and APP fields. It must also be able to recognize RSC marker codes and reset the decoder when they are encountered.

7.2 Sequential Control Structure for encoding an Image

The control structure for compression of an image is shown in figure 7.2.1.

```
                (encode image)
                      |
          ----------------------
         | add SOI marker code |
          ----------------------
                      |
    ------------>|
   |                  |
   |      ----------------------
   |     | code frame           |
   |      ----------------------
   |                  |
   |                         no        ---------------
   |        < more frames> --------->| add EOI        |
   |                  ?              |   marker code |
   |                  | yes           ---------------
    -------------                            |
                                          ( done )
```

Figure 7.2.1. Encoder control structure for a image

Each frame in the image is coded independently. Only the quantization matrices and code tables may be retained from one frame to the next. Component identification should also be consistent from frame to frame.

7.2.1 Control structure for a frame

The control structure for compression of a frame is oriented around the scans in the frame. If non-interleaved data ordering is used, each component is sent in a separate scan, and the component being sent in a given scan is identified by the component identification in the scan header. If interleaved data ordering is used, all of the components in the frame are sent in a single scan.

Figure 7.2.1.1 provides a sketch of the frame control structure.

```
                 (encode frame)
                       |
          -------------------------
          | add SOF marker code     |
          | generate frame          |
          |   signaling information |
          -------------------------
                       |
   -------------->|
   |                   |
   |      -------------------------
   |      | encode scan             |
   |      -------------------------
   |                   |
   |                              no
   |          < more scans> --------->(done)
   |                   ?
   |                   | yes
   ---------------
```

Figure 7.2.1.1. Encoder control structure for a frame.

7.2.2 Control structure for a scan

A scan is comprised of a sequence of coding intervals. For the sequential algorithm, however, if the coding interval is set to zero it defaults to the full scan. A coding interval which is less than the full scan has no functional purpose if resynchronization is not enabled - the coded data is then independent of the coding interval.

If resynchronization is enabled, a RSC marker code is placed in the coded data at the start of each coding interval. (The RSC marker at the start of the first coding interval enables resynchronization.) If resynchronization is disabled, the control structure is the same, except that the entire scan contains one coding interval and RSC markers are not used. A scan is always terminated by a SOS, SOF or EOI marker code. The LCT marker code can precede one of these marker codes at the end of the first scan in the frame.

Figure 7.2.2.1 provides a sketch of the scan control structure. The loop is terminated when the encoder has coded the expected number of minimum data units (MDU). The number of MDU is calculated from the frame signaling parameters (see Sections 6.1.1 and 6.4.7).

```
                  (encode scan)
                        |
              -------------------------
              | add SOS marker code    |
              | generate scan          |
              |   signaling information|
              | initialize coder       |
              -------------------------
                        |
   -------------->|
   |                    |
   |          -------------------------
   |          | encode data for next   |
   |          |   coding interval      |
   |          -------------------------
   |                    |
   |                           no
   |        <more intervals> ----------(done)
   |                    ?
   |                    | yes
   ----------------
```

Figure 7.2.2.1. Encoder control structure for a scan 7.2.3 Coding interval control structure Figure 7.2.3.1 provides a sketch of the encoder control structure for a coding interval. The loop is terminated either when the encoder has coded the number of lines of minimum data units (MDU) in the coding interval or when it has completed the image frame.

```
              (encode coding interval)
                        |
                       yes    ---------------------
             < resync >----->| add RSC marker code |
                        ?     | reset coder         |
                        | no  | increment modulo    |
                        |     |   RSC count         |
                        |     ---------------------
                        |                |
   ------------>|<---------------------
   |                    |
   |         -------------------
   |         | encode next MDU  |
   |         -------------------
   |                    |
   |                          no
   |          <more MDU > ----------( done )
   |                    ?
   |                    | yes
   -------------
```

Figure 7.2.3.1. Encoding of a coding interval

If the coder is reset, the DC predictions are set to zero.

7.2.4 Coding a minimum data unit (MDU)

The minimum data unit for the sequential DCT algorithm is one block interleave for interleaved data ordering, and one 8x8 block for non-interleaved data ordering. Within a given MDU with interleaved data ordering, the 8x8 DCT blocks are coded in the order defined by the sampling ratio parameters for the frame. The control structure for encoding a MDU with interleaved data ordering is shown in figure 7.2.4.1. In this figure, C(N) refers to the image component in the Nth block of the MDU.

```
                    (encode MDU)
                         |
                    ----------
                   |   N=0    |
                    ----------
                         |
 ---------------------->|
|                        |
|       -------------------------------
|      | N = N + 1                     |
|      | calculate forward 8x8 DCT     |
|      |   using Tq(C(N))              |
|      | encode DC for Nth 8x8 block   |
|      |   using Td(C(N))              |
|      | encode AC for Nth 8x8 block   |
|      |   using Ta(C(N))              |
|       -------------------------------
|                        |
|          no
 ---------------< N = Nb   >
                         ?
                         | yes
                         |
                    ( done  )
```

Figure 7.2.4.1. Encoder control for coding a MDU

7.3 Process for encoding an 8x8 block

In the sequential DCT algorithm the DCT of each 8x8 block is coded as a complete unit, independent of whether the data is interleaved or non-interleaved.

7.3.1 Forward DCT (FDCT)

The mathematical definition of the FDCT is given in section 5.3.2. For purposes of exposition, the DCT coefficients are ordered in an 8x8 array with the DC component in the upper left corner, increasing horizontal "frequencies" from left to right along rows of the array, and increasing vertical "frequencies" down the columns of the array. Threshold matrices and the zigzag ordering are defined relative to this convention.

The precision of the FDCT computation is not specified.

7.3.1.1 Level shift in the FDCT

In computing the FDCT the input data is level shifted to a signed representation by subtracting 2**(P-1), where P is the precision specified for the input data. For the baseline system, P=8 and the input data is level shifted by subtracting 128.

Upon completion of the IDCT computation an inverse level shift is used to restore the original unsigned representation.

7.3.2 Inverse DCT (IDCT)

The mathematical definition of the IDCT is given in section 5.3.2. The precision of the IDCT computation is not specified.

7.3.2.1 Level shift in the IDCT

After computation of the IDCT the signed N bit precision output data is level shifted by adding 2**(P-1), converting the output to an unsigned representation. In the baseline system P=8 and the output data is level shifted by adding 128.

7.3.3 Quantization rules 7.3.3.1 Quantization of the FDCT

The normalization of the DCT (see section 5) is defined such that the coefficients before quantization have a precision of N+3 bits, where N is the input data precision. After quantization the DCT coefficients have a precision of $$N + 3 - \log2(M)$$

where M is the quantization matrix value for the coefficient. M is an integer which is specified individually for each DCT coefficient. Section 6.4.9 describes the specification of the matrix of quantization values.

In the baseline system input and output data precision are restricted to 8 bits and the precision of the quantized DCT values is restricted to a maximum of 11 bits. In extended precision implementations N may be as large as 12 bits.

A uniform quantization procedure should be used to quantize the DCT coefficients; this procedure should be consistent with the dequantization procedure defined for the IDCT (section 7.3.3.2). The quantization matrix is not specified. However, some typical quantization matrices are given in section 5.3.3.2.

7.3.3.2 Dequantization of the IDCT

The dequantization of the DCT is done by multiplying each quantized coefficient value by the quantization value for that coefficient. If necessary, the output values should be clamped to stay within the precision range specified.

7.3.4 Coding models for Huffman coding 7.3.4.1 Coding model for DC coefficients

The DC coefficients are coded differentially, using a one-dimensional predictor which is the DC value from the previous 8x8 block from the same component. The conventions for ordering of 8x8 blocks within an MDU are given in section 6.1.1. In the decoder the difference is decoded and added to the prediction.

At the start and after each resynchronization, the prediction for the DC coefficient is initialized to 0. (Note that the input data has been level shifted.)

7.3.4.2 Coding model for AC coefficients

The two-dimensional array of DCT coefficients is rearranged into a one-dimensional linear array or vector, ZZ(0..63), using a zigzag ordering. The zigzag ordering of the coefficients in ZZ relative to the normal two-dimensional coefficient array is:

| | | | | | | | |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

Coefficient 0 is the DC coefficient.

The coefficients in ZZ are ordered so that the lower "frequencies" tend to occur first. Since many coefficients are zero, runs of zeros are identified and coded as runs, rather than as individual zero values. In addition, if the last part of the vector is entirely zero, this is coded explicitly as an end-of-block (EOB). This will be described in more detail in the section on the structure of the AC table.

7.3.5 Huffman coding

Two coding procedures are used, one for the DC coefficient ZZ(0) and the other for the AC coefficients ZZ(1)..ZZ(63). The coefficients are coded in the order in which they occur in ZZ, starting with the DC coefficient.

7.3.5.1 Huffman coding of DC coefficients 7.3.5.1.1 Structure of DC code table

The DC code table consists of a set of Huffman codes (maximum length 16 bits) to which are appended additional bits (in most cases) which can code any possible difference between the current DC coefficient and the prediction. The Huffman codes for the difference categories are generated in such a way that no code consists entirely of 1-bits.

The differences are grouped into 16 categories with each category being assigned a 4 bit value, SSSS. A Huffman code is created for each of the 16 difference categories. (Depending on precision, fewer difference categories and therefore fewer codes may be needed.)

Table 7.3.5.1.1.1. Difference categories for DC coding

| SSSS | Difference values |
|---|---|
| 0 | 0 |
| 1 | -1,1 |
| 2 | -3,-2,2,3 |
| 3 | -7..-4,4..7 |
| 4 | -15..-8,8..15 |
| 5 | -31..-16,16..31 |
| 6 | -63..-32,32..63 |
| 7 | -127..-64,64..127 |
| 8 | -255..-128,128..255 |
| 9 | -511..-256,256..511 |
| 10 | -1023..-512,512..1023 |
| 11 | -2047..-1024,1024..2047 |
| 12 | -4095..-2048,2048..4095 |
| 13 | -8191..-4096,4096..8191 |
| 14 | -16383..-8192,8192..16383 |
| 15 | -32767..-16384,16384..32767 |

For each category enough additional bits are appended to the code word to uniquely identify which difference in that category actually occurred. The number of extra bits is given by SSSS; the extra bits are appended to the serial bit stream following the convention for integers, least significant bit first. When the coefficient is positive, the low order bits of the coefficient are transmitted. When the coefficient is negative, the low order bits of the coefficient-1 are transmitted. Note that the most significant bit of the appended bit sequence is 0 for negative coefficients and 1 for positive coefficients.

7.3.5.1.2 Default Huffman tables for the DC coefficients (2)

Tables 7.3.5.2.1.2.1 and 7.3.5.2.1.2.2 give default Huffman tables 0 and 1 for the DC coefficients. Table 0 is appropriate for luminance components of high quality video images. Table 1 is appropriate for chrominance components of the same images.

Note that even though these are listed as default tables and the final algorithm is expected to contain default tables, these are only provisional tables and should be expected to change.

Table 7.3.5.2.1.2.1 DC Codeword Default Table 0

| Category | Codelength | Codeword |
|---|---|---|
| 0 | 3 | 000 |
| 1 | 3 | 001 |
| 2 | 3 | 010 |
| 3 | 3 | 011 |
| 4 | 3 | 100 |
| 5 | 3 | 101 |
| 6 | 3 | 110 |
| 7 | 4 | 1110 |
| 8 | 5 | 11110 |
| 9 | 6 | 111110 |
| 10 | 7 | 1111110 |
| 11 | 8 | 11111110 |

The 16 bytes which specify the list of code lengths for DC table 0 is:

X'00 00 07 01 01 01 01 01 00 00 00 00 00 00 00 00'

The set of values following this list is:

X'00 01 02 03 04 05 06 07 08 09 0A 0B'

Table 7.3.5.2.1.2.2 DC Codeword Default Table 1

| Category | Codelength | Codeword |
|---|---|---|
| 0 | 2 | 00 |
| 1 | 2 | 01 |
| 2 | 3 | 100 |
| 3 | 3 | 101 |
| 4 | 3 | 110 |
| 5 | 4 | 1110 |
| 6 | 5 | 11110 |
| 7 | 6 | 111110 |
| 8 | 8 | 11111100 |
| 9 | 8 | 11111101 |
| 10 | 8 | 11111110 |
| 11 | 9 | 111111110 |

The 16 bytes which specify the list of code lengths for DC table 1 is:

X'00 02 03 01 01 01 00 03 01 00 00 00 00 00 00 00'

The set of values following this list is:

X'00 01 02 03 04 05 06 07 08 09 0A 0B'

7.3.5.1.3 Downloadable Huffman tables for the DC coefficients

The procedure for downloading the Huffman tables is given in Section 6.5.4.1.1. The procedure for creating a code table from this information is described in section 7.3.5.4.2.

In the baseline system no more than two Huffman tables may be downloaded for the DC coefficients.

7.3.5.1.4 Huffman encoding and decoding procedures for DC coefficients

The difference, DIFF, between the DC value and the prediction is coded. The prediction is always the DC value coded for the previous DCT block of the same component.

The encoding procedure is defined in terms of a set of extended tables, XHUFCO and XHUFSI, which contain the complete set of Huffman codes and sizes for all possible difference values. For full 16 bit precision the tables are relatively large. In many cases, however, the precision of the difference signal may be small enough to make this implementation practical.

XHUFCO and XHUFSI are generated from the encoder tables EHUFCO and EHUFSI (section 7.3.5.4.2) by appending the additional bit patterns to the Huffman codes for each difference category. By definition, XHUFCO and XHUFSI have entries for each possible difference value. XHUFCO contains the concatenated bit pattern of the Huffman code and the additional bit field; XHUFSI contains the total length in bits of this contatenated bit pattern. Both are indexed by DIFF.

The encoding procedure for a DC coefficient is:

```
DIFF=DC-PRED
CODE=XHUFCO(DIFF)
SIZE=XHUFSI(DIFF)
transmit SIZE bits of CODE
```

where DC is the quantized DC coefficient value, PRED is the predicted quantized DC value, and DIFF is the difference between the DC coefficient and the prediction. The Huffman code (CODE) (including any additional bits) is obtained from XHUFCO and SIZE (length of code including additional bits) is obtained from XHUFSI, using DIFF as the index to the two tables.

The decoding procedure is not specified. However, an example of a possible decoder implementation is described in section 13.2 to provide a point of reference for implementers.

7.3.5.2 Huffman coding of AC coefficients 7.3.5.2.1 Structure of AC code table

Each nonzero AC coefficient in the vector of zigzag ordered coefficients, ZZ, is described by a composite 8-bit value, I, of the form I = binary 'NNNNSSSS'

The 4 least significant bits, 'SSSS', define a category for the amplitude of the next nonzero coefficient in ZZ, and the 4 most significant bits, 'NNNN', give the position of the coefficient in ZZ relative to the previous nonzero coefficient (i.e. the run-length of zero coefficients between nonzero coefficients). Since the run length of zero coefficients may exceed 15, the value 'NNNNSSSS'=240 is defined to represent a run length of 15 zero coefficients followed by a coefficient of zero amplitude. (This can be interpreted as a run length of 16 zero coefficients.) In addition, a special value 'NNNNSSSS'='00000000' is used to code the end-of-block (EOB), signaling that all remaining coefficients in the block are zero.

The general structure of the code table is illustrated in figure 7.3.5.2.1.1.

```
                         SSSS

          |  0      1     2   . . .  14    15
        --|-----|--------------------------|
        0 | EOB |                          |
          |     |                          |
        . |  X  |                          |
NNNN    . |  X  |        RUN-SIZE          |
        . |  X  |         VALUES           |
          |     |                          |
       15 | ZRL |                          |
       -------------------------------------
```

Figure 7.3.5.2.1.1. Two-dimensional value array for Huffman coding.

The entries marked 'X' are undefined for the sequential system. Additional EOB run codes using those composite values will be defined for the progressive modes of the extended system.

With four bits allocated to SSSS, this value table allows coding of DCT AC coefficients with up to 15 bit precision. The magnitude ranges assigned to each value of SSSS are defined in table 7.3.5.2.1.2.

Table 7.3.5.2.1.2. Values assigned to coefficient amplitude ranges.

| SSSS | AC coefficients |
|---|---|
| 1 | -1,1 |
| 2 | -3,-2,2,3 |
| 3 | -7..-4,4..7 |
| 4 | -15..-8,8..15 |
| 5 | -31..-16,16..31 |
| 6 | -63..-32,32..63 |
| 7 | -127..-64,64..127 |
| 8 | -255..-128,128..255 |
| 9 | -511..-256,256..511 |
| 10 | -1023..-512,512..1023 |
| 11 | -2047..-1024,1024..2047 |
| 12 | -4095..-2048,2048..4095 |
| 13 | -8191..-4096,4096..8191 |
| 14 | -16383..-8192,8192..16383 |
| 15 | unused |

The composite value is Huffman coded and each Huffman code is followed by additional bits (assumed to be randomly distributed, and thus uncoded) which specify the sign and exact amplitude of the coefficient.

The AC code table consists of one Huffman code (maximum length 16 bits, not including extension bits) for each possible composite value. The codes for each composite value are generated in a manner which makes the all 1-bit pattern for any length a prefix for a longer code.

The format for the additional bits is the same as in the coding of the DC coefficients. ZZ(K) is the Kth coefficient in the vector of coefficients being coded. The value of SSSS gives the number of additional bits required to specify the sign and precise amplitude of the coefficient. The additional bits transmitted are either the low-order SSSS bits of ZZ(K) when ZZ(K) is positive or the low-order SSSS bits of ZZ(K)-1 when ZZ(K) is negative.

7.3.5.2.2 Default Huffman tables for the AC coefficients (2)

Tables 7.3.5.2.2.2.1 and 7.3.5.2.2.2.2 give default Huffman tables 0 and 1 for the AC coefficients. Table 0 is appropriate for luminance components of high quality video images. Table 1 is appropriate for chrominance components of the same images.

Note that even though these are listed as default tables and the final algorithm is expected to contain default tables, these are only provisional tables and should be expected to change.

Table 7.3.5.2.2.2.1 AC Codeword Default Table 0

| Run/Size | Codelength | Codeword |
|---|---|---|
| 0/0 | 4 | 1010 |
| 0/1 | 2 | 00 |
| 0/2 | 2 | 01 |
| 0/3 | 3 | 100 |
| 0/4 | 4 | 1011 |
| 0/5 | 5 | 11010 |
| 0/6 | 6 | 111000 |
| 0/7 | 7 | 1111000 |
| 0/8 | 10 | 1111110110 |
| 0/9 | 15 | 111111111000000 |
| 0/A | 16 | 1111111110000010 |
| 1/1 | 4 | 1100 |
| 1/2 | 6 | 111001 |
| 1/3 | 7 | 1111001 |
| 1/4 | 9 | 111110110 |
| 1/5 | 11 | 11111110110 |
| 1/6 | 16 | 1111111110000011 |
| 1/7 | 16 | 1111111110000100 |
| 1/8 | 16 | 1111111110000101 |
| 1/9 | 16 | 1111111110000110 |
| 1/A | 16 | 1111111110000111 |
| 2/1 | 5 | 11011 |
| 2/2 | 8 | 11111000 |
| 2/3 | 10 | 1111110111 |
| 2/4 | 16 | 1111111110001000 |
| 2/5 | 16 | 1111111110001001 |
| 2/6 | 16 | 1111111110001010 |
| 2/7 | 16 | 1111111110001011 |
| 2/8 | 16 | 1111111110001100 |
| 2/9 | 16 | 1111111110001101 |
| 2/A | 16 | 1111111110001110 |
| 3/1 | 6 | 111010 |
| 3/2 | 9 | 111110111 |
| 3/3 | 11 | 11111110111 |
| 3/4 | 16 | 1111111110001111 |
| 3/5 | 16 | 1111111110010000 |
| 3/6 | 16 | 1111111110010001 |
| 3/7 | 16 | 1111111110010010 |
| 3/8 | 16 | 1111111110010011 |
| 3/9 | 16 | 1111111110010100 |
| 3/A | 16 | 1111111110010101 |
| 4/1 | 6 | 111011 |
| 4/2 | 10 | 1111111000 |
| 4/3 | 16 | 1111111110010110 |
| 4/4 | 16 | 1111111110010111 |
| 4/5 | 16 | 1111111110011000 |
| 4/6 | 16 | 1111111110011001 |
| 4/7 | 16 | 1111111110011010 |
| 4/8 | 16 | 1111111110011011 |
| 4/9 | 16 | 1111111110011100 |
| 4/A | 16 | 1111111110011101 |
| 5/1 | 7 | 1111010 |
| 5/2 | 10 | 1111111001 |
| 5/3 | 16 | 1111111110011110 |
| 5/4 | 16 | 1111111110011111 |
| 5/5 | 16 | 1111111110100000 |
| 5/6 | 16 | 1111111110100001 |

| | | |
|---|---|---|
| 5/7 | 16 | 1111111110100010 |
| 5/8 | 16 | 1111111110100011 |
| 5/9 | 16 | 1111111110100100 |
| 5/A | 16 | 1111111110100101 |
| 6/1 | 7 | 1111011 |
| 6/2 | 11 | 11111111000 |
| 6/3 | 16 | 1111111110100110 |
| 6/4 | 16 | 1111111110100111 |
| 6/5 | 16 | 1111111110101000 |
| 6/6 | 16 | 1111111110101001 |
| 6/7 | 16 | 1111111110101010 |
| 6/8 | 16 | 1111111110101011 |
| 6/9 | 16 | 1111111110101100 |
| 6/A | 16 | 1111111110101101 |
| 7/1 | 8 | 11111001 |
| 7/2 | 11 | 11111111001 |
| 7/3 | 16 | 1111111110101110 |
| 7/4 | 16 | 1111111110101111 |
| 7/5 | 16 | 1111111110110000 |
| 7/6 | 16 | 1111111110110001 |
| 7/7 | 16 | 1111111110110010 |
| 7/8 | 16 | 1111111110110011 |
| 7/9 | 16 | 1111111110110100 |
| 7/A | 16 | 1111111110110101 |
| 8/1 | 8 | 11111010 |
| 8/2 | 16 | 1111111110110110 |
| 8/3 | 16 | 1111111110110111 |
| 8/4 | 16 | 1111111110111000 |
| 8/5 | 16 | 1111111110111001 |
| 8/6 | 16 | 1111111110111010 |
| 8/7 | 16 | 1111111110111011 |
| 8/8 | 16 | 1111111110111100 |
| 8/9 | 16 | 1111111110111101 |
| 8/A | 16 | 1111111110111110 |
| 9/1 | 9 | 111111000 |
| 9/2 | 16 | 1111111110111111 |
| 9/3 | 16 | 1111111111000000 |
| 9/4 | 16 | 1111111111000001 |
| 9/5 | 16 | 1111111111000010 |
| 9/6 | 16 | 1111111111000011 |
| 9/7 | 16 | 1111111111000100 |
| 9/8 | 16 | 1111111111000101 |
| 9/9 | 16 | 1111111111000110 |
| 9/A | 16 | 1111111111000111 |
| A/1 | 9 | 111111001 |
| A/2 | 16 | 1111111111001000 |
| A/3 | 16 | 1111111111001001 |
| A/4 | 16 | 1111111111001010 |
| A/5 | 16 | 1111111111001011 |
| A/6 | 16 | 1111111111001100 |
| A/7 | 16 | 1111111111001101 |
| A/8 | 16 | 1111111111001110 |
| A/9 | 16 | 1111111111001111 |
| A/A | 16 | 1111111111010000 |
| B/1 | 9 | 111111010 |
| B/2 | 16 | 1111111111010001 |
| B/3 | 16 | 1111111111010010 |
| B/4 | 16 | 1111111111010011 |
| B/5 | 16 | 1111111111010100 |
| B/6 | 16 | 1111111111010101 |
| B/7 | 16 | 1111111111010110 |
| B/8 | 16 | 1111111111010111 |
| B/9 | 16 | 1111111111011000 |
| B/A | 16 | 1111111111011001 |
| C/1 | 10 | 1111111010 |
| C/2 | 16 | 1111111111011010 |

| | | |
|---|---|---|
| C/3 | 16 | 1111111111011011 |
| C/4 | 16 | 1111111111011100 |
| C/5 | 16 | 1111111111011101 |
| C/6 | 16 | 1111111111011110 |
| C/7 | 16 | 1111111111011111 |
| C/8 | 16 | 1111111111100000 |
| C/9 | 16 | 1111111111100001 |
| C/A | 16 | 1111111111100010 |
| D/1 | 11 | 11111111010 |
| D/2 | 16 | 1111111111100011 |
| D/3 | 16 | 1111111111100100 |
| D/4 | 16 | 1111111111100101 |
| D/5 | 16 | 1111111111100110 |
| D/6 | 16 | 1111111111100111 |
| D/7 | 16 | 1111111111101000 |
| D/8 | 16 | 1111111111101001 |
| D/9 | 16 | 1111111111101010 |
| D/A | 16 | 1111111111101011 |
| E/1 | 12 | 111111110110 |
| E/2 | 16 | 1111111111101100 |
| E/3 | 16 | 1111111111101101 |
| E/4 | 16 | 1111111111101110 |
| E/5 | 16 | 1111111111101111 |
| E/6 | 16 | 1111111111110000 |
| E/7 | 16 | 1111111111110001 |
| E/8 | 16 | 1111111111110010 |
| E/9 | 16 | 1111111111110011 |
| E/A | 16 | 1111111111110100 |
| F/0 | 12 | 111111110111 |
| F/1 | 16 | 1111111111110101 |
| F/2 | 16 | 1111111111110110 |
| F/3 | 16 | 1111111111110111 |
| F/4 | 16 | 1111111111111000 |
| F/5 | 16 | 1111111111111001 |
| F/6 | 16 | 1111111111111010 |
| F/7 | 16 | 1111111111111011 |
| F/8 | 16 | 1111111111111100 |
| F/9 | 16 | 1111111111111101 |
| F/A | 16 | 1111111111111110 |

The 16 bytes which specify the list of code lengths for AC table 0 is:

X'00 02 01 03 02 04 04 03 05 05 05 02 00 00 01 7D'

The set of values which follows this list is:

```
X'01 02 03 00 04 11 05 21 06 12 31 41 07 13 51 61
  22 71 81 14 32 91 A1 B1 08 23 42 52 C1 15 33 62
  72 D1 E1 F0 09 0A 16 17 18 19 1A 24 25 26 27 28
  29 2A 34 35 36 37 38 39 3A 43 44 45 46 47 48 49
  4A 53 54 55 56 57 58 59 5A 63 64 65 66 67 68 69
  6A 73 74 75 76 77 78 79 7A 82 83 84 85 86 87 88
  89 8A 92 93 94 95 96 97 98 99 9A A2 A3 A4 A5 A6
  A7 A8 A9 AA B2 B3 B4 B5 B6 B7 B8 B9 BA C2 C3 C4
  C5 C6 C7 C8 C9 CA D2 D3 D4 D5 D6 D7 D8 D9 DA E2
  E3 E4 E5 E6 E7 E8 E9 EA F1 F2 F3 F4 F5 F6 F7 F8
  F9 FA'
```

Table 7.3.5.2.2.2.2 AC Codeword Default Table 1

| Run/Size | Codelength | Codeword |
|---|---|---|
| 0/0 | 2 | 00 |
| 0/1 | 2 | 01 |

| | | |
|---|---|---|
| 0/2 | 3 | 100 |
| 0/3 | 4 | 1010 |
| 0/4 | 5 | 11000 |
| 0/5 | 7 | 1110110 |
| 0/6 | 9 | 111111000 |
| 0/7 | 15 | 111111110111010 |
| 0/8 | 15 | 111111110111011 |
| 0/9 | 15 | 111111110111100 |
| 0/A | 15 | 111111110111101 |
| 1/1 | 4 | 1011 |
| 1/2 | 6 | 111000 |
| 1/3 | 8 | 11110110 |
| 1/4 | 10 | 1111110110 |
| 1/5 | 15 | 111111110111110 |
| 1/6 | 15 | 111111110111111 |
| 1/7 | 16 | 1111111110010101 |
| 1/8 | 16 | 1111111110010110 |
| 1/9 | 16 | 1111111110010111 |
| 1/A | 16 | 1111111110011000 |
| 2/1 | 5 | 11001 |
| 2/2 | 7 | 1110111 |
| 2/3 | 10 | 1111110111 |
| 2/4 | 11 | 11111110110 |
| 2/5 | 16 | 1111111110011001 |
| 2/6 | 16 | 1111111110011010 |
| 2/7 | 16 | 1111111110011011 |
| 2/8 | 16 | 1111111110011100 |
| 2/9 | 16 | 1111111110011101 |
| 2/A | 16 | 1111111110011110 |
| 3/1 | 5 | 11010 |
| 3/2 | 7 | 1111000 |
| 3/3 | 9 | 111111001 |
| 3/4 | 11 | 11111110111 |
| 3/5 | 16 | 1111111110011111 |
| 3/6 | 16 | 1111111110100000 |
| 3/7 | 16 | 1111111110100001 |
| 3/8 | 16 | 1111111110100010 |
| 3/9 | 16 | 1111111110100011 |
| 3/A | 16 | 1111111110100100 |
| 4/1 | 5 | 11011 |
| 4/2 | 8 | 11110111 |
| 4/3 | 11 | 11111111000 |
| 4/4 | 15 | 111111111000000 |
| 4/5 | 16 | 1111111110100101 |
| 4/6 | 16 | 1111111110100110 |
| 4/7 | 16 | 1111111110100111 |
| 4/8 | 16 | 1111111110101000 |
| 4/9 | 16 | 1111111110101001 |
| 4/A | 16 | 1111111110101010 |
| 5/1 | 6 | 111001 |
| 5/2 | 9 | 111111010 |
| 5/3 | 15 | 111111111000001 |
| 5/4 | 16 | 1111111110101011 |
| 5/5 | 16 | 1111111110101100 |
| 5/6 | 16 | 1111111110101101 |
| 5/7 | 16 | 1111111110101110 |
| 5/8 | 16 | 1111111110101111 |
| 5/9 | 16 | 1111111110110000 |
| 5/A | 16 | 1111111110110001 |
| 6/1 | 7 | 1111001 |
| 6/2 | 10 | 1111111000 |
| 6/3 | 15 | 111111111000010 |
| 6/4 | 16 | 1111111110110010 |
| 6/5 | 16 | 1111111110110011 |
| 6/6 | 16 | 1111111110110100 |
| 6/7 | 16 | 1111111110110101 |

| | | |
|---|---|---|
| 6/8 | 16 | 1111111110110110 |
| 6/9 | 16 | 1111111110110111 |
| 6/A | 16 | 1111111110111000 |
| 7/1 | 6 | 111010 |
| 7/2 | 10 | 1111111001 |
| 7/3 | 15 | 111111111000011 |
| 7/4 | 16 | 1111111110111001 |
| 7/5 | 16 | 1111111110111010 |
| 7/6 | 16 | 1111111110111011 |
| 7/7 | 16 | 1111111110111100 |
| 7/8 | 16 | 1111111110111101 |
| 7/9 | 16 | 1111111110111110 |
| 7/A | 16 | 1111111110111111 |
| 8/1 | 7 | 1111010 |
| 8/2 | 12 | 111111110100 |
| 8/3 | 15 | 111111111000100 |
| 8/4 | 16 | 1111111111000000 |
| 8/5 | 16 | 1111111111000001 |
| 8/6 | 16 | 1111111111000010 |
| 8/7 | 16 | 1111111111000011 |
| 8/8 | 16 | 1111111111000100 |
| 8/9 | 16 | 1111111111000101 |
| 8/A | 16 | 1111111111000110 |
| 9/1 | 8 | 11111000 |
| 9/2 | 12 | 111111110101 |
| 9/3 | 16 | 1111111111000111 |
| 9/4 | 16 | 1111111111001000 |
| 9/5 | 16 | 1111111111001001 |
| 9/6 | 16 | 1111111111001010 |
| 9/7 | 16 | 1111111111001011 |
| 9/8 | 16 | 1111111111001100 |
| 9/9 | 16 | 1111111111001101 |
| 9/A | 16 | 1111111111001110 |
| A/1 | 8 | 11111001 |
| A/2 | 15 | 111111111000101 |
| A/3 | 16 | 1111111111001111 |
| A/4 | 16 | 1111111111010000 |
| A/5 | 16 | 1111111111010001 |
| A/6 | 16 | 1111111111010010 |
| A/7 | 16 | 1111111111010011 |
| A/8 | 16 | 1111111111010100 |
| A/9 | 16 | 1111111111010101 |
| A/A | 16 | 1111111111010110 |
| B/1 | 8 | 11111010 |
| B/2 | 14 | 11111111011100 |
| B/3 | 16 | 1111111111010111 |
| B/4 | 16 | 1111111111011000 |
| B/5 | 16 | 1111111111011001 |
| B/6 | 16 | 1111111111011010 |
| B/7 | 16 | 1111111111011011 |
| B/8 | 16 | 1111111111011100 |
| B/9 | 16 | 1111111111011101 |
| B/A | 16 | 1111111111011110 |
| C/1 | 8 | 11111011 |
| C/2 | 15 | 111111111000110 |
| C/3 | 16 | 1111111111011111 |
| C/4 | 16 | 1111111111100000 |
| C/5 | 16 | 1111111111100001 |
| C/6 | 16 | 1111111111100010 |
| C/7 | 16 | 1111111111100011 |
| C/8 | 16 | 1111111111100100 |
| C/9 | 16 | 1111111111100101 |
| C/A | 16 | 1111111111100110 |
| D/1 | 10 | 1111111010 |
| D/2 | 15 | 111111111000111 |
| D/3 | 16 | 1111111111100111 |

| | | |
|---|---|---|
| D/4 | 16 | 1111111111101000 |
| D/5 | 16 | 1111111111101001 |
| D/6 | 16 | 1111111111101010 |
| D/7 | 16 | 1111111111101011 |
| D/8 | 16 | 1111111111101100 |
| D/9 | 16 | 1111111111101101 |
| D/A | 16 | 1111111111101110 |
| E/1 | 12 | 111111110110 |
| E/2 | 15 | 111111111001000 |
| E/3 | 16 | 1111111111101111 |
| E/4 | 16 | 1111111111110000 |
| E/5 | 16 | 1111111111110001 |
| E/6 | 16 | 1111111111110010 |
| E/7 | 16 | 1111111111110011 |
| E/8 | 16 | 1111111111110100 |
| E/9 | 16 | 1111111111110101 |
| E/A | 16 | 1111111111110110 |
| F/0 | 11 | 11111111001 |
| F/1 | 15 | 111111111001001 |
| F/2 | 16 | 1111111110010100 |
| F/3 | 16 | 1111111111110111 |
| F/4 | 16 | 1111111111111000 |
| F/5 | 16 | 1111111111111001 |
| F/6 | 16 | 1111111111111010 |
| F/7 | 16 | 1111111111111011 |
| F/8 | 16 | 1111111111111100 |
| F/9 | 16 | 1111111111111101 |
| F/A | 16 | 1111111111111110 |

The 16 bytes which specify the list of code lengths for AC table 1 is:

X'00 02 01 02 04 03 05 06 03 05 04 03 00 01 10 6B'

The set of values which follows this list is:

```
X'00 01 02 03 11 04 21 31 41 12 51 71 05 22 32 61
  81 13 42 91 A1 B1 C1 06 33 52 14 23 62 72 D1 24
  34 43 F0 82 92 E1 B2 07 08 09 0A 15 16 44 53 63
  73 83 A2 C2 D2 E2 F1 F2 17 18 19 1A 25 26 27 28
  29 2A 35 36 37 38 39 3A 45 46 47 48 49 4A 54 55
  56 57 58 59 5A 64 65 66 67 68 69 6A 74 75 76 77
  78 79 7A 84 85 86 87 88 89 8A 93 94 95 96 97 98
  99 9A A3 A4 A5 A6 A7 A8 A9 AA B3 B4 B5 B6 B7 B8
  B9 BA C3 C4 C5 C6 C7 C8 C9 CA D3 D4 D5 D6 D7 D8
  D9 DA E3 E4 E5 E6 E7 E8 E9 EA F3 F4 F5 F6 F7 F8
  F9 FA'
```

7.3.5.2.3 Downloadable Huffman tables for the AC coefficients

The procedure for downloading the Huffman tables is given in Section 6.5.4.1.1. The procedure for creating a code table from this information is described in section 7.3.5.4.2.

In the baseline system no more than two Huffman tables may be downloaded for the AC coefficients.

7.3.5.2.4 Huffman encoding and decoding procedures for AC coefficients

The Huffman code table is assumed to be available as a pair of vectors, EHUFCO (containing the code bits) and EHUFSI (containing the length of each code in bits), both indexed by the composite value defined above.

The encoding procedure for the AC coefficients in a block is shown in figures 7.3.5.2.4.1 and 7.3.5.2.4.2.

```
                          (encode AC coefficients)
                                     |
                              ---------------
                              |     K=0     |
                              |     R=0     |
                              ---------------
 ---------------------------->|<-----------------------
|                             |                        |
|                       ---------------           ----------
|                       |   K = K+1   |           | R=R+1  |
|                       ---------------           ----------
|                             |                        |
|                             |       yes          no  |
|                      < ZZ(K)=0 >------<  K=63  >----
|                             ?                ?
|        --------------->| no                | yes
|        |                    |                |
|  -----------------------    |    ----------------------
|  | code HUFFSI(240) bits |  |    | code EHUFSI(0) bits |
|  |   of EHUFCO(240)      |  |    |   of EHUFCO(0)      |
|  | R=R-16                |  |    ----------------------
|  -----------------------    |                |
|        |       yes          |                |
|        ----------<  R > 15 >                 |
|                             ?                 |
|                             | no              |
|                   ------------------          |
|                   | encode R,ZZ(K) |          |
|                   | R = 0          |          |
|                   ------------------          |
|                             |                 |
|                 no          |      yes        |
 ----------------------<   K=63   >----------->|
                             ?                 |
                                            ( done )
```

Figure 7.3.5.2.4.1. Huffman encoding procedure for AC coefficients

The procedure "code HUFFSI(240) bits of EHUFCO(240)" codes a run of 16 zero coefficients (ZRL code of figure 7.3.5.2.1.1). The procedure "code HUFFSI(0) bits of EHUFCO(0)" codes the end-of-block (EOB code). If the last coefficient (K=63) is not zero, the EOB code is bypassed.

```
                ( encode R,ZZ(K) )
                        |
               ---------------------
              | SSSS = CSIZE(ZZ(K)) |
              | I = (16*R) + SSSS   |
              | code EHUFSI(I) bits |
              |   of EHUFCO(I)      |
               ---------------------
                        |
              yes
        --------< ZZ(K)<0 >
       |             ?
 ---------------       | no
| ZZ(K)=ZZ(K)-1 |      |
 ---------------       |
       |               |
        ------------>|
               ---------------------
              | code SSSS low order |
              |   bits of ZZ(K)     |
               ---------------------
                        |
                    ( done )
```

Figure 7.3.5.2.4.2. Encoding a non-zero AC coefficient.

CSIZE is a function which maps an AC coefficient to the SSSS value described above, thereby giving the number of bits which must be transmitted to completely specify the sign and amplitude.

7.3.5.3 Byte stuffing

In order to provide code space for marker codes which can be located in the compressed bit stream without decoding the stream, byte stuffing is used.

The marker codes are byte aligned in the compressed data, and are defined to be a X'FF' byte followed by a byte in the range X'C0' to X'FF'. Marker code values below X'FFC0' are reserved. Byte alignment is achieved by padding incomplete bytes with 1-bits. If padding with 1-bits creates a X'FF' value, a zero byte is stuffed before adding the X'FF' and marker code.

Whenever, in the course of normal encoding, the byte value X'FF' is created in the code string, a X'00' byte is stuffed into the code string.

If a X'00' byte is detected after a X'FF' byte, the decoder must discard it. If the byte is not zero, a marker code has been detected, and must be interpreted to whatever degree is needed to decode the data.

7.3.5.4 Huffman table specification

The Huffman table is specified in terms of a 16 byte list (BITS) giving the number of codes for each code length from 1 to 16. This is followed by a list of the 8 bit values which are assigned to each code (HUFFVAL). The values are placed in the list in order of increasing code length. Code lengths greater than 16 bits are not allowed, and the procedure for generating the Huffman table parameters must reserve a code point so that the longest code word cannot be all 1-bits.

The procedures which are used to generate this list are not specified. The list must be generated in a manner which is consistent with the rules for Huffman coding, and it must observe the constraints discussed in the previous paragraph. Section 13.1 contains an example of a procedure for generating lists of lengths and values which are in accord with these rules.

7.3.5.4.1 Signaling of table generation data

Section 6.5.4 describes the Huffman code table specification.

7.3.5.4.2 Table generation procedure

Given a vector BITS(1..16) containing the number of codes of each size, and a vector HUFFVAL(0..255) containing the values to be associated with those codes as described above, two tables are generated. The HUFFSIZE table contains a list of code lengths; the HUFFCODE table contains the Huffman codes corresponding to those lengths. HUFFSIZE is generated by the procedure in figure 7.3.5.4.2.1.

```
                                 (SIZE_TABLE)
                                      |
                                 -----------
                                |    P=0    |
                                |    I=1    |
                                |    J=1    |
                                 -----------
                                      |
  -------------------------------->|
 |                                    |
 |   ---------------------------->|
 |  |    ---------------              |
 |  |   | HUFFSIZE(P)=I | no
 |   --| P=P+1          |---< J>BITS(I) >
 |      | J=J+1         |          ?
 |       ---------------           | yes
 |                                 |
 |                          ---------------
 |                         |     I=I+1     |
 |                         |     J=1       |
 |                          ---------------
 |                                 |
 |                       no
  -------------------------< I > 16  >
                                   ?
                                   | yes
                                   |
                          ---------------
                         | HUFFSIZE(P)=0 |
                         | LASTP=P       |
                          ---------------
                                   |
                               ( done )
```

Figure 7.3.5.4.2.1. Generation of table of Huffman code sizes

Note that the variable LASTP is set to the index of the last entry in the table.

A Huffman code table, HUFFCODE, containing a code for each size in HUFFSIZE is generated by the procedure in figure 7.3.5.4.2.2. The notation "sll" in this figure indicates the shift-left-logical operation - in this case, by one bit position.

APPENDIX B

*An American National Standard*

IEEE Standard for a Simple 32-Bit Backplane Bus: NuBus

1. General

1.1 Scope. This standard describes a computer backplane bus optimized for 32-bit transfers, multiprocessor operations, and simplicity. In brief, this is a synchronous (10 MHz), multiplexed, multimaster bus that provides a strictly fair arbitration mechanism. The only bus transfers are read and write (and block transfer versions of each of these) to a single 32-bit address space. Geographic slot addressing and nondaisy-chain arbitration scheme make system configuration simpler by eliminating switches and jumpers. This minimalist approach results in a conceptually straightforward bus with a small pin count (51 active signal lines). Figure 1 shows the major elements of a typical NuBus system.

1.2 Objective. The objectives of this bus are:

- Optimized for 32-bit transfers
- System architecture independence
- Multiprocessor support
- Ease of system integration
- Sparsity of mechanism These objectives result in a bus that is optimized for 32 bits, but simple enough for low-cost applications, such as 32-bit personal computers.

1.3 Purpose. This standard is intended to describe and specify the logical, electrical, and physical interface standard for circuit boards that allow them to connect to and communicate over a backplane. It also specifies the backplane environment that must be provided to these boards. This standard is oriented to designers of bus interface logic, designers of backplane environments, and those evaluating buses. In keeping with the minimalist philosophy of the bus, the standard has taken a similar approach. Section 2 provides an introduction to the bus, Section 3 is the "minimalist" core of the specification, and Appendix A

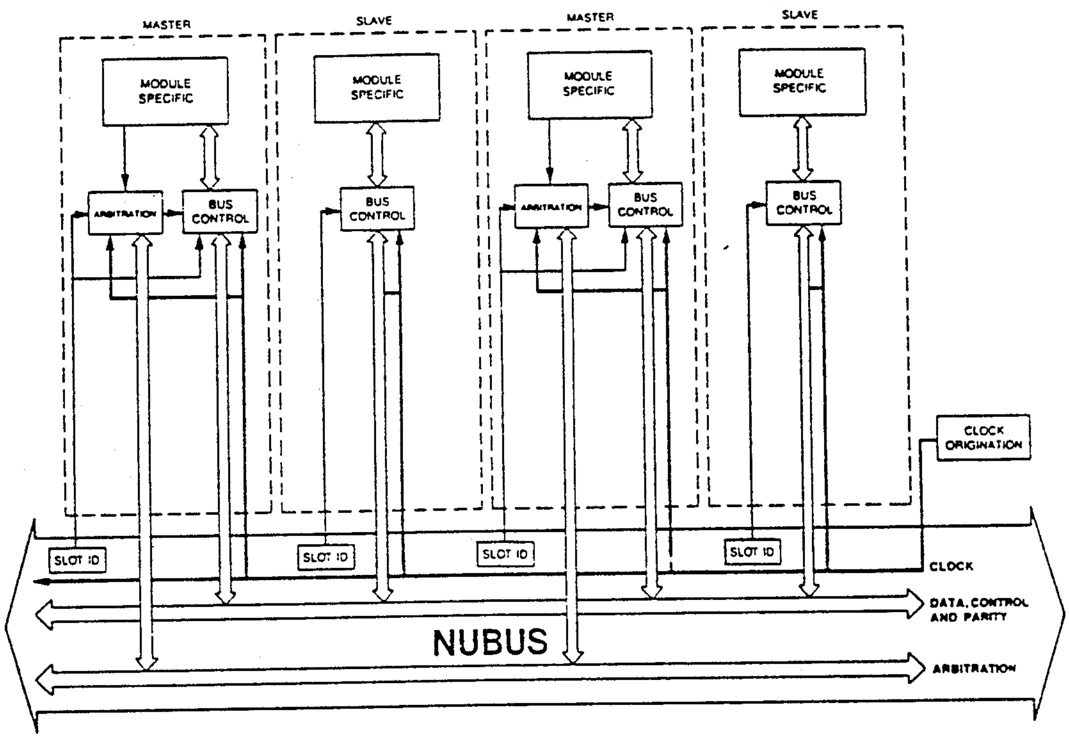

[Extracted from Texas Instruments NuBus™ specification document with permission of the publisher. Copyright (1983, 1986, 1988) Texas Instruments Incorporated.]

Fig 1
Simplified NuBus Diagram describes implications and capabilities that follow from the rules presented in Section 3.

Not specified by this standard are:

- Physical Environment—This includes topics such as how a backplane attaches to a rack, provisions for system cooling, resistance to vibration, etc.
- System Architecture—This is a low-level specification. Any system architectures (such as message passing protocols) are not within the scope of this standard.

1.4 Definitions

1.4.1 General backplane. A circuit board with one or more bus connectors that provides signals for communication between bus modules, and provides certain resources to the connected modules.

board. A device connected to the bus. Usually constructed from a printed circuit board. Also referred to as a module.

bus. A set of signal lines to which a number of devices are connected and over which information is transferred between them.

byte. A set of 8 signals or bits taken as a unit.

half-word. For the purpose of this standard, a half-word is a 16-bit data item taken as a unit.

master. A bus device that initiates a transaction.

slave. A bus device that responds to a transaction.

word. For the purpose of this standard, a word is a 32-bit data item taken as a unit.

1.4.2 Protocol ack cycle. A cycle in which a slave responds to a master and terminates a transaction.

arbitration. A collection of mechanisms that allow masters to access the bus without conflicting with each other.

arbitration contest. This is the core mechanism to resolve bus ownership between one or more competing masters. It takes two bus periods.

attention cycle. A single cycle in which a master indicates the start and acknowledge in the same cycle.

block transfer. A transaction in which a single address is conveyed by the master and multiple data items from sequential addresses are then communicated between the master and the slave.

bus lock. Method of a master ensuring continued tenure of the bus. Not identical to resource lock.

competitor. A master that participates in a particular arbitration contest.

cycle. One period of the bus clock, from rising edge to the next rising edge.

data cycle. A period in which data are valid and are acknowledged. This occurs when acknowledge is asserted at the end of a transaction and on intermediate acknowledges during a block transfer.

driving edge. A time corresponding to a rising edge of the bus clock.

fairness. A property of some arbitration techniques that ensures all modules will get access to the bus on approximately the same terms. This prevents modules from being "starved."

null cycle. A type of an attention cycle that is used to dismiss a resource lock and initiate a rearbitration.

ownership. State of a master that has arbitrated and won the bus and has not yet lost a bus arbitration contest.

period. Time between two driving edges.

resource lock. A type of an attention cycle that indicates to slaves that data items will be referenced in a locked fashion and any nonbus path to referenced data items should be locked out. A null cycle clears this state.

sample edge. A time corresponding to a falling edge of the bus clock signal.

signal line. A conductor on the backplane other than ground, or power.

start cycle. A cycle that initiates a transaction. The address and transfer type are valid during this cycle.

tenure. Time period of unbroken ownership of the bus by a particular module. May consist of one or more transactions or attention cycles.

transaction. A sequence of cycles beginning with a start cycle and ending with an ack cycle that is used to convey data between a master and a slave.

1.4.3 Physical asserted. The state of a signal line. Since all lines are active low signals, this state is the low state for all bus lines.

drive. A module activity causing a bus signal line to be in a particular sate.

high, false, 1. Unasserted state of a bus line.

low, true, 0. Asserted state of a bus line.

open-collector. A type of bus driver (only drives low or not at all).

slot. A backplane location that accepts a NuBus module.

three-state. A type of bus driver. Either drives high, low, or not at all.

unasserted. The state of a signal line. Since all signal lines are active low, this state is the high state for all bus lines.

1.5 References. The following publications shall be used in conjunction with this standard.

[1] ANSI/IEEE 1101-1987, IEEE Standard for Mechanical Core Specifications for Microcomputers.[2]

[2] IEC 297-1-1986, Dimensions of Mechanical Structures of the 482.6 mm Series; Part 1: Panels and Racks.[3]

[3] IEC 603-2-1980, Two-Part Connectors for Printed Boards, for Basic Grid of 2.54 mm (0.1 in), With Common Mounting Features.

---

[2] ANSI/IEEE publications can be obtained from the Sales Department, American National Standards Institute, 1430 Broadway, New York, NY 10018, or from the Institute of Electrical and Electronics Engineers, Service Center, Piscataway, NJ 08854-4150.

[3] IEC publications are available in the US from the Sales Department, American National Standards Institute, 1430 Broadway, New York, NY 10018.

2. Overview

This section introduces concepts required for a general understanding of the NuBus specification contained in Section 3. The material presented in this section of the standard does not *specify* the bus, but rather describes some characteristics of the bus. The description given in this section is deliberately brief and intuitive; Appendix A contains an in-depth elaboration of the specifications given in Section 3.

2.1 Bus Lines. NuBus lines can be grouped into four classes based on the functions they perform: utility signals, data transfer signals, arbitration signals, and power.

2.1.1 Utility Signals. The system clock and the bus timeout function are supplied by the terminator board, or other backplane module, and are not required on any NuBus board. Usually, the power fail warning and reset signals are generated by agents that do not reside on the backplane.

Clock (*CLK**) — Synchronizes bus arbitration and data transfers. Nominally 10 MHz with a duty cycle of 25%. Usually, bus signals are changed on the rising edge and sampled (75 ns later) on the falling edge.

Reset (*RESET**) — An open-collector signal, used to return all modules to their initial power-up state. May be asserted asynchronous to the *CLK** line.

Power Fail Warning (*PFW**) — This open-collector line signals that system power is about to fail. May be asserted asynchronous to the *CLK** line.

Card Slot Identification (*ID*⟨3 . . . 0⟩*) — These four lines are not bused, but are binary-encoded at each position to specify the module's position on the backplane.

Non-Master Request (*NMRQ**) — An asynchronous line asserted by boards that are not capable of becoming bus masters, to indicate a need for some service. The nature of this service and the determination of the provider are not specified by this standard.

2.1.2 Bus Data Transaction Signals. These signals are all three-state lines, and include address/data, control, and parity lines.

Address and Data (*AD*⟨31 . . . 0⟩*) — These lines are multiplexed to carry address information at the beginning of a transaction, and 8, 16, or 32 bits of data later in the transaction.

Transfer Mode (*TM*⟨1 . . . 0⟩*) — At the beginning of the transaction, these two lines indicate the type of transaction being initiated. Later in the transaction, the responding module uses them to indicate success or failure of the requested transaction.

System Parity (*SP**) — This line carries the even parity bit generated from the 32 bits on the *AD*⟨31 . . . 0⟩* lines, if parity is being used.

System Parity Valid (*SPV**) — If asserted, it indicates that a parity bit has been generated for the *AD*⟨31 . . . 0⟩* lines.

Start Signal (*START**) — This signal is asserted at the start of a transaction, and also initiates an arbitration contest. Additionally, when asserted in conjunction with the *ACK** line, it denotes special nontransaction cycles called *attention cycles*.

Transfer Acknowledge (*ACK**) — The usual use of this signal is to indicate the ending cycle of a transaction. It has a special use if asserted during the same cycle with *START**.

2.1.3 Arbitration System Signals. The signals in this group are all open-collector lines and are used by the distributed arbitration logic to determine the next owner of the bus.

Bus Request (*RQST**) — This line is asserted by modules to indicate their desire to own the bus. The fair arbitration scheme guarantees that all modules requesting the bus will obtain ownership within some determinable maximum time.

Arbitration Signals (*ARB*⟨3 . . . 0⟩*) — These four lines are bused and binary-encoded in the same manner as the *ID*⟨3 . . . 0⟩* lines. During an arbitration contest, contending modules compare these lines with the binary value of their own *ID*⟨3 . . . 0⟩* lines and drive the *ARB*⟨3 . . . 0⟩* lines according to the rules of the distributed arbitration logic. The net effect of an arbitration contest is that two cycles after starting a contest the *ARB*⟨3 . . . 0⟩* lines carry the binary-encoded number of the next bus owner.

2.1.4 Power Lines. Four voltages are defined for use by NuBus modules: +5 V, −12 V, − 12 V, and −5.2 V. Voltage specifications such as required regulation are defined elsewhere in this standard; the amount of current available from each voltage supply is not specified by this standard.

2.2 Bus Operation

NOTE: The material presented in this section is descriptive and tutorial in nature, and is not a full specification of the bus.

2.2.1 Fundamental Concepts

• In general, signals are changed only on the rising edge of the system clock and sampled 75 ns later on the falling edge of the clock. The falling edge of the clock is called the *sample edge* and the rising edge of the clock is called the *driving edge.*

• The 100 ns time period between successive driving edges is called a *bus cycle* or simply a *cycle.* All cycles that exist can be categorized by considering the logic state of the following signals: *START**, *ACK**, *TM*⟨1 . . . 0⟩*, and *AD*⟨1 . . . 0⟩*.

• A *start cycle* is one in which *START** is asserted (and *ACK** is not asserted). The *TM*⟨1 . . . 0⟩* and *AD*⟨1 . . . 0⟩* lines can be thought of as encoding one of sixteen possible kinds of transactions, eight of which are read transactions and the other eight are write transactions.

• An *ack cycle* is one in which *ACK** is asserted (and *START** is not asserted). The *TM*⟨1 . . . 0⟩* lines encode one of four possible status codes, signifying successful completion, postponement, error, or bus timeout.

• An *attention cycle* is one in which both *START** and *ACK** are asserted at the same time. the *TM*⟨1 . . . 0⟩* lines encode four possible types of attention cycles, two of which are defined as reserved for future use. The other two are used as broadcast messages to lock and unlock resources, and are beyond the scope of this overview.

• A *transaction* is the basic bus data transfer operation, which begins with a start cycle and ends with an ack cycle. Transactions may be categorized based on the category of the start cycle which initiates the transaction. Thus, there are read transactions, block write transactions, and so on.

• The bus is said to be *busy* for the time between a start cycle and its corresponding ack cycle. The bus is *idle* for the time between an ack cycle and the next start cycle.

2.2.2 Examples of Transactions. In order to use the bus, a module must first have ownership of the bus. A module (for example, the module in slot #7 on the backplane) obtains ownership by requesting the bus and waiting until the distributed arbitration logic determines that the next owner will be #7. Then, the module waits until the bus is idle, and does a start cycle to begin the transaction. If the module wishes to do a "read word" transaction, then the $AD\langle 1 \ldots 0\rangle^*$ and $TM\langle 1 \ldots 0\rangle^*$ lines will be encoded for this type of transaction, and the rest of the address lines will have the desired word address. If another module determines that the address refers to itself, then in some subsequent cycle it will place the requested data on the $AD\langle 31 \ldots 0\rangle^*$ lines, and issue an ack cycle. This completes the transaction, and bus ownership may or may not pass to some other module, depending on the circumstances.

In a similar fashion, to write a word of data to another module on the bus, the start cycle would contain the appropriate code on the $TM\langle 1 \ldots 0\rangle^*$ and $AD\langle 1 \ldots 0\rangle^*$ lines, and the desired address in the rest of the address lines. The next cycle, the master would switch the $AD\langle 31 \ldots 0\rangle^*$ lines to carry the 32 bits of data to be written. In the second or subsequent cycle, the address slave module would sample the data lines and then issue an ack cycle, thus completing the transaction.

Note that it is possible to have both read and write transactions be as short as two cycles, consisting of only the start cycle and the ack cycle. However, transactions may be longer than two cycles.

3. Specification

3.1 Protocol

3.1.1 Signal Determinacy. A signal line is determinate during a given cycle if it is in either an asserted or unasserted state within the specified setup and hold times of the system clock. When a signal is specified to be determinate, it shall be determinate as a consequence of one of the following:

(1) If a signal is driven during cycle $n$, then it is determinate during cycle $n$.

(2) If the three-state signal is driven asserted during cycle $n$ and is not driven during cycles $n + 1$ and $n + 2$, then it is not guaranteed determinate during cycle $n + 1$, but is guaranteed (by the bus termination) to be unasserted during cycle $n + 2$.

(3) If an open-collector signal is driven asserted during cycle $n$ and is not driven during cycle $n + 1$, then it is guaranteed (by the bus termination) to be unasserted during cycle $n + 1$.

(4) If a signal is unasserted during cycle $n$ and is not driven during cycle $n + 1$, then it is guaranteed (by the bus termination) to remain unasserted during cycle $n + 1$.

3.1.2 Bus Cycles. A bus cycle is a single period of *CLK**, beginning with the rising edge. The rising edge of *CLK** is the driving edge, denoted by $D_i$, and is associated with the driving of bus signals during bus cycle $i$. The falling edge of *CLK** is the sample edge, denoted by $S_i$, and is associated with the sampling of bus signals during bus cycle $i$.

3.1.3 Transactions. A transaction consists of two or more bus cycles, the first of which is a start cycle and the last of which is an ack cycle. A start cycle is a bus cycle in which *START** is asserted, *ACK** is unasserted, *AD*⟨31 . . . 0⟩* carry an address, and *TM*⟨1 . . . 0⟩* carry the transfer mode. An ack cycle is a bus cycle in which *ACK** is asserted, *START** is unasserted. *AD*⟨31 . . . 0⟩* carry data, and *TM*⟨1 . . . 0⟩* carry the transfer response status.

3.1.3.1 Data Sizes. Three different data sizes may be transferred: bytes, halfwords, and words. The data transferred is unjustified as shown in Fig 2.

| | | | |
|---|---|---|---|
| *AD*31* | | | *AD*0* |
| Word | | | |
| Halfword 1 | | Halfword 0 | |
| Byte 3 | Byte 2 | Byte 1 | Byte 0 |

[Extracted from Texas Instruments NuBus™ specification document with permission of the publisher. Copyright (1983, 1986, 1988) Texas Instruments Incorporated.]

Fig 2
**Relationship of Words, Halfwords, Bytes and *AD*⟨31 . . . 0⟩* Lines**

That is, a byte is conveyed on the same byte lane regardless of the transfer mode used to access it. Similarly, a halfword is conveyed on the same halfword lane regardless of the transfer mode used to access it. The data size and lane for a transaction is determined during a start cycle by the *TM*⟨1 . . . 0⟩* and *AD*⟨1 . . . 0⟩* lines as shown in Table 1.

NOTE: These encodings and bit and byte labels specify data transfers over the bus and do not necessarily directly correspond to the address encoding or byte labeling convention of a particular microprocessor.

Table 1
Transfer Mode Summary

| *TM*1* | *TM*0* | *AD*1* | *AD*0* | Type of Cycle |
|---|---|---|---|---|
| L | L | L | L | Write byte 3 |
| L | L | L | H | Write byte 2 |
| L | L | H | L | Write byte 1 |
| L | L | H | H | Write byte 0 |
| L | H | L | L | Write halfword 1 |
| L | H | L | H | Block write |
| L | H | H | L | Write halfword 0 |
| L | H | H | H | Write word |
| H | L | L | L | Read byte 3 |
| H | L | L | H | Read byte 2 |
| H | L | H | L | Read byte 1 |
| H | L | H | H | Read byte 0 |
| H | H | L | L | Read halfword 1 |
| H | H | L | H | Block read |
| H | H | H | L | Read halfword 0 |
| H | H | H | H | Read word |

During any cycle on which $AD\langle 31 \ldots 0\rangle^*$ are specified to carry data, all $AD\langle 31 \ldots 0\rangle^*$ lines shall be determinate. This is independent of either the data size or lane.

NOTE: The state of any $AD\langle 31 \ldots 0\rangle^*$ line not included in the transfer mode, although determinate, is unspecified.

3.1.3.2 Bus Parity. Parity checking of the $AD\langle 31 \ldots 0\rangle^*$ lines is optional on a cycle by cycle basis. Thus parity is useful only when the module driving the $AD\langle 31 \ldots 0\rangle^*$ lines generates parity *and* the module capturing the address or data checks it.

Two signals, $SP^*$ and $SPV^*$ are used to communicate the parity bit and to indicate parity is being used, respectively. $SPV^*$ shall be determinate during any cycle in which the $AD\langle 31 \ldots 0\rangle^*$ lines are specified to carry address or data.

If $SPV^*$ is asserted during a cycle that $AD\langle 31 \ldots 0\rangle^*$ carries an address or data, then $SP^*$ shall be driven with the even parity of the $AD\langle 31 \ldots 0\rangle^*$ lines. Even parity means that if an even number of $AD\langle 31 \ldots 0\rangle^*$ lines are asserted, then $SP^*$ is unasserted; otherwise $SP^*$ is asserted.

If $SPV^*$ is unasserted during a cycle that $AD\langle 31 \ldots 0\rangle^*$ carries an address or data, then $SP^*$ is unspecified and may be indeterminate.

Although byte and halfword transactions are supported, parity (if used) shall always be generated over the complete 32 bits of the $AD\langle 31 \ldots 0\rangle^*$ lines. If parity errors are detected, the following applies:

During Address Cycle—A slave detecting a parity error shall not respond on this transaction.

During Data Cycle on Read—A master detecting a parity error shall complete the transaction. The data are presumed to be corrupted.

During Data Cycle on Write—An addressed slave detecting a parity error shall acknowledge with the error status code.

3.1.3.3 Acknowledgment. During an ack cycle the $TM\langle 1 \ldots 0\rangle^*$ lines carry a transaction response status as shown in Table 2.

The transaction response status conveys information from the addressed slave to the master relevant to the current transaction. If the slave is going to respond, it shall complete the transaction with an ack cycle within 255 cycles following the start cycle.

NOTE: The master shall complete each transaction, regardless of the transaction response status. The action taken by a master in response to an abnormally completed transaction is not specified by this standard.

3.1.3.3.1 Bus Transfer Complete. This response indicates a normal valid completion of a bus transaction. If the transaction is a block transfer and bus transfer complete is issued without the transfer of any intermediate data,

Table 2
Transaction Response Status Summary

| *TM*1* | *TM*0* | Type of Acknowledge |
|---|---|---|
| L | L | Bus transfer complete |
| L | H | Error |
| H | L | Bus timeout error |
| H | H | Try again later |

this response indicates that the slave does not support block transfers and that no data has been transferred. This is not an error condition.

3.1.3.3.2 Error. This response indicates an error condition was detected by the slave and indicates an unsuccessful transaction. During a read or block read an error response indicates that any data transferred may not be valid. During a write, event cycle, or block write, an error response indicates that the write may not have completed correctly.

3.1.3.3.3 Bus Timeout Error. This response indicates that no slave responded to the start cycle address. Timeout logic shall be implemented by the chassis in order to terminate the current transaction with a bus timeout error. If a period of 256 cycles have elapsed since a start cycle, and there has been no corresponding ack cycle, then the bus timeout logic shall assume the role of the slave, and shall generate an ack cycle with a bus timeout error code.

3.1.3.3.4 Try Again Later. This response indicates that the slave is unable to complete the transaction at this time. There is a strong implication that the transfer can be accomplished by some future request.

During a single read or write transaction, or the first data transfer cycle of a block transfer, this is not an error condition. The requesting module should retry the transaction. The maximum number of retries is not specified by this document, but slaves should not be designed in such a manner that a large number of retries is required to access them.

This response shall not occur during a block transfer on any data cycle other than the first one.

3.1.3.4 Single Data Cycle Transactions. A single data cycle transaction is a read transaction or a write transaction in which only a single data value is transferred.

3.1.3.4.1 Read Transactions. A read transaction consists of the following steps (refer to Fig 3):

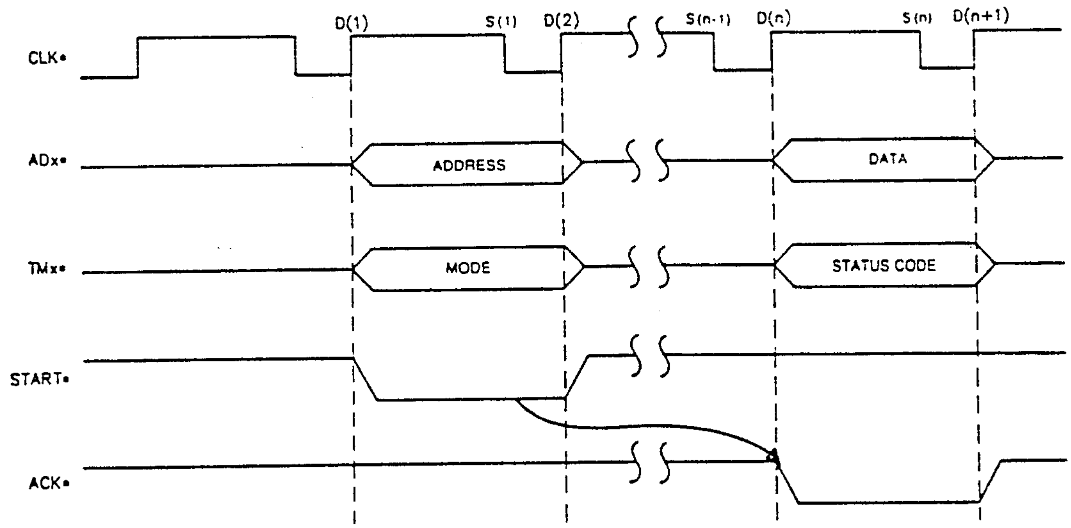

[Extracted from Texas Instruments NuBus™ specification document with permission of the publisher. Copyright (1983, 1986, 1988) Texas Instruments Incorporated.]

Fig 3
Read Transaction $D_1$ — The master asserts $START^*$ and drives the $AD\langle 31 \ldots 0\rangle^*$ lines with the desired address and drives the $TM\langle 1 \ldots 0\rangle^*$ lines with the appropriate transfer mode to initiate the transaction. The master shall ensure that $ACK^*$ is unasserted.

$S_1$ — Bus modules sample the $AD\langle 31 \ldots 0\rangle^*$ and $TM\langle 1 \ldots 0\rangle^*$ lines.

$D_2$ — The master stops driving the $AD\langle 31 \ldots 0\rangle^*$, $TM\langle 1 \ldots 0\rangle^*$ and $ACK^*$ lines. The master drives $START^*$ unasserted and waits for an ack cycle.

$D_n$ — The addressed slave drives the requested data onto the $AD\langle 31 \ldots 0\rangle^*$ lines, drives the appropriate transaction response status on the $TM\langle 1 \ldots 0\rangle^*$ lines, and asserts $ACK^*$. The slave shall ensure that $AD\langle 31 \ldots 0\rangle^*$ lines not indicated by the transfer mode are determinate.

$S_n$ — The bus master samples the $AD\langle 31 \ldots 0\rangle^*$ and $TM\langle 1 \ldots 0\rangle^*$ lines to receive the data and note any error condition.

$D_{n+1}$ — The addressed slave stops driving the $AD\langle 31 \ldots 0\rangle^*$, $TM\langle 1 \ldots 0\rangle^*$, and $ACK^*$ lines. The bus owner shall drive $ACK^*$ to a determinate state. This may be the $D_1$ of the next transaction.

3.1.3.4.2 Write Transactions. A write transaction consists of the following steps (refer to Fig 4):

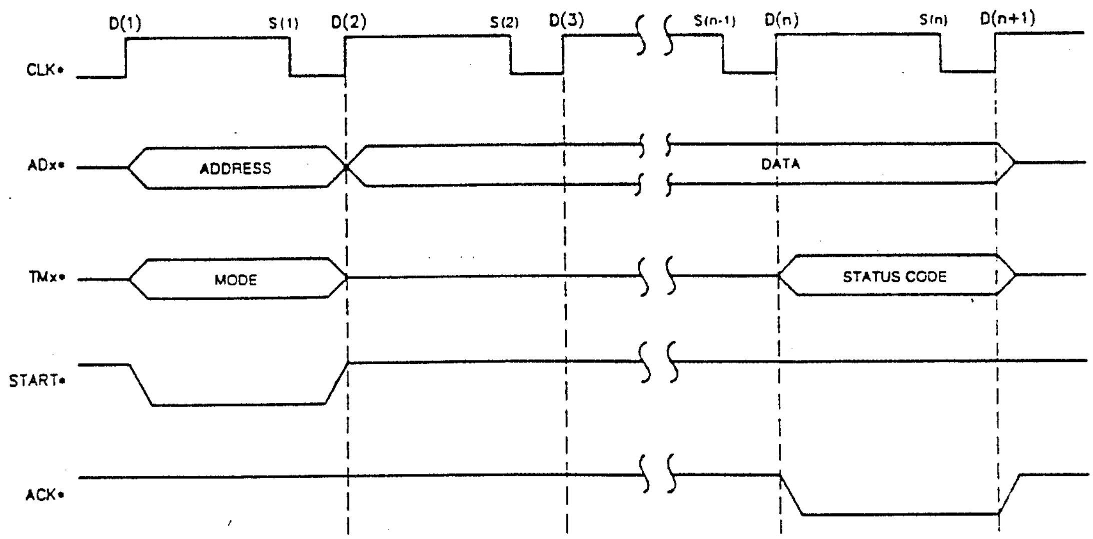

[Extracted from Texas Instruments NuBus™ specification document with permission of the publisher. Copyright (1983, 1986, 1988) Texas Instruments Incorporated.]

Fig 4
Write Transaction $D_1$ — The master asserts $START^*$ and drives $AD\langle 31 \ldots 0\rangle^*$ lines with the desired address and the $TM\langle 1 \ldots 0\rangle^*$ lines with the appropriate transfer mode to initiate the transaction. The master shall ensure that $ACK^*$ is unasserted.

$S_1$ — Bus slaves sample the $AD\langle 31 \ldots 0\rangle^*$ and $TM\langle 1 \ldots 0\rangle^*$ lines.

$D_2$–$D_n$ — The master drives the data to be written onto the appropriate $AD\langle 31 \ldots 0\rangle^*$ lines. The master stops driving the $TM\langle 1 \ldots 0\rangle^*$ and $ACK^*$ lines. The master drives $START^*$ unasserted and waits for an ack cycle. The determinacy requirement in this case indicates that the master drives *all* of the $AD\langle 31 \ldots 0\rangle^*$ lines independent of the data sizes or lanes.

$S_2$–$S_n$ — The addressed slave samples the $AD\langle 31 \ldots 0\rangle^*$ and $TM\langle 1 \ldots 0\rangle^*$ lines to receive the data. The data may be sampled on any cycle after the start cycle through the ack cycle.

$D_n$ — The addressed slave drives the appropriate transaction response status on the $TM\langle 1 \ldots 0\rangle^*$ lines and asserts $ACK^*$.

$D_{n+1}$ — The bus master stops driving the $AD\langle 31 \ldots 0\rangle^*$ lines, and the addressed slave stops driving the $TM\langle 1 \ldots 0\rangle^*$ and $ACK^*$ lines. The bus owner shall drive $ACK^*$ to a determinate state. This may be the $D_1$ of the next transaction.

3.1.3.4.3 Event Transactions. An event transaction is a special case of a write transaction that is used to post interrupts. The write address shall either specify a word, a halfword 0, or a byte 0, and the data written shall have $AD0^*$ asserted. The remaining $AD^*$ lines required by the transfer mode should be either all asserted or all unasserted. Other combinations are reserved for future use. Any bus master can generate an interrupt for another module by performing an event transaction into an area of the address space that is being monitored by the slave module. Neither the method of monitoring nor the response elicited is specified by this standard.

3.1.4 Block Transfers. A block transfer is a read transaction or a write transaction in which multiple data values are transferred. A block transfer consists of a start cycle, multiple data cycles to or from sequential address locations, and an ack cycle. The number of data words transferred is controlled by the master and communicated during the start cycle. Allowed lengths of block transfers are two, four, eight, and sixteen words. Only word transfers are provided in block mode.

The type of block transfer (read or write) is specified by an encoding of $AD\langle 1 \ldots 0\rangle^*$ and $TM\langle 1 \ldots 0\rangle^*$ as defined in Table 1.

The size of the block to be transferred and its starting address are determined by an encoding of the $AD\langle 5 \ldots 2\rangle^*$ lines as defined in Table 3. The response of a slave to any other encoding of these lines during a block transfer is undetermined.

During block transfers, each data cycle is acknowledged by the responding slave. The intermediate data cycles are acknowledged by asserting $TM0^*$ with both $TM1^*$ and $ACK^*$ unasserted. For intermediate acknowledgments, $TM0^*$ has the same significance and timing with respect to $AD\langle 31 \ldots 0\rangle^*$ as $ACK^*$

Table 3
Block Size and Starting Address Summary

| $AD5^*$ | $AD4^*$ | $AD3^*$ | $AD2^*$ | Block Size (Words) | Block Starting Address |
|---|---|---|---|---|---|
| X | X | X | H | 2 | $(A_{31} \rightarrow A_3)000$ |
| X | X | H | L | 4 | $(A_{31} \rightarrow A_4)0000$ |
| X | H | L | L | 8 | $(A_{31} \rightarrow A_5)00000$ |
| H | L | L | L | 16 | $(A_{31} \rightarrow A_6)000000$ |

does during nonblock transfers. The final data cycle in an ack cycle, and the transaction response status has the same meaning as in a single data cycle transaction, as indicated in Table 2.

3.1.4.1 Block Read. A block read transaction consists of the following steps (refer to Fig 5):

$D_1$ — The bus master asserts *START** and drives the *AD*⟨31 . . . 0⟩* lines with the desired address and drives the *TM*⟨1 . . . 0⟩* lines with the appropriate transfer mode to initiate the transaction. The master shall ensure that *ACK** is unasserted.

$S_1$ — The bus modules sample the *AD*⟨31 . . . 0⟩* and *TM*⟨1 . . . 0⟩* lines.

$D_2$ — The bus master stops driving the *AD*⟨31 . . . 0⟩*, *TM*⟨1 . . . 0⟩* and *ACK** lines. The master drives *START** unasserted and waits for an intermediate acknowledgment.

$D_n$ — The addressed slave drives the first word of the requested data on the *AD*⟨31 . . . 0⟩* and drives *TM*0* asserted. The slave shall assure that *ACK** and *TM*1* are unasserted.

$S_n$ — The bus master, responding to the assertion of *TM*0* with *ACK** unasserted, samples the *AD*⟨31 . . . 0⟩* lines, and captures the data.

$D_{n+1}$ — If the addressed slave is not ready to put the next consecutive word on the bus, the addressed slave drives *TM*0* unasserted until a bus cycle in which the word is ready.

NOTE: The previous three steps are repeated for ascending addresses until all but the final word of the block have been transferred.

$D_b$ — The addressed slave drives the final word of requested data on the *AD*⟨31 . . . 0⟩* lines, drives the appropriate transfer response status on the *TM*0* lines, and drives *ACK** asserted.

$S_b$ — The bus master samples the *AD*⟨31 . . . 0⟩* and *TM*⟨1 . . . 0⟩* lines to receive the data and note any error conditions.

$D_{b+1}$ — The addressed slave stops driving the *AD*⟨31 . . . 0⟩*, *TM*⟨1 . . . 0⟩*, and *ACK** lines. The bus owner shall drive *ACK** to a determinate state. This may be the $D_1$ of the next transaction.

Figures 6, 8C:
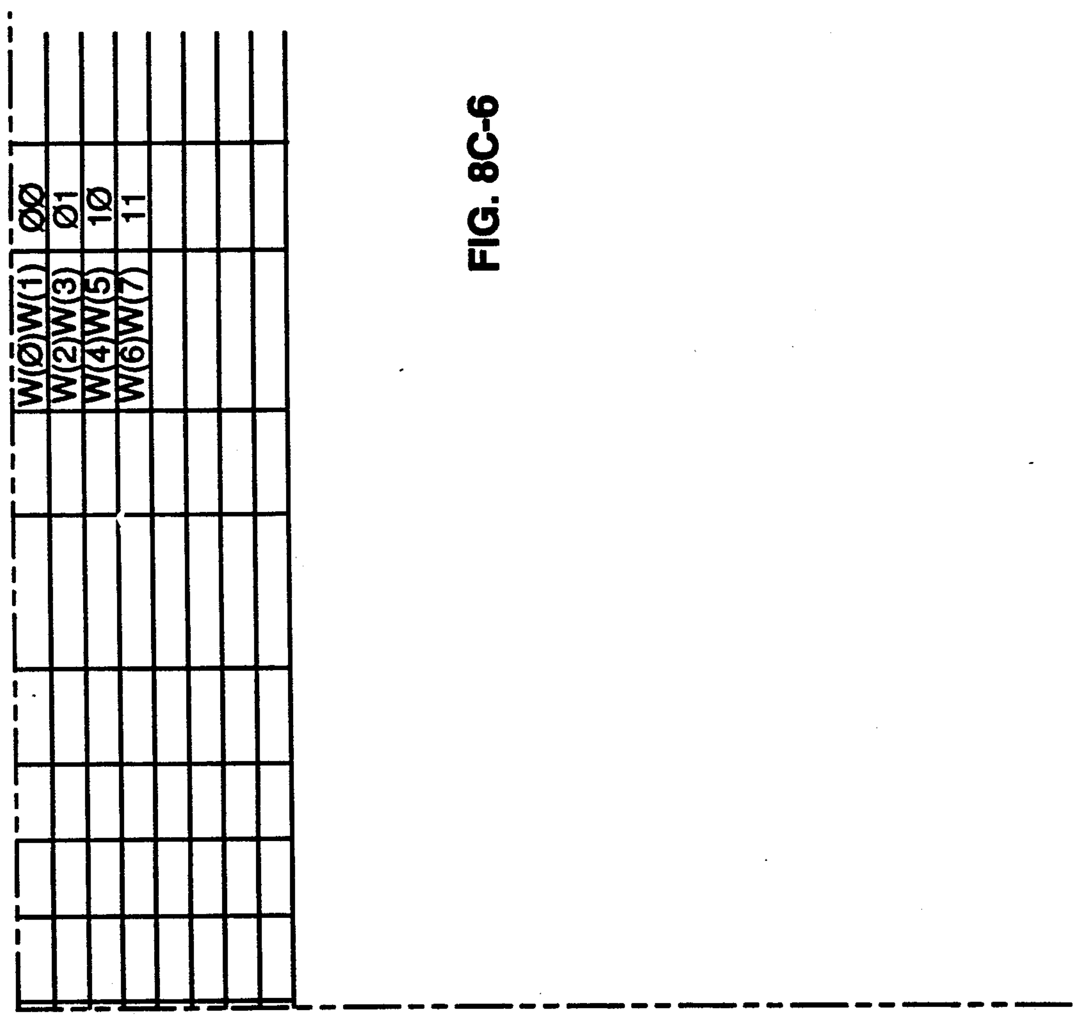

3.1.4.2 Block Write. A block write transaction consists of the following steps (refer to Fig 6):

$D_1$ — The bus master asserts *START** and drives the *AD*⟨31 . . . 0⟩* lines with the desired address and the *TM*⟨1 . . . 0⟩* lines with the appropriate transfer mode to initiate the transaction. The master shall ensure that *ACK** is unasserted.

$S_1$ — The bus modules sample the *AD*⟨31 . . . 0⟩* and *TM*⟨1 . . . 0⟩* lines.

$D_2$–$D_n$ — The bus master drives the first word of the data to be written onto

** The addressed slave is responsible for driving TM0• to the desired state between D(n) and D(b+1)

[Extracted from Texas Instruments NuBus™ specification document with permission of the publisher. Copyright (1983, 1986, 1988) Texas Instruments Incorporated.]

Block Read Operation

** The addressed slave is responsible for driving TM0• to the desired state between R(n) and R(b+1)

[Extracted from Texas Instruments NuBus™ specification document with permission of the publisher. Copyright (1983, 1986, 1988) Texas Instruments Incorporated.]

Block Write Operation the appropriate $AD\langle 31 \ldots 0\rangle^*$, $TM\langle 1 \ldots 0\rangle^*$ and $ACK^*$ lines. The master drives $START^*$ unasserted and waits for an intermediate acknowledgment.

$S_n$ — The addressed slave samples the $AD\langle 31 \ldots 0\rangle^*$ lines to receive the data and drives the $TM0^*$ line asserted. The slave shall assure that $ACK^*$ and $TM1^*$ are unasserted. The data may be sampled on any cycle after the start cycle through the intermediate acknowledge cycle.

$D_{n+1}$ — The bus master drives the next consecutive word of the data on the $AD\langle 31 \ldots 0\rangle^*$ lines. If the slave is not ready to sample the data, the slave drives $TM0^*$ unasserted until it is ready to proceed.

NOTE: The previous two steps are repeated for ascending addresses until all but the final word of the block have been transferred.

$D_{b-k}$–$D_b$ — The bus master drives the final word of the requested data on the $AD\langle 31 \ldots 0\rangle^*$ lines.

$S_b$ — The addressed slave sample the $AD\langle 31 \ldots 0\rangle^*$ lines and captures the final word of the block transfer. The data may be sampled on any cycle from the previous intermediate acknowledge through the ack cycle.

$D_b$ — The addressed slave asserts $ACK^*$ and drives the appropriate transaction response status on the $TM\langle 1 \ldots 0\rangle^*$ lines.

$D_{b+1}$ — The bus master stops driving the $AD\langle 31 \ldots 0\rangle^*$ lines, and the addressed slave stops driving the $TM\langle 1 \ldots 0\rangle^*$ and $ACK^*$ lines. The bus owner shall drive $ACK^*$ to a determinate state. This may be the $D_1$ of the next transaction.

3.1.4.3 Block Transfer Early Termination. An addressed slave that is incapable of performing any block transfer shall issue an ack cycle without any intermediate data transfer cycles ($TM0^*$ asserted, $TM1^*$ and $ACK^*$ unasserted) with a bus transfer complete transaction response status. The single word transferred shall be ignored by the master during a read and shall be ignored by the addressed slave during a write. This is a normal response of a module incapable of supporting block transfers and is not an error condition.

If the addressed slave detects an error during a block transaction, the transaction may be terminated by the addressed slave by issuing an ack cycle with the appropriate transaction response status. Any data transferred during a block transfer that is ended with an error condition is not guaranteed to be meaningful.

NOTE: The slave is not required to signal the error as soon as it is detected. Thus, the error could have occurred *at any time* during the active block transfer, and all data transferred are suspect.

3.1.5 Attention Cycles. An attention cycle is a single bus cycle during which the master asserts both *START** and *ACK** in the same clock period. The *TM*⟨1 . . . 0⟩* lines are also driven and define one of four types of attention cycles. The *AD*⟨31 . . . 0⟩* lines are ignored by all modules and no module is selected nor are any data transferred. Table 4 defines the four types of attention cycles.

3.1.5.1 Attention-Null Cycle. An attention-null cycle is used to reinitiate arbitration. If the bus is requested and acquired, but not used by the new owner, and *RQST** is asserted, then the new bus owner shall generate an attention-null cycle to initiate a new arbitration contest. If *RQST** is not asserted, then an attention-null cycle is not required, but may be inserted.

An attention-null cycle is also used to indicate the end of a locked resource transfer sequence. Resource locking is described in 3.1.6.2.4.

3.1.5.2 Attention-Resource-Lock Cycle. An attention-resource-lock cycle is used to indicate that the following sequence of locked transactions should also lock any resource that is addressed during the locked sequence. Resource locking is described in 3.1.6.2.4.

3.1.5.3 Reserved Attention Cycles. These two types of attention cycles are currently not defined, but are reserved for future use. Current modules shall restart arbitration, but not change the state of a resource lock, if they see either one of these cycles.

If either one of these cycles are defined in the future, they shall be defined in a manner that is consistent with this specification, that is, they will restart arbitration and not affect resource lock.

3.1.6 Arbitration. Arbitration is the mechanism used to determine which bus module will be the next bus owner.

3.1.6.1 Bus Ownership. There is always a bus owner, except for the period immediately after reset and before any bus modules request bus ownership. Bus ownership may be thought of as a token that is always present and is passed from one module to another.

Table 4
Attention Cycle Summary

| *TM*1* | *TM*0* | Type of Attention Cycle |
|---|---|---|
| L | L | Attention-null |
| L | H | Reserved |
| H | L | Attention-resource-lock |
| H | H | Reserved |

3.1.6.1.1 Bus Owner Responsibilities. The bus owner has certain privileges and certain responsibilities. The bus owner is the only bus module that can initiate bus transactions. The bus owner is responsible for guaranteeing that the *START** signal is in a determinate state on every bus cycle and that the *ACK** signal is in a determinate state during the start cycle, and during all cycles between transactions. Figure 7 defines the responsibility of the bus owner on a cycle by cycle basis.

Fig 7
Signal Driving Responsibilities of the Bus Owner

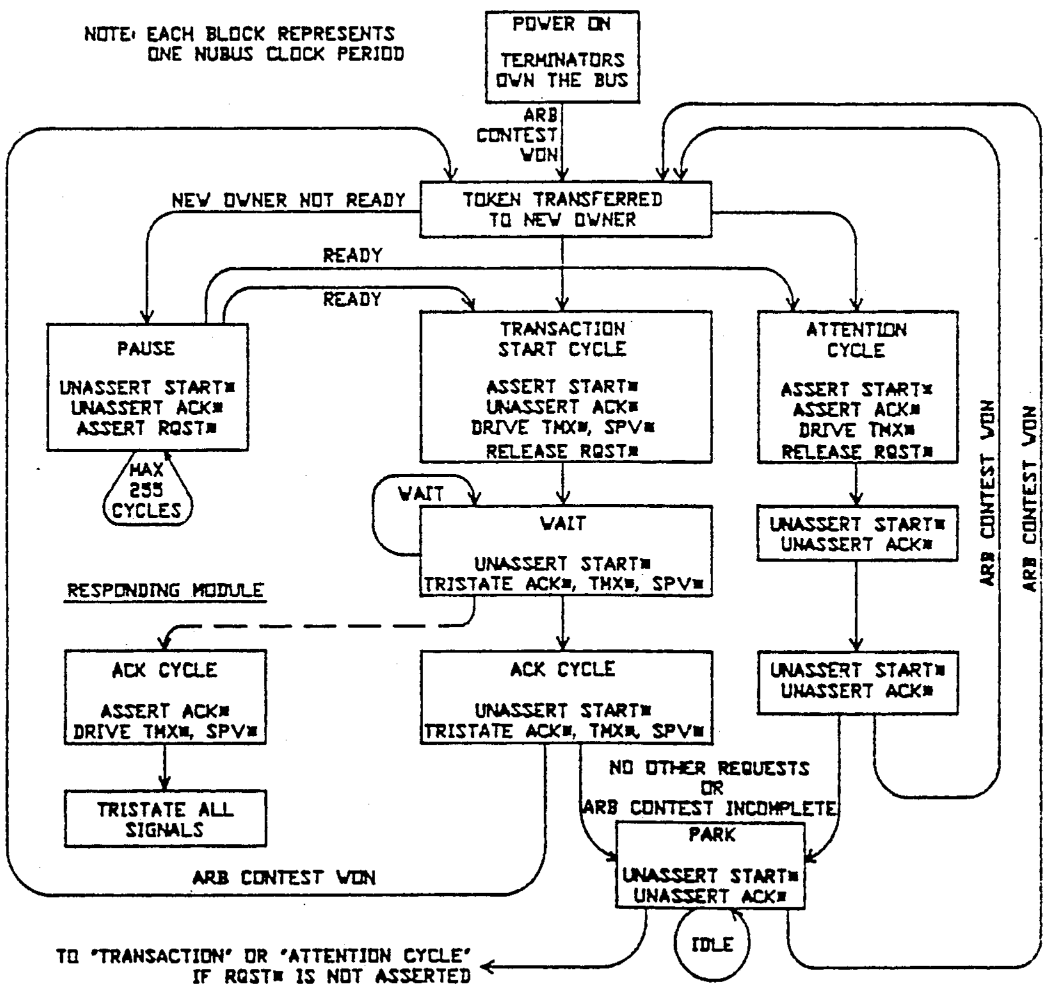

[Extracted from Texas Instruments NuBus™ specification document with permission of the publisher. Copyright (1983, 1986, 1988) Texas Instruments Incorporated.]

If $START^*$ or $ACK^*$ is asserted during cycle $n$ by any module, then it shall be driven during cycle $n + 1$ by the bus owner.

Transfer mode 0 and 1 ($TM\langle 1 \ldots 0\rangle^*$) shall be driven by the current bus owner during start cycles to indicate the type of bus operation being initiated. They shall be driven by the responding module during ack cycles to denote the type of acknowledgment. The encoding of these lines during a start cycle shall be as given in Table 1, and during an ack cycle shall be as given in Table 2. $TM0^*$ is asserted by the responding module during block transfer modes to acknowledge individual words. When $TM0^*$ is asserted by the responding module as an intermediate acknowledge during a block transfer on some cycle $n$, then it shall be driven by the responding module on cycle $n + 1$.

During a start cycle, the current bus owner drives the four control signals, the $AD\langle 31 \ldots 0\rangle^*$ lines, and the parity lines. After the start cycle, the $AD\langle 31 \ldots 0\rangle^*$ lines are driven by the master for write transactions, and by the responding module for read transactions. The master does not drive the three control signals: $ACK^*$, $TM0^*$, and $TM1^*$ after the $START^*$ cycle. The responding module may drive these three control signals during any cycle after the start cycle, and shall drive them during the ack cycle.

3.1.6.2 Determination of Next Owner. The next owner is determined by the arbitration process. The arbitration process varies, depending on the state of the bus when a potential owner requests to become the next owner. Bus modules request bus ownership by driving the open-collector $RQST^*$ line asserted. A module shall not begin to drive the $RQST^*$ line if it was asserted on the previous sample edge. A module that has begun to assert $RQST^*$ shall continue to assert $RQST^*$ until it wins an arbitration contest and asserts $START^*$.

3.1.6.2.1 Single Competitor. The simplest case is when the bus is not being used and one bus module requests ownership by driving the $RQST^*$ line asserted. In this case, an arbitration contest occurs, which the single requestor wins. The requestor becomes the new bus owner at the end of the arbitration contest.

In the case that a transaction is in progress and a single bus module requests bus ownership by driving the $RQST^*$ line asserted, the requestor will determine that it will be the next bus owner at the end of the arbitration contest, but it will not assume ownership until the completion of the transaction on the cycle immediately following the ack cycle.

3.1.6.2.2 Multiple Competition. More than one bus module may request bus ownership simultaneously by driving the $RQST^*$ line asserted on the same bus cycle. In this case, the arbitration contest will determine which requesting module will be the next bus owner. The winning bus module will assume ownership at the end of the arbitration contest if the bus is not busy, or at the end of the bus transaction on the cycle immediately following the ack cycle if the bus is busy when the contest is completed.

As each winning bus module assumes bus ownership, the remaining requestors compete in a new arbitration contest to determine the next winner. This sequence repeats until all requestors have won.

3.1.6.2.3 Fairness. All bus modules are given equal access to the bus. At the end of each transaction, the next winning requestor shall assume ownership. Since a module may assert the $RQST^*$ line only if it was not asserted on the previous sample edge, all requestors who requested ownership simultaneously will win before any new requestors are permitted to request ownership. Therefore, a single module is prevented from continuously requesting ownership and winning the arbitration contests.

3.1.6.2.4 Locking. Although modules normally perform only one transaction before allowing another requestor to become bus owner, sometimes a module may need to lock the bus. An example of this is an indivisible test-and-set operation performed in a multiprocessor environment. Two levels of locking are provided: bus locking and resource locking.

Bus locking is accomplished with no additional mechanism. To lock the bus, a module simply continues to request bus ownership and participate in arbitration contests. (It does not release $RQST^*$.) Since it won the previous contest, and no other (possibly higher-numbered) modules can join the contention, it will win subsequent contests. Figure 8 shows an example in which module #4 locks the bus for two transactions.

Modules should not lock the bus unless required, and should lock the bus for as short a tenure as possible.

Resource locking is done by issuing an attention-bus-lock cycle as the first transaction of the locked bus tenure to alert all modules that a locked operation is occurring. The bus lock is maintained using the bus lock mechanism described in the preceding paragraphs. A bus owner that issues an attention-bus-lock cycle shall issue an attention-null cycle as the last cycle of its locked bus tenure to indicate to all modules that the locked operation is completed. All bus modules with resources that may be locked shall monitor the NuBus for attention-bus-lock cycles. If that module is ever addressed after an attention-bus-lock cycle, but before a corresponding attention-null cycle, then it shall lock its internal resource until the bus master issues an attention-null cycle. Only one attention-bus-lock cycle is issued for each locked tenure, so all modules with lockable resources shall record this occurrence; however, they do not need to react to it

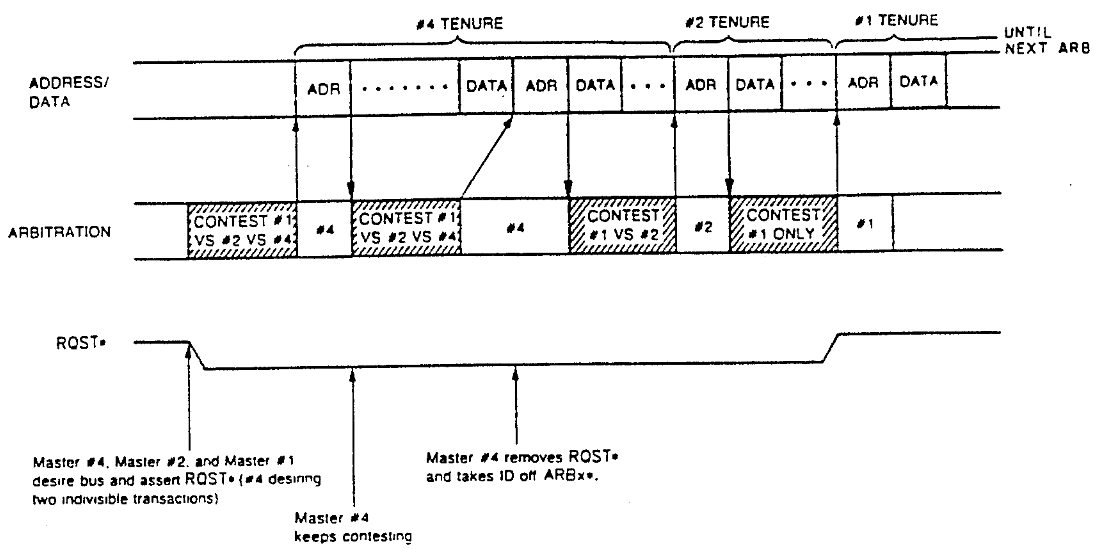

[Extracted from Texas Instruments NuBus™ specification document with permission of the publisher. Copyright (1983, 1986, 1988) Texas Instruments Incorporated.]

Fig 8
Bus Locking Example unless they are addressed before the locked tenure is completed with an attention-null cycle. This allows multiple resources to be "touched" and locked during the same locked tenure.

A bus owner that intends to perform an indivisible bus operation should always lock resources on addressed slaves in addition to locking the bus. For example, a module containing both a processor and memory contains a resource (memory) that can be accessed from the NuBus and directly from the local processor. A bus master that is attempting to perform a locked sequence of transactions on this memory must also lock the memory resource so that the local processor does not interfere with the locked sequence. This is to prevent the local processor from modifying a data structure that is being modified by the bus master. A module is not required to provide locking of its local resources and may provide locking on some and not on others; however, only local resources that can be locked can be used for reliable test-and-set operations.

3.1.6.2.5 Parking. As long as $RQST^*$ remains unasserted, the bus owner is considered to be "parked" on the bus and may continue to use the bus without the necessity of going through an arbitration contest in which it is the only contender. Once another module drives the $RQST^*$ line asserted, an arbitration contest is started and the bus owner shall not begin another transaction.

This concept of "bus parking" reduces the average time needed to acquire the bus in systems with a small number of active contenders.

NOTE: A parked bus owner that desires a locked series of transactions is required to request an arbitration contest by driving *RQST** asserted.

3.1.6.3 Transfer of Ownership. The conceptual bus ownership token is transferred from one module to another module in response to a bus request at specific, well-defined occasions, as follows:

- If the bus is busy (a transaction is in progress), and the arbitration contest is complete, then the token is transferred at the end of the ack cycle and the new bus owner assumes bus ownership on the cycle immediately following the ack cycle.

- If the bus is not busy (the current bus owner is parked), then the token is transferred at the end of the arbitration contest and the new bus owner assumes bus ownership on the cycle immediately following the arbitration contest.

- If the bus is busy, but the ack cycle occurs before the arbitration contest is completed, then the token is transferred at the end of the arbitration contest and the new bus owner assumes bus ownership on the cycle immediately following the arbitration contest.

- If an attention-null cycle is issued, then the token is transferred at the end of the arbitration contest and the new bus owner assumes bus ownership on the cycle immediately following the arbitration contest.

- If any transaction completes and no module has requested bus ownership, then the token is not transferred and the bus master retains bus ownership and is parked.

3.1.6.4 Arbitration Contest. An arbitration contest occurs after either of two occurrences: *RQST** transitions from the unasserted state to the asserted state, or a start cycle occurs while *RQST** is asserted. During arbitration, one or more modules contend for control of the bus.

3.1.6.4.1 Arbitration Signals

Bus Request—*RQST** is an open-collector line driven asserted by any module to request bus ownership.

Arbitrate Signals—*ARB*⟨3 . . . 0⟩* are open-collector binary coded lines, with *ARB*3* representing the most significant bit. They are driven by contenders in each arbitration contest and are used by the distributed arbitration logic to determine the next bus owner.

ID Signals—*ID*⟨3 . . . 0⟩* provide a unique binary coded value to each bus module. *ID*3* represents the most significant bit.

3.1.6.4.2 Contest Description. An arbitration contest (see Fig 9) consists of the following steps:

$S_1$ — A module shall not assert $RQST^*$ unless $RQST^*$ was unasserted. If $RQST^*$ is unasserted on this sample edge, then all modules that desire bus ownership begin driving their ID codes on the $ARB\langle 3 \ldots 0\rangle^*$ lines immediately after this edge.

$D_2$ — Modules that desire ownership of the bus, and that started driving the $ARB\langle 3 \ldots 0\rangle^*$ lines on $S_1$, begin driving the $RQST^*$ lines asserted and continue to drive it asserted until that module becomes bus master.

$S_3$ — The arbitration logic distributed among the modules determines which of the modules is to become the next bus owner. The contest mechanism shall settle within two clock periods, at which time the code on the $ARB\langle 3 \ldots 0\rangle^*$ lines reflects the ID of the highest-numbered contender.

$D_4$–$D_{n-1}$ — The winning module waits until bus ownership is transferred to it before becoming a bus master. On the cycle that the conceptual bus ownership token is transferred to the new owner, it is responsible for driving $START^*$ and $ACK^*$ to determinate states, even if it does not immediately start a transaction. The new owner shall not wait longer than 255 cycles before starting a transaction.

$D_n$ — The bus owner begins its bus transaction by driving $START^*$ asserted, and quits driving $RQST^*$. ($RQST^*$ is not released if the bus owner is locking the bus.)

$S_n$ — The bus owner stops driving the $ARB\langle 3 \ldots 0\rangle^*$ lines, unless it desires to lock the bus. If multiple modules were requesting bus ownership, the next contest begins on $S_n$ when the current bus owner releases the $ARB\langle 3 \ldots 0\rangle^*$ lines. Other modules that desire bus ownership and that started driving the $ARB\langle 3 \ldots 0\rangle^*$ lines on $S_1$ and driving $RQST^*$ on $D_2$, continue driving $ARB\langle 3 \ldots 0\rangle^*$ and asserting $RQST^*$.

$S_{n+2}$ — The arbitration logic distributed among the modules determines which of the modules is to become the next bus owner. The contest mechanism shall settle within two clock periods, at which time the code on the $ARB\langle 3 \ldots 0\rangle^*$ lines reflects the ID of the highest-numbered contenders. If the previous owner is locking the bus, it will again win the arbitration contest and remain as the bus owner.

$D_{n+3}$ — The winning module waits until the bus ownership is transferred to it before becoming the bus master. This edge is equivalent to $D_4$,

[Extracted from Texas Instruments NuBus™ specification document with permission of the publisher. Copyright (1983, 1986, 1988) Texas Instruments Incorporated.]

Arbitration Contest and the sequence from $D_4$ to $D_{n+3}$ is repeated for all remaining requestors who started asserting $RQST^*$ on $D_2$.

Once a module has requested bus ownership, it shall not stop requesting until it has won ownership and generated a start cycle for a bus transaction or generated as attention cycle. When the last requestor becomes master and asserts $START^*$ and quits asserting $RQST^*$, the $RQST^*$ line will become unasserted. New requestors can now request bus ownership, and a new series of arbitration contests begins on $S_1$. Figure 10 illustrates a sequence of several modules contending for bus ownership.

3.1.6.4.3 Arbitration Logic Mechanism. When a bus contest occurs, each module shall drive the arbitration lines with its unique ID code, and then unassert them if it detects higher ID codes than its own on the arbitration lines. Figure 11 illustrates this relationship in a logic diagram.

Note that the $ARB\langle 3 \ldots 0\rangle^*$ lines are common to all cards while the $ID\langle 3 \ldots 0\rangle^*$ lines present a unique binary code to each card slot. The signals "arb" and "grant" in Fig 11 are module signals, with "arb" indicating that a module is contending for the bus and "grant" indicating that the $ARB\langle 3 \ldots 0\rangle^*$

Fig 10
Multiple Arbitration Contests

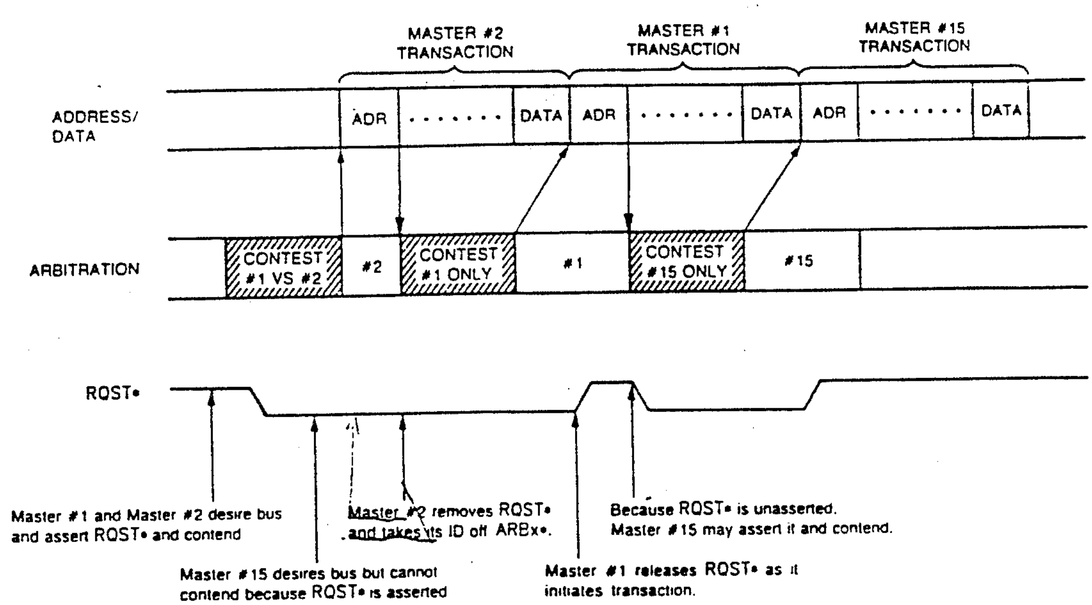

[Extracted from Texas Instruments NuBus™ specification document with permission of the publisher. Copyright (1983, 1986, 1988) Texas Instruments Incorporated.]

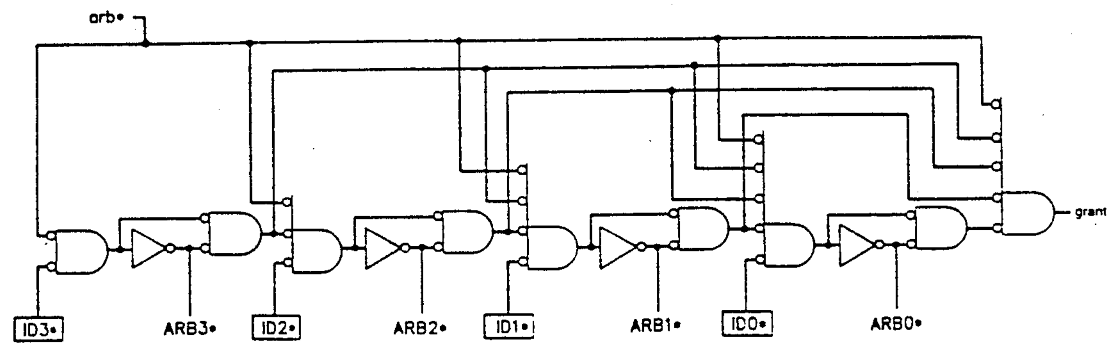

[Extracted from Texas Instruments NuBus™ specification document with permission of the publisher. Copyright (1983, 1986, 1988) Texas Instruments Incorporated.]

Fig 11
Arbitration Logic currently match this module's $ID\langle 3 \ldots 0\rangle^*$ lines. The following logic equations describe how the arbitration logic on any given module works:

$$ARB3^* = ID3^* \cdot arb$$

$$ARB2^* = ID2^* \cdot arb \cdot (ID3^* + \overline{ARB3^*})$$

$$ARB1^* = ID1^* \cdot arb \cdot (ID3^* + \overline{ARB3^*}) \cdot (ID2^* + \overline{ARB2^*})$$

$$ARB0^* = ID0^* \cdot arb \cdot (ID3^* + \overline{ARB3^*}) \cdot (ID2^* + \overline{ARB2^*}) \cdot (ID1^* + \overline{ARB1^*})$$

where "·" is the logical AND operator and "+" the logical OR operator, and *overline* indicates logical inversion.

According to these equations, after a short delay (arbitration period) the $ARB\langle 3 \ldots 0\rangle^*$ lines shall equal the ID code of the highest-numbered contender.

3.1.7 Address Space

Figure 12:
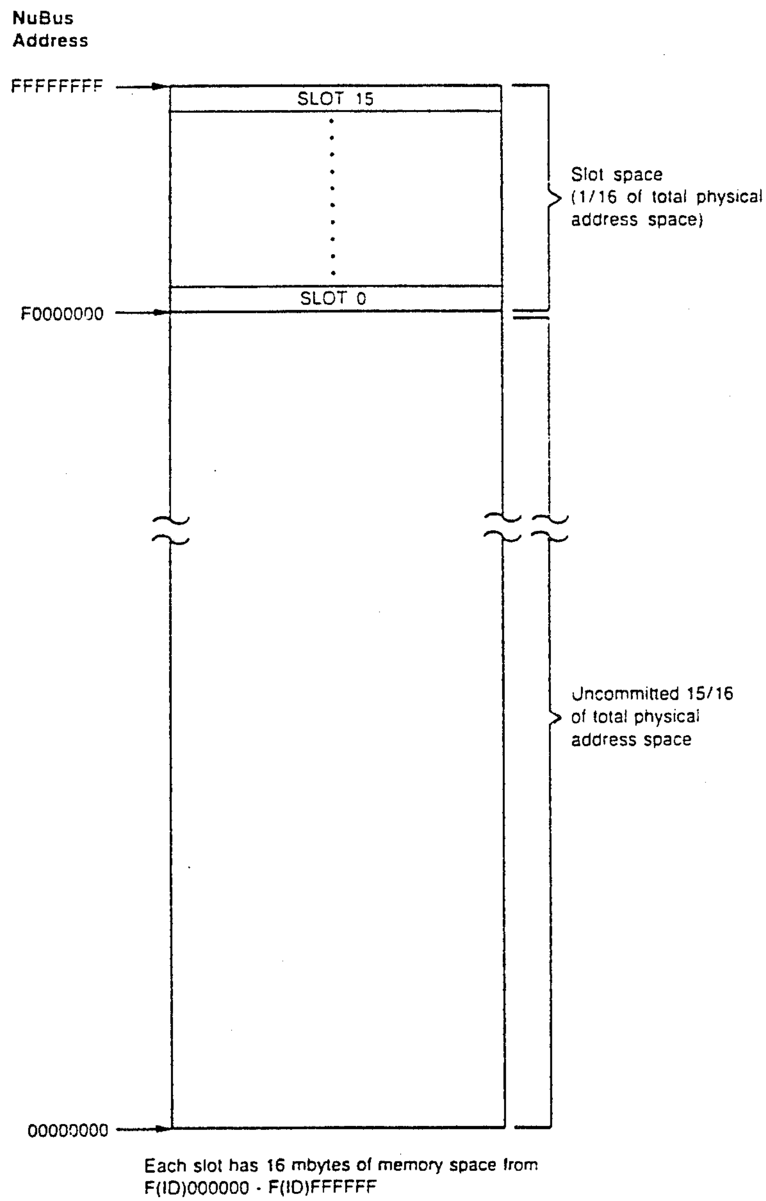

3.1.7.1 Slot and Uncommitted Space. The $ID\langle 3 \ldots 0\rangle^*$ shall be used to allocate a portion of the total address space to each module. The upper one-sixteenth (256 megabytes) of the entire four gigabyte NuBus address space is called "slot space." As shown in Fig 12, this area is divided into sixteen regions of sixteen megabytes each, which are mapped to the sixteen possible NuBus card slots (or ID codes). Addresses of the form $FS_iXXXXXX$ reference address space

[Extracted from Texas Instruments NuBus™ specification document with permission of the publisher. Copyright (1983, 1986, 1988) Texas Instruments Incorporated.]

NuBus Address Space that belongs to the slot space of the module in slot $S_i$. This fixed address allocation, based solely on a module's slot location, enables the design of systems that are free of jumpers and configuration switches.

The remaining fifteen-sixteenths of the 32-bit physical address space is uncommitted and may be allocated as required. Any allocation of this space may be module or system dependent, but allocation of the space shall be programmable by registers in the slot space of the module to which it is allocated.

3.1.7.2 Slot Occupancy. Each module shall respond (with either "transfer complete" or "error" codes, as appropriate) to read requests within the high-order word (address $FS_iFFFFFC$) of its slot space. Either response indicates occupancy of the addressed slot.

3.1.7.3 Configuration ROM. Each module should have a configuration ROM that is located at the top of the module's slot space. Note that, in general, provision of a configuration ROM satisfies the requirement of slot occupancy.

3.1.8 Utility Functions. This section identifies the signal lines that serve utility-type functions for the NuBus. *CLK**, *RESET**, *PFW**, and the bus timeout function shall be supplied by the terminator module (or other backplane module) and are not required to be on any NuBus module; however, a NuBus module may assert *RESET** or *PFW** if required as part of that module's functionality.

3.1.8.1 Clock Signal. Clock (*CLK**) synchronizes bus arbitration and data transfers between system modules. *CLK** has an asymmetric duty-cycle of 25% and a constant nominal frequency of 10 MHz. Unless stated otherwise, bus signals shall be changed only at the rising edge of *CLK**, and shall be sampled only at the falling edge.

3.1.8.2 Reset Signal. Reset (*RESET**) is an open-collector line that returns all cards to their initial power-up state (system reset). It is asserted during system power up/down, and may be asserted at any other time to reset the system. When *RESET** is asserted, it shall remain asserted for a minimum of 1 ms.

This signal may be asserted or unasserted asynchronously with the driving edge of *CLK**.

Upon power loss, *RESET** shall be asserted before the output of the +5 V supply falls below +4.8 V, and remain asserted until the +5 V supply falls below +1 V. Upon power up, *RESET** shall be asserted before the +5 V supply reaches +1 V, and remain asserted until at least 100 ms after all the power supply voltages are stable.

3.1.8.3 Power Fail Warning Signal. Power fail warning (*PFW**) is an open-collector line that provides advance warning of an impending power failure. This signal may be asserted asynchronously with respect to *CLK**.

Upon interruption of ac power, *PFW** shall be asserted for a minimum of 2 ms before *RESET** is asserted. The state of *PFW** upon power-up is undefined, but it shall become unasserted at least 1 ms before *RESET** is deasserted.

Optionally, the *PFW** signal may also be used to control the power supply. If *PFW** is driven high (>2.4 V) while the system is powered off, the power supply will turn on (in less than 1.5 S). If the system is powered, and *PFW** is asserted, the power supply will turn the system off; however, the power will remain within limits for at least 2 ms and *RESET** will be asserted before the +5 V supply drops below +4.8 V.

The power supply shall draw less than 20 mA from *PFW** during the power-on cycle. The power supply should also filter this signal so that glitches on *PFW** of less than 250 ns will not cause the power supply to turn off.

3.1.8.4 Non-Master Request. Non-master request (*NMRQ**) is an open-collector line that provides a simple method for a bus module to indicate a need for service.

This signal may be asserted and unasserted asynchronously with respect to *CLK**.

A module needing service asserts *NMRQ** for at least one clock period, and should continue to assert *NMRQ** until its service need has been satisfied.

*NMRQ** may be bused or not bused by the chassis. The bused *NMRQ** line or the individual nonbused *NMRQ** lines should be terminated by the chassis as open-collector signals.

3.1.8.5 Card Slot Identification Signals. Identification signals (*ID*⟨3 . . . 0⟩*) shall be binary-coded (with *ID*3* being the most significant bit) to specify the physical location of each module. The highest-numbered slot (fifteen) shall have the four signals wired low on the backplane, and the lowest-numbered slot (zero) shall have all four signals open. Intervening numbered slots shall have appropriate combinations of the four signals open and wired low. The distributed arbitration logic shall use the ID numbers to uniquely identify modules for arbitration contests, as explained in Section 3.1.6.

Each module must provide appropriate pull-ups on each *ID*⟨3 . . . 0⟩* line so that those lines that are left open on the backplane will be interpreted as high by the arbitration logic.

3.2 Physical

3.2.1 Timing

3.2.1.1 Basic NuBus Timing. The NuBus system clock shall have a 100 ns period with a 75 ns unasserted/25 ns asserted duty cycle. Figure 13 shows the basic timing for most NuBus signals. The low-to-high transition of *CLK** shall be used to assert and unassert signals on the bus. Signals shall be sampled on

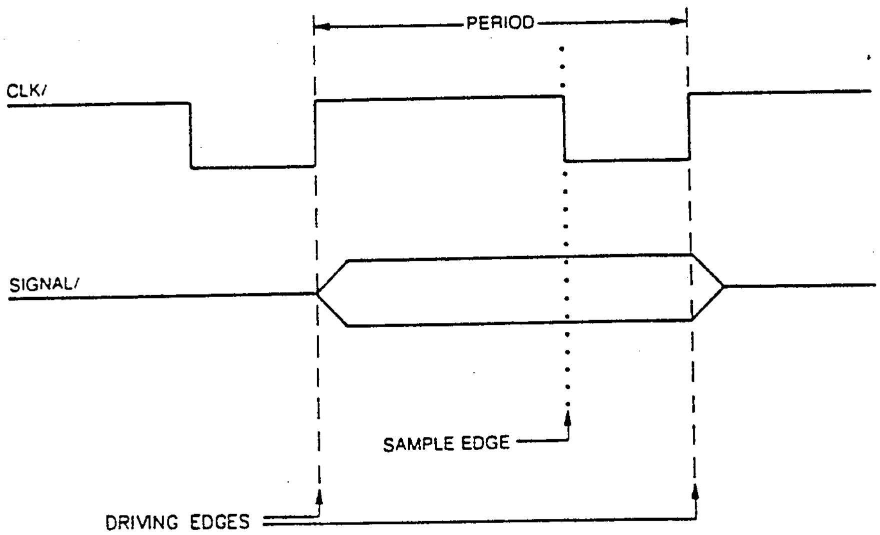

[Extracted from Texas Instruments NuBus™ specification document with permission of the publisher. Copyright (1983, 1986, 1988) Texas Instruments Incorporated.]

Fig 13
Basic NuBus Signal Timing the high-to-low transition of the clock. The asymmetric duty cycle of the clock provides 75 ns for propagation and setup time. With 25 ns between the sample and driving edges, bus skew problems are avoided.

3.2.1.2 Utility and Data Transfer Timing. Figure 14 shows the clock, control, and address/data timing relationships during data transfers.

3.2.1.3 Arbitration Timing. The timing of the *ARB*⟨3 . . . 0⟩* signals is not the same as the timing of the data transfer signals. The timing of an arbitration contest always begins on the sample edge of *CLK** and completes two clock periods later. A contest starts on the sample edge of *CLK** immediately preceding the assertion of *RQST** and on the sample edge of *CLK** during a start cycle. If *RQST** and *START** both become active in the same cycle, then the timing of the arbitration contest starts over during the start cycle.

Figure 15 details the *ARB*⟨3 . . . 0⟩* timing for an arbitration between module #A (1010) and module #5 (0101) following a *START** initiated by module #8. In the general case, contenders wait for the current bus master to release the *ARB*⟨3 . . . 0⟩* lines before the new arbitration can take place. Thus, the assertion time ($T_{on}$) for *ARB*⟨3 . . . 0⟩* signals is the turn off time of the current master ($T_{off}$), plus the bus propagation delay ($T_{pd}$), plus the time taken to react

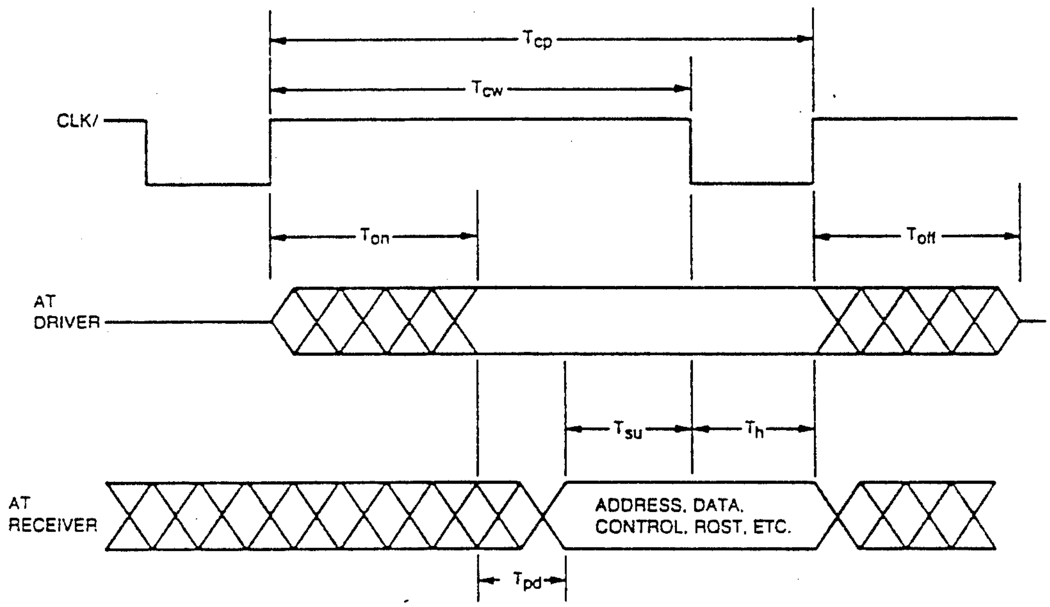

| Parameter | Description | Minimum | Maximum |
|---|---|---|---|
| $T_{cp}$ | Clock period | 99.99 ns | 100.01 ns |
| $T_{cw}$ | Clock width | 73 ns | 77 ns |
| $T_{on}$ | Turn on time | — | 35 ns |
| $T_{off}$ | Turn off time | — | 35 ns |
| $T_{pd}$ | Propagation delay | — | 17 ns |
| $T_{su}$ | Set-up time | 21 ns | — |
| $T_{h}$ | Hold time | $T_{cp} - T_{cw}$ | — |

NOTE: Setup, hold, and other times are defined at the module-to-NuBus connector. All module-internal delays shall be taken into account while providing for the above specified times.

[Extracted from Texas Instruments NuBus™ specification document with permission of the publisher. Copyright (1983, 1986, 1988) Texas Instruments Incorporated.]

Fig 14
Data Transfer Timing Specifications to the change in logic levels ($T_{en}$). At the end of this time ($T_{on}$), both devices assert their slot ID's on the $ARB\langle 3 \ldots 0\rangle$* lines, resulting in a pattern of $F$ (1111). This causes module #A to release $ARB1$* and module #5 to release $ARB2$* and $ARB0$*. After $ARB2$* reaches a high state, module #A again asserts $ARB1$*.

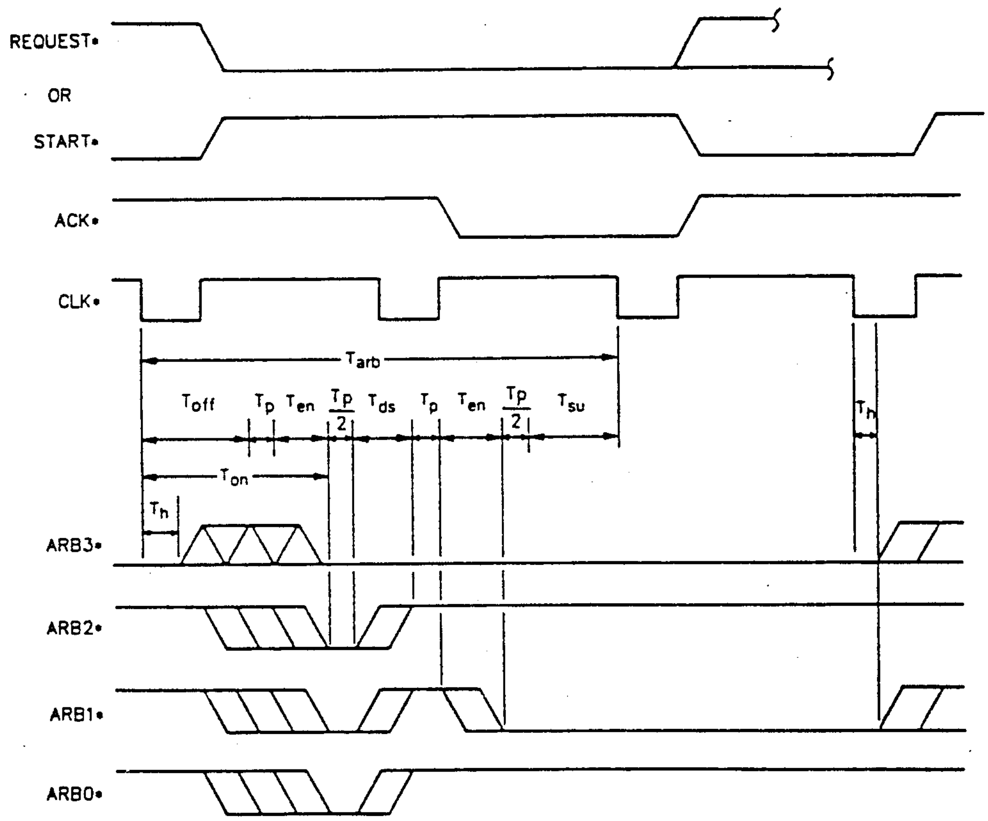

| Parameter | Description | Minimum | Maximum |
|---|---|---|---|
| $T_{arb}$ | Arbitration time | — | 200 ns |
| $T_{on}$ | ARB turn on time | 10 ns | 83 ns |
| $T_{en}$ | Arbitration enable time | — | 26 ns |
| $T_{ds}$ | Arbitration disable time | — | 26 ns |
| $T_{su}$ | Arbitration set-up time | 31 ns | — |
| $T_{h}$ | Hold time | 10 ns | — |
| $T_{off}$ | Turn off time | 10 ns | 40 ns |
| $T_{pd}$ | Propagation delay | — | 17 ns |

[Extracted from Texas Instruments NuBus™ specification document with permission of the publisher. Copyright (1983, 1986, 1988) Texas Instruments Incorporated.]

Fig 15
Arbitration Timing

On the second falling edge of *CLK** following the assertion of *RQST** or the unassertion of *START**, module #A wins the arbitration contest.

3.2.2 DC and AC Specifications for Signals

3.2.2.1 Logical and Electrical States. All NuBus signals are active when low. The relationship between logical states and electrical signal levels for all NuBus signal lines is shown in Table 5.

3.2.2.2 Termination Requirements. The termination circuits perform two functions: reduce signal ringing, and guarantee signal determinacy during the times that a signal is not being driven by a module. The terminators shall cause the following signal determination:

(1) If a three-state signal is asserted during cycle $n$ and is not driven during cycles $n + 1$ and $n + 2$, then the terminators will guarantee that it will be in the unasserted state during cycle $n + 2$, but the terminators do not guarantee determinacy during cycle $n + 1$.

(2) If an open-collector signal is asserted during cycle $n$ and is not driven during cycle $n + 1$, then the terminators will guarantee that it is unasserted during cycle $n + 1$.

(3) If a signal is unasserted during cycle $n$ and is not driven during cycle $n + 1$, then the terminators will guarantee that it remains unasserted during cycle $n + 1$.

Table 6 provides the drive requirements, the load allowance, and the required termination for each of the NuBus signal lines. These lines can be divided into four basic types: clock (*CLK**), address/data (*AD*⟨31 . . . 0⟩*, *SPV**, *SP**), control (*START**, *ACK**, *TM0**, *TM1**), and open collector (*RESET**, *RQST**, *ARB*⟨3 . . . 0⟩*, *PFW**, *NMRQ**).

3.2.3 Backplane (Signal) Characteristics. To meet the NuBus timing requirements with the drivers and terminations described above, the characteristic impedance ($Z_0'$) and the roundtrip propagation delay ($T_{pd}$) of a backplane loaded with cards shall be controlled. Both of these parameters depend on

Table 5
Logical State Definitions

| Logical State | Electrical Signal Level (Active Low) |
|---|---|
| Unasserted (H) | >2.0 V at the receiver<br><3.5 V at the driver |
| Asserted (L) | <0.8 V at the receiver |

Table 6
Bus Drivers, Receivers, and Terminations

| Signal Type | AC Drive $I_{PD}$ (min) | AC Drive $I_{PU}$ (min) | DC Drive $I_{OL}$ (min) | DC Drive $I_{OH}$ (min) | AC Load $C_L$ (max) | DC Loading $I_{IL}$ (max) | DC Loading $I_{IH}$ (max) |
|---|---|---|---|---|---|---|---|
| Clock | 90 mA | −50 mA | 60 mA | −30 mA @ 3.0 V | 18 pF | −1.4 mA | 0.1 mA from driver |
| Address/ Data | 80 mA | −40 mA | 24 mA | −1.6 mA @ 3.2 V | 18 pF | −0.5 mA | 0.1 mA |
| Control | 80 mA | −40 mA | 24 mA | −1.6 mA @ 3.2 V | 18 pF | −0.5 mA | 0.1 mA |
| Open Collector | 80 mA | N/A | 60 mA | N/A | 18 pF | −0.625 mA | 0.1 mA |

| Termination | Primary Function | Desired Characteristics (Thevenin Equivalent) | Typical Implementation | |
|---|---|---|---|---|
| Clock | Minimize reflection | 50 Ω @ 1.6 V | 160/75 Ω | End away from driver |
| Address/Data | Determinacy | 175 Ω @ 3.0 V | 270/470 Ω | One end |
| Control | Determinacy | 175 Ω @ 3.0 V | 270/470 Ω | One end |
| Open Collector | Unassert signal | 65 Ω @ 3.5 V | 180/470 Ω | Both ends |

NOTES:
$I_{OL}$—Low output drive current available at 0.5 V.
$I_{OH}$—High output drive current available at specified voltage.
$I_{PU}$—Transient pull-up current, required for one $t_{PD}$ whenever the driver transitions from asserted to unasserted.
$I_{PD}$—Transient pull-down current, required for one $t_{PD}$ whenever the driver transitions from unasserted to asserted.
$I_{IL}$—DC low-level input current.
$I_{IH}$—DC high-level input current.
Negative currents indicate flow out of a node and positive currents indicate flow into a node.

backplane geometries (length, card spacing, layer separation, etc), as well as the type of dielectric used in the backplane. Only the critical parameters ($Z_0'$ and $T_{pd}$) are specified by this document. Their specifications shall be $$Z_0' \geq 25\ \Omega$$

$$T_{pd} \leq 17.0\ \text{ns}$$

3.2.4 Voltage Specifications. Four voltages are specified on the NuBus, as shown in Table 7. While +5, +12, and −12 volts are required, −5.2 V is optional. The pins designated for −5.2 shall be used for −5.2 or not at all.

Table 7
Voltage Specifications

| Source Label | Nominal Value (volts) | Tolerance from Nominal | Combined Line and Load Regulation | Max Ripple (PK-PK) |
|---|---|---|---|---|
| +5 | 5 | ±3% | 0.3% | 50 mV |
| −5.2 | −5.2 | ±3% | 0.3% | 50 mV |
| +12 | 12 | ±3% | 0.3% | 75 mV |
| −12 | −12 | ±3% | 0.3% | 75 mV |

3.2.5 Mechanical Specifications—Triple Height Modules. Two mechanical form-factor options are defined for NuBus modules: triple height and PC-style. This section defines the triple height form-factor, and the following section defines the PC-style form-factor.

The triple height form-factor is derived from specifications for connectors as given in IEC 603-2-1980 [3][4] and for modules in IEC 297-1-1986 [2]. It shall conform to ANSI/IEEE Std 1101-1987 [1], except where noted otherwise in this section. This section details the particular options of the IEC family used by NuBus triple height modules.

3.2.5.1 Board Configuration—Triple Height

3.2.5.1.1 Board Size. NuBus modules shall correspond to triple height boards as specified by IEC standards [2], [3], 366.7 mm (14.437 in). Cards shall be triple depth, 280 mm (11.024 in), as specified by IEC standards [2], [3]. The dimensions and layout of a module are shown in Fig 16.

3.2.5.1.2 Connectors. Three connectors shall be mounted in the standard positions as specified by IEC standards [2], [3] as shown in Fig 16. The connectors are referred to as P1, P2, and P3, with P1 at the top and P3 at the bottom. The NuBus is located on P1, which shall be a C096-M connector, as specified by IEC 603-2-1980 [3], with pin assignments as shown in Table 8. P2 and P3 should be C096-M connectors, as specified by IEC 603-2-1980 [3]; however, other connectors as specified by IEC standards are allowed if high current or shielded connections are required.

3.2.5.1.3 Component Height. The module component height shall be less than 13.97 mm (0.55 in). No component or lead shall extend beyond the board bottom more than 2.54 mm (0.10 in).

[4]The numbers in square brackets refer to those of the references listed in 1.5.

[Extracted from Texas Instruments NuBus™ specification document with permission of the publisher. Copyright (1983, 1986, 1988) Texas Instruments Incorporated.]

Triple Height NuBus Board

Table 8
Pin Assignments (P1)
(As viewed from front edge of board)

| Row ⇒ Pin ⇓ | A | B | C |
|---|---|---|---|
| 1 | −12 | −12 | *RESET** |
| 2 | *RESERVED* | *GND* | *RESERVED* |
| 3 | *SPV** | *GND* | +5 |
| 4 | *SP** | +5 | +5 |
| 5 | *TM1** | +5 | *TM0** |
| 6 | *AD1** | +5 | *AD0** |
| 7 | *AD3** | +5 | *AD2** |
| 8 | *AD5** | −5.2 | *AD4** |
| 9 | *AD7** | −5.2 | *AD6** |
| 10 | *AD9** | −5.2 | *AD8** |
| 11 | *AD11** | −5.2 | *AD10** |
| 12 | *AD13** | *GND* | *AD12** |
| 13 | *AD15** | *GND* | *AD14** |
| 14 | *AD17** | *GND* | *AD16** |
| 15 | *AD19** | *GND* | *AD18** |
| 16 | *AD21** | *GND* | *AD20** |
| 17 | *AD23** | *GND* | *AD22** |
| 18 | *AD25** | *GND* | *AD24** |
| 19 | *AD27** | *GND* | *AD26** |
| 20 | *AD29** | *GND* | *AD28** |
| 21 | *AD31** | *GND* | *AD30** |
| 22 | *GND* | *GND* | *GND* |
| 23 | *GND* | *GND* | *PFW** |
| 24 | *ARB1** | −5.2 | *ARB0** |
| 25 | *ARB3** | −5.2 | *ARB2** |
| 26 | *ID1** | −5.2 | *ID0** |
| 27 | *ID3** | −5.2 | *ID2** |
| 28 | *ACK** | +5 | *START** |
| 29 | +5 | +5 | +5 |
| 30 | *RQST** | *GND* | +5 |
| 31 | *NMRQ** | *GND* | *GND* |
| 32 | +12 | +12 | *CLK** |

3.2.5.1.4 Board Thickness. In the area of the card guides, that is, within 2.5 mm (0.098 in) of the top and bottom edges, NuBus cards shall be 1.6 ± 0.2 mm (0.063 ± 0.008 in) thick. In other areas, the board may be thicker; however, any additional thickness is deducted from lead length allowance.

3.2.5.1.5 Working Area. Components shall not be placed on any part of the board within 0.150 in of the top or bottom edges.

3.2.5.1.6 Malfunction Indicator. Modules should have a malfunction indicator. It shall be mounted as shown in Fig 16. When this indicator is on, it should indicate that the module is defective in some way. The indicator may turn on temporarily after power-up while the module is being checked for correct operation.[5]

3.2.5.1.7 Other Indicators. If other indicators are required to display status of a module, they should be located as shown in Fig 16.

3.2.5.1.8 Board Ejector/Injector. Triple height NuBus cards shall contain a pair of ejector/injector devices that operate in conjunction with a "lip" on the card cage. These devices are mounted on the front edge of the module at the top and bottom with pins pressed into the module, as shown in Fig 16. The details of the ejector/injector device are shown in Fig 17. This ejector/injector mechanism is not consistent with ANSI/IEEE Std 1101-1987 [1].

3.2.5.1.9 Card Cage Lip. A lip will be provided as shown in Fig 18 on the top and bottom of the card cage. This lip provides the surfaces that the ejector/injector devices act against when the module is being installed or removed.

3.2.5.1.10 Intercard Spacing. The card cage shall space modules 20.32 mm (0.80 in) apart.

3.2.5.1.11 Ground Distribution on Boards. Logic boards shall not connect power or signal ground to chassis ground or to connector shield ground. Capacitive bypassing is allowable, using low-leakage, low ESR capacitors.

3.2.5.2 Cable Configuration. All cable connections to a triple height board shall be via the P2 and P3 connectors. No cable attachments are permitted to the front edge of the board.

3.2.6 Mechanical Specifications—PC-Style Boards. This section defines the PC-style form-factor for NuBus modules.

The PC-style form-factor option is derived from specifications for connectors as given in IEC 603-2-1980 [3] and is for use in equipment that requires a smaller form factor than the triple height boards.

3.2.6.1 Board Configuration—PC-Style. Figure 19 is a diagram (viewing the component side) of a PC-style NuBus module. Note that the NuBus connector is located along the bottom edge of the card and that an *I/O* connector is at the right edge. A metal expansion shield (shown in Fig 20) covers the right side of the card and provides a solid mating to a system's metal *I/O* shield. The screw pads for this expansion shield are to be used to provide grounding for any *I/O* connector's shield.

---

[5]The intention is to *encourage*, but not *require* a malfunction indicator. However, *if* one is present, it *must* be mounted as shown in the figure.

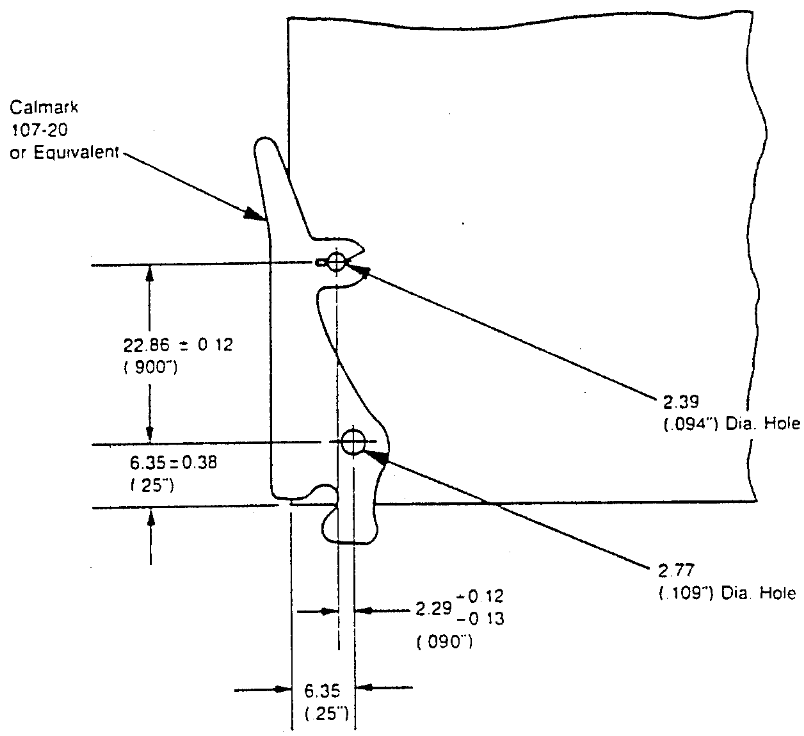

[Extracted from Texas Instruments NuBus™ specification document with permission of the publisher. Copyright (1983, 1986, 1988) Texas Instruments Incorporated.]

Fig 17
Triple Height NuBus Board Ejector/Injector

Note that Fig 19 shows the PC-style card as viewed from the component side of the board.

3.2.6.1.1 Board Size. PC-style NuBus boards shall be 101.6 mm (4.0") in height and a maximum of 326.6 mm (12.858") in length. The length of the card shall vary only on the left side of the card. The minimum length shall be 177.8 mm (7.0").

3.2.6.1.2 Connectors. The NuBus connector (referred to as P1) is mounted on the board as shown in Fig 19. This connector shall be a C096-M connector as specified by IEC 603-2-1980 [3], with pin assignments as shown in Table 8.

*I/O* connectors (if required) shall be contained in the area shown in Fig 20, located at the right side of the board. The exact type and number of these connec-

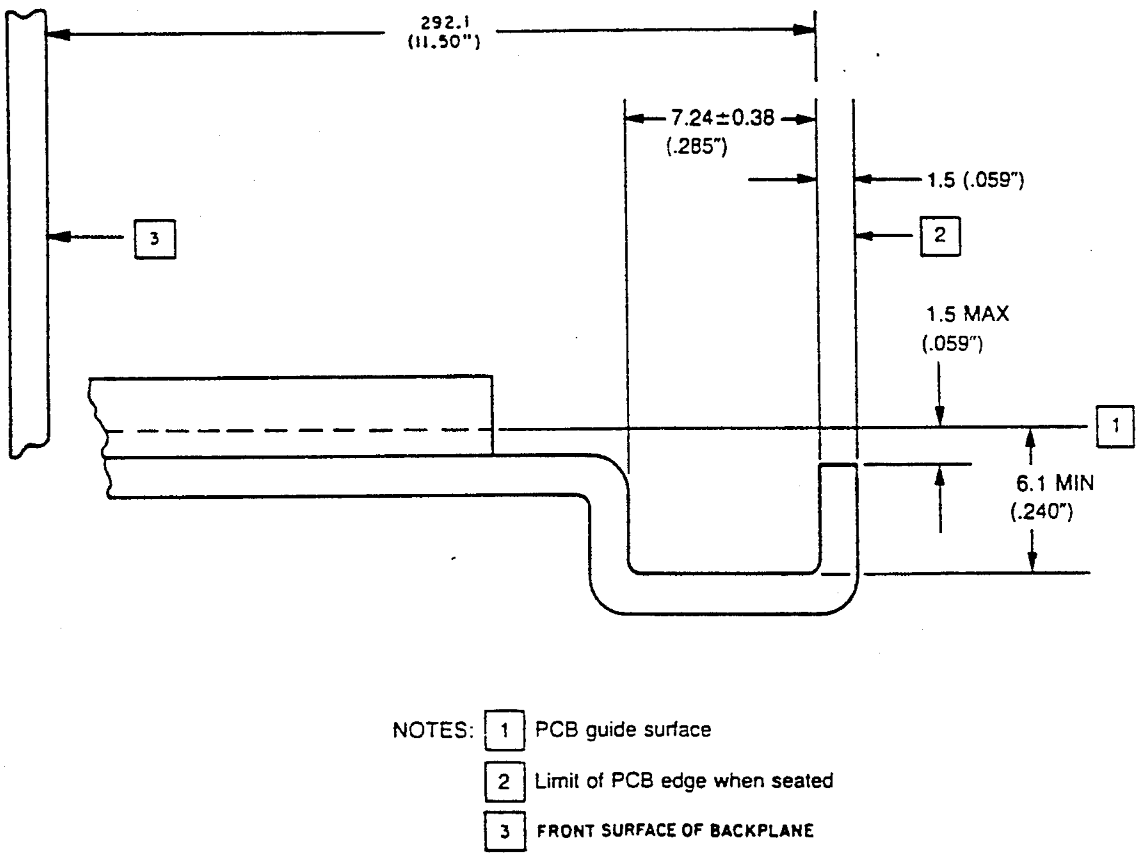

[Extracted from Texas Instruments NuBus™ specification document with permission of the publisher. Copyright (1983, 1986, 1988) Texas Instruments Incorporated.]

Fig 18
Triple Height NuBus Card Cage Lip tors are determined by the board's function; the limitations on size and placement are system and vendor specific.

Auxilliary connectors (if required) should be placed on the top edge of the board, in the area so designated in Fig 19. The maximum length of such a connector shall be 76 mm (3.0"). Note that the use of auxilliary connectors is discouraged, but may be necessary for multiboard subsystems.

3.2.6.1.3 Component Height. The board component height shall be less than 15.24 mm (0.60"). No component or lead shall extend more than 2.54 mm (0.10") beyond the noncomponent side of the board.

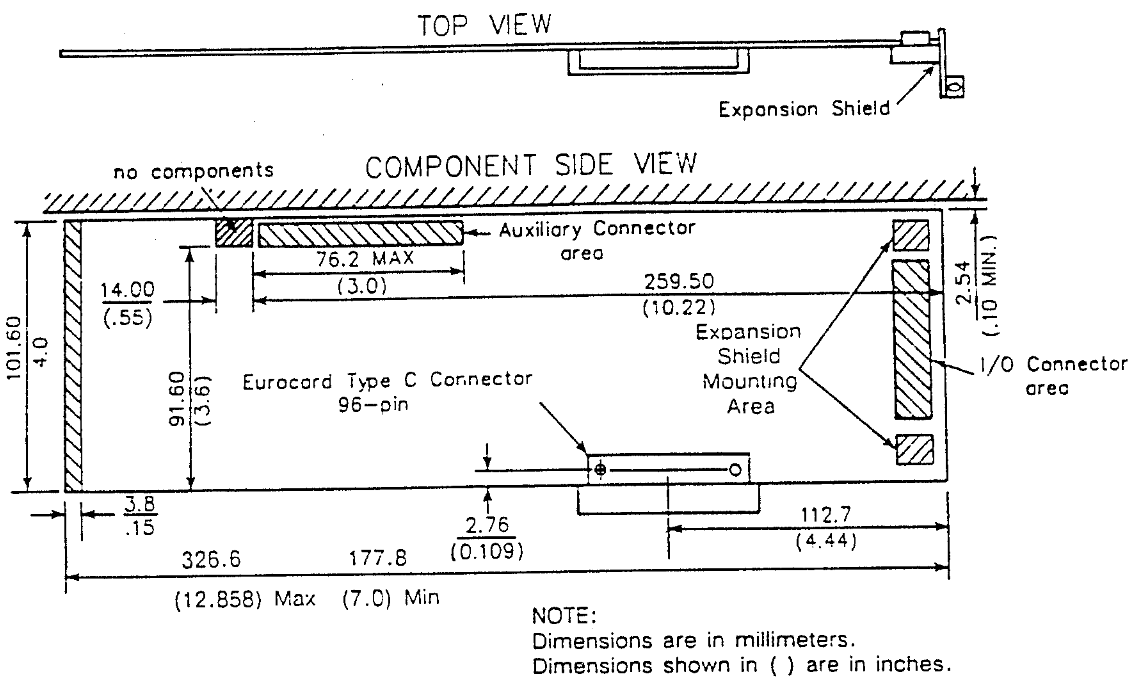

[Extracted from Texas Instruments NuBus™ specification document with permission of the publisher. Copyright (1983, 1986, 1988) Texas Instruments Incorporated.]

Fig 19
PC-Style NuBus Board

3.2.6.1.4 Board Thickness. The board shall be 1.6 ± 0.2 mm (0.063 ± 0.008″) thick. The board's warpage shall be controlled so that total warpage is at most 2.54 mm (0.10″).

3.2.6.1.5 Working Area. Components may be placed anywhere except for areas designated as having no components by Fig 19. Components may not extend beyond the edge of the board in any direction. Note that the use of auxillary connectors may require a notch in the edge of the board for cable routing in order to keep the designated area free of components. Components should be aligned along the length of the card.

3.2.6.1.6 Intercard Spacing. The system shall space modules a minimum of 22.86 mm (0.900″) apart.

3.2.6.1.7 Cables. All cabling leaving the system enclosure shall be by means of an *I/O* connector located at the right side of the board, through the expansion shield.

ANSI/IEEE
Std 1196-1987

SPECIFICATION

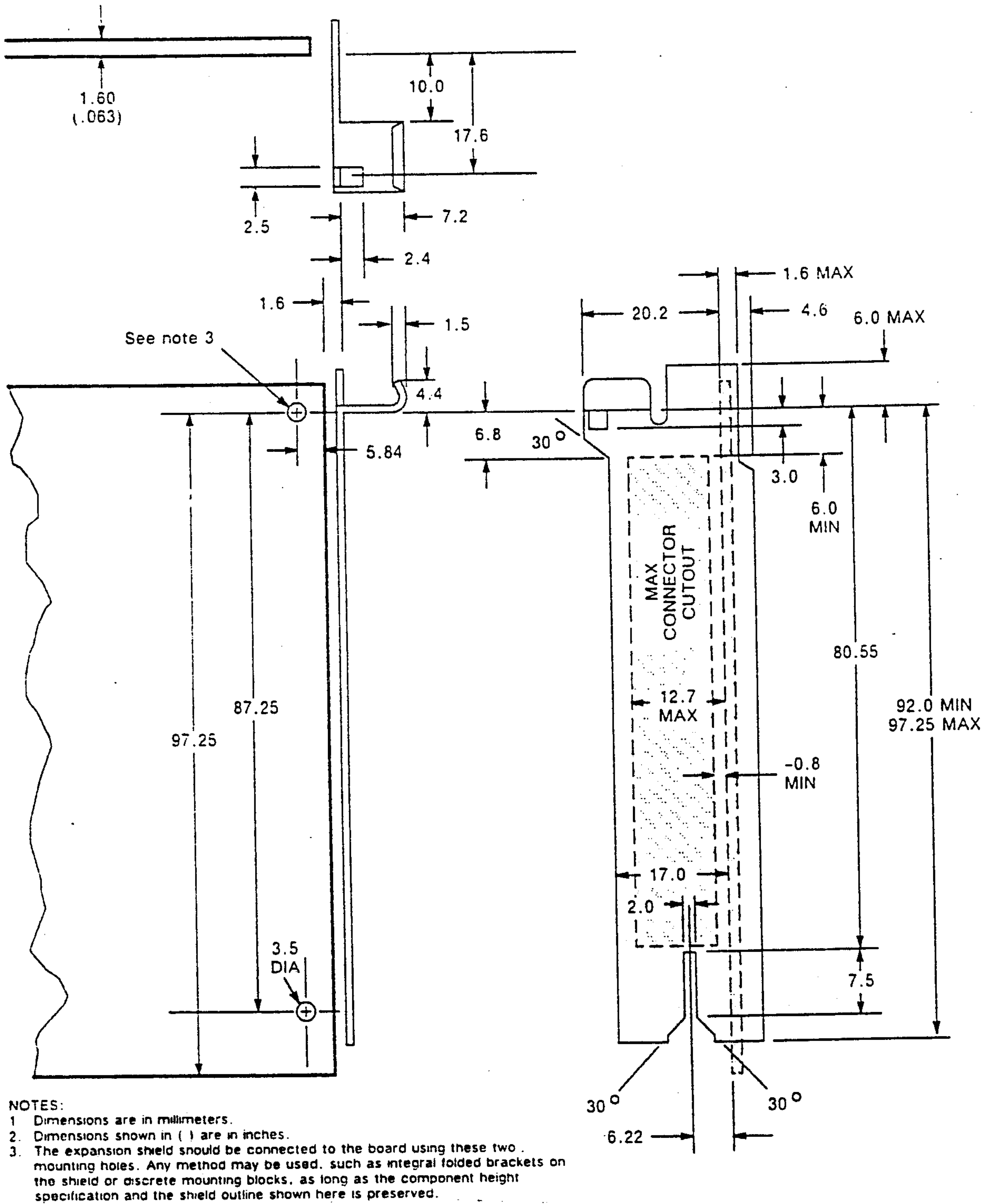

NOTES:
1. Dimensions are in millimeters.
2. Dimensions shown in ( ) are in inches.
3. The expansion shield should be connected to the board using these two mounting holes. Any method may be used, such as integral folded brackets on the shield or discrete mounting blocks, as long as the component height specification and the shield outline shown here is preserved.

[Extracted from Texas Instruments NuBus™ specification document with permission of the publisher. Copyright (1983, 1986, 1988) Texas Instruments Incorporated.]

Fig 20
Expansion Shield for PC-Style NuBus Board

Table 9
Pin Assignments (P2 and P3)
(As viewed from front edge of board)

| Row ⇒ / Pin ⇓ | A | B | C |
|---|---|---|---|
| 1 | — | — | — |
| 2 | — | *GND* | — |
| 3 | — | *GND* | — |
| 4 | — | — | — |
| 5 | — | +5 | — |
| 6 | — | +5 | — |
| 7 | — | +5 | — |
| 8 | — | — | — |
| 9 | — | — | — |
| 10 | — | −5.2*ENAB* | — |
| 11 | — | −5.2*OUT* | — |
| 12 | — | *GND* | — |
| 13 | — | — | — |
| 14 | — | +12*ENAB* | — |
| 15 | — | +12*OUT* | — |
| 16 | — | *GND* | — |
| 17 | — | — | — |
| 18 | — | — | — |
| 19 | — | *GND* | — |
| 20 | — | −12*OUT* | — |
| 21 | — | −12*ENAB* | — |
| 22 | — | — | — |
| 23 | — | *GND* | — |
| 24 | — | — | — |
| 25 | — | — | — |
| 26 | — | — | — |
| 27 | — | — | — |
| 28 | — | +5 | — |
| 29 | — | — | — |
| 30 | — | *GND* | — |
| 31 | — | *GND* | — |
| 32 | — | — | — |

3.2.7 Pin Assignments. The pin assignments for the P1 connector are listed in Table 8 and the recommended pin assignments for the P2 and P3 connectors are listed in Table 9. If P2 or P3 is a C096 connector, as specified in IEC 603-2-1980 [3], then these connectors shall be wired as shown in Table 9. If a different connector is used, then ground pins should be allocated along the length of the connector for EMI (electro magnetic interference) control purposes.

**3.2.7.1 TTL *I/O* Signals.** Rows A and C should be used for TTL level *I/O* signals only.

**3.2.7.2 Non-TTL *I/O* Signals.** *I/O* signals that have voltage excursions greater than (0-5 V) should be connected via pins in row B of P2 and P3 to minimize problems if the wrong cable is inadvertently connected.

If +12 V, −12 V or −5.2 V is required by the cable assembly, it should be supplied via the appropriate +12*OUT*, −12*OUT*, or −5.2*OUT* pin. These pins are not connected to the backplane, but are supplied from P1 via traces on the NuBus module. This allows those voltage lines to be fused, if required.

Generally, non-TTL drivers should only be powered if the correct cable is installed. The +12*ENAB*, −12*ENAB*, and −5.2*ENAB* pins are used to allow the cable assembly to provide a jumper from the appropriate *xOUT* pin to the *xENAB* pin to provide power to the drivers. Figure 21 illustrates the use of the *xENAB* pins.

3.3 Compliance. Modules may be designed that conform to the NuBus specification without the requirement of being able to support all possible types of transactions. A manufacturer of a NuBus module who wishes to claim compliance with this specification must disclose those operations that the module does not support. The following paragraphs describe the permissible variations.

3.3.1 Modules

3.3.1.1 Masters. A module is not required to have the ability to arbitrate and become a bus master.

A master is allowed to support any combination of eight, sixteen, and thirty-two bit single transfers; and any combination of two-, four-, eight-, or sixteen-word block transfers.

A manufacturer of a module that locks the bus under control of hardware or firmware must disclose the maximum number of transactions that the module will attempt with the bus locked. Locked transactions done under software control obviously cannot be specified by the module manufacturer and should be used with caution. Designing a master that locks the bus for more than sixteen contiguous memory transfers is permissible, but discouraged. A manufacturer shall clearly identify any module that locks the NuBus for more than sixteen contiguous transfers.

Figure 22:
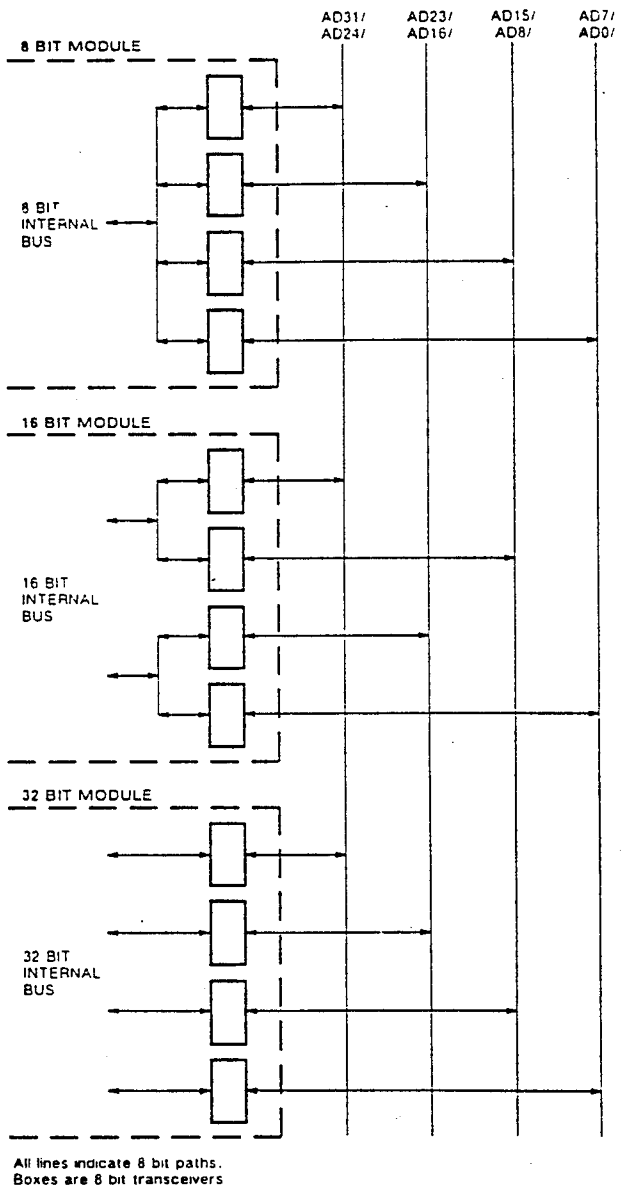

3.3.1.2 Slaves. The addressing of a slave should allow complete access to its functions by masters that support only 32-bit transfers. Figure 22 illustrates the data path connections for an 8-bit and 16-bit slave that provides access to all byte addresses. However, it is not required that this level of interconnection be provided. A simple 8-bit module may be connected to only one byte lane and a simple 16-bit module may be connected to only two byte lanes. In general, this

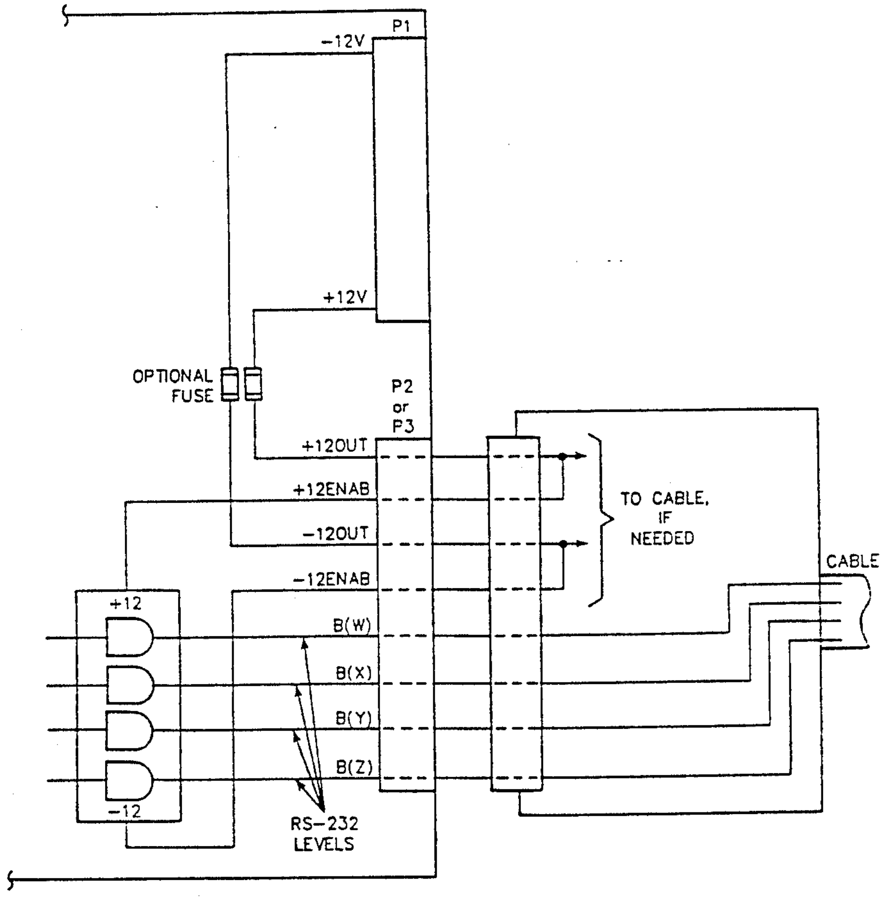

[Extracted from Texas Instruments NuBus™ specification document with permission of the publisher. Copyright (1983, 1986, 1988) Texas Instruments Incorporated.]

Fig 21
**Cable Driver Power Via *xENAB* Pins** requires that independent device registers be located in different 32-bit words, even though all bits may not be meaningful data.

Slaves are not required to support block transfers, but if a slave does support block transfers, then it shall support all types (two, four, eight, and sixteen word) of block transfers.

3.3.1.3 Memories. Modules that are identified as memory boards shall respond to 8-, 16-, and 32-bit transfers. All 32 bits that contain the addressed entity shall be returned on read operations.

[Extracted from Texas Instruments NuBus™ specification document with permission of the publisher. Copyright (1983, 1986, 1988) Texas Instruments Incorporated.]

Data Paths for 8-, 16-, and 32-Bit Slaves

3.3.2 Backplane

3.3.2.1 *NMRQ**. *NMRQ** may be a bused signal, or treated as individual signals from each slot.

3.3.2.2 Termination. Termination may be varied on chasses with a small number of slots, but must always meet the signal determinacy requirements.

Termination may be mounted directly on the backplane, or implemented in plug-in modules.

3.3.2.3 Slots. Any number of slots (up to sixteen) may be provided by the backplane.

Appendix (This Appendix is not a part of ANSI/IEEE Std 1196-1987, IEEE Standard for a Simple 32-bit Backplane Bus Specification: NuBus, but is included for information only.)

This Appendix provides explanations of features of the standard that follow from the specification, describes the differences between similar concepts, and provides information about bus features that gives a designer background about the philosophy and style of the bus. This Appendix is not a part of the specification, and nothing in this Appendix is intended to be read as a "shall."

A1. Locking

Bus locking and resource locking are strongly related but distinct bus mechanisms provided by this standard. Bus locking is an arbitration-related technique a master may use that guarantees continued, unbroken, bus tenure. A master should only use this capability to accomplish an indivisible operation such as "test-and-set"; however, it may be used to gain performance or for other reasons.

When bus locking is used for the recommended purpose of disallowing other bus masters from accessing a set of locations while it performs an atomic operation, a problem may occur. If a location being referenced can be modified via a path *other than the system bus*, the operation may not be indivisible. Bus locking prevents other system bus masters from accessing any location, but does not inform a slave that it is required to lock out other module specific paths that may access that location. Memory on board a CPU module will often be dual-ported; to insure an indivisible operation, the other port must be locked out also.

Resource locking provides this facility. It is signaled by a master, by a single-cycle broadcast (special case of an attention cycle), to all slaves that indicates that a resource lock may be required. Slaves that are subsequently accessed are to lock out any board specific paths from reading or writing a location that is accessed over the bus.

NOTE: Many slaves, such as ordinary memory modules, have no path other than the system bus, and therefore ignore the resource lock command.

The specification only guarantees to masters that locations actually referenced will be locked; however, it is permissible and practical for a slave to lock a complete memory array or region. Locking more than required is practical for a slave implementation, but cannot be assumed by a master.

Resource locking implies more than bus locking, but bus locking always accompanies resource locking.

A2. Technology Dependence

As a high-speed, synchronous bus, this standard has no claim to technology independence. However, its protocols have been designed to allow modules that are low-cost and, therefore, relatively slow. Address decode time and response time for reads and writes are only limited by the bus timeout period (25.5 ms).

This section describes the extent of technology dependence the bus specification implies.

*Speed*—All modules must perform certain operations within defined time periods:

- Track bus state at bus clock speed. (*START**, *ACK**, and *TM*⟨1 . . . 0⟩* are the only signals that affect bus state.)
- Latch address in the one cycle during which it is valid.
- Turn drivers on and off within turn on and hold times specified.

*Speed*—Masters only:

- Perform arbitration in specified manner. Requires arbitration contest to be performed in a specified minimum time.

*Bus Drive*—There are current drive, receiver threshold, and capacitive load requirements that restrict the technology that may be used for the actual bus drivers and receivers.

A3. Flow Control

At the highest level, two programs on two CPU modules may have a producer/consumer relationship and require flow control. This is accomplished within the logic of the programs, possibly using an atomic test-and-set at the core of its "handshake." This high-level flow control is *not* what is being discussed in this section, but rather a low-level handshake between master and slave in a particular bus transfer.

Masters and slaves have different roles and different flow mechanisms. Masters implicitly control flow in that a master is the initiator in any interaction and will only initiate actions that it is prepared to execute. In view of this implicit flow control, no lower level handshake is provided to the master in the protocols. The result is that a master must be able to perform any transaction it initiates at the maximum rate supported by the protocol.

Slaves, in contrast, may be addressed at any time by a master, and therefore it is critical that slaves do have a cycle by cycle flow control means. Other than the need to latch an address in one cycle, and to track bus state at bus speeds, a slave may regulate all aspects of all transactions to the rate it desires.

A4. Single Address Space

All addressable resources: memory, *I/O* registers, configuration information, and interrupt mechanism, are in a single 2**32 byte space. This allows a 32-bit value to uniquely identify any bus entity without the awkward need to also know whether the value references "memory space," "*I/O* space," "system space," "control space," "short address space," etc.

A5. Non-Master Request Versus Event Cycles

The *NMRQ** line provides a nonspecific, low-performance, low-cost method for a module to indicate a general need for service. More sophisticated modules would probably not use this line, but instead would have the additional arbitration logic that allowed them to become masters, and generate event cycles. *NMRQ** should be used only for those slaves so simple that the additional cost to become master is prohibitive.

Events at a bus level are simply write transfers to particular locations. This method of interrupting allows directed interrupts, which are important in multiprocessor systems. It requires no additional mechanism to generate if a module already has master capability. For a CPU to "catch" these events and turn them into on-board interrupts, a memory-mapped register (perhaps an addressable latch) that feeds a priority encoder is all that is needed.

A6. Capacitive Loading

The capacitive loading specifications are difficult to meet. Meeting or approaching the maximum value requires great care in driver/receiver selection and minimizing trace length from connector to circuits.

A7. Bus Clock

The clock signal is unique in that it is driven from one end of the bus to a termination at the other end. Most bus signals are driven from modules in two directions to termination at each end of the backplane. This difference provides the clock with the advantage of driving about twice the impedance other signals do.

Combined with the larger drive current specified for the clock, the higher impedance provides the property that the clock signal will go through the receiver threshold area at all points on a backplane on the first transition.

Reflections will not be needed to get it above the threshold. Of all signals, the clock must have a clean edge and thus must have the property that the single-ended driving provides.

A8. Termination

The termination values have been specified for use in a fully loaded sixteen-slot system. A designer who is building a system with only a few slots may consider modifying the termination to suit a simpler system. Before doing this, however, a thorough understanding of the purpose of the termination and backplane physics should be obtained. It is critical that the clock signal does not ring, that the address/data lines and control lines are determinate when they are specified to be sampled, and that the open-collector lines transition from asserted to unasserted states within the specified times.

A9. Byte Addressing on Bus

Various computer CPUs number their bits and bytes differently from one another. This situation has come to be called the "endian" problem, from *Gulliver's Travels*, which described the conflict between two groups over which end of an egg should be broken first, the big end or the little end. The differences between "big-endian" and "little-endian," computers as to byte addressing often seem as arbitrary and as unlikely to be resolved.[6] In spite of this problem, CPUs of either byte addressing persuasion can be (and have been) used with the NuBus.

Section 3 of this specification defines the relationship of words, halfwords, and bytes *from the bus's point of view*. At a minimum, this is required so that one may unambiguously know what "1196 bus, byte 51" is. Different processors may map that into different byte addresses from their perspective, but it is important to have a defined "byte 51" from a bus interface hardware point of view.

It is recommended that CPUs wire their data path connection to the bus such that, when performing a byte access, an instruction reading or writing "byte *n*" actually gets bus byte *n*. Processors following this recommendation will be able to communicate via shared memory on the bus through arrays of bytes, if all references to this area are through byte reads and writes. Thirty-two bit words will be scrambled between different style CPUs, but bytes will be in the same place. Other buses have made the opposite choice. On those buses, CPUs are required to connect to the bus such that different type processors can readily exchange 32-bit words on word boundaries, but do not have a common understanding of where "byte 51" is.

[6]See "On Holy Wars and a Plea for Peace," by Danny Cohen, in the October, 1981 issue of *IEEE Computer Magazine*.

A10. Fairness

The 1196 bus provides only one method of arbitration, and that method has the property of providing each board the same access to bandwidth and about the same average latency as all other boards waiting to access the bus. This feature is called "fairness" in that all boards that attempt to access the bus at a given time will gain use of the bus before any of those boards can access it a second time. This policy is the result of two presumptions: (1) bus arbitration is a very rapid, low-level event that exists exclusively in order to allow one and only one board to have ownership of the bus at a given instant; and (2) it is critical that no board or combination of boards be able to "starve" other boards from bus bandwidth.

Other bus structures have adopted a fair arbitration mechanism along with a priority mechanism, and in some cases a preemptive priority mechanism. The 1196 bus is "strictly fair" based on the idea that optional fairness is no fairness.

Even though a system may limit the time that any one board may have the bus, any bus that allows priority arbitration can put no finite upper bound on the latency time a low priority board may wait to acquire the bus. A case can occur where control of the bus passes back and forth between higher priority masters and a lower priority board is "starved."

The 1196 bus slots *do* have ID numbers that are used, among other things, for the arbitration contest. Boards with higher slot numbers *will* get access before lower numbered boards that requested the bus *on the identical clock cycle*. Some method was needed to break this sort of tie, and the slot number has the advantages of being simple and deterministic. This does not provide a high-numbered slot with greater access to bandwidth, but only with a somewhat smaller theoretical average and maximum latency. A lower numbered board may have to wait for all other boards to use the bus once, and then for all boards of higher slot number to use the bus once.

A11. Elimination of Switches and Jumpers

Switches and jumpers have a long history of causing operational difficulties in computer systems. A goal of the NuBus is to provide the means to eliminate most, if not all, jumpers from the system. The slot addressing provides a mechanism that allows each board to be uniquely addressed. The board should then be designed with software controlled registers to peform any function that would require switches or jumpers in an old style system.

A12. Preferred *I/O* Cabling

Cabling for the triple height NuBus cards is via the two auxilliary connectors, P2 and P3. No cabling is to be connected to any other edge of the board. The P2 and P3 connectors interface to mating DIN connectors on the backplane. The I/O cables then connect on the back side of the backplane. Since the cables will generally not incorporate a 96 pin DIN connector to mate to the backplane connector, an adaptor card is required to provide a mating connector to match the cable. The adaptor card can provide multiple connectors for separate cables, as long as all of the required signals can be routed through the backplane connector. Figure A1 illustrates this arrangement.

A significant benefit of this cabling scheme is that the boards may be removed from the system without disturbing the system cabling. This simplifies maintenance and improves system reliability.

Fig A1
Cabling Scheme for Triple Height NuBus Cards

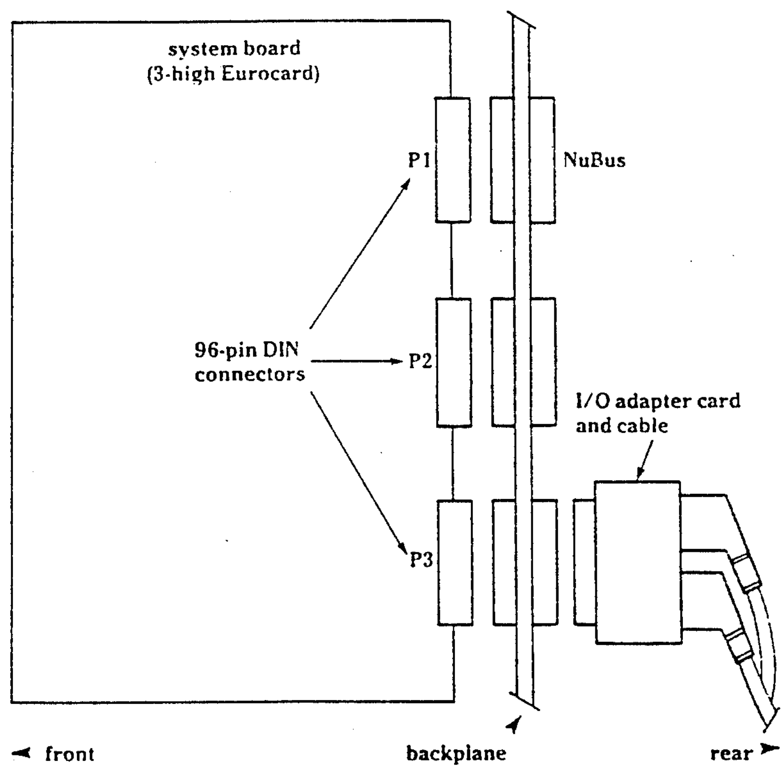

[Extracted from Texas Instruments NuBus™ specification document with permission of the publisher. Copyright (1983, 1986, 1988) Texas Instruments Incorporated.]

A13. Reserved Attention Cycles

The two reserved attention cycles may be defined at a later date, as a need is identified. Possible uses might be for broadcast cycles, or response to nonmaster requests. Whatever use is defined in the future must be compatible with the current definitions. This requires that newly defined attention cycles will restart arbitration and not affect the resource lock mechanism. This will allow current hardware to be upward compatible.

| SECTION | | PAGE |
|---|---|---|
| Table 8 | Pin Assignments (P1) | 52 |
| Table 9 | Pin Assignments (P2 and P3) | 58 |
| APPENDIX | | |
| A1. | Locking | 63 |
| A2. | Technology Dependence | 64 |
| A3. | Flow Control | 64 |
| A4. | Single Address Space | 65 |
| A5. | Non-Master Request Versus Event Cycles | 65 |
| A6. | Capacitive Loading | 65 |
| A7. | Bus Clock | 65 |
| A8. | Termination | 66 |
| A9. | Byte Addressing on Bus | 66 |
| A10. | Fairness | 67 |
| A11. | Elimination of Switches and Jumpers | 67 |
| A12. | Preferred I/O Cabling | 67 |
| A13. | Reserved Attention Cycles | 69 |
| APPENDIX FIGURE | | |
| Fig A1 | Cabling Scheme for Triple Height NuBus Cards | 68 |

We claim:

1. A system for data compression and decompression, comprising:

video interface means for receiving and transmitting digitized images;

discrete cosine transform means for performing, during data compression, a 2-dimensional discrete cosine transform on data received by said video interface means, and providing coefficients of said 2-dimensional discrete cosine transform, and for performing, during data decompression, a 2-dimensional inverse discrete cosine transform, and providing as output data said coefficients of said 2-dimensional inverse discrete cosine transform to said video interface for transmission as digitized images;

quantization means for attenuating, during data compression, higher frequency coefficients of said 2-dimensional discrete cosine transform, and for partially restoring, during data decompression, said higher frequency coefficients of said 2-dimensional discrete cosine transform, in preparation for said 2-dimensional inverse discrete cosine transform;

zig-zag means for rearranging, during data compression, said coefficients of said 2-dimensional discrete cosine transform from "sequential" order into "zig-zag" order, and for rearranging, during data decompression, said zig-zag ordered coefficients of said 2-dimensional discrete cosine transform from a "zig-zag" order to a "sequential" order;

data packing and unpacking means for packing, during data compression, said "zig-zag" ordered coefficients of said 2-dimensional discrete cosine transform as run length-represented coefficients of said 2-dimensional discrete cosine transform, said run length-represented coefficients of said 2-dimensional discrete cosine transform represent runs of zero coefficients as run lengths of zero coefficients, and for unpacking, during data decompression, said run length-represented coefficients of said 2-dimensional discrete cosine transform to said "zig-zag" ordered coefficients of said 2-dimensional discrete cosine transform;

Huffman coding/decoding means for coding, during data compression, said run length-represented coefficients of said 2-dimensional discrete cosine transform into Huffman codes, and for decoding, during data decompression, said Huffman codes into said run length-represented coefficients of said 2-dimensional discrete cosine transform;

host interface means for transmitting, during data compression, said Huffman codes to a host computer, and for retrieving, during data decompression, said Huffman codes from a host computer;

wherein said discrete cosine transform means comprises:

block memory means for storing, during data compression, said data received by said video interface means, and for storing, during data decompression, said output data of said 2-dimensional inverse discrete cosine transform;

discrete cosine transform processor means for providing, during data compression, coefficients of a discrete cosine transform and during decompression, coefficients of an inverse discrete cosine transform;

row storage means for temporarily storing intermediate data of said 2-dimensional discrete cosine transform, and intermediate data of said 2-dimensional inverse discrete cosine transform;

input selection means for alternatively receiving, during data compression, data from said block memory means and intermediate data of said 2-dimensional discrete cosine transform from said row storage means for transmitting to said discrete cosine transform processor means, and for alternatively receiving, during data decompression, data from said quantization means and said intermediate data of said 2-dimensional inverse discrete cosine transform from said row storage means for transmitting to said discrete cosine transform processor means; and row/column separation means for, during data compression, separating from said coefficients of said discrete cosine transform said coefficients of said 2-dimensional discrete cosine transform and said intermediate data of said 2-dimensional discrete cosine transform, for transmitting said coefficients of said 2-dimensional discrete cosine transform to said quantization means and said intermediate data of said 2-dimensional discrete cosine transform to said row storage means, for, during data decompression, separating from said coefficients of said inverse discrete cosine transform said coefficients of said 2-dimensional inverse discrete cosine transform and said intermediate data of said 2-dimensional inverse discrete cosine transform, and for transmitting said coefficients of said 2-dimensional inverse discrete cosine transform to said block memory means, and for transmitting said intermediate data of said 2-dimensional inverse discrete cosine transform to said row storage means.

2. A system as in claim 1, for data compression and decompression, wherein said block memory means comprises:

memory storage means for separately receiving and storing video data having Y-, U-, and V-types;

a plurality of address counter means for separately containing logical read/write addresses for read/-write accesses to said Y-, U-, and V-types video data stored in said memory storage means; and address-aliasing means for implementing an "in-line" memory to minimize storage requirement, and for translating said logical read/write addresses into physical addresses for said read/write accesses to said Y-, U-, and V-types video data stored in said memory storage means;

3. A system as in claim 1, for data compression and decompression, wherein said discrete cosine transform processor means comprises:

a first plurality of latches for receiving a first, second, third and fourth data;

first summing means for selectably computing a first sum or a difference of said first and second data, and for selectably computing a second sum or difference for said third and fourth data;

a second plurality of latches for receiving, storing and transmitting as a first result said first sum or difference and as a second result said second sum or difference;

first multiplication means for selectably performing a first multiplication of said first result with 2 cos (pi/8), 2 cos (pi/4), 2 cos (3pi/8) and 1;

a third plurality of latches for receiving, storing and transmitting result of said first multiplication and for receiving from said second plurality of latches, storing and transmitting said second result;

first multiplexor means for selecting a first multiplexed datum from said result of said first multiplication and said first result in said second plurality of latches;

second multiplexor means for selecting a second multiplexed datum form said result of said first multiplication and said second result in said third plurality of latches;

second summing means for computing a third sum or difference of said first multiplexed datum and said second result stored in said third plurality of latches;

third multiplexor means for selecting a third multiplexed datum from said second result stored in said third plurality of latches and said third sum or difference;

a fourth plurality of latches for receiving said second multiplexed datum and said third multiplexed datum;

a plurality of multiplexors for selecting from said fourth plurality of latches a fourth, fifth, sixth and seventh multiplexed data;

third summing means for selectably providing a fourth sum or difference of said fourth and fifth multiplexed data, and for selectably providing a fifth sum or difference of said sixth and seventh multiplexed data;

a fifth plurality of latches for receiving and storing said fourth sum or difference, and said fifth sum or difference;

a second multiplication means for selectably performing a second multiplication of said fourth sum and 2 cos (pi/8), 2 cos (pi/4), or 2 cos (3pi/8) or 1;

a sixth plurality of latches for receiving and storing the result of said second multiplication and said fifth sum or difference;

fourth multiplexor means for selecting an eighth multiplexed datum from said result of said second multiplication stored in said sixth plurality of latches and said fourth sum or difference;

fourth summing means for computing a sixth sum or difference of said eighth multiplexed datum and said fifth sum or difference stored in said sixth plurality of latches;

fifth multiplexor means for selecting a ninth multiplexed datum from said fifth sum or difference stored in said sixth plurality of latches;

sixth multiplexor means for selecting a tenth multiplexed datum from said sixth sum or difference and said fifth sum or difference stored in said sixth plurality of latches;

a seventh plurality of latches for receiving and storing said ninth multiplexed datum and said tenth multiplexed datum;

fifth summing means for providing a seventh sum of said ninth and tenth multiplexed data, and for selectably providing a eighth sum or difference of said ninth and tenth multiplexed data; and an eighth plurality of latches for receiving and storing said seventh sum and said eighth sum.

4. A system as in claim 1, wherein said row storage means comprises:

memory means for storing intermediate data of a 2-dimensional discrete cosine transform during data compression and for storing intermediate data for a 2-dimensional inverse discrete cosine transform during data decompression, said memory means allows reading and writing a pair of said intermediate data at a time; and address generator means for generating addresses for read/write access reading and writing said pair of said intermediate data to said memory means.

5. A system as in claim 4, wherein said memory means comprises:

an odd plane of a plurality of memory cells, for storing a first datum of said pair of said intermediate data; and an even plane of a plurality of memory cells, for storing a second datum of said pair of said intermediate data.

6. A system as in claim 5, wherein said memory means is accessed by a method comprising the steps of:

providing, in order, a first and a second square matrices of the same dimension, and each matrix with an even number of rows and column, said matrices are provided two entries at a time row-by-row;

writing said first matrix into said memory means two entries at a time, in an order such that, in the beginning of the writing the first row, the first of said two entries is written into said odd plane, and the second of said two entries is written into said even plane, and said order is maintained throughout said first row, and said order is reversed at the beginning of the second row, such that the first of said two entries is written into said even plane, and the second of said two entries is written into said odd plane, said order is reversed alternatively until said first matrix is completely written into said memory means; and reading said first matrix two entries at a time column-by-column until the entire first matrix is read, and writing said second matrix two entries at a time row-by-row into the memory locations of said memory means previously occupied by each two entries of said first matrix read, and said writing of said second matrix is in an order substantially the same as described for writing said first matrix.

* * * * *

CERTIFICATE OF CORRECTION

PATENT NO. : 5,196,946

DATED : March 23, 1993

INVENTOR(S) : Alexander Balkanski, et al

It is certified that error appears in the above-indentified patent and that said Letters Patent is hereby corrected as shown below:

Column 1, line 48: delete "$2^8$x28x28" and insert --$2^8$ x $2^8$ x $2^8$--,

Column 7, line 30: delete "$x[n]e$" and insert --$\tilde{x}$ [n]e--.

Column 7, line 34: delete "X[k]" second occurrence and insert --$\tilde{x}$ [k]--.

Column 11, lines 25-29: delete the equations and insert --2, $-2\cos\frac{\Pi}{8}$, $-2\cos\frac{\Pi}{4}$, $-2\cos\frac{3\Pi}{8}$ ...., $-2\cos\frac{7\Pi}{8}$--.

Column 20, line 35: delete "YYUVYYUV" and insert --YYUV--.

Column 20, line 54: delete "col10-co17" and insert --co10-co17--.

UNITED STATES PATENT AND TRADEMARK OFFICE

CERTIFICATE OF CORRECTION

PATENT NO. : 5,196,946 Page 2 of 2

DATED : March 23, 1993

INVENTOR(S) : Alexander Balkanski, et al

It is certified that error appears in the above-indentified patent and that said Letters Patent is hereby corrected as shown below:

Column 273, line 35: Claim: delete "ransform" and insert --transform--.

Signed and Sealed this

Twenty-seventh Day of December, 1994

Attest:

Bruce Lehman

BRUCE LEHMAN

*Attesting Officer* *Commissioner of Patents and Trademarks*